US011312906B2

United States Patent
Mamiya et al.

(10) Patent No.: US 11,312,906 B2
(45) Date of Patent: Apr. 26, 2022

(54) POLYMERIZABLE MONOMER, LIQUID CRYSTAL COMPOSITION USING POLYMERIZABLE MONOMER, AND LIQUID CRYSTAL DISPLAY DEVICE

(71) Applicant: DIC Corporation, Tokyo (JP)

(72) Inventors: Junichi Mamiya, Kita-adachi-gun (JP); Yuichi Inoue, Kita-adachi-gun (JP); Masaomi Kimura, Kita-adachi-gun (JP); Junko Yamamoto, Kita-adachi-gun (JP); Masanao Hayashi, Kita-adachi-gun (JP); Hirokazu Sugiyama, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 16/611,753

(22) PCT Filed: May 17, 2018

(86) PCT No.: PCT/JP2018/019055
§ 371 (c)(1),
(2) Date: Nov. 7, 2019

(87) PCT Pub. No.: WO2018/221236
PCT Pub. Date: Dec. 6, 2018

(65) Prior Publication Data
US 2020/0224098 A1     Jul. 16, 2020

(30) Foreign Application Priority Data

Jun. 1, 2017  (JP) .............................. JP2017-109172
Jan. 30, 2018 (JP) .............................. JP2018-013593

(51) Int. Cl.
*C09K 19/12*     (2006.01)
*C09K 19/32*     (2006.01)
(Continued)

(52) U.S. Cl.
CPC .............. *C09K 19/12* (2013.01); *C09K 19/32* (2013.01); *C09K 19/3402* (2013.01);
(Continued)

(58) Field of Classification Search
CPC .... C09K 19/12; C09K 19/32; C09K 19/3402; C09K 19/322; C09K 19/14; C09K 19/30;
(Continued)

(56) References Cited

U.S. PATENT DOCUMENTS 10,344,215 B2    7/2019  Tong et al.
2011/0272631 A1  11/2011 Saito
(Continued)

FOREIGN PATENT DOCUMENTS

CN    103626660 A    3/2014
CN    104737068 A    6/2015
(Continued)

OTHER PUBLICATIONS

International Search Report dated Jun. 26, 2018, issued in counterpart International Application No. PCT/JP2018/019055 (2 pages).
(Continued)

*Primary Examiner* — Eli D. Strah
(74) *Attorney, Agent, or Firm* — Westerman, Hattori, Daniels & Adrian, LLP

(57) ABSTRACT

A problem to be solved by the present invention is to provide a liquid crystal composition excellent in vertical alignment and compatibility and to provide a liquid crystal display device produced using the same. The problem is solved by a liquid crystal composition containing one or two or more kinds of self-aligning polymerizable monomers and one or two or more kinds of polymerizable monomers (or polymerizable compounds) having a specific chemical structure, and a liquid crystal display device produced using the same, specifically a liquid crystal composition containing a polym-
(Continued)

erizable monomer represented by General Formula (I) and a spontaneously aligning monomer which has a chemical structure different from that of the polymerizable monomer represented by General Formula (I), and has a polar group, and a liquid crystal display device containing the same.

10 Claims, 1 Drawing Sheet

(51) Int. Cl.
  *C09K 19/34* (2006.01)
  *G02F 1/1337* (2006.01)
  *G02F 1/1343* (2006.01)
  *C09K 19/04* (2006.01)

(52) U.S. Cl.
  CPC .......... *G02F 1/1337* (2013.01); *G02F 1/1343* (2013.01); *B32B 2457/20* (2013.01); *B32B 2457/202* (2013.01); *C09K 2019/0448* (2013.01); *C09K 2019/122* (2013.01); *C09K 2019/3425* (2013.01); *C09K 2323/00* (2020.08)

(58) Field of Classification Search
  CPC ........ C09K 19/34; C09K 19/38; C09K 19/54; C09K 19/56; C09K 2323/00; C09K 2019/0448; C09K 2019/122; C09K 2019/3425; C09K 2019/3416; C09K 2019/3413; G02F 1/1337; G02F 1/1343; G02F 1/133703; G02F 2001/133742; G02F 1/133742; B32B 2457/20; B32B 2457/202
  See application file for complete search history.

(56) References Cited

U.S. PATENT DOCUMENTS

| | | | |
|---|---|---|---|
| 2015/0252265 A1* | 9/2015 | Archetti | C09K 19/38 349/130 |
| 2016/0046863 A1 | 2/2016 | Archetti et al. | |
| 2016/0053178 A1 | 2/2016 | Hirschmann et al. | |
| 2016/0170269 A1 | 6/2016 | Noma et al. | |
| 2016/0264865 A1 | 9/2016 | Hirschmann et al. | |
| 2016/0264866 A1 | 9/2016 | Hirschmann et al. | |
| 2017/0045765 A1 | 2/2017 | Fujisawa et al. | |
| 2017/0123275 A1 | 5/2017 | Noma et al. | |
| 2017/0158793 A1* | 6/2017 | Endo | C08F 220/303 |
| 2017/0362506 A1 | 12/2017 | Hirschmann et al. | |
| 2017/0369418 A1* | 12/2017 | Tanaka | C09K 19/322 |
| 2018/0057743 A1 | 3/2018 | Archetti et al. | |
| 2018/0187079 A1 | 7/2018 | Sudou et al. | |
| 2018/0208848 A1 | 7/2018 | Archetti et al. | |

FOREIGN PATENT DOCUMENTS

| | | | |
|---|---|---|---|
| CN | 105916900 A | 8/2016 | |
| EP | 3 553 595 A1 | 10/2019 | |
| JP | 5565316 B2 | 8/2014 | |
| JP | 2015-168826 A | 9/2015 | |
| JP | 2016-041804 A | 3/2016 | |
| JP | 2016-047918 A | 4/2016 | |
| JP | 2016-169377 A | 9/2016 | |
| JP | 2016-186070 A | 10/2016 | |
| JP | 2017-014486 A | 1/2017 | |
| JP | 6624305 B2 | 12/2019 | |
| TW | 201716549 A | 5/2017 | |
| WO | 2014/061755 A1 | 4/2014 | |
| WO | 2015/122457 A1 | 8/2015 | |
| WO | WO-2015198915 A1 * | 12/2015 | .......... G02B 5/3016 |
| WO | 2016/015803 A1 | 2/2016 | |
| WO | 2016/082922 A1 | 6/2016 | |
| WO | 2016/117271 A1 | 7/2016 | |
| WO | WO-2016117271 A1 * | 7/2016 | ............. C09K 19/34 |
| WO | 2016/146245 A1 | 9/2016 | |
| WO | 2017/041893 A1 | 3/2017 | |
| WO | 2018/105726 A1 | 6/2018 | |

OTHER PUBLICATIONS

Notice of Reasons for Refusal dated Dec. 6, 2018, issued in counterpart JP Patent Application No. 2018-552896, w/English translation (6 pages).

Notice of Reasons for Refusal dated Jan. 31, 2019, issued in counterpart JP Patent Application No. 2018-552896, w/English translation (6 pages).

* cited by examiner

POLYMERIZABLE MONOMER, LIQUID CRYSTAL COMPOSITION USING POLYMERIZABLE MONOMER, AND LIQUID CRYSTAL DISPLAY DEVICE

TECHNICAL FIELD

The present invention relates to a novel polymerizable monomer, a liquid crystal composition containing such a polymerizable monomer and a spontaneously aligning monomer, and a liquid crystal display device produced using the same.

BACKGROUND ART

In general, a liquid crystal display device such as a liquid crystal panel or a liquid crystal display changes a state of alignment of liquid crystal molecules by an external stimulus such as an electric field, and a change in optical characteristics associated with the change is used for display. Such a liquid crystal display device has a configuration in which a gap between two transparent substrates is filled with liquid crystal molecules, and it is common to form an alignment film for an arrangement of the liquid crystal molecules in a specific direction in advance on a surface of a substrate in contact with the liquid crystal molecules.

However, there are problems in that alignment defects occur due to scratches and dust on an alignment film surface in a manufacturing process of the liquid crystal display device, and as the size of the substrate is increased, it becomes difficult to design and manage the alignment film to obtain uniform alignment over the entire surface of the substrate for a long period of time.

Therefore, in recent years, there has been a demand for development of a liquid crystal display device that does not require an alignment film by using a liquid crystal composition containing a spontaneously aligning material that controls the alignment of liquid crystal molecules in a liquid crystal layer.

For example, PTL 1 discloses, in place of lauryl acrylate which has a relatively weak interaction with a liquid crystal molecule, a liquid crystal composition containing a spontaneously aligning material that suppresses a decrease in a voltage holding rate by a liquid crystal composition containing a monofunctional biphenyl monomer having an octyl group and exhibiting high linearity and a bifunctional biphenyl monomer having a stearyl group and exhibiting low linearity. In addition, PTL 2 discloses various liquid crystal compositions containing a polymerizable self-alignment additive which controls alignment of the liquid crystal molecules in place of the alignment film, and discloses that when a test cell without an alignment layer is filled with a liquid crystal composition containing a nematic LC medium, a polymerizable self-alignment additive, and a polymerizable compound if necessary, it has spontaneous homeotropic (vertical) alignment with respect to the substrate surface, this vertical alignment is much more stable up to the clearing point, and the formed VA cell can be reversibly switched by applying a voltage.

CITATION LIST

Patent Literature

PTL 1: US-A-2017-0123275
PTL 2: JP-T-2015-168826

SUMMARY OF INVENTION

Technical Problem

However, although it is considered that a composition containing two kinds of hydrophobic monomers having a long alkyl chain and a biphenyl skeleton as disclosed in PTL 1 has a stronger interaction with the liquid crystal molecules of the liquid crystal layer, with which a gap between a pair of substrates is filled, than that of lauryl acrylate, there is a problem in that the alignment direction of the liquid crystal molecules cannot be regulated due to a low adsorption force to the substrate.

Moreover, in PTL 2, since the polymerizable self-alignment additive provided with a polar group, such as a hydroxyl group, is used, it is considered that the adsorption force with respect to the substrate is higher than that of the monomer disclosed in PTL 1. However, when the adsorption force of the polymerizable self-alignment additive to the substrate is too high, the polymerizable self-alignment additive does not spread uniformly on the substrate, which causes a problem of uneven alignment. Further, in a system where a gap between a pair of substrates is filled with, as a liquid crystal layer, a liquid crystal composition containing a polymerizable compound having a highly symmetric chemical structure as used in PTL 2 and a polymerizable self-alignment additive having a polar group such as a hydroxyl group, the liquid crystal layer exhibits hydrophobic properties, and thus the polymerizable compound exists in a direction horizontal to the substrate in terms of free energy, which causes a problem in that it is difficult for the liquid crystal molecules that are aligned in accordance with the polymerizable compound to form a vertical alignment with respect to the substrate. In addition, in the liquid crystal composition containing the polymerizable self-alignment additive having a polar group such as a hydroxyl group, the compatibility with a liquid crystal molecule that is hydrophobic is lowered, which causes a problem in that the liquid crystal compound, the polymerizable compound, or the like is precipitated.

In this regard, the problem to be solved by the present invention is to provide a novel polymerizable monomer excellent in vertical alignment and compatibility or a liquid crystal composition excellent in vertical alignment and compatibility and to provide a liquid crystal display device produced using the same.

Solution to Problem

As a result of intensive studies by the inventors of the present invention, it has been found that the above problems can be solved by a liquid crystal composition containing one or two or more kinds of self-aligning polymerizable monomers and one or two or more kinds of polymerizable monomers (or polymerizable compounds) having a specific chemical structure, and a liquid crystal display device produced using the same, and thereby the present invention has been completed.

Advantageous Effects of Invention

The liquid crystal composition according to the present invention exhibits high compatibility and excellent vertical alignment with respect to liquid crystal molecules.

The liquid crystal composition according to the present invention exhibits excellent extensibility (wetting and spreading) with respect to the substrate.

The liquid crystal composition according to the present invention has no alignment unevenness or can reduce alignment unevenness.

The liquid crystal display device according to the present invention has no alignment unevenness or exhibits reduced alignment unevenness.

The polymerizable monomer according to the present invention exhibits high compatibility and excellent vertical alignment with respect to liquid crystal molecules.

The liquid crystal composition containing a polymerizable monomer according to the present invention exhibits excellent extensibility (wetting and spreading) with respect to the substrate.

The liquid crystal composition containing the polymerizable monomer according to the present invention has no alignment unevenness or can reduce alignment unevenness.

DESCRIPTION OF EMBODIMENTS

Figure 1:
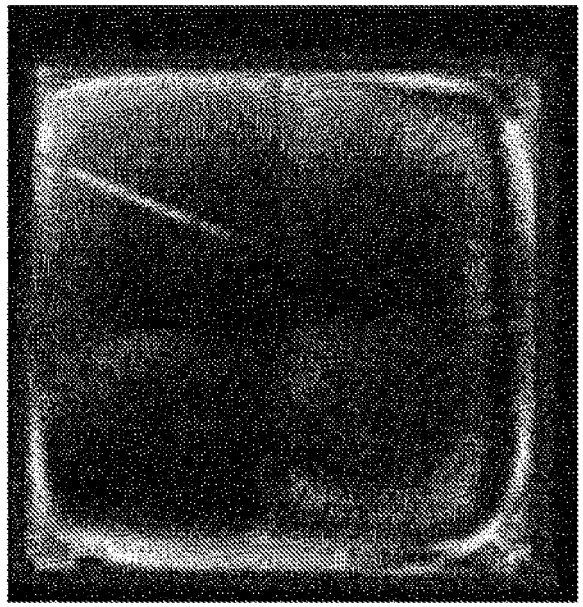
FIG. 1 is a diagram illustrating an evaluation result of an alignment test of comparative examples.

According to a first aspect of the present invention, there is provided a liquid crystal composition containing a polymerizable monomer represented by General Formula (I) and a spontaneously aligning monomer which has a chemical structure different from that of the polymerizable monomer represented by General Formula (I), and has a polar group.

[Chem. 1]

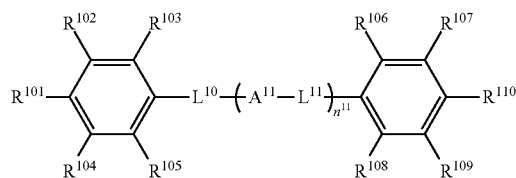

(I)

In General Formula (I), $R^{101}$, $R^{102}$, $R^{103}$, $R^{104}$, $R^{105}$, $R^{106}$, $R^{107}$, $R^{109}$, $R^{109}$, and $R^{110}$ each independently represent any of $P^{11}$—$S^{11}$—, an alkyl group having 1 to 18 carbon atoms, an alkoxy group having 1 to 18 carbon atoms, a halogen atom, and a hydrogen atom, and $P^{11}$ represents any of the following Formula (R-I) to Formula (R-IX).

[Chem. 2]

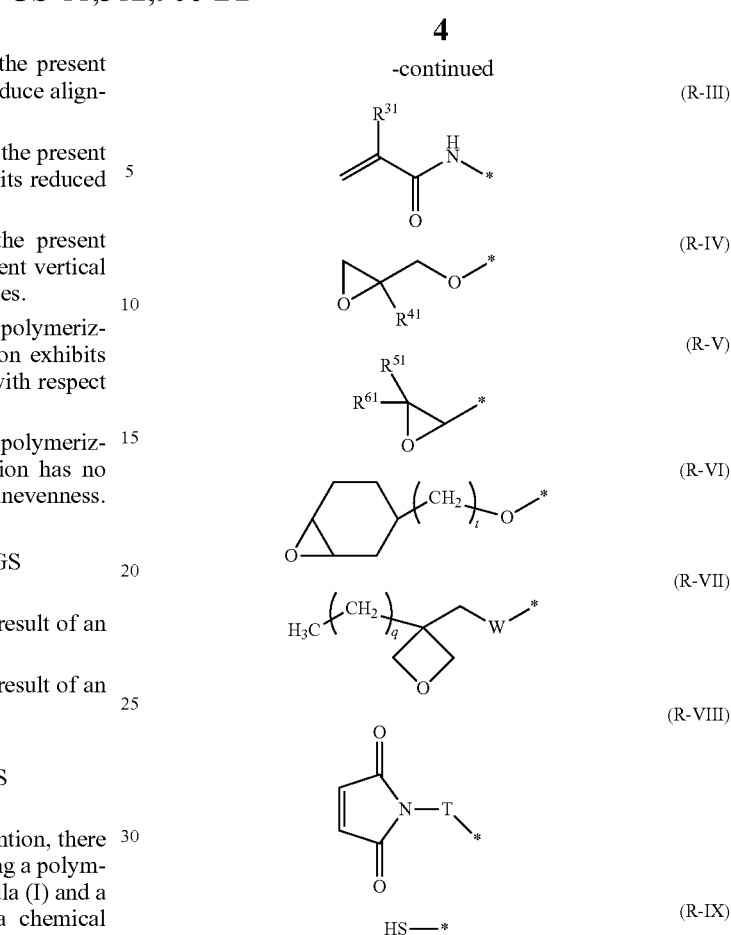

In Formulae (R-I) to (R-IX), $R^{21}$, $R^{31}$, $R^{41}$, $R^{51}$, and $R^6$ are each independently a hydrogen atom or an alkyl group having 1 to 5 carbon atoms, or a halogenated alkyl group having 1 to 5 carbon atoms, W is a single bond, —O—, or a methylene group, T is a single bond or —COO—, and p, t, and q are each independently 0, 1, or 2.

$S^{11}$ represents a single bond or an alkylene group having 1 to 15 carbon atoms, and one or two or more —CH$_2$—'s in the alkylene group may be substituted with —O—, —OCO—, or —COO— so that an oxygen atom is not directly adjacent thereto, $n^{11}$ represents 0, 1, or 2, $A^{11}$ represents a group selected from the group consisting of a group (a), a group (b), and a group (c) as follows: (a) 1,4-cyclohexylene group (one —CH$_2$— or two or more non-adjacent —CH$_2$—'s present in this group may be substituted with —O—). (b) 1,4-phenylene group (one —CH═ or two or more non-adjacent —CH═'s present in this group may be substituted with —N═), and (c) naphthalene-2,6-diyl group, 1,2,3,4-tetrahydronaphthalene-2,6-diyl group, or decahydronaphthalene-2,6-diyl group (one —CH═ or two or more non-adjacent —CH═'s present in the naphthalene-2,6-diyl group or the 1,2,3,4-tetrahydronaphthalene-2,6-diyl group may be substituted with —N═), the group (a), the group (b), and the group (c) may be each independently substituted with an alkyl group having 1 to 12 carbon atoms, an alkoxy group having 1 to 12 carbon atoms, halogen atoms, a cyano group, a nitro group, or $P^{11}$—$S^{11}$—, $L^{10}$ and $L^{10}$ each independently represent a single bond, —OCH$_2$—, —CH$_2$O—, —C$_2$H$_4$—, —OC$_2$H$_4$O—, —COO—, —OCO—, —CH═CR$^a$—COO—, —CH═CR$^a$—OCO—, —COO—CR$^a$═CH—, —OCO—CR$^a$═CH—, —(CH$_2$)$_z$—COO—, —(CH$_2$)$_z$—OCO—, —OCO—

$(CH_2)$—, —COO—$(CH_2)_z$—, —CH=CH—, —$CF_2$O—, —O$CF_2$—, or —C≡C—, wherein $R^a$'s each independently represent a hydrogen atom or an alkyl group having 1 to 3 carbon atoms, and in the formula, z's each independently represent an integer of 1 to 4, at least two or more $P^{11}$—$S^{11}$—'s are included in one molecule of General Formula (I), an alkyl group having 1 to 18 carbon atoms is contained in one molecule of General Formula (I), and one —$CH_2$— or two or more non-adjacent —$CH_2$—'s in the alkyl group may be each independently substituted with —O—, and in a case where there are a plurality of $P^{11}$'s, $S^{11}$'s, $L^{10}$'s, $L^{11}$'s, and $A^{11}$'s, those may be the same as or different from each other.

With this, there is provided a liquid crystal composition which gives excellent vertical alignment with respect to the liquid crystal molecule and is excellent in the compatibility. In addition, in the liquid crystal composition, it is possible to vertically align the liquid crystal molecules without requiring an alignment film.

In General Formula (I), $A^{11}$ represents a group selected from the group consisting of the following groups (a) to (c), and the group (a), the group (b), and the group (c) may be each independently substituted with an alkyl group having 1 to 12 carbon atoms, an alkoxy group having 1 to 12 carbon atoms, halogen, a cyano group, a nitro group, or $P^{11}$—$S^{11}$—.
  (a) 1,4-cyclohexylene group (one —$CH_2$— or two or more non-adjacent —$CH_2$—'s present in this group may be substituted with —O—),
  (b) 1,4-phenylene group (one —CH= or two or more non-adjacent —CH='s present in this group may be substituted with —N=), and
  (c) naphthalene-2,6-diyl group, 1,2,3,4-tetrahydronaphthalene-2,6-diyl group, or decahydronaphthalene-2,6-diyl group (one —CH= or two or more non-adjacent —CH='s present in the naphthalene-2,6-diyl group or the 1,2,3,4-tetrahydronaphthalene-2,6-diyl group may be substituted with —N=)

In General Formula (I), $A^{11}$ is preferably a 1,4-phenylene group or a naphthalene-2,6-diyl group which may be substituted with an alkyl group having 1 to 12 carbon atoms, an alkoxy group having 1 to 12 carbon atoms, halogen atom, a cyano group, a nitro group, or $P^{11}$—$S^{11}$—, and is more preferably a 1,4-phenylene group which may be substituted with an alkyl group having 1 to 12 carbon atoms, an alkoxy group having 1 to 12 carbon atoms, halogen atoms, a cyano group, a nitro group, or $P^{11}$—$S^{11}$—.

In General Formula (I), $L^{10}$ is preferably a single bond, —O$CH_2$—, —$CH_2$O—, —$C_2H_4$—, —COO—, —OCO—, —CH=CH—COO—, —CH=CH—OCO—, —COO—CH=CH—, —OCO—CH=CH—, —$C_2H_4$—COO—, —$C_2H_4$—OCO—, —OCO—$C_2H_4$—, —COO—$C_2H_4$—, —CH=CH—, —$CF_2$O—, —O$CF_2$—, or —C≡C—, is more preferably a single bond, —O$CH_2$—, —$CH_2$O—, —$C_2H_4$—, —COO—, —OCO—, —$C_2H_4$—COO—, —$C_2H_4$—OCO—, —OCO—$C_2H_4$—, —COO—$C_2H_4$—, —$CF_2$O—, —O$CF_2$—, or —C≡C—, and is particularly preferably a single bond.

The linking group $L^{10}$ is an even number linking group, and the molecule is linear, so that it is easy to become familiar with liquid crystal molecules.

In General Formula (I), $L^{11}$ is preferably a single bond, —O$CH_2$—, —$CH_2$O—, —$C_2H_4$—, —COO—, —OCO—, —CH=CH—COO—, —CH=CH—OCO—, —COO—CH=CH—, —OCO—CH=CH—, —$C_2H_4$—COO—, —$C_2H_4$—OCO—, —OCO—$C_2H_4$—, —COO—$C_2H_4$—, —CH=CH—, —$CF_2$O—, —O$CF_2$—, or —C≡C—, is more preferably a single bond, —O$CH_2$—, —$CH_2$O—, —$C_2H_4$—, —COO—, —OCO—, —$C_2H_4$—COO—, —$C_2H_4$—OCO—, —OCO—$C_2H_4$—, —COO—$C_2H_4$—, —CH=CH—, —$CF_2$O—, —O$CF_2$—, or —C≡C—, and is particularly preferably a single bond.

The linking group $L^{11}$ is an even number linking group, and the molecule is linear, so that it is easy to become familiar with liquid crystal molecules.

In General Formula (I), $L^{10}$ and $L^{11}$ may be the same as or different from each other, and $L^{10}$ and $L^{11}$ are preferably the same as each other.

In General Formula (I), $R^{101}$, $R^{102}$, $R^{103}$, $R^{104}$, $R^{105}$, $R^{106}$, $R^{107}$, $R^{108}$, $R^{109}$, and $R^{101}$ each independently represent any of $P^{11}$—$S^{11}$—, an alkyl group having 1 to 18 carbon atoms, an alkoxy group having 1 to 18 carbon atoms, a halogen atom, or a hydrogen atom, and in this case, the preferable number of carbon atoms of the alkyl group and the alkoxy group is preferably 10 to 18 in a case where the alignment of the liquid crystal is regarded as important, and is preferably 1 to 4 in a case where the solubility in the liquid crystal compound is regarded as important. In addition, the alkyl group and the alkoxy group may be linear or branched, and the linear shape is particularly preferable.

Further, in a case where at least one or more of $R^{101}$, $R^{102}$, $R^{103}$, $R^{104}$, $R^{105}$, $R^{106}$, $R^{107}$, $R^{108}$, $R^{109}$, and $R^{110}$ represent an alkyl group having 1 to 18 carbon atoms, the preferable number of carbon atoms in the alkyl group is preferably 10 to 18 in a case where the alignment of the liquid crystal is regarded as important, and is preferably 1 to 4 is in a case where the solubility in the liquid crystal compound is regarded as important. In addition, the alkyl group may be linear or branched, and the linear shape is particularly preferable.

In General Formula (I), it is preferable that $R^{101}$, $R^{102}$, $R^{103}$, $R^{104}$, $R^{105}$, $R^{106}$, $R^{107}$, $R^{108}$, $R^{109}$, and $R^{110}$ each independently represent any of $P^{11}$—$S^{11}$—, an alkyl group having 1 to 10 carbon atoms, a halogen atom, or a hydrogen atom, and more preferably represent $P^{11}$—$S^{11}$—, an alkyl group having 1 to 3 carbon atoms, a fluorine atom, or a hydrogen atom. From the viewpoint of solubility, the alkyl chain is better not be too long.

At least two or more $P^{11}$—$S^{11}$—'s are included in one molecule of the polymerizable monomer represented by General Formula (I). The polymerizable monomer represented by General Formula (I) preferably has two or more polymerizable groups from the viewpoint of crosslinking density.

In General Formula (I), among $R^{101}$, $R^{102}$, $R^{103}$, $R^{104}$, $R^{105}$, $R^{106}$, $R^{107}$, $R^{108}$, $R^{109}$, and $R^{110}$, at least two or more $P^{11}$—$S^{11}$—'s are preferable, 2 to 4 $P^{11}$—$S^{11}$—'s are more preferable, and 2 or 3 $P^{11}$—$S^{11}$—'s are still more preferable.

In the polymerizable monomer represented by General Formula (I), it is preferable that 1 to 4 polymerizable groups are provided on an outer portion of a mesogen skeleton from the viewpoint of polymerizability.

That is, at least two or more $P^{11}$—$S^{11}$—'s are included in one molecule of the polymerizable monomer represented by General Formula (I). In this case, the configuration is divided into three types including (1) All contains two or more $P^{11}$—$S^{21}$—'s, (2) $A^{11}$ contains one or more $P^{11}$—$S^{11}$—'s, and at least one or more $P^{11}$, —$S^{11}$—'s of $R^{101}$, $R^{102}$, $R^{103}$, $R^{104}$, $R^{105}$, $R^{106}$, $R^{107}$, $R^{108}$, $R^{109}$, and $R^{110}$, and (3) $A^{11}$ contains at least two or more $P^{11}$—$S^{11}$—'s of $R^{101}$, $R^{102}$, $R^{103}$, $R^{104}$, $R^{105}$, $R^{106}$, $R^{107}$, $R^{108}$, $R^{109}$, and $R^{10}$.

In General Formula (I), in a case of (1) $A^{11}$ contains two or more $P^{11}$—$S^{11}$—'s, it is preferable to have a structure in which $A^{11}$ is preferably a 6-membered ring group, and $P^{11}$—$S^{11}$— is substituted at positions 2 and 5, and it is more preferable to have a structure that $A^{11}$ is a 1,4-phenylene group, and $P^{11}$—$S^{11}$— is substituted at positions 2 and 5.

In General Formula (I), in a case of (2) $A^{11}$ contains one or more $P^{11}$—$S^{11}$-'s, and at least one or more $P^{11}$—$S^{11}$-'s of $R^{101}$, $R^{102}$, $R^{103}$, $R^{104}$, $R^{105}$, $R^{106}$, $R^{107}$, $R^{108}$, $R^{109}$, and $R^{101}$, it is preferable to have a structure in which $A^{11}$ is a 6-membered ring group, one of the 2- or 3-positions of $A^{11}$ that is a 6-membered ring has $P^{11}$—$S^{11}$—, and $R^{101}$ or $R^{110}$ has $P^{11}$—$S^{11}$—.

In General Formula (I), in a case of (3) All contains at least two or more $P^{11}$—$S^{11}$-'s of $R^{101}$, $R^{102}$, $R^{103}$, $R^{104}$, $R^{105}$, $R^{106}$, $R^{107}$, $R^{108}$, $R^{109}$, and $R^{110}$, examples of preferable structures include a structure in which $R^{101}$ and $R^{110}$ are $P^{11}$—$S^{11}$— ($P^{11}$ and $S^{11}$ may be the same as or different from each other), a structure in which $R^{101}$ and $R^{107}$ are $P^{11}$—$S^{11}$— ($P^{11}$ and $S^{11}$ may be the same as or different from each other), and a structure in which $R^{108}$ and $R^{110}$ are $P^{11}$—$S^{11}$— ($P^{11}$ and $S^{11}$ may be the same as or different from each other).

$R^{101}$ and $R^{110}$ are preferably $P^{11}$—$S^{11}$— from the viewpoint of the solubility in the liquid crystal compound.

In a case where three $P^{11}$—$S^{21}$-'s are included in one molecule of the polymerizable monomer represented by General Formula (I), examples of preferable structures include a structure in which $R^{101}$, $R^{110}$, and $R^{107}$ are $P^{11}$—$S^{11}$— ($P^{11}$ and $S^{11}$ may be the same as or different from each other), a structure in which $R^{101}$, $R^{110}$, and $R^{102}$ are $P^{11}$—$S^{11}$— ($P^{11}$ and $S^{11}$ may be the same as or different from each other), and a structure in which $A^{11}$ is a 6-membered ring group, one of 2- or 3-positions of $A^{11}$ that is a 6-membered ring has $P^{11}$—$S^{11}$—, and $R^{101}$ or $R^{110}$ has $P^{11}$—$S^{11}$—.

In the case where four $P^{11}$—$S^{11}$—'s are included in one molecule of the polymerizable monomer represented by General Formula (I), examples of preferable structures include a structure in which $R^{102}$, $R^{104}$, $R^{107}$, and $R^{109}$ are $P^{11}$—$S^{11}$— ($P^{11}$ and $S^{11}$ may be the same as or different from each other) and a structure in which $R^{102}$, $R^{104}$, and $R^{107}$ are $P^{11}$—$S^{11}$— and one of 2- or 3-positions of $A^{11}$ that is a 6-membered ring has $P^{11}$—$S^{11}$—.

Needless to say, in a case where there are a plurality of $P^{11}$ and $S^{11}$ as described above, $P^{12}$ and $S^{11}$ may be the same as or different from each other.

At least one alkyl group having 1 to 18 carbon atoms is contained in one molecule of General Formula (I), and one —$CH_2$— or two or more non-adjacent —$CH_2$-'s in the alkyl group may be each independently substituted with —O—.

As a result, a long-chain alkyl group is directed to the hydrophobic liquid crystal layer side, and the liquid crystal molecules are also aligned in the vertical direction with respect to the substrate, thereby achieving an effect of improving the vertical alignment.

As an example of at least one alkyl group (one —$CH_2$— or two or more non-adjacent —$CH_2$-'s in the alkyl group may be each independently substituted with —O—) having 1 to 18 carbon atoms which is contained in one molecule of the polymerizable monomer represented by General Formula (I), an alkyl group having 1 to 18 carbon atoms or an alkoxy group having 1 to 18 carbon atoms is preferable, and an alkyl group having 1 to 18 carbon atoms is more preferable.

In the polymerizable monomer represented by General Formula (I), when one or more alkyl groups are contained in one molecule, an alkyl moiety is easily compatible with a hydrophobic liquid crystal, and is aligned in a brush shape toward the liquid crystal layer side, and the liquid crystal molecules are also aligned vertically, which is preferable.

In addition, examples of preferable examples of at least one alkyl group (one —$CH_2$— or two or more non-adjacent —$CH_2$-'s in the alkyl group may be each independently substituted with —O—) having 1 to 18 carbon atoms which is contained in one molecule of the polymerizable monomer represented by General Formula (I) include a straight chain or branched alkyl group, and a straight chain alkyl group is preferable. Further, the preferable number of carbon atoms of the alkyl group is preferably 1 to 3 in a case where the solubility and extensibility of the liquid crystal composition are regarded as important. On the other hand, it is preferably 10 to 19 in a case where the vertical alignment with respect to the liquid crystal molecule is regarded as important.

It is preferable to contain one or two alkyl groups (one —$CH_2$— or two or more non-adjacent —$CH_2$-'s in the alkyl group may be each independently substituted with —O—) having 1 to 18 carbon atoms in one molecule of the polymerizable monomer represented by General Formula (I).

From the viewpoint of alignment, it is preferable to contain one or two alkyl groups having 1 to 18 carbon atoms in one molecule of the polymerizable monomer represented by General Formula (I).

In a case where one alkyl group (one —$CH_2$— or two or more non-adjacent —$CH_2$-'s in the alkyl group may be each independently substituted with —O—) having 1 to 18 carbon atoms which is contained in one molecule of the polymerizable monomer represented by General Formula (I), it is preferable any of $R^{102}$, $R^{103}$, $R^{106}$, $R^{107}$, and 2- or 3-positions of $A^{11}$ that is a 6-membered ring. In addition, in a case where two alkyl groups (one —$CH_2$— or two or more non-adjacent —$CH_2$-'s in the alkyl group may be each independently substituted with —O—) having 1 to 18 carbon atoms are contained in one molecule of the polymerizable monomer represented by General Formula (I), as a combination of positions of the two alkyl groups, any one of combinations of $R^{102}$ and $R^{104}$, $R^{103}$ and $R^{105}$, $R^{102}$ and $R^{103}$, $R^{106}$ and $R^{108}$, $R^{107}$ and $R^{109}$, and $R^{106}$ and $R^{107}$ is preferable, and any one of combinations of $R^{102}$ and $R^{104}$, $R^{103}$ and $R^{105}$, $R^{106}$ and $R^{108}$, and $R^{107}$ and $R^{109}$ is more preferable.

In General Formula (I), $n^{11}$ represents 0, 1, or 2, $n^{11}$ is preferably 0 or 1, and $n^1$ is more preferably 0.

In General Formula (I), in a case where $n^{11}$ is 2, $L^1$ and $A^{11}$ may be the same as or different from each other.

The compound represented by General Formula (I) has a structure in which two benzene rings and, if necessary, a ring $A^{11}$ are linked, and these two benzene rings and the ring $A^{11}$ have at least two $P^{11}$—$S^{11}$—'s, and therefore, the compound represented by General Formula (I) has an action and effect as a polymerizable monomer.

In General Formula (I), $P^{11}$ represents any one of the following Formulae (R-I) to (R-IX).

[Chem. 3]

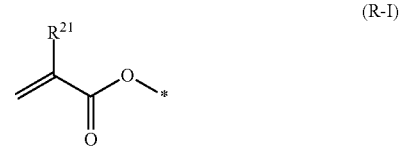

(R-I)

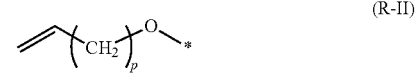

(R-II)

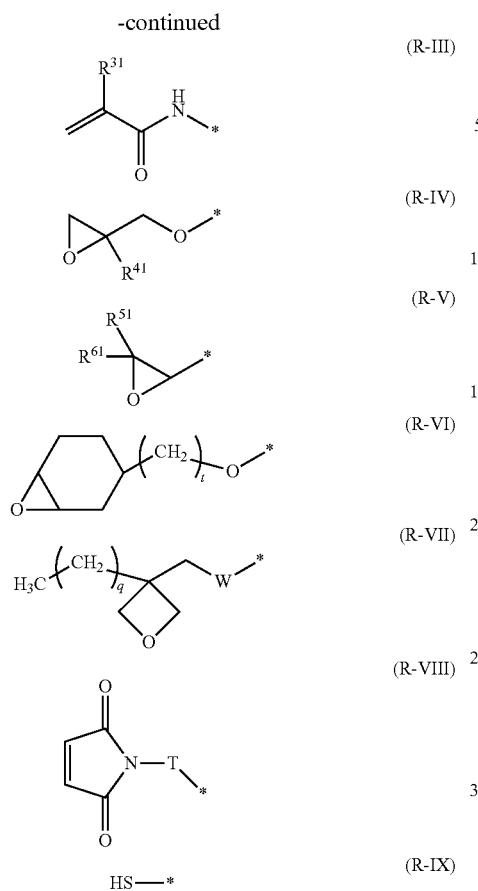

(R-III)

(R-IV)

(R-V)

(R-VI)

(R-VII)

(R-VIII)

(R-IX)

In Formulae (R-I) to (R-IX), $R^{21}$, $R^{31}$, $R^{41}$, $R^{51}$, and $R^{61}$ are each independently a hydrogen atom or an alkyl group having 1 to 5 carbon atoms, or a halogenated alkyl group having 1 to 5 carbon atoms, W is a single bond, —O—, or a methylene group, T is a single bond or —COO—, and p, t, and q are each independently 0, 1, or 2.

Among them, in General Formula (I), $P^{11}$ is each independently preferably Formula (R-1), Formula (R-2), Formula (R-3), Formula (R-4), Formula (R-5), or Formula (R-7), more preferably Formula (R-1), Formula (R-2), Formula (R-3), or Formula (R-4), still more preferably Formula (R-1), further still more preferably an acryl group or a methacryl group, and even more preferably a methacryl group.

In General Formula (I), $S^{11}$ is preferably a single bond or an alkylene group having 1 to 3 carbon atoms, and is more preferably a single bond.

A lower limit of the content of the polymerizable monomer represented by General Formula (I) in the liquid crystal composition of the present invention is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.12% by mass, preferably 0.15% by mass, preferably 0.17% by mass, preferably 0.2% by mass, preferably 0.22% by mass, preferably 0.25% by mass, preferably 0.27% by mass, preferably 0.3% by mass, preferably 0.32% by mass, preferably 0.35% by mass, preferably 0.37% by mass, preferably 0.4% by mass, preferably 0.42% by mass, preferably 0.45% by mass, preferably 0.5% by mass, and preferably 0.55% by mass. An upper limit of the content of the polymerizable compound represented by General Formula (I) in the liquid crystal composition of the present invention is preferably 2.5% by mass, preferably 2.3% by mass, preferably 2.1% by mass, preferably 2% by mass, preferably 1.8% by mass, preferably 1.6% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.5% by mass, preferably 0.45% by mass, and preferably 0.4% by mass.

The liquid crystal composition according to the present invention preferably contains one or two or more kinds of polymerizable monomers represented by General Formula (I), preferably contains one to five kinds of polymerizable monomers represented by General Formula (I), preferably contains one to four kinds of polymerizable monomers represented by General Formula (I), and preferably contains one to three kinds of polymerizable monomers represented by General Formula (I). In another embodiment, from the viewpoint of improving the vertical alignment and alignment unevenness, it is preferable to contain two to five kinds of polymerizable monomers represented by General Formula (I), and it preferably contains two to four kinds of polymerizable monomers represented by General Formula (I).

As a preferable form of the polymerizable monomer represented by the General Formula (I) according to the present invention, it is preferably represented by General Formula (Ia).

[Chem. 4]

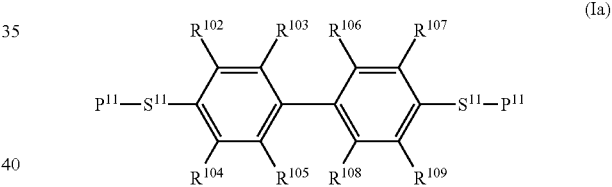

(Ia)

In General Formula (Ia), $R^{102}$, $R^{103}$, $R^{104}$, $R^{105}$, $R^{106}$, $R^{107}$, $R^{108}$, and $R^{09}$ each independently represent any of $P^{11}$—$S^{11}$—, an alkyl group having 1 to 18 carbon atoms, an alkoxy group having 1 to 18 carbon atoms, a halogen atom, or a hydrogen atom, and $P^{11}$ represents any of Formula (R-I) to Formula (R-IX).

[Chem. 5]

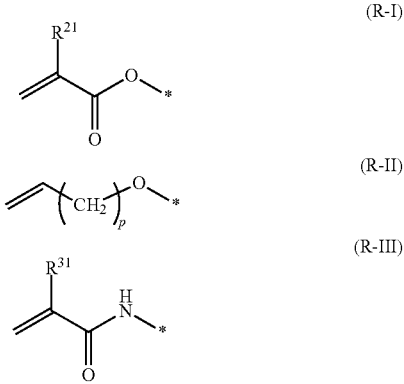

(R-I)

(R-II)

(R-III)

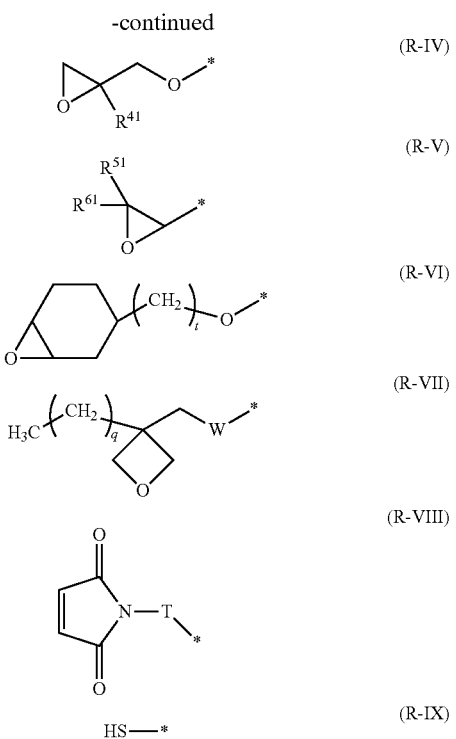

(R-IV)
(R-V)
(R-VI)
(R-VII)
(R-VIII)
(R-IX)

In Formulae (R-I) to (R-IX), $R^{21}$, $R^{31}$, $R^{41}$, $R^{51}$, and $R^{61}$ are each independently a hydrogen atom or an alkyl group having 1 to 5 carbon atoms, or a halogenated alkyl group having 1 to 5 carbon atoms, W is a single bond, —O—, or a methylene group, T is a single bond or —COO—, and p, t, and q are each independently 0, 1, or 2, $S^{11}$ represents a single bond or an alkylene group having 1 to 15 carbon atoms, and one or two or more —$CH_2$-'s in the alkylene group may be substituted with —O—, —OCO—, or —COO-so that an oxygen atom is not directly adjacent thereto, at least one of $R^{102}$, $R^{103}$, $R^{104}$, $R^{105}$, $R^{106}$, $R^{107}$, $R^{108}$, and $R^{109}$ is an alkyl group having 1 to 18 carbon atoms and an alkoxy group having 1 to 18 carbon atoms. Here, a plurality of $P^{21}$ and $S^{11}$'s may be the same as or different from each other.

In General Formula (Ia), any of $R^{102}$, $R^{103}$, $R^{106}$, and $R^{107}$ is preferably an alkyl group having 1 to 18 carbon atoms or an alkoxy group having 1 to 18 carbon atoms. In addition, in General Formula (Ia), in a case of containing two alkyl groups having 1 to 18 carbon atoms or an alkoxy group having 1 to 18 carbon atoms, as a combination of positions of the two alkyl groups, any one of combinations of $R^{102}$ and $R^{104}$, $R^{103}$ and $R^{105}$, $R^{102}$ and $R^{103}$, $R^{106}$ and $R^{108}$, $R^{107}$ and $R^{109}$, and $R^{106}$ and $R^{107}$, and any one of combinations of $R^{102}$ and $R^{104}$, $R^{103}$ and $R^{105}$, $R^{106}$ and $R^{108}$, and $R^{107}$ and $R^{109}$ is more preferable.

In General Formula (Ia), $P^{11}$ is each independently preferably Formula (R-1), Formula (R-2), Formula (R-3), Formula (R-4), Formula (R-5), or Formula (R-7), more preferably Formula (R-1), Formula (R-2), Formula (R-3), or Formula (R-4), still more preferably Formula (R-1), further still more preferably an acryl group or a methacryl group, and even more preferably a methacryl group. Moreover, two or more $P^{11}$'s in General Formula (Ia) may be the same as or different from each other, but are preferably the same, and are preferably the same as each other.

In General Formula (Ia), $S^{11}$ is preferably a single bond or an alkylene group having 1 to 3 carbon atoms, and is more preferably a single bond. Moreover, two or more $S^{11}$'s in General Formula (Ia) may be the same as or different from each other, but are preferably the same, and are preferably the same as each other.

In addition, the preferable aspect of an alkyl group having 1 to 18 carbon atoms and an alkoxy group having 1 to 18 carbon atoms is the same as that of General Formula (I).

A lower limit of the content of the polymerizable monomer represented by General Formula (Ia) in the liquid crystal composition of the present invention is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.12% by mass, preferably 0.15% by mass, preferably 0.17% by mass, preferably 0.2% by mass, preferably 0.22% by mass, preferably 0.25% by mass, preferably 0.27% by mass, preferably 0.3% by mass, preferably 0.32% by mass, preferably 0.35% by mass, preferably 0.37% by mass, preferably 0.4% by mass, preferably 0.42% by mass, preferably 0.45% by mass, preferably 0.5% by mass, and preferably 0.55% by mass. An upper limit of the content of the polymerizable compound represented by General Formula (I) in the liquid crystal composition of the present invention is preferably 2.5% by mass, preferably 2.3% by mass, preferably 2.1% by mass, preferably 2% by mass, preferably 1.8% by mass, preferably 1.6% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.5% by mass, preferably 0.45% by mass, and preferably 0.4% by mass.

The liquid crystal composition according to the present invention preferably contains one or two or more kinds of polymerizable monomers represented by General Formula (Ia). The kinds of the polymerizable monomers represented by General Formula (Ia) contained in the liquid crystal composition according to the present invention are preferably one to five kinds, one to four kinds, one to three kinds, or one or two kinds. In another embodiment, from the viewpoint of improving the vertical alignment and the alignment unevenness, it is preferable to contains two to five kinds, two to four kinds, or two or three kinds of the polymerizable monomers.

Examples of the preferable compound of the polymerizable monomer represented by General Formula (I) according to the present invention include compounds represented by Formulae RM-1 to RM-75-6 as follows.

[Chem. 6]

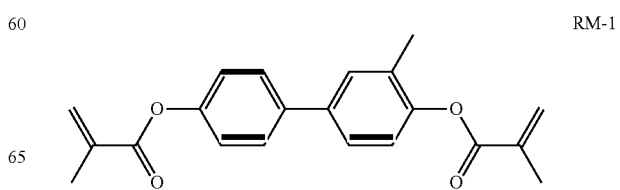

RM-1

-continued
RM-2
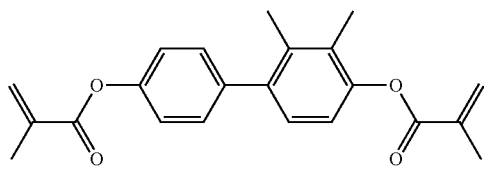
RM-3
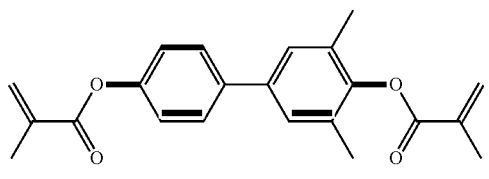
RM-4
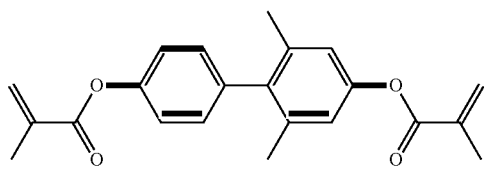
RM-5
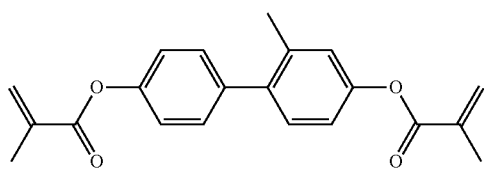
RM-6
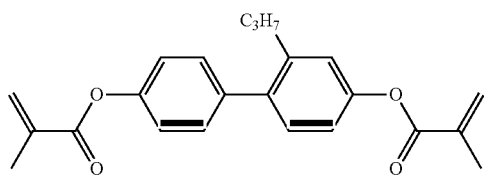
RM-7
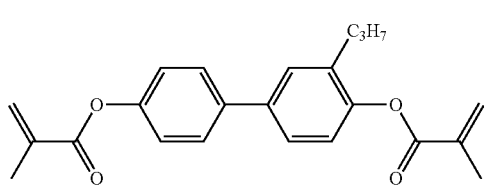
RM-8
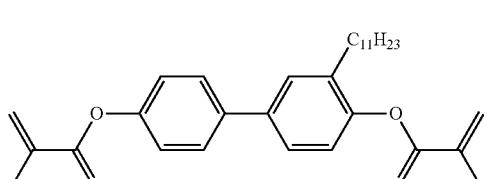
RM-9
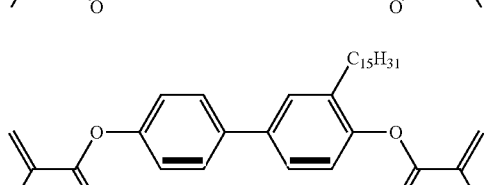
RM-10
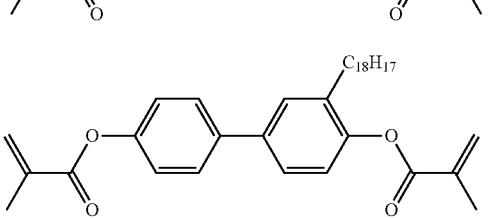
-continued
RM-11
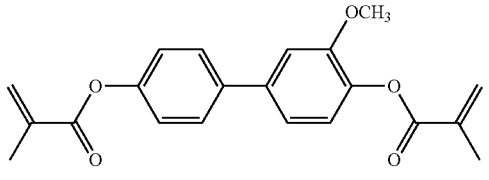
RM-12
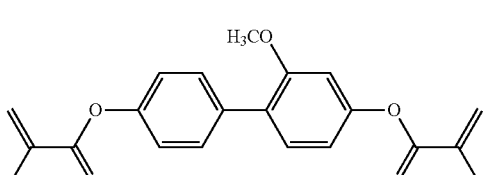
RM-13
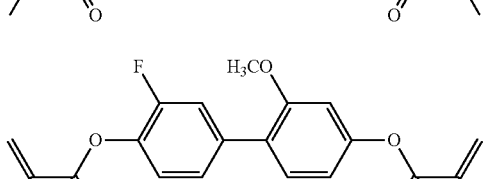
RM-14
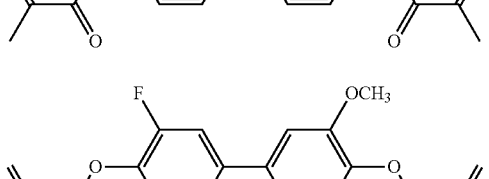
RM-15
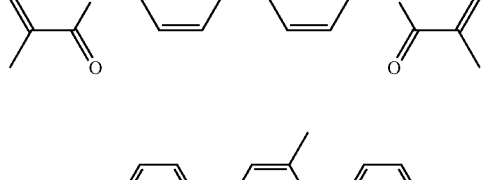
RM-16
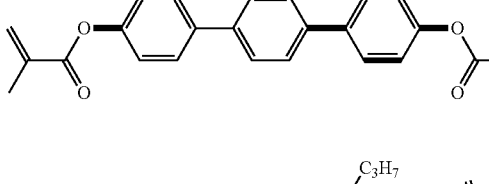
RM-17
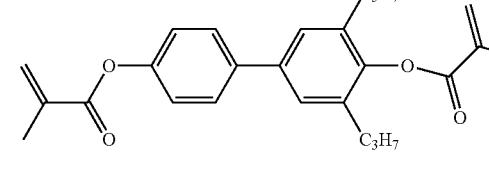
RM-18
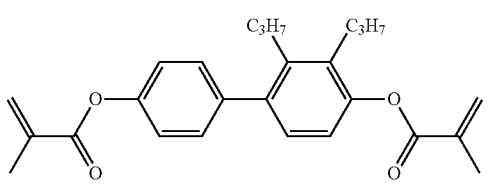

[Chem. 7]

-continued
RM-34
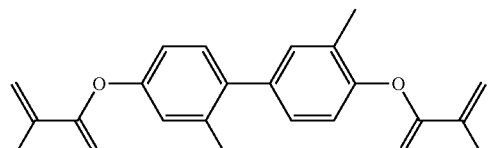
RM-35
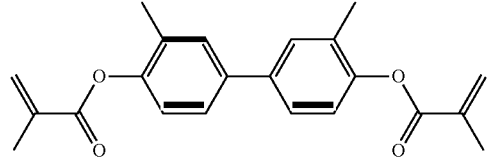
RM-36
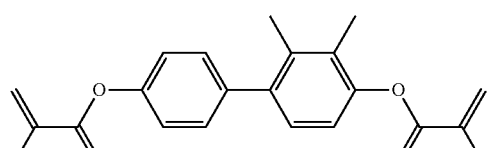
RM-37
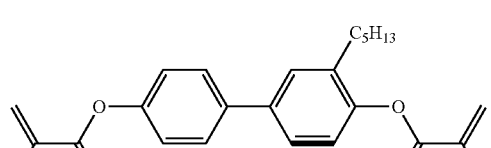
RM-38
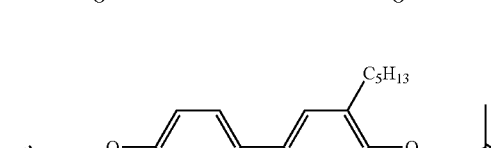
RM-39
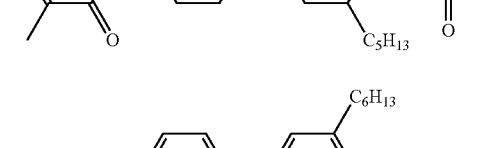
RM-40
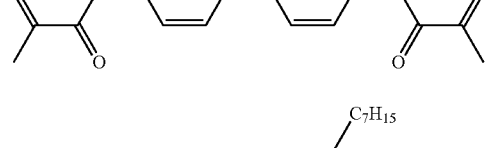
RM-41
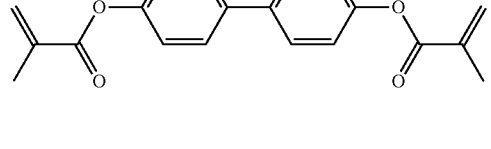
-continued
RM-42
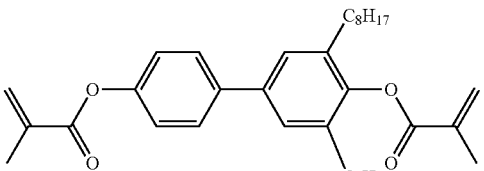
RM-43
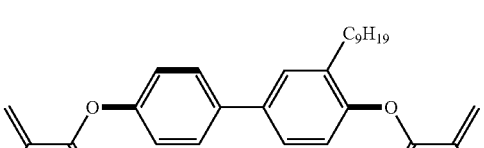
RM-44
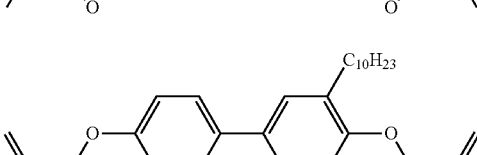
[Chem. 8]
RM-45
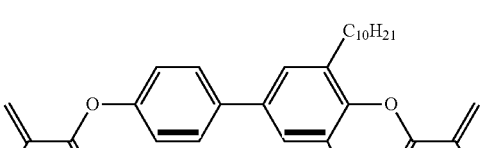
RM-46
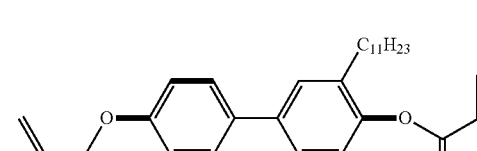
RM-47
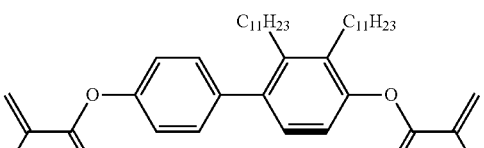
RM-48
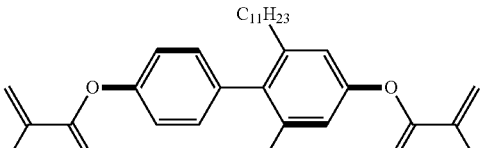
RM-49
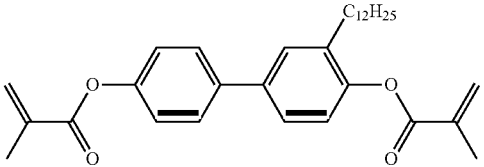

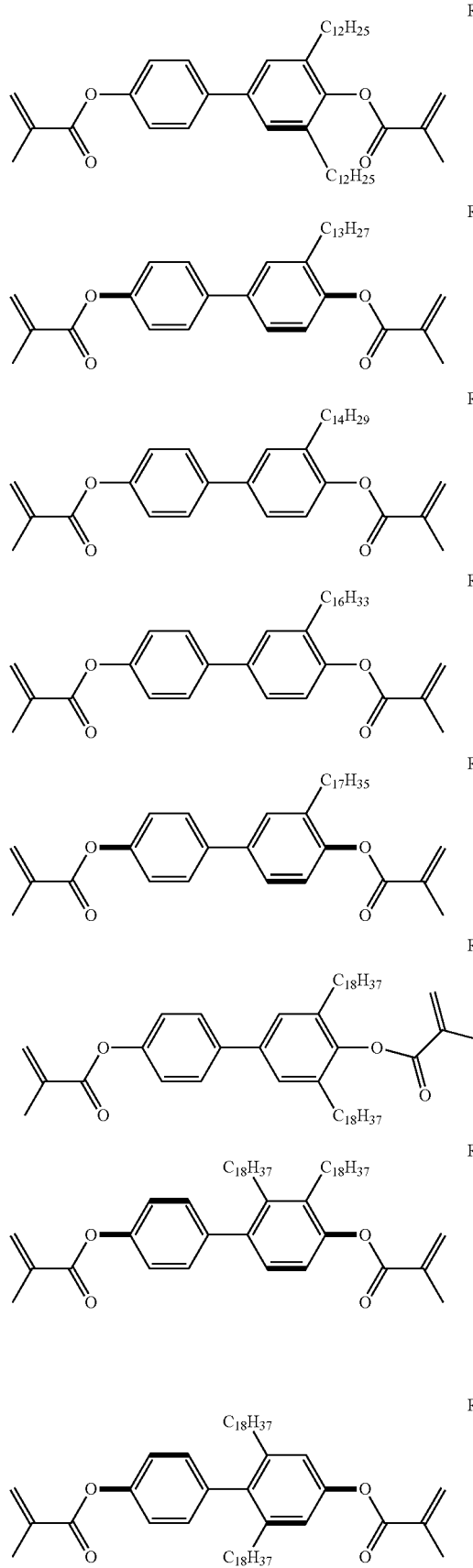
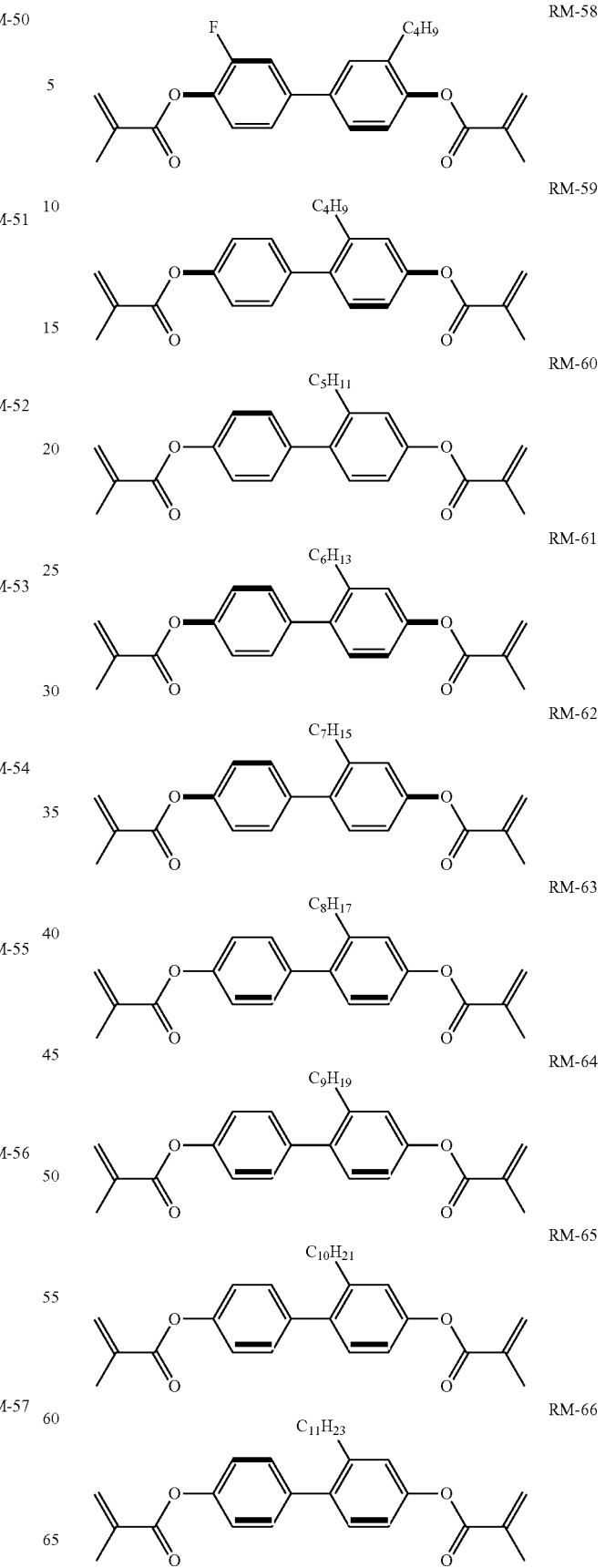

[Chem. 9]
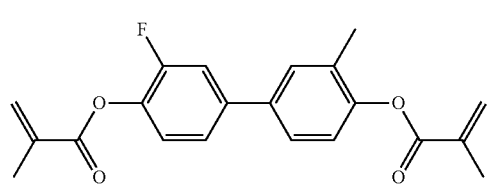
RM-67
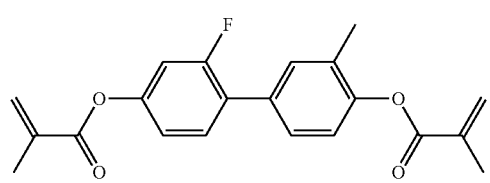
RM-68
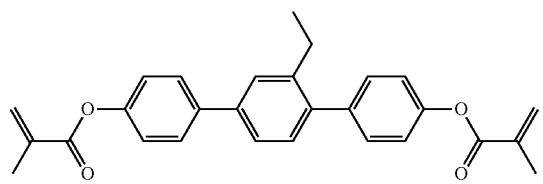
RM-69
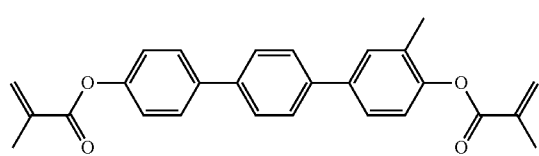
RM-70
[Chem. 10]
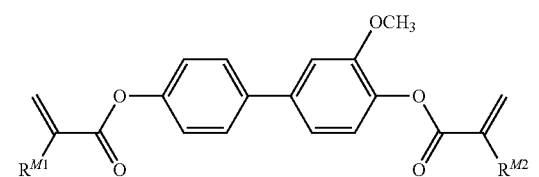
RM-11-1
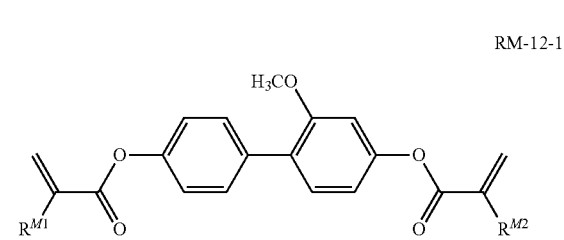
RM-12-1
[Chem. 11]
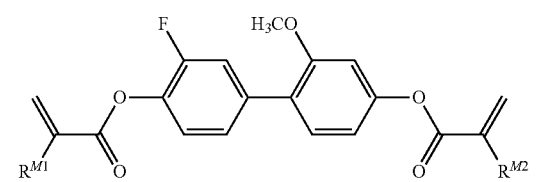
RM-13-1
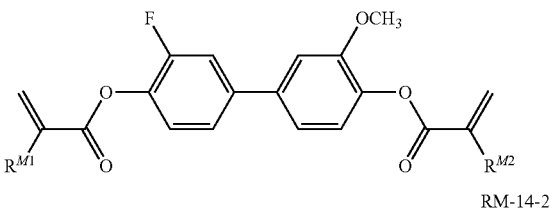
RM-14-1
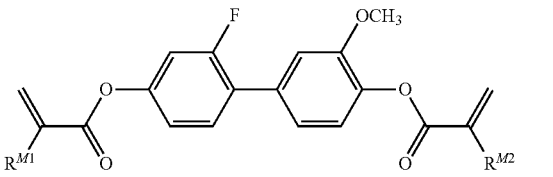
RM-14-2
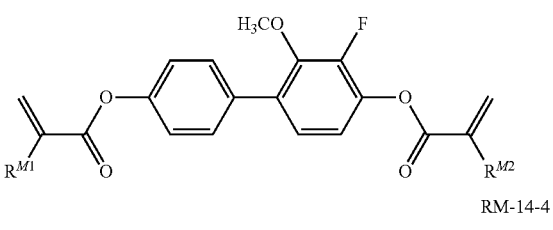
RM-14-3
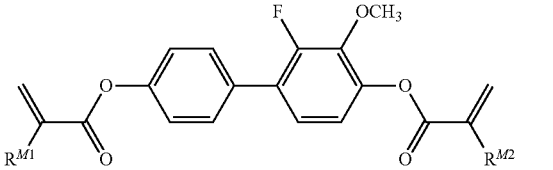
RM-14-4
[Chem. 12]
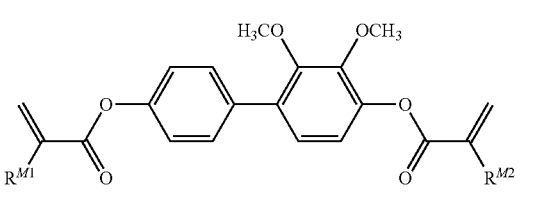
RM-71-1
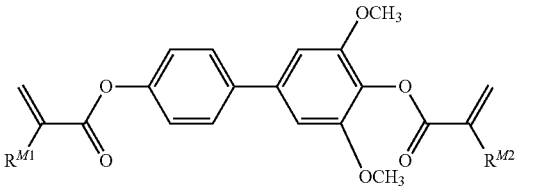
RM-71-2
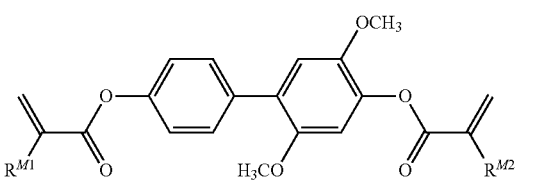
RM-71-3

RM-71-4
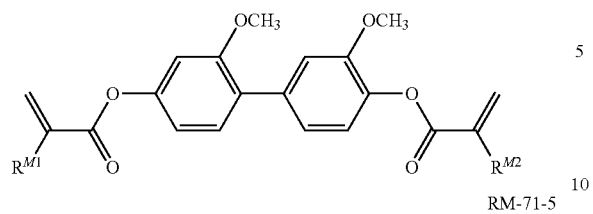
RM-71-5
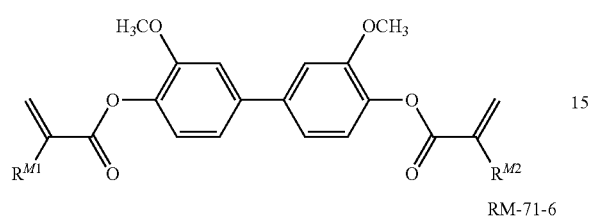
RM-71-6
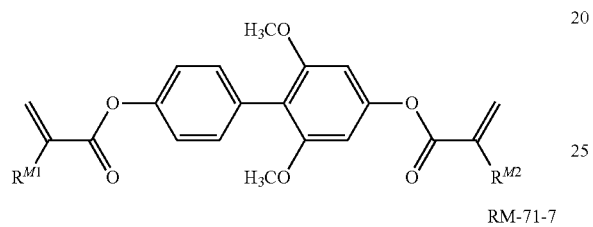
RM-71-7
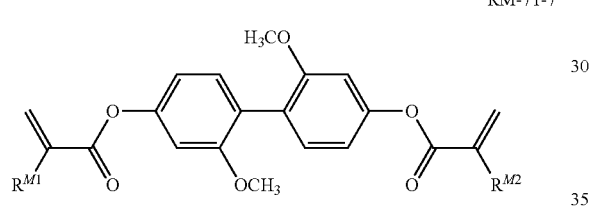
[Chem. 13]
RM-72-1
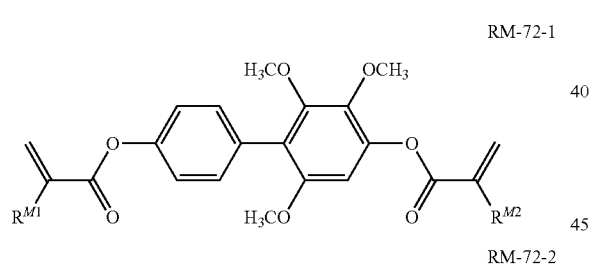
RM-72-2
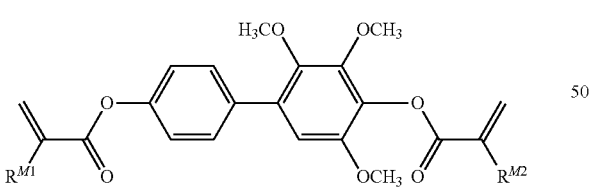
RM-72-3
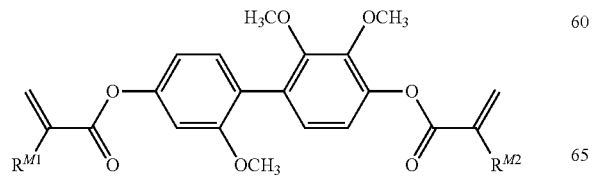
RM-72-4
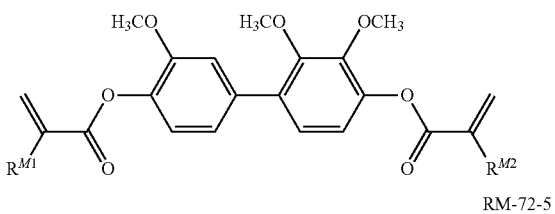
RM-72-5
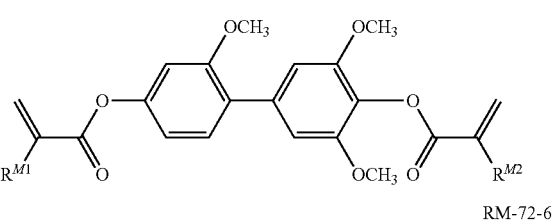
RM-72-6
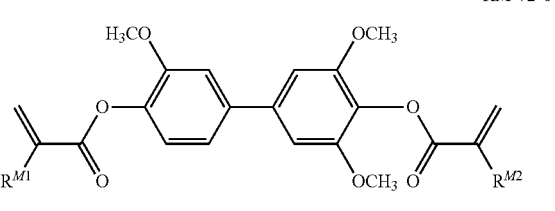
RM-72-7
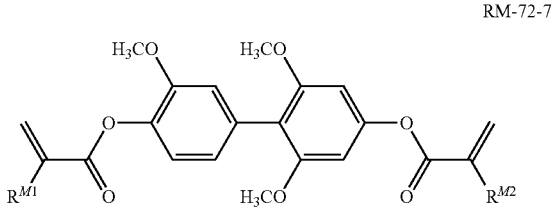
RM-72-8
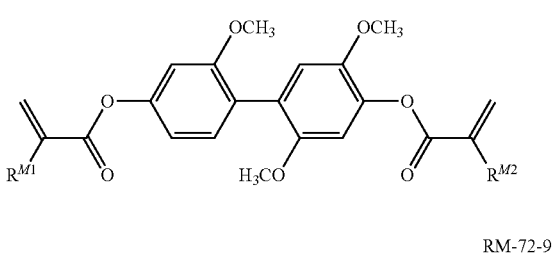
RM-72-9
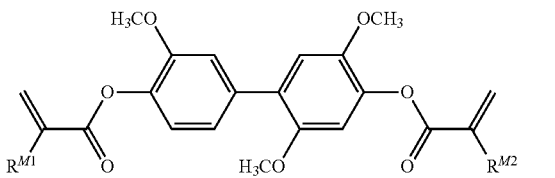
[Chem. 14]
RM-73-1
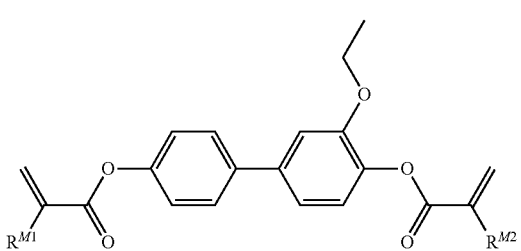

RM-73-2
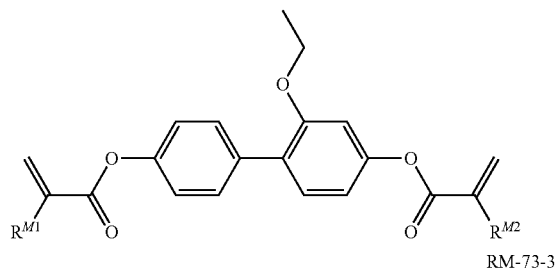
RM-73-3
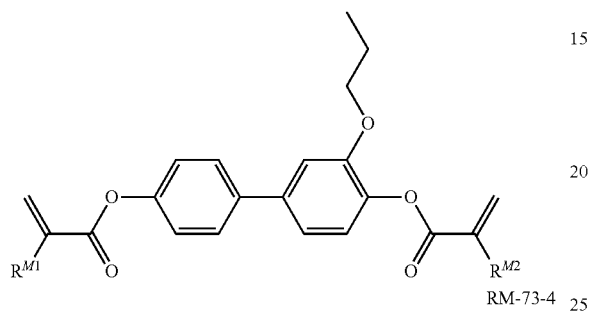
RM-73-4
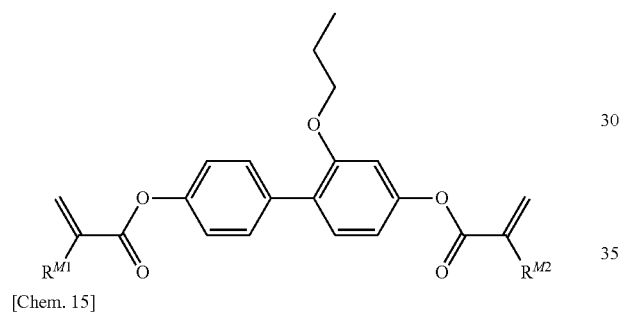
[Chem. 15]
RM-74-1
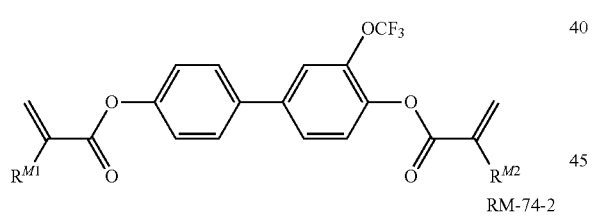
RM-74-2
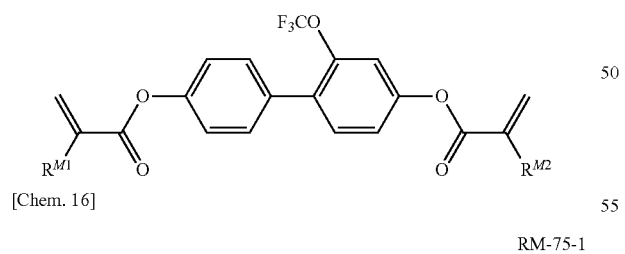
[Chem. 16]
RM-75-1
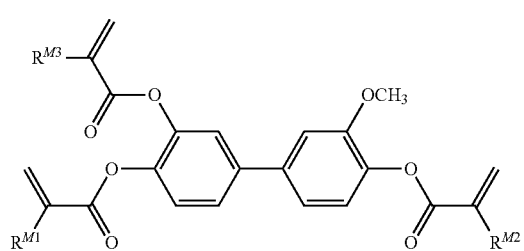
RM-75-2
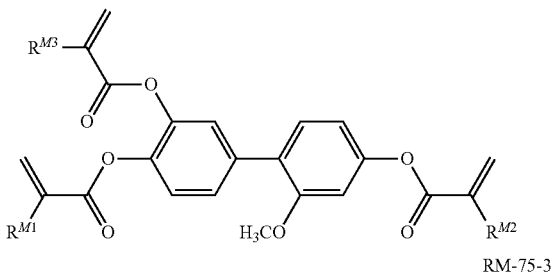
RM-75-3
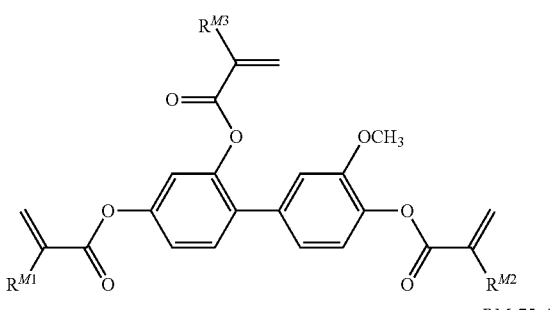
RM-75-4
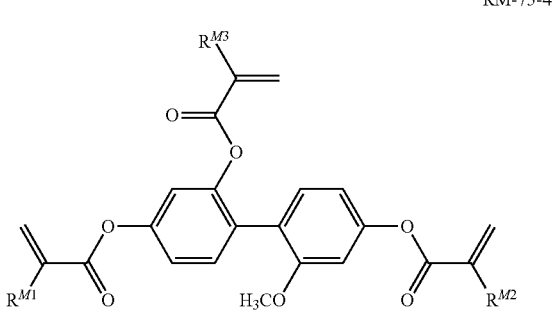
RM-75-5
RM-75-6
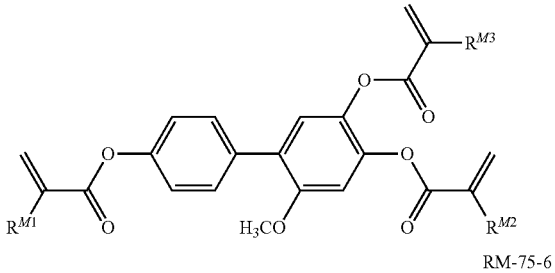
In the formula, $R^{M1}$, $R^{M2}$, and $R^{M3}$ each independently represent an alkyl group having 1 to 5 carbon atoms, a fluorine atom, or a hydrogen atom, and more preferably represent an alkyl group having 1 carbon atom or a hydrogen atom.

Formulae RM-1 to RM-66 are preferable, Formulae RM-2 to RM-4, RM-16 to RM-18, RM-20 to RM-26, RM-30 to RM-32, RM-34 to RM-36, RM-38, RM-42, RM-45 to RM-48, RM-50, and RM-55 to RM-57 are more preferable, Formulae RM-2 to RM-4 and RM-16 to RM-18 are still more preferable.

The liquid crystal composition according to the present invention essentially contains a spontaneously aligning monomer that controls the alignment of the liquid crystal molecules. Further, the spontaneously aligning monomer has at least one polar group and has a chemical structure different from that of the polymerizable monomer represented by General Formula (I) according to the present invention.

The polar group preferably has a role of an adsorption moiety that adsorbs to a substrate, a film, or an electrode.

The polar group contained in the spontaneously aligning monomer according to the present invention is preferably one or two more kinds selected from the group consisting of Formulae (K-1) to (K-28) as follows.

[Chem. 17]

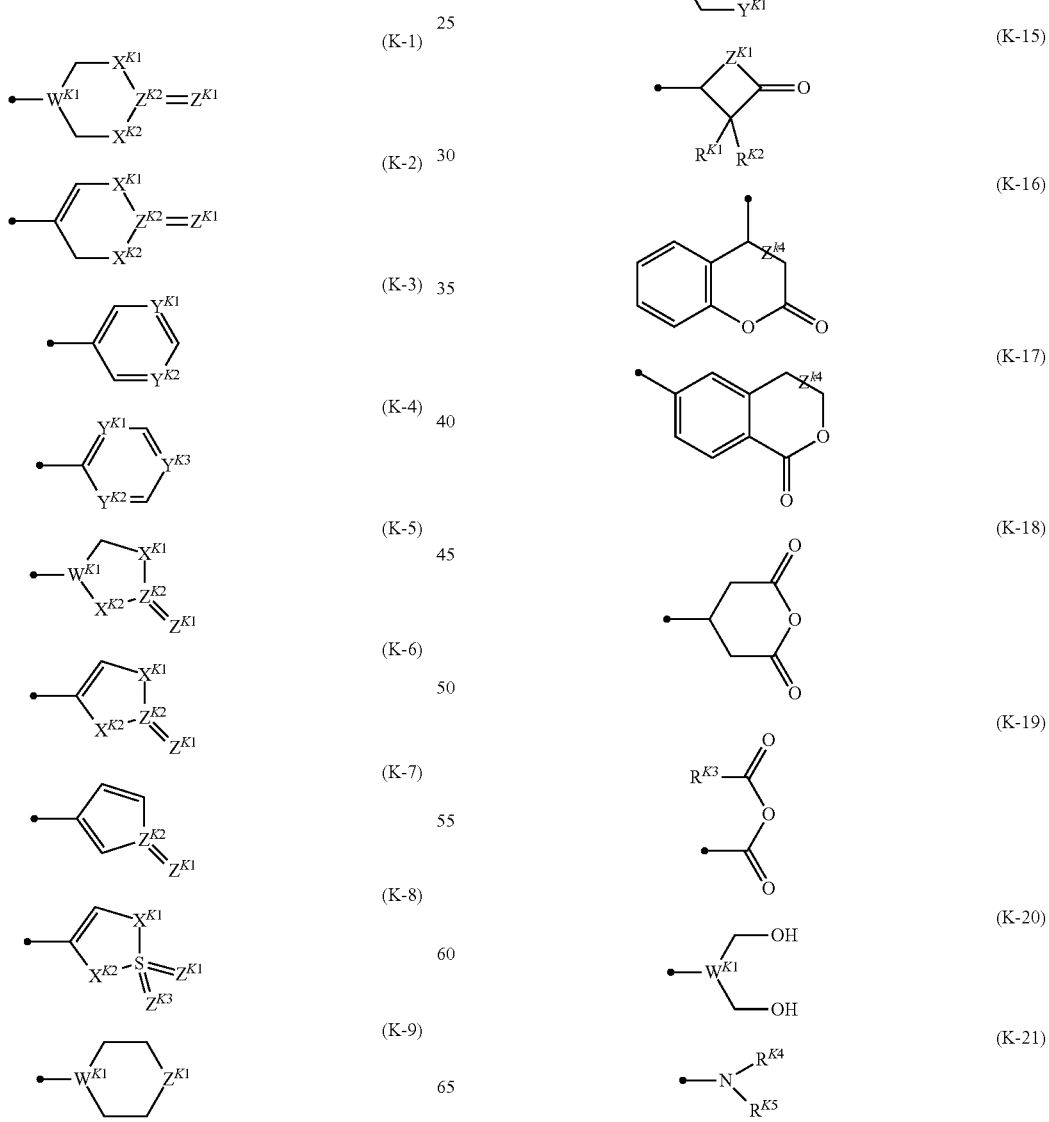

-continued

 (K-22)

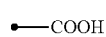 (K-23)

In Formulae (K-1) to (K-23), $R^{K1}$ and $R^{K2}$ each independently represent a hydrogen atom, a straight chain or branched alkyl group having 1 to 5 carbon atoms, or an alkyloxy group, $R^M$ represents a hydrogen atom or a straight chain or branched alkyl group having 1 to 20 carbon atoms, wherein one —$CH_2$— or two or more non-adjacent —$CH_2$-'s in the alkyl group may be substituted with —O—, —COO—, or —OCO—, $R^{K4}$ and $R^{K5}$ each independently represent a hydrogen atom or an alkyl group having 1 to 8 carbon atoms, $W^{K1}$ represents a methyl group, $\equiv$C—$CH_3$, $\equiv$C—$C_2H_5$, $\equiv$C—$C_3H_7$, $\equiv$C—$C_4H_9$, $\equiv$C—$C_5H_{11}$, $\equiv$C—$C_6H_{13}$, or a nitrogen atom, $X^{K1}$ and $X^{K2}$ each independently represent —$CH_2$—, an oxygen atom, —C(=O)—, or a sulfur atom, $Y^{K1}$, $Y^{K2}$, and $Y^{K3}$ each independently represent a methyl group or a nitrogen atom, $Z^{K1}$ represents an oxygen atom or a sulfur atom, $Z^{K2}$ represents a carbon atom or a silicon atom, $Z^{K3}$ represents an oxygen atom, and $Z^{K4}$ represents a single bond or a double bond.

[Chem. 18]

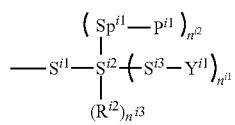 (K-24)

In the formula, $Y^{i1}$ represents a straight chain or branched alkyl group having 3 to 20 carbon atoms, a halogenated alkyl group, or a cyanated alkyl group, at least two or more secondary carbon atoms in these alkyl groups are substituted with —(C=$X^{i1}$)— and/or —(CH—CN)—, the secondary carbon atoms in these alkyl groups may be substituted with —CH=CH—, —C$\equiv$C—, —O—, —NH—, —COO—, or —OCO— so that an oxygen atom is not directly adjacent thereto, and $X^{i1}$ represents an oxygen atom, a sulfur atom, NH, or $NR^{i1}$, $S^{i1}$ and $S^{i3}$ each independently represent an alkylene group having 1 to 6 carbon atoms or a single bond, —$CH_2$— in the alkylene group may be substituted with —CH=CH—, —C$\equiv$C—, —C(=$CH_2$)—, —C(=$CHR^3$)—, —C(=$CR^{132}$)—, —O—, —NH—, —C=O—, —COO—, or —OCO— so that an oxygen atom is not directly adjacent thereto, $S^{i2}$ represents a carbon atom, a nitrogen atom, or a silicon atom, $R^{i2}$ represents a hydrogen atom and a straight chain or branched alkyl group having 1 to 20 carbon atoms, and secondary carbon atoms in these groups may be substituted with —O—, —CH=CH—, or —C$\equiv$C— so that an oxygen atom is not directly adjacent thereto, $P^{i1}$ represents a polymerizable group, $Sp^{i1}$ represents a spacer group or a single bond, $n^{i1}$ represents an integer of 1 to 3, $n^{i2}$ and $n^{i3}$ each independently represent an integer of 0 to 2, but in a case where $S^{i2}$ represents a carbon atom or a silicon atom, $n^{i1}+n^{i2}+n^{i3}$ is 3, in a case where $S^{i2}$ represents a nitrogen atom, $n^{i1}+n^{i2}+n^{i3}$ is 2. $R^{i3}$ represents the same meaning as $R^{i3}$ in General Formula (i), and in a case where there are a plurality of $R^{i2}$'s, $X^{i1}$'s, $Y^{i1}$'s, $S^{i1}$'s, $S^{i3}$'s, $P^{i1}$'s, and $Sp^{i1}$'s in General Formula (K-1), those may be the same as or different from each other.

[Chem. 19]

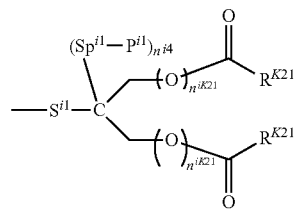 (K-25)

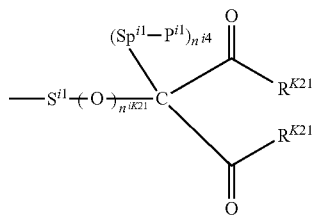 (K-26)

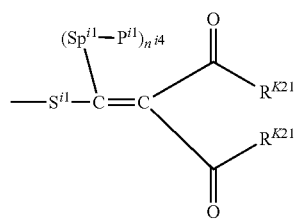 (K-27)

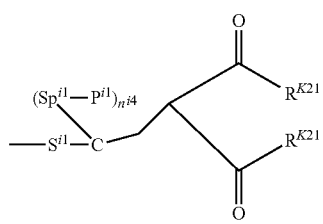 (K-28)

In the formula, $S^{i1}$, $P^{i1}$, and $Sp^{i1}$ respectively represent the same meanings as those of $S^{i1}$, $P^{i1}$, and $Sp^{i1}$ in General Formula (K-1), $R^{K21}$ represents a straight chain or branched alkyl group having 1 to 10 carbon atoms, a halogenated alkyl group, or a cyanated alkyl group, at least two or more secondary carbon atoms in these alkyl groups may be substituted with —CH=CH—, —C$\equiv$C—, —O—, or —NH— so that an oxygen atom is not directly adjacent thereto, and $n^{i4}$ and $n^{iK21}$ each independently represent 0 or 1.

The spontaneously aligning monomer according to the present invention has at least one polar group, a mesogenic group, and at least one polymerizable group, and has a chemical structure different from that of the polymerizable monomer represented by General Formula (I) according to the present invention. The polar group may be bonded to a mesogenic group or a polymerizable group via a spacer.

The spacer is preferably represented by a single bond or an alkylene group having 1 to 15 carbon atoms, and one or two or more —$CH_2$—'s in the alkylene group may be substituted with —O—, —OCO—, or —COO— so that an oxygen atom is not directly adjacent thereto.

The mesogenic group has General Formula (mes):

[Chem. 20]

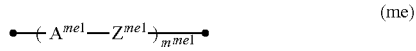
(me)

In the formula, $Z^{me1}$ represents a single bond, —CH=CH—, —CF=CF—, —C≡C—, —COO—, —OCO—, —OCOO—, —OOCO—, —CF$_2$O—, —OCF$_2$—, —CH=CHCOO—, —OCOCH=CH—, —CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, or an alkylene group having 2 to 20 carbon atoms, wherein one —CH$_2$— or two or more non-adjacent —CH$_2$— 's in the alkylene group may be substituted with —O—, —COO—, or —OCO—, and here, in a case where $K^{i1}$ is (K-11), at least any one of —CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, and —OCH$_2$CH$_2$O— is contained in the mesogenic group, $A^{me1}$ represents a divalent 6-membered ring aromatic group, a divalent 6-membered ring heteroaromatic group, a divalent 6-membered ring aliphatic group, and a divalent 6-membered ring heteroaliphatic group, and the hydrogen atom in these ring structures may be substituted with a halogen atom, or $P^{11}$—$S^{11}$—, and a polar group. Further, in a case where there are a plurality of $Z^{me1}$'s and $A^{me1}$'s respectively, those may be the same as or different from each other, and $m^{me1}$ represents an integer of 1 to 5, and in Formula (me), the leftmost black spot and the rightmost black spot represent a bonds.

The spontaneously aligning monomer according to the present invention is preferably one or two or more kinds of compounds selected from the group consisting of compounds represented by General Formula (i), General Formula (ii), General Formula (iii), and General Formula (iv).

[Chem. 21]

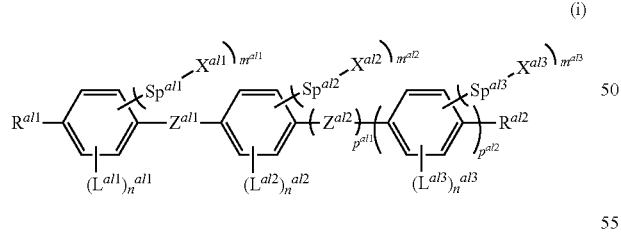
(i)

In General Formula (i), $R^{a11}$, $R^{a12}$, $Z^{a11}$, $Z^{a12}$, $L^{a11}$, $L^{a12}$, $L^{a13}$, $Sp^{a11}$, $Sp^{a12}$, $Sp^{a13}$, $X^{a11}$, $X^{a12}$, $X^{a13}$, $m^{a11}$, $m^{a12}$, $m^{a13}$, $n^{a11}$, $n^{a12}$, $n^{a13}$, $P^{a11}$, and $P^{a12}$ each independently represent as follows: $R^{a11}$ represents a hydrogen atom, a halogen atom, a linear, branched, or cyclic alkyl having 1 to 20 carbon atoms, wherein in the alkyl group, one —CH$_2$— or two or more non-adjacent CH$_2$'s groups may be substituted with —O—, —S—, —CO—, —CO—O—, —O—CO—, —O—CO—O— so that the O and/or S atoms are not directly bonded to each other, and one or two or more hydrogen atoms may be substituted with F or Cl.

$R^{a12}$ represents a group having any of the following partial structures:

[Chem. 22]

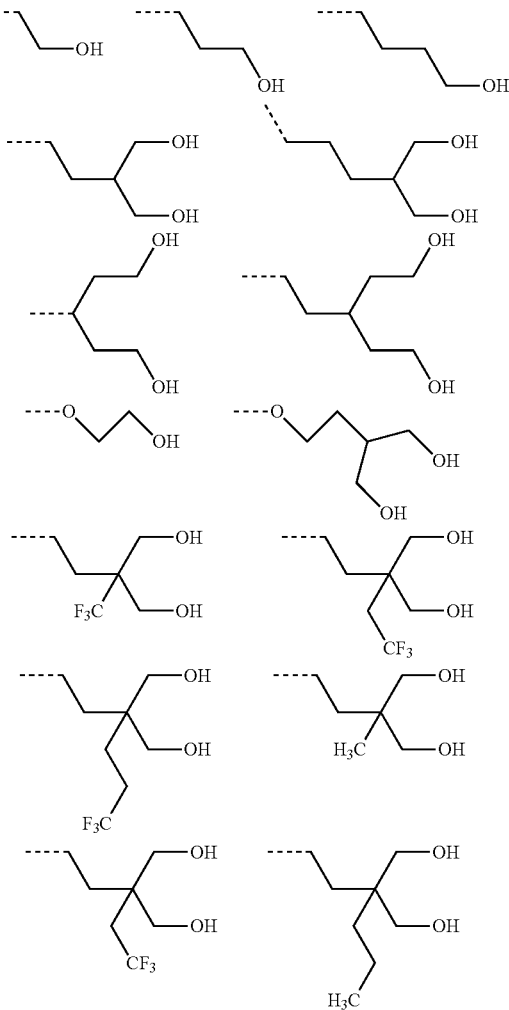

[Chem. 23]

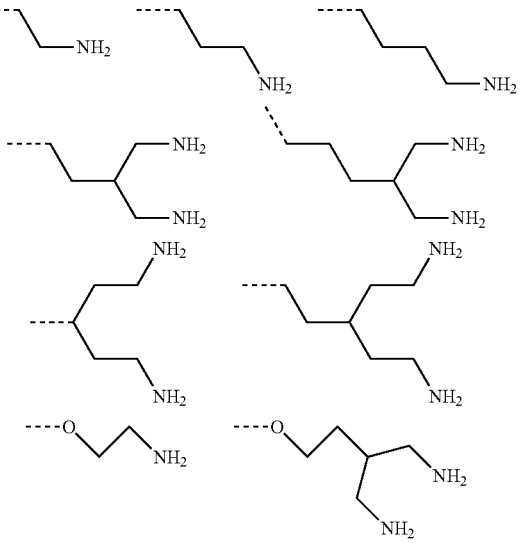

-continued

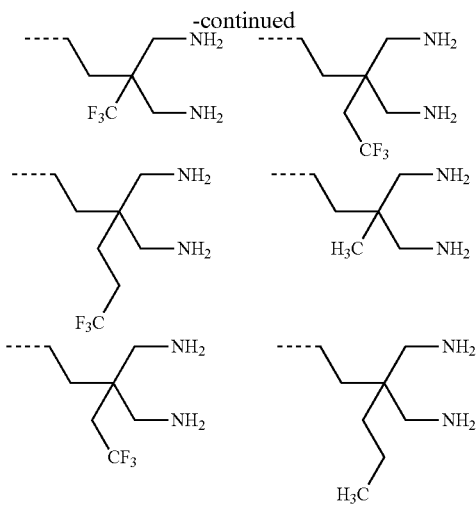

Sp$^{a11}$, Sp$^{a12}$, and Sp$^{a13}$ each independently represent an alkyl group having 1 to 12 carbon atoms or a single bond, X$^{a11}$, X$^{a12}$, and X$^{a13}$ each independently represent an alkyl group, an acrylic group, a methacryl group, or a vinyl group, Z$^{a11}$ represents —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_n{}^{a1}$—, —CF$_2$CH$_2$—, —CH$_2$CF$_2$—, —(CH$_2$)$_n{}^{a1}$—, —CH═CH—, —CF═CF—, —C≡C—, —CH═CH—COO—, —OCO—CH═CH—, —(CR$^{a13}$R$^{a14}$)$_n{}^{a1}$-, —CH (-Sp$^{a11}$-X$^{a11}$)—, —CH$_2$CH(-Sp$^{a11}$-X$^{a11}$)—, —CH(-Sp$^{a11}$-X$^{11}$)CH(-Sp$^{a11}$-X$^{a11}$)—, Z$^{a12}$'s each independently represent a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH)n1-, —CF$_2$CH$_2$—, —CH$_2$CF$_2$—, —(CF$_2$)na1-, —CH═CH—, —CF═CF—, —C≡C—, —CH═CH—COO—, —OCO—CH═CH—, —(CR$^{a13}$R$^{a14}$)n$^{a1}$-, —CH(-Sp$^{a11}$-X$^{a11}$)—, —CH$_2$CH(-Sp$^a$-X$^{a11}$)—, —CH(-Sp$^{a11}$-X$^{a11}$)CH(-Sp$^{a11}$-X$^{a11}$)—, L$^{a11}$, L$^{a12}$, and L$^{a13}$ each independently represent a hydrogen atom, a fluorine atom, a chlorine atom, a bromine atom, an iodine atom, —CN, —NO2, —NCO, —NCS, —OCN, —SCN, —C(═O)N(R$^{a13}$)$_2$, —C(═O)R$^{a13}$, an optionally substituted silyl group having 3 to 15 carbon atoms, an optionally substituted aryl or cycloalkyl group having 1 to 25 carbon atoms, wherein one or two or more hydrogen atoms may be substituted with a halogen atom (a fluorine atom and a chlorine atom), R$^{a13}$ represents an alkyl group having 1 to 12 carbon atoms, R$^{a14}$ represents a hydrogen atom or an alkyl group having 1 to 12 carbon atoms, and n$^{a1}$ represents an integer of 1 to 4, P$^{a11}$ and P$^{a21}$ each independently represent 0 or 1, m$^{a11}$, m$^{a12}$, and m$^{a13}$ each independently represent an integer of 0 to 3, and n$^{a11}$, n$^{a12}$, and n$^{a13}$ each independently represent an integer of 0 to 3)

General Formula (ii):

[Chem. 24]

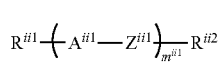

(ii)

In the formula, Zi$^{i1}$ represents a single bond, —CH═CH—, —CF═CF—, —C≡C—, —COO—, —OCO—, —OCOO—, —OOCO—, —CFO—, —OCF$_2$—, —CH═CHCOO—, —OCOCH═CH—, —CH$_2$CH$_2$COO—, —OCOCH$_2$—CH$_2$—, —CH═C(CH$_3$)COO—, —OCOC(CH$_3$)═CH—, —CH$_2$—CH(CH$_3$) COO—, —OCOCH(CH$_3$)—CH$_2$—, —OCH$_2$CH$_2$O—, or an alkylene group having 2 to 20 carbon atoms, wherein one —CH$_2$— or two or more non-adjacent —CH$_2$—'s in the alkylene group may be substituted with —O—, —COO—, or —OCO—, and here, in a case where K$^{i1}$ is (K-11), at least any one of —CH$_2$—CH$_2$COO—, —OCOCH$_2$—CH$_2$—, —CH═C(CH$_3$)COO—, —OCOC(CH$_3$)═CH—, —CH$_2$—CH(CH$_3$)COO—, —OCOCH(CH$_3$)—CH$_2$—, and —OCH$_2$CH$_2$O— is contained in the mesogenic group, Ai$^{i1}$ represents a divalent 6-membered ring aromatic group, a divalent 6-membered ring heteroaromatic group, a divalent 6-membered ring aliphatic group, and a divalent 6-membered ring heteroaliphatic group, and hydrogen atoms in these ring structures may be substituted with a halogen atom, P$^{i1}$-Sp$^{i1}$-, and a monovalent organic group having a substituent represented by General Formula K$^{i1}$, or R$^{i1}$, wherein at least one thereof is substituted with P$^{i1}$-Sp$^{i1}$-, in a case where there are a plurality of Zi$^{i1}$'s and Ai$^{i1}$'s, those may be the same as or different from each other, mi$^{i1}$ represents an integer of 1 to 5, Ri$^{i1}$ and Ri$^{i2}$ each independently represent a hydrogen atom, a straight chain or branched alkyl group having 1 to 40 carbon atoms, a halogenated alkyl group, or P$^{i1}$-Sp$^{i1}$-, wherein CH$_2$— in the alkyl group may be substituted with —CH═CH—, —C≡C—, —O—, —NH—, —COO—, or —OCO— so that —O— is not continuous, at least one of Ri$^{i1}$ and Ri$^{i2}$ represents a monovalent organic group having a substituent represented by K$^{i1}$, and has one or more P$^{i1}$-Sp$^{i1}$- in General Formula (ii), has one or two or more monovalent organic groups having a substituent represented by K$^{i1}$, and has one or two or more R$^{i1}$. Here, in a case where K$^{i1}$ is (K-11), Zi$^{i1}$ is a compound (hereinafter also referred to as "compound (ii)") represented by any of —CH$_2$—CH$_2$COO—, —OCOCH$_2$—CH$_2$—, —CH$_2$—(CH$_3$)COO—, —OCOCH(CH$_3$)—CH$_2$—, —OCH$_2$CH$_2$O—, P$^{i1}$-Sp$^{i1}$- (P$^{i1}$ represents a polymerizable group and represents a substituent selected from the group represented by General Formula (P-1) to General Formula (P-15), wherein the rightmost black spot represent a bonds.

[Chem. 25]

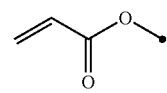

(P-1)

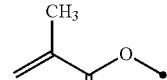

(P-2)

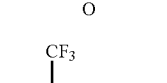

(P-3)

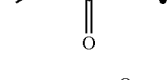

(P-4)

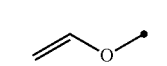

(P-5)

-continued

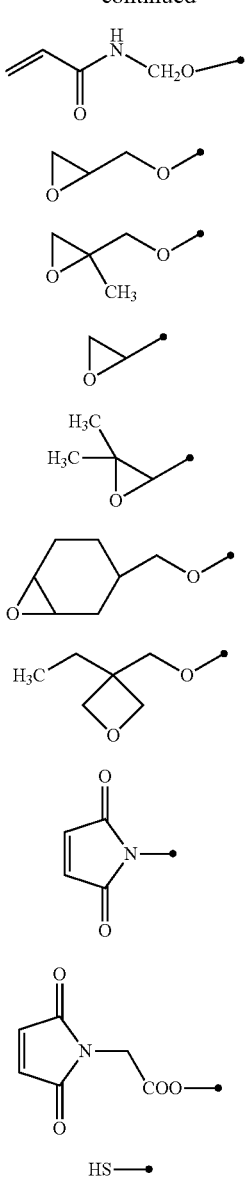

Sp$^{i1}$ represents a spacer group, a monovalent organic group having a substituent represented by K$^{i1}$ (K$^{i1}$ represents a substituent represented by General Formula (K-1) to General Formula (K-11)), and R$^{i1}$ (R$^{i1}$ represents a hydrogen atom, a straight chain or branched alkyl group having 1 to 40 carbon atoms, a halogenated alkyl group, or P$^{i1}$-Sp$^{i1}$-, wherein —CH$_2$— in the alkyl group may be substituted with —CH=CH—, —C≡C—, —O—, —NH—, —COO—, or —OCO— so that —O— is not continuous.

In General Formula (ii), Zi$^{i1}$ preferably represents a single bond, —CH=CH—, —C≡C—, —COO—, —OCO—, —OCOO—, —OOCO—, —CH=CHCOO—, —OCOCH=CH—, —CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, a linear or branched alkylene group having 1 to 40 carbon atoms, or a group obtained by substituting one —CH$_2$— or two or more non-adjacent —CH$_2$—'s in the alkylene group with —O—, more preferably represents a single bond, —COO—, —OCO—, —CH=CHCOO—, —OCOCH=CH—, —CH$_2$—CH$_2$COO—, —OCOCH$_2$—CH$_2$—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, a linear or branched alkylene group having 1 to 40 carbon atoms, or a group obtained by substituting or one —CH$_2$— or two or more non-adjacent —CH$_2$—'s in the alkylene group with —O—, and still more preferably represents a single bond, CH$_2$—CH$_2$COO—, —OCOCH$_2$—CH$_2$—, —CH=C(CH$_3$) COO—, —OCOC(CH$_3$)=CH—, —CH$_2$—CH(CH$_3$)COO—, —OCOCH(CH$_3$)—CH$_2$—, —OCH$_2$CH$_2$O—, an alkylene group having 2 to 15 carbon atoms (ethylene group (—H$_2$CH$_2$—)), a group (—CH$_2$O—, —OCH$_2$—) obtained by substituting one —CH$_2$— in the ethylene group with —O—, an linear alkylene group having 3 to 13 carbon atoms, or a group obtained by substituting one —CH$_2$— or two or more non-adjacent —CH$_2$—'s in the alkylene group with —O—.

Ai$^{i1}$ preferably represents a divalent 6-membered ring aromatic group or a divalent 6-membered ring aliphatic group, and a divalent unsubstituted 6-membered ring aromatic group, a divalent unsubstituted 6-membered ring aliphatic group, or the hydrogen atom in these ring structures may be not substituted or may be substituted with an alkyl group having 1 to 6 carbon atoms, an alkoxy group having 1 to 6 carbon atoms, or a halogen atom, a divalent unsubstituted 6-membered ring aromatic group, a group obtained by substituting the hydrogen atom in this ring structure with a fluorine atom, or a divalent unsubstituted 6-membered ring aliphatic group is preferable, and a hydrogen atom on the substituent is preferably a 1,4-phenylene group, a 2,6-naphthalene group or a 1,4-cyclohexyl group, which may be substituted by a halogen atom, an alkyl group, or an alkoxy group, wherein at least one substituent is substituted with P$^{i1}$-Sp$^{i1}$-.

mi$^{i1}$ preferably represents an integer of 2 to 5, and is more preferably an integer of 2 to 4.

General Formula (iii);

[Chem. 26]

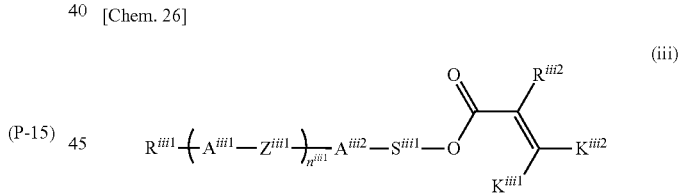

In General Formula (iii), Rii$^{i1}$ is an alkyl group having 1 to 15 carbon atoms, wherein in the alkyl group, at least one —CH$_2$— may be substituted with —O— or —S—, at least one —(CH$_2$) 2- may be substituted with —CH=CH— or —C≡C—, and in these groups, at least one hydrogen atom may be substituted with a halogen atom, Aii$^{i1}$ and A$^{iii4}$ each independently represent 1,4-cyclohexylene, 1,4-cyclohexenylene, 1,4-phenylene, naphthalene-2,6-diyl, decahydronaphthalene-2,6-diyl, 1,2,3,4-tetrahydronaphthalene-2,6-diyl, tetrahydropyran-2,5-diyl, 1,3-dioxane-2,5-diyl, pyrimidine-2,5-diyl, pyridine-2,5-diyl, fluorene-2,7-diyl, phenanthrene-2,7-diyl, anthracene-2,6-diyl, perhydrocyclopenta [A] phenanthrene-3,17-diyl, or 2,3,4,7,8,9,10,11,12,13,14,15,16,17-tetradecahydrocyclopen ta [A] phenanthrene-3,17-diyl, in these rings, at least one hydrogen atom may be substituted with a fluorine atom, a chlorine atom, an alkyl group having 1 to 12 carbon atoms, an alkenyl groups having 2 to 12 carbon atoms, an alkoxy group having 1 to 11 carbon atoms, or an alkenyloxy group having 2 to 11 carbon atoms, and in these groups, at least one at least one hydrogen atom may be substituted with a fluorine atom or a chlorine atom, $Zii^{i1}$ is a single bond or alkylene having 1 to 10 carbon atoms, and in this alkylene, at least one —$CH_2$— may be substituted with —O—, —CO—, —COO—, —OCO—, or —OCOO—, and at least one —$(CH_2)_2$— may be substituted with —CH═CH— or —C≡C—, and in these groups, at least one hydrogen atom may be substituted with a halogen atom, $Zii^{i1}$ is a single bond or an alkylene group having 1 to 10 carbon atoms, and in this alkylene group, at least one —$CH_2$— may be substituted with —O—, —CO—, —COO—, —OCO—, or —OCOO—, and at least one —$(CH_2)_2$— may be substituted with —CH═CH— or —C≡C—, and in these groups, at least one hydrogen may be substituted with a halogen atom, $Kii^{i1}$ and $Kii^{i2}$ each independently represent a hydrogen atom, a halogen atom, an alkyl group having 1 to 5 carbon atoms, or an alkyl group having 1 to 5 carbon atoms in which at least one hydrogen atom is substituted with a halogen atom (for example, a fluorine atom), $nii^{i1}$ is 0, 1, 2, 3, or 4, $Rii^{i2}$ is a group represented by Formula (iii-1) or Formula (iii-2).

[Chem. 27]

$$\bullet\!-\!S^{iii1}\!-\!X^{iii1} \quad \text{(iii-1)}$$

$$\bullet\!-\!S^{iii1}\!-\!S^{iii2}\!-\!S^{iii3}\!-\!X^{iii1} \quad \text{(iii-2)}$$
$$\quad\quad\quad\quad\quad\;|$$
$$\quad\quad\quad\;S^{iii3}\!-\!X^{iii1}$$

In Formula (iii-1), and Formula (iii-2), $Sii^{i2}$ and $Sii^{i3}$ each independently represent a single bond or an alkylene group having 1 to 10 carbon atoms, and in this alkylene group, at least one —$CH_2$— may be substituted with —O—, —NH—, —CO—, —COO—, —OCO—, or —OCOO—, and at least one —$(CH_2)_2$— may be substituted with —CH═CH— or —C≡C—, and in these groups, at least one hydrogen atom may be substituted with a halogen atom, $Sii^{i1}$ is ═CH— or ═N—, $Xii^{i1}$ is a group represented by —OH, —NH2, —$OR^3$, —$N(R3)_2$, Formula ($Xii^{i1}$), —COOH, —SH, —$B(OH)_2$, or —$Si(R^3)_3$, wherein $R^3$ is a hydrogen atom or an alkyl group having 1 to 10 carbon atoms, and in the alkyl group, at least one —$CH_2$— may be substituted with —O— or —CH═CH—, and in these groups, at least one hydrogen atom may be substituted with a halogen atom, Formula ($Xii^{i1}$):

[Chem. 28]

($nii^{i2}$ is an integer of 1 to 5)
General Formula (iv);

[Chem. 29]

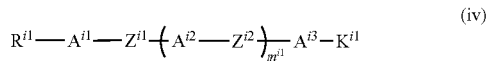

Since the compound represented by General Formula (iv) specifically has a partial structure represented by $K^{i1}$ in particular, when used in the liquid crystal composition, the compound is aligned on a substrate sandwiching the liquid crystal composition (liquid crystal layer), and can hold the liquid crystal molecules in a state of being aligned in the vertical direction. It is considered that the compound represented by the general formula (iv) is adsorbed to the substrate sandwiching the liquid crystal composition (liquid crystal layer) due to the partial structure represented by $K^{i1}$ having polarity, and the compound has the partial structure represented by $K^{i1}$ at an end of the compound, and thus the liquid crystal molecules are held in a state of being aligned in the vertical direction. Therefore, according to the liquid crystal composition using the polymerizable compound of the present embodiment, the liquid crystal molecules are aligned without providing the PI layer (the vertical alignment of the liquid crystal molecules is induced when no voltage is applied, and horizontal alignment of the liquid crystal molecules is realized when the voltage is applied). For this reason, the liquid crystal composition containing the compound (iv) is preferably used to assist the vertical alignment of the liquid crystal molecules.

In addition, the inventors of the present invention have found that the liquid crystal composition containing the compound (iv) in the present embodiment has a partial structure represented by $K^{i1}$, which can secure not only the alignment of the liquid crystal molecules but also the storage stability of the liquid crystal composition.

Further, since the liquid crystal composition containing the compound (iv) represented by General Formula (iv) has a polymerizable group at a specific position as a substituent of $A^{i2}$ or $A^{i3}$ or as a substituent of $K^1$, more excellent alignment can be maintained.

From the above viewpoint, the compound (iv) in the liquid crystal composition of the present embodiment may have a partial structure represented by Kit at the end of the molecule, preferably at the end of a main chain of the molecule, and the chemical structure of the bond destination to which the partial structure represented by $K^{i1}$ is bond is not particularly limited as long as it does not inhibit a function of the liquid crystal composition.

Hereinafter, specific examples of the compound represented by General Formula (iv) will be described.

$K^{i1}$ in General Formula (iv) is preferably a straight chain or branched alkyl group having 3 to 40 carbon atoms, a straight chain or branched halogenated alkyl group having 3 to 40 carbon atoms, and a straight chain or branched alkylated alkyl group having 3 to 40 carbon atoms, wherein at least two or more secondary carbon atoms in $K^{i1}$ are substituted with —(C═$X^{i1}$)— and/or —(CH—CN)—, at least two or more secondary carbon atoms in $K^{i1}$ are preferably substituted with —(C═$X^{i1}$)—, at least three or more secondary carbon atoms are preferably substituted with —(C═$X^{i1}$)—, and at least four or more secondary carbon atoms are preferably substituted with —(C═$X^{i1}$)—. $X^{i1}$ is preferably an oxygen atom from the viewpoint of improving a voltage holding rate (VHR). $K^{i1}$ preferably represents a straight chain or branched alkyl group having 3 to 30 carbon atoms, a straight chain or branched halogenated alkyl group, and a straight chain or branched cyanated alkyl group, wherein the secondary carbon atom in the alkyl group may be substituted with —(C═$CH_2$)—, —(C═$CHR^{i3}$)—, —(C═$CR^{i3}2$)-, —CH═CH—, —C≡C—, or —O— so that an oxygen atom is not directly adjacent thereto, more preferably represents a straight chain or branched alkyl group having 3 to 20 carbon atoms or a straight chain or branched cyanated alkyl group, wherein the secondary carbon atom in the alkyl group may be substituted with —(C═$CH_2$)—, —(C═$CHR^{i3}$)—, —(C═$CR^{i3}$)—, or —O— so that an oxygen atom is not directly adjacent thereto, and still more preferably a branched alkyl group having 3 to 20 carbon atoms or a branched cyanated alkyl group, wherein the secondary carbon atom in the alkyl group may be substituted with —(C═CH$_2$)—, or —O— so that an oxygen atom is not directly adjacent thereto. $R^{i3}$ is preferably a straight chain or branched alkyl group having 1 to 10 carbon atoms, is preferably an alkyl group having 1 to 7 carbon atoms, and is preferably an alkyl group having 1 to 3 carbon atoms, wherein the secondary carbon atoms in the alkyl group may be substituted with —O—, —CH═CH—, or —C≡C— so that an oxygen atom is not directly adjacent thereto.

The hydrogen atom in $K^{i1}$ is preferably substituted with a polymerizable group, that is, $P^{i1}$-$Sp^{i1}$-. When the polar group and the polymerizable group are present in $K^{i1}$, more excellent alignment can be obtained.

$K^{i1}$ preferably represents General Formula (K-24).

[Chem. 30]

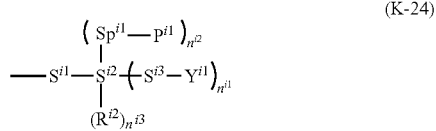

(K-24)

In the formula, $Y^{i1}$ represents a straight chain or branched alkyl group having 3 to 20 carbon atoms, a halogenated alkyl group, or a cyanated alkyl group, at least two or more secondary carbon atoms in these alkyl groups are substituted with —(C═$X^{i1}$)— and/or —(CH—CN)—, and the secondary carbon atom in these alkyl groups may be substituted with —CH═CH—, —C≡C—, —O—, —NH—, —COO—, or —OCO— so that an oxygen atom is not directly adjacent thereto, wherein the oxygen atom in these alkyl groups may be substituted with $P^{i1}$-$Sp^{i1}$-, $X^{i1}$ represents an oxygen atom, a sulfur atom, NH, or $NR^{i3}$, $S^{i3}$ and $S^{i3}$ each independently represent an alkylene group having 1 to 6 carbon atoms or a single bond, —CH$_2$— in the alkylene group may be substituted with —CH═CH—, —C≡C—, —(C═CH$_2$)—, —(C═CHR$^{i3}$)—, —(C═CR$^{i3}_2$)—, —O—, —NH—, —(C═O)—, —COO—, or —OCO— so that an oxygen atom is not directly adjacent thereto, $S^{i2}$ represents a carbon atom, a nitrogen atom, or a silicon atom, $R^{i2}$ represents a hydrogen atom, a straight chain or branched alkyl group having 1 to 20 carbon atoms, a halogenated alkyl group, or a cyanated alkyl group, and the secondary carbon atoms in these groups may be substituted with —O—, —CH═CH—, —C≡C—, —C(═$X^{i1}$)—, or —CH(—CN)— so that an oxygen atom is not directly adjacent thereto, $P^{i1}$ represents a polymerizable group, $Sp^{i2}$ represents a spacer group or a single bond, $n^{i1}$ represents an integer of 1 to 3, $n^{i2}$ and $n^{i3}$ each independently represent an integer of 0 to 2, but in a case where $S^{i2}$ represents a carbon atom or a silicon atom, $n^{i1}$+$n^{i2}$+$n^{i3}$ is 3, in a case where $S^{i2}$ represents a nitrogen atom, $n^{i1}$+$n^{i2}$+$n^{i3}$ is 2. $R^{i3}$ represents the same meaning as $R^{i3}$ in General Formula (i), and in a case where there are a plurality of $R^{i2}$'s, $X^{i1}$'s, $Y^{i1}$'s, $S^{i1}$'s, $S^{i3}$'s, $P^{i1}$'s, and $Sp^{i1}$'s in General Formula (K-1), those may be the same as or different from each other.

$S^{i1}$ and $S^{i3}$ in General Formula (K-1) preferably a straight chain or branched alkylene group having 1 to 6 carbon atoms or a single bond, wherein —CH$_2$— in the alkylene group may be substituted with —CH═CH—, —(C═CH$_2$)—, —O—, —(C═O)—, —COO—, or —OCO— so that an oxygen atom is not directly adjacent thereto, more preferably represents a single bond, a linear alkylene group having 1 to 6 carbon atoms, or a group obtained by substituting —CH$_2$— in the alkylene group with —O— so that an oxygen atom is not directly adjacent thereto. Specifically, $S^{i1}$ and $S^{i3}$ preferably represent —(CH$_2$)$_n$—, —O—(CH$_2$) n-, —(CH$_2$) n-O—, —(CH$_2$)n-O—(CH$_2$)$_m$—, —COO—(CH$_2$) n-, and —OCO—(CH$_2$)n- (n and m represent an integer of 1 to 6).

$S^{i2}$ is preferably a carbon atom. $R^{i2}$ preferably represents a hydrogen atom or a straight chain or branched alkyl group having 1 to 10 carbon atoms, wherein —CH$_2$— in the alkyl group may be substituted with —O—, —C(═$X^{i1}$)—, or —CH(—CN)— (here, —O— is not continuous), preferably represents a hydrogen atom or a straight chain or branched alkyl group having 1 to 7 carbon atoms, wherein —CH$_2$— in the alkyl group may be substituted with —O—, —C(═$X^{i1}$)—, or —CH(—CN)— (here, —O— is not continuous), and more preferably represents a hydrogen atom, a linear alkyl group having 1 to 3 carbon atoms.

$Y^{i1}$ is an alkyl group having 3 to 20 carbon atoms, a straight chain or branched halogenated alkyl group having 3 to 20 carbon atoms, or a straight chain or branched cyanated alkyl group having 3 to 20 carbon atoms, wherein at least two or more secondary carbon atoms in $Y^{i1}$ are substituted with —(C═$X^{i1}$)— and/or —(CH—CN)—, and at least two or more secondary carbon atoms in $Y^{i1}$ are preferably substituted with —(C═$X^{i1}$)—. $X^{11}$ is preferably an oxygen atom from the viewpoint of improving a voltage holding rate (VHR). $Y^{i1}$ preferably represents a alkyl group having 3 to 10 carbon atoms, a halogenated alkyl group, and a straight chain or branched cyanated alkyl group, wherein the secondary carbon atoms in the alkyl group may be substituted with —(C═CH$_2$)—, —(C═CHR$^{13}$)—, —(C═CR$^{32}$)—, —CH═CH—, —C≡C—, or —O— so that an oxygen atom is not directly adjacent thereto, more preferably represents a straight chain or branched alkyl group having 3 to 7 carbon atoms or a straight chain or branched cyanated alkyl group, wherein the secondary carbon atoms in the alkyl group may be substituted with —(C═CH$_2$)—, —(C═CHR$^{i3}$)—, —(C═CR$^{i3}_2$)—, or —O— so that an oxygen atom is not directly adjacent thereto, and still more preferably a straight chain or branched cyanated alkyl group having 3 to 7 carbon atoms, wherein the secondary carbon atoms in the alkyl group may be substituted with —O— so that an oxygen atom is not directly adjacent thereto. In addition, a hydrogen atom in the alkyl group may be substituted with $P^{i1}$-$Sp^{i1}$-.

$Y^{i1}$ represents a group represented by General Formula (Y-1), which is preferable from the viewpoint of improving the alignment of the liquid crystal.

[Chem. 31]

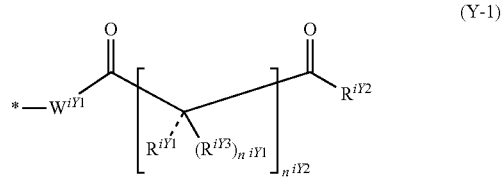

(Y-1)

In the formula, $W^{iY1}$ represents a single bond or an oxygen atom, a broken line represents a single bond or a double bond, in a case where the broken line represents a single bond, $R^{iY1}$ represents a hydrogen atom, a straight chain or branched alkyl group having 1 to 20 carbon atoms, or $P^{i1}$-$Sp^{i1}$-, wherein in the secondary carbon atom in the alkyl group may be substituted with —O—, —CH=CH—, —C≡C—, or —CO— so that an oxygen atom is not directly adjacent thereto, and in a case where the broken line represents a double bond, $R^{iY1}$ represents =CH$_2$, =CHR$^{iY4}$, or =CR$^{iY4}$2, $R^{iY4}$ represents a hydrogen atom and a straight chain or branched alkyl group having 1 to 20 carbon atoms, wherein the secondary carbon atom in the alkyl group may be substituted with —O—, —CH=CH—, or —C≡C— so that an oxygen atom is not directly adjacent thereto, in a case where a broken line represents a single bond, $R^{iY1}$ represents the same meaning as that of $R^{iY1}$, $R^{iY2}$ represents a hydrogen atom, a straight chain or branched alkyl group having 1 to 20 carbon atoms, a halogenated alkyl group, and a cyanated alkyl group, wherein the secondary carbon atoms in these alkyl groups may be substituted with —CH=CH—, —C≡C—, —O—, —NH—, —COO—, —OCO—, —C(=O)—, or —CH$_2$(—CN)— so that an oxygen atom is not directly adjacent thereto, and $R^{iY2}$ represents $P^{i1}$-$Sp^{i1}$-, $n^{iY1}$ is 0 in a case where the broken line represents a double bond, and is 1 in a case where the broken line represents a single bond, $n^{iY2}$ represents an integer of 0 to 5, $P^{i1}$ represents a polymerizable group, $Sp^{i1}$ represents a spacer group or a single bond, and in a case where there is a plurality of $R^{iY1}$'s, $R^{iY3}$'s, $R^{iY4}$'s, $P^{i1}$'s, and $Sp^{i1}$'s, those may be the same as or different from each other and bonded to $S^{13}$ by *.

In a case where the broken line represents a single bond, $R^{iY1}$ is preferably a hydrogen atom or a straight chain or branched alkyl group having 1 to 10 carbon atoms, is preferably a hydrogen atom or an alkyl group having 1 to 7 carbon atoms, and is preferably a hydrogen atom or an alkyl group having 1 to 3 carbon atoms, wherein the secondary carbon atoms in the alkyl group may be substituted with —O—, —CH=CH—, or —C≡C— so that an oxygen atom is not directly adjacent thereto. Specifically, it preferably represents a hydrogen atom, and from the viewpoint of improving heat resistance, it preferably represents an alkyl group having 1 to 3 carbon atoms, an alkoxy group having 1 to 3 carbon atoms, —CO—CH$_3$, or —CH$_2$—O—CH$_3$. $R^{iY1}$ also preferably represents $P^{i1}$-$Sp^{i1}$- from the viewpoint of improving the heat resistance. In a case where $R^{iY1}$ represents $P^{i1}$-$Sp^{i1}$-, it is considered that a decomposition product generated by the decomposition of the compound represented by General Formula (i) by heat is polymerized, so that an increase in impurities can be prevented and the adverse effect on the liquid crystal composition is reduced. $P^{i1}$ represents a polymerizable group, and preferably represents an acryloyl group, a methacryloyl group, or a substituent selected from the group represented by General Formulae (P-1) to (P-15) described later. $Sp^{i1}$ preferably represents a linear alkylene group having 1 to 18 carbon atoms or a single bond, more preferably represents a linear alkylene group having 2 to 15 carbon atoms or a single bond, and more preferably represents a linear alkylene group having 2 to 8 carbon atoms or a single bond.

Moreover, in a case where the broken line represents a double bond, it represents =CH$_2$, =CHR$^{iY4}$, or =CR$^{iY4}$2, and preferably represents =CH$_2$. $R^{iY4}$ is preferably a straight chain or branched alkyl group having 1 to 10 carbon atoms, is preferably an alkyl group having 1 to 7 carbon atoms, and is preferably an alkyl group having 1 to 3 carbon atoms, wherein the secondary carbon atom in the alkyl group may be substituted with —O—, —CH=CH—, or —C≡C— so that an oxygen atom is not directly adjacent thereto.

Preferable group for $R^{iY3}$ are the same as the preferable groups for $R^{iY1}$ in the case where the broken line represents a single bond. $n^{iY1}$ is preferably 0.

Examples of the preferable combinations of $R^{iY1}$ and $R^{iY3}$ include combinations of both hydrogen atoms, both alkyl groups having 1 to 3 carbon atoms, both alkoxy groups having 1 to 3 carbon atoms, and both —CH$_2$—O—CH). In a case where one of $R^{iY1}$ and $R^{iY3}$ represents $P^{i1}$-$Sp^{i1}$- or —CO—CH$_3$, the other preferably represents a hydrogen atom. $n^{iY2}$ is preferably an integer of 0 to 3, is more preferably 0, 1 or 2, and is still more preferably 0 or 1.

$R^{iY2}$ is preferably a hydrogen atom or an alkyl group having 1 to 10 carbon atoms, a halogenated alkyl group, or a cyanated alkyl group, an alkyl group having 1 to 7 carbon atoms, a halogenated alkyl group, or a cyanated alkyl group, and is preferably an alkyl group having 1 to 3 carbon atoms. In addition, the secondary carbon atom in the alkyl group is preferably substituted with —O—, —(C=X$^{i2}$)—, or —(CH$_2$—CN)— so that an oxygen atom is not directly adjacent thereto. $X^{i2}$ is preferably an oxygen atom from the viewpoint of improving the VHR. $R^{iY2}$ preferably represents $P^{i1}$-$Sp^{i1}$-. In a case where $R^{iY2}$ represents $P^{i1}$-$Sp^{i1}$-, it is considered that a decomposition product generated by the decomposition of the compound represented by General Formula (i) by heat is polymerized, so that an increase in impurities can be prevented and the adverse effect on the liquid crystal composition is reduced.

More specifically, General Formula (Y-1) is preferably Formulae (Y-1-1), (Y-1-2), (Y-1-3a), (Y-1-3b), and (Y-1-4).

[Chem. 32]

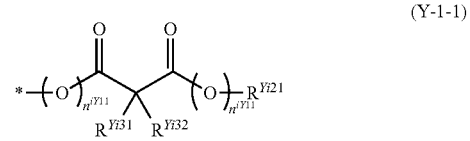
(Y-1-1)

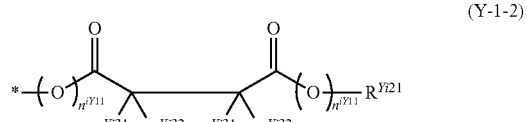
(Y-1-2)

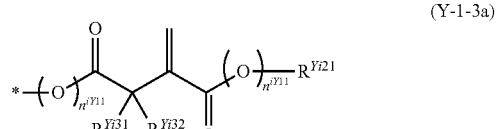
(Y-1-3a)

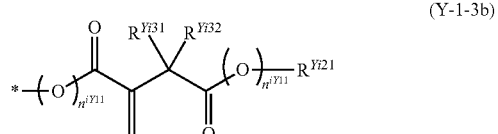
(Y-1-3b)

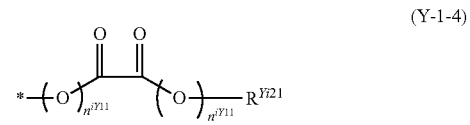
(Y-1-4)

In the formula, $n^{iY11}$ represents 0 or 1, $R^{iY21}$ represents an alkyl group having 1 to 10 carbon atoms, a halogenated alkyl group, and a cyanated alkyl group, wherein the secondary carbon atoms in these alkyl groups may be substituted with —CH=CH—, —C≡C—, —O—, —NH—, —COO—, —OCO—, —(C=O)—, or —(CH$_2$—CN)— so that an oxygen atom is not directly adjacent thereto, and $R^{iY21}$ represents $P^{i1}\text{-}Sp^{i1}\text{-}$, $R^{iY31}$ and $R^{iY32}$ each independently represent a hydrogen atom and a straight chain or branched alkyl group having 1 to 10 carbon atoms, wherein the secondary carbon atom in the alkyl group may be substituted with —O—, —CH=CH—, —C≡C—, or —CO— so that an oxygen atom is not directly adjacent thereto, and $R^{iY31}$ and $R^{iY32}$ represents $P^{i1}\text{-}Sp^{i1}\text{-}$.

$R^{iY21}$ is preferably an alkyl group having 1 to 7 carbon atoms, a halogenated alkyl group, or a cyanated alkyl group, and is preferably an alkyl group having 1 to 3 carbon atoms. $R^{iY12}$ preferably represents $P^{i1}\text{-}Sp^{i1}\text{-}$. $R^{iY31}$ and $R^{iY32}$ are preferably a hydrogen atom, an alkyl group having 1 to 5 carbon atoms, and an alkoxy group having 1 to 5 carbon atoms, and preferably represents a hydrogen atom, an alkyl group having 1 to 3 carbon atoms, an alkoxy group having 1 to 3 carbon atoms, —CO—CH$_3$, and —CH$_2$—O—CH$_3$. In addition, it is preferable that at least one of $R^{iY31}$ and $R^{iY32}$ represents $P^{i1}\text{-}Sp^{i1}\text{-}$.

From the viewpoint of improving the compatibility with the liquid crystal compound, it preferably has a structure of Formula (Y-1-1). As Formula (Y-1-1), Formula (Y-1-1a) to Formula (Y-1-1h) are preferable.

[Chem. 33]

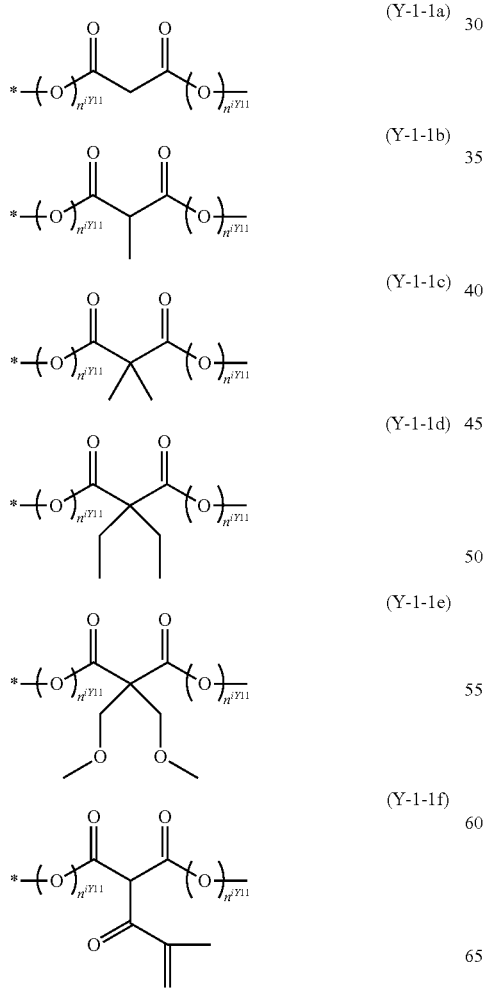

(Y-1-1a)
(Y-1-1b)
(Y-1-1c)
(Y-1-1d)
(Y-1-1e)
(Y-1-1f)

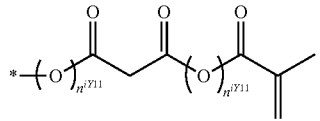

(Y-1-1g)

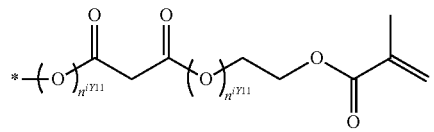

(Y-1-1h)

In the formula, $n^{iY11}$ represents 0 or 1.

From the viewpoint of improving the compatibility and the heat resistance with the liquid crystal compound, it preferably has a structure of Formula (Y-1-2). As Formula (Y-1-2), Formula (Y-1-2a) to Formula (Y-1-2f) are preferable.

[Chem. 34]

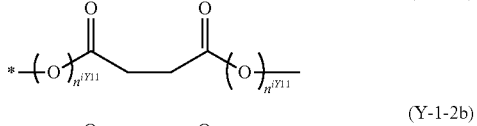

(Y-1-2a)

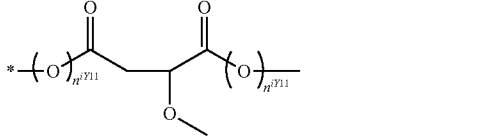

(Y-1-2b)

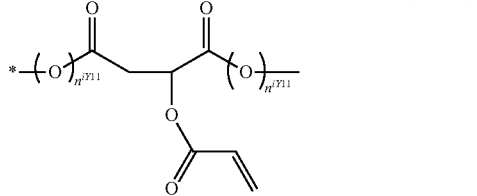

(Y-1-2c)

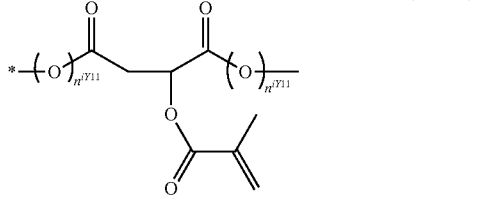

(Y-1-2d)

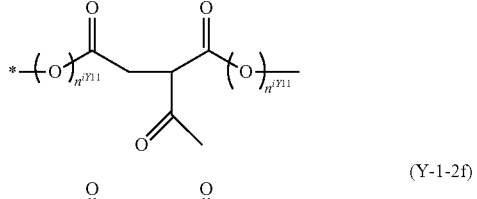

(Y-1-2e)

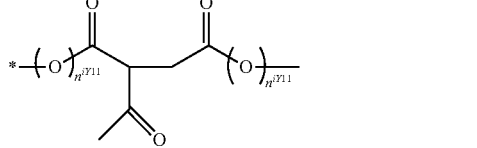

(Y-1-2f)

-continued (Y-1-2g)
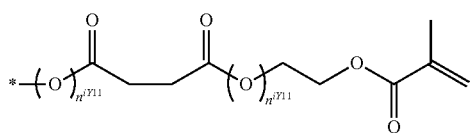

In the formula, $n^{iY11}$ represents 0 or 1.

From the viewpoint of improving the compatibility and the heat resistance with the liquid crystal compound, it preferably has a structure of Formula (Y-1-3a), and Formula (Y-1-3b). Formula (Y-1-3a) is preferably Formula (Y-1-3aa), and Formula (Y-1-3b) is preferably Formula (Y-1-3ba).

[Chem. 35]

(Y-1-3aa)
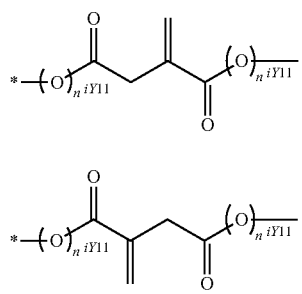

(Y-1-3ba)
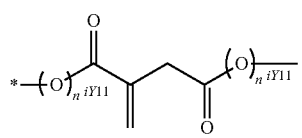

In the formula, $n^{iY11}$ represents 0 or 1.

From the viewpoint of improving the alignment and the voltage holding rate of the liquid crystal composition, it preferably has a structure of Formula (Y-1-4). As Formula (Y-1-4), Formula (Y-1-4a) to Formula (Y-1-4f) are preferable. Particularly, the structures (Y-1-4a) to (Y-1-4c) are preferable because the compatibility with the liquid crystal compound and the alignment of the liquid crystal composition are well balanced.

[Chem. 36]

(Y-1-4a)
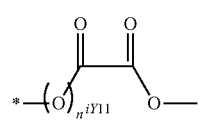

(Y-1-4b)
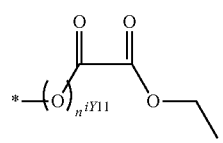

(Y-1-4c)
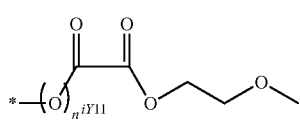

-continued (Y-1-4d)
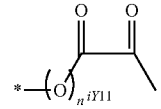

(Y-1-4e)
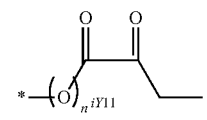

(Y-1-4f)
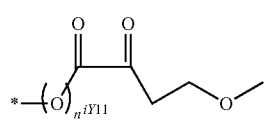

In the formula, $n^{iY11}$ represents 0 or 1.

$Y^{i1}$ represents a group represented by General Formula (Y-2), which is preferable.

[Chem. 37]

(Y-2)
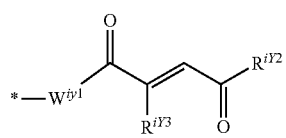

In the formula, $W^{iY1}$, $R^{iY3}$, and $R^{iY2}$ have the same meaning as those of $W^{iY1}$, $R^{iY3}$ and $R^{iY2}$ in General Formula (Y-1).

General Formula (Y-2) preferably represents General Formula (Y-2-1).

[Chem. 38]

(Y-2-1)
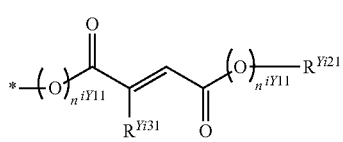

In the formula, $n^{iY11}$, $R^{iY21}$ and $R^{i31}$ have the same meaning as that of $n^{iY11}$, $R^{iY21}$, and $R^{i31}$ in General Formula (Y-1-1).

$Y^{i1}$ represents a group represented by General Formula (Y-3), which is preferable from the viewpoint of improving the heat resistance.

[Chem. 39]

(Y-3)
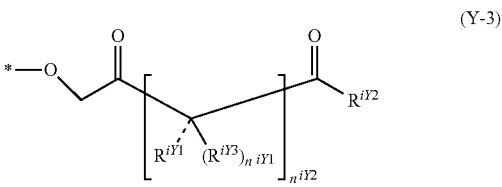

In the formula, $R^{iY1}$, $R^{iY2}$, $R^{iY3}$, $n^{iY1}$, and $n^{iY1}$ represent the same meanings as those of $R^{iY1}$, $R^{iY2}$, $R^{iY3}$, $n^{iY1}$, and $n^{iY1}$ in General Formula (Y-1).

General Formula (Y-3) preferably represents General Formula (Y-3-1) to General Formula (Y-3-4).

[Chem. 40]

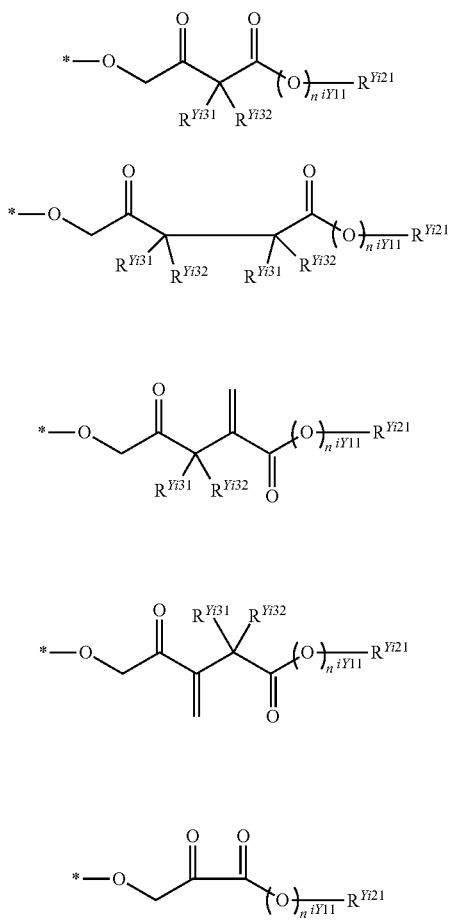

(Y-3-1)

(Y-3-2)

(Y-3-3a)

(Y-3-3b)

(Y-1-4)

In the formula, $R^{iY21}$, $R^{iY31}$, $R^{iY32}$, and $n^{iY11}$ represent the same meanings as those of $R^{iY21}$, $R^{iY31}$, $R^{iY32}$, and $n^{iY11}$ in General Formula (Y-1-1).

More specifically, General Formula (Y-3-1) is preferably General Formula (Y-3-11).

[Chem. 41]

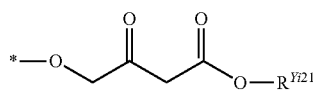

(Y-3-11)

In the formula, $R^{iY21}$ represents the same meaning as that of $R^{iY21}$ in General Formula (Y-3-1).

In addition, $Y^{i1}$ represents a group represented by General Formula (Y-4), which is preferable from the viewpoint of improving the heat resistance.

[Chem. 42]

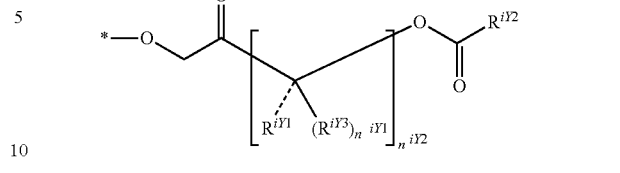

(Y-4)

In the formula, $R^{iY1}$, $R^{iY2}$, $R^{iY3}$, $n^{iY1}$, and $n^{iY1}$ represent the same meanings as those of $R^{iY1}$, $R^{iY2}$, $R^{iY3}$, $n^{iY1}$, and $n^{iY1}$ in General Formula (Y-1).

General Formula (Y-4) preferably represents General Formula (Y-4-1) to General Formula (Y-4-3b).

[Chem. 43]

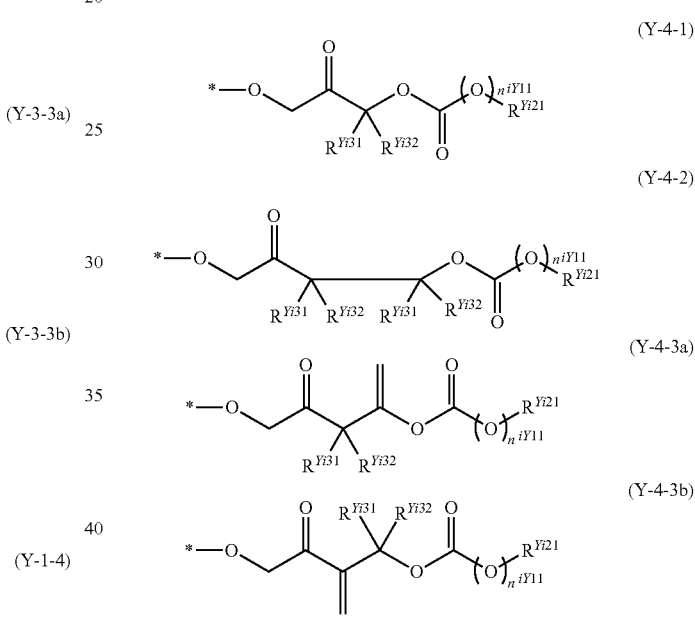

(Y-4-1)

(Y-4-2)

(Y-4-3a)

(Y-4-3b)

In the formula, $R^{iY21}$, $R^{iY31}$, $R^{iY32}$, and $n^{iY11}$ represent the same meanings as those of $R^{iY21}$, $R^{iY31}$, $R^{iY32}$, and $n^{iY11}$ in General Formula (Y-1-1).

More specifically, General Formula (Y-4-1) is preferably General Formula (Y-4-11).

[Chem. 44]

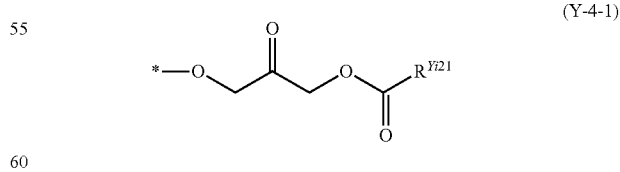

(Y-4-1)

In the formula, $R^{iY21}$ represents the same meaning as that of $R^{iY21}$ in General Formula (Y-4-1).

$P^{i1}$ preferably represents a substituent selected from the group represented by Formula (P-1) to General Formula (P-15) as follows. From the viewpoint of ease of handling and reactivity, any one of the substituents represented by Formulae (P-1) to (P-3), (P-14), and (P-15) is preferable, and any one of the substituents represented by Formulae (P-1) and (P-2) is more preferable.

[Chem. 45]

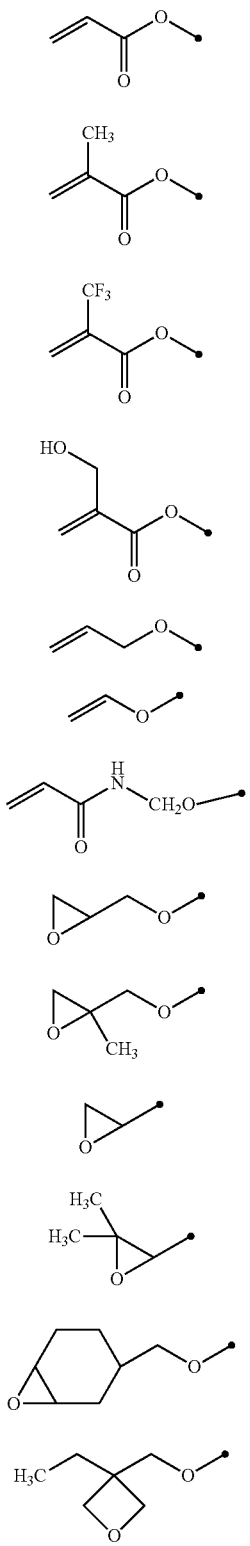

(P-1)
(P-2)
(P-3)
(P-4)
(P-5)
(P-6)
(P-7)
(P-8)
(P-9)
(P-10)
(P-11)
(P-12)
(P-13)

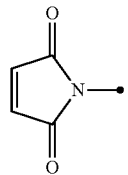

(P-14)

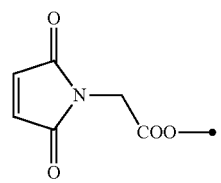

(P-15)

In the formula, the rightmost black spot represents a bond.

$Sp^{i1}$ preferably represents a linear alkylene group having 1 to 18 carbon atoms or a single bond, more preferably represents a linear alkylene group having 2 to 15 carbon atoms or a single bond, and more preferably represents a linear alkylene group having 2 to 8 carbon atoms or a single bond.

$n^{i1}$ preferably represents 1 or 2 from the viewpoint of improving the alignment of the liquid crystal and the solubility in the liquid crystal compound. $n^{i2}$ preferably represents 0 or 1, and more preferably represents 1 from the viewpoint of improving the alignment. $n^{i3}$ preferably represents 0 or 1.

General Formula (K-24) preferably represents a group selected from General Formula (K-24A) or (K-24B).

[Chem. 46]

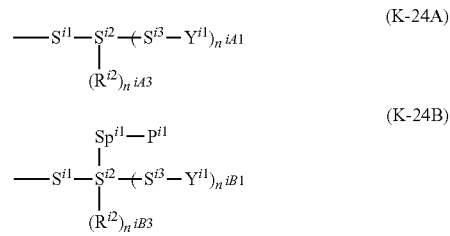

(K-24A)
(K-24B)

In the formula, $S^{i1}$, $S^{i2}$, $S^{i3}$, $Y^{i1}$, $P^{i1}$, and $Sp^{i1}$ represent the same meanings as those of $S^{i1}$, $S^{i2}$, $S^{i3}$, $Y^{i1}$, $P^{i1}$, and $Sp^{i1}$ in General Formula (K-1), $n^{iA1}$ represents an integer of 1 to 3, niA3 represents an integer of 0 to 2, niB1 represents an integer of 1 to 2, and niB3 represents 0 or 1, wherein in a case where $S^{i2}$ represents a carbon atom or a silicon atom, $n^{iA1}+n^{iA3}$ is 3 and $n^{iB1}+n^{iB3}$ is 2, and in a case where $S^{i2}$ represents a nitrogen atom, $n^{iA1}+n^{iA3}$ is 2, $n^{iB1}$ is 1, and $n^{i83}$ is 0.

Since $K^{i1}$ in Formula (i) is an important structure for vertically aligning the liquid crystal composition, and a polar group and a polymer group are adjacent to each other, more excellent alignment can be obtained, and excellent solubility in the liquid crystal composition is exhibited. Therefore, in a case where the alignment of the liquid crystal is regarded as important, General Formula (K-24B) is preferable. On the other hand, in a case where the solubility in the liquid crystal compound is regarded as important, General Formula (K-24A) is preferable.

Preferable examples of General Formulae (K-24A) to (K-24B) include Formulae (K-24A-1) to (K-24A-4) and Formulae (K-24B-I) to (K-24B-6) as follows, and Formulae (K-24A-1) to (K-24A-3) are preferable from the viewpoint of the solubility in the liquid crystal composition, Formulae (K-24B-2) to (K-24B-4) are preferable, and Formulae (K-24A-1), (K-24B-2), and (K-24B-4) are particularly preferable from the viewpoint of the alignment.

In the formula, $S^{i1}$, $Y^{i1}$, and $P^{i1}$ each independently represent the same meanings as those of $S^{i1}$, $Y^{i1}$, and $P^{i1}$ in General Formula (K-24).

In addition, General Formula (K-24) preferably represents a group selected from General Formula (K-24-1), (K-24-2), (K-24-3a), (K-24-3b), (K-24-4a), (K-24-4b) (K-24-Y2), (K-24-Y3), and (K-24-Y4).

[Chem. 47]

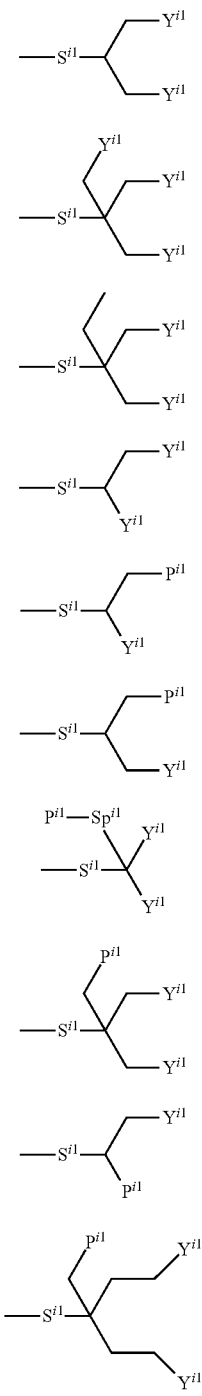

[Chem. 48]

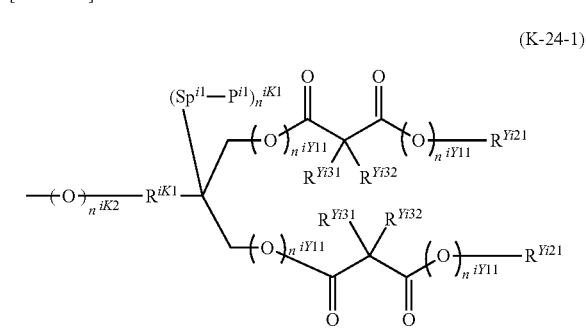

(K-24-1)

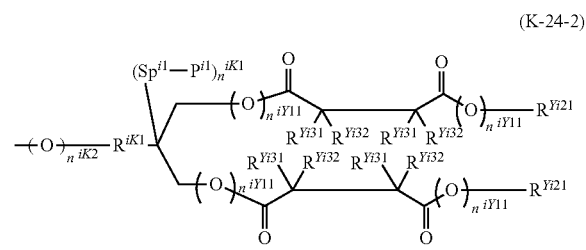

(K-24-2)

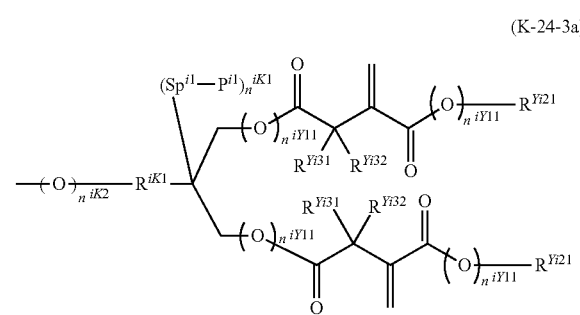

(K-24-3a)

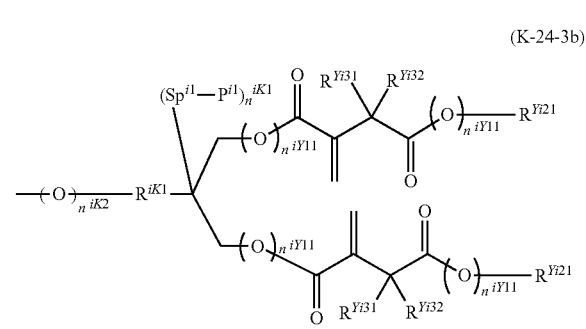

(K-24-3b)

[Chem. 49]

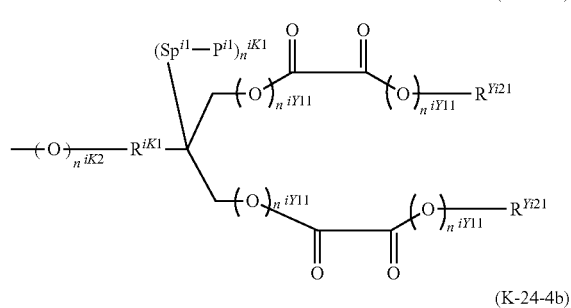

(K-24-4a)

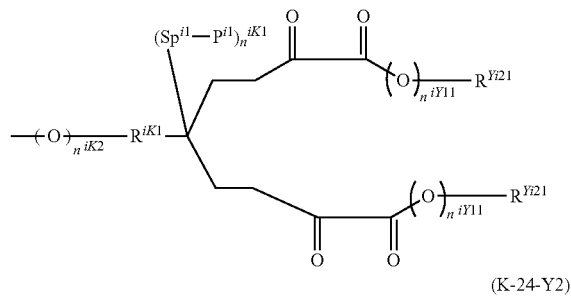

(K-24-4b)

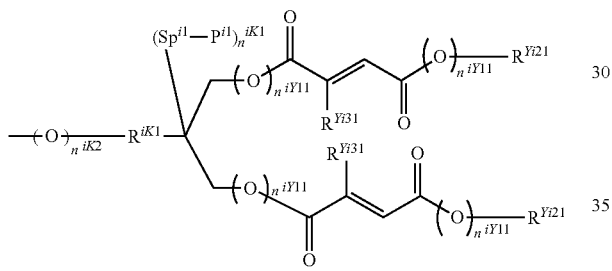

(K-24-Y2)

[Chem. 50]

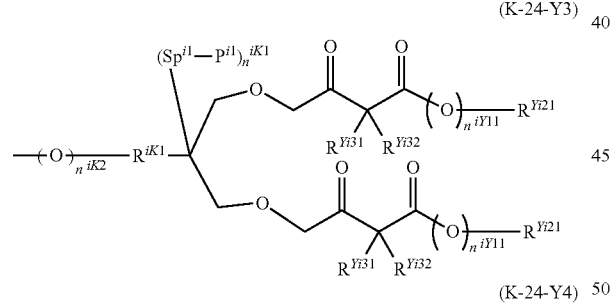

(K-24-Y3)

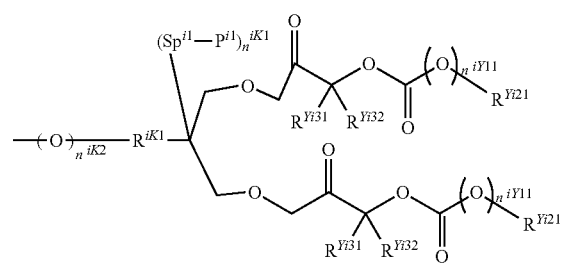

(K-24-Y4)

In the formula, $n^{iY11}$, $R^{iY21}$, $R^{iY31}$, and $R^{iY32}$ each independently represent the same meanings as those of $n^{iY11}$, $R^{iY21}$, $R^{iY31}$, and $R^{iY32}$ in General Formulae (Y-1-1) to (Y-4), $Sp^{i1}$ and pi each independently represent the same meanings as those of $Sp^{i1}$ and $P^{i1}$ in General Formula (i), and $R^{iK1}$ represents an alkylene group having 1 to 6 carbon atoms or a single bond, wherein —$CH_2$— in the alkylene group may be substituted with —CH=CH—, —C≡C—, or —O— so that an oxygen atom is not directly adjacent thereto, $n^{iK1}$ and $n^{iK2}$ each independently represent 0 or 1.

$R^{iK1}$ is preferably a straight chain alkylene group having 1 to 6 carbon atoms, and preferably a straight chain alkylene group having 1 to 3 carbon atoms. Note that, the preferable groups of $R^{iY21}$, $R^{iY31}$, $R^{iY32}$, $Sp^{i1}$, and $P^{i1}$ are the same as those of $R^{iY21}$, $R^{iY31}$, $R^{iY32}$, $Sp^{i1}$, and $P^{i1}$ in General Formulae (Y-1-1) to (Y-1-4), and (Y-2) to (Y-4) and General Formula (i).

In addition, $K^{i1}$ preferably represents General Formulae (K-25) to (K-28).

[Chem. 51]

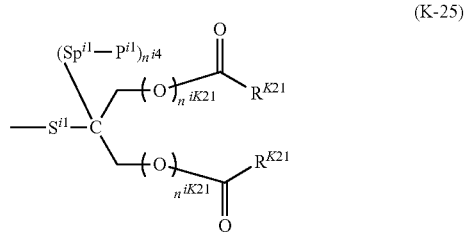

(K-25)

(K-26)

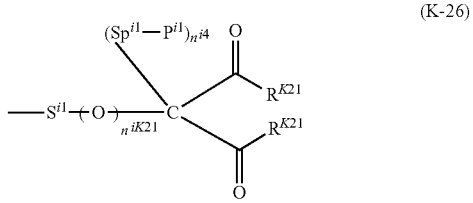

(K-27)

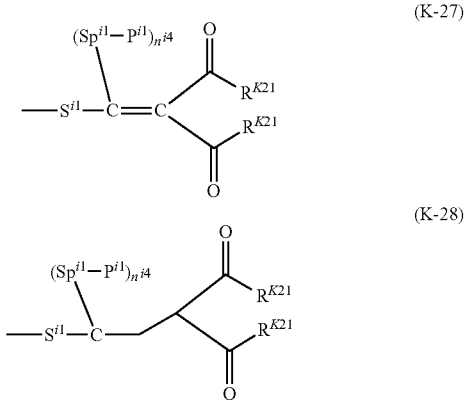

(K-28)

In the formula, $S^{i1}$, $P^{i1}$, and $Sp^{i1}$ respectively represent the same meanings as those of $S^{i1}$, $P^{i1}$, and $Sp^{i1}$ in General Formula (K-24), $R^{K21}$ represents a straight chain or branched alkyl group having 1 to 10 carbon atoms, and a halogenated alkyl group or a cyanated alkyl group, wherein at least one or more secondary carbon atoms in these alkyl groups may be substituted with —CH=CH—, —C≡C—, —O—, or —NH— so that an oxygen atom is not directly adjacent thereto, $n^{i4}$ and $n^{iK21}$ each independently represent 0 or 1.

$R^{K21}$ preferably represents a straight chain or branched alkyl group having 1 to 5 carbon atoms, a halogenated alkyl group, or a cyanated alkyl group, and more preferably represents a straight chain alkyl group having 1 to 3 carbon atoms or a cyanated alkyl group. In addition, at least one or more secondary carbon atoms in these alkyl groups is preferably substituted with —O— so that an oxygen atom is not directly adjacent thereto. $R^{K21}$ is specifically preferably an alkyl group having 1 to 3 carbon atoms, an alkoxy group having 1 to 3 carbon atoms, and a cyanated alkyl group having 1 to 3 carbon atoms.

General Formula (K-25) preferably represents General Formulae (K-25-1) to (K-25-3) as follows.

[Chem. 52]

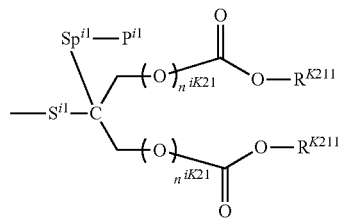
(K-25-1)

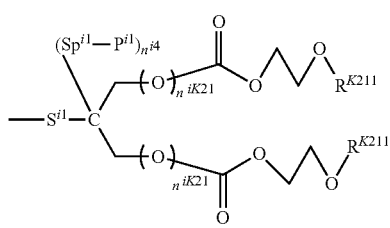
(K-25-2)

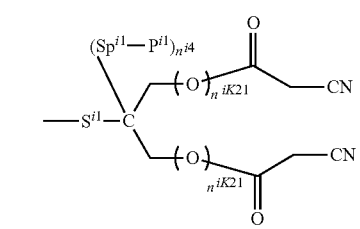
(K-25-3)

In the formula, $S^{i1}$, $P^{i1}$, $Sp^{i1}$, $n^{i4}$, and $n^{iK21}$ represent the same meanings as those of $S^{i1}$, $P^{i1}$, $Sp^{i1}$, $n^{i4}$, and $n^{iK21}$ in General Formula (K-25), and $R^{K211}$ represents a straight chain or branched alkyl group having 1 to 3 carbon atoms, a halogenated alkyl group, or a cyanated alkyl group.

General Formula (K-26) preferably represents General Formulae (K-26-1) and (K-26-2) as follows.

[Chem. 53]

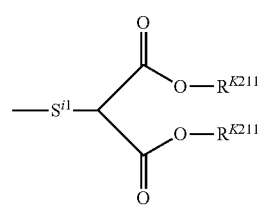
(K-26-1)

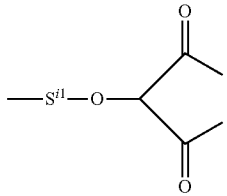
(K-26-2)

In the formula, $S^{i1}$ represents the same meaning as that of $S^{i1}$ in General Formula (K-26), and $R^{K211}$ represents a straight chain or branched alkyl group having 1 to 3 carbon atoms, a halogenated alkyl group, or a cyanated alkyl group.

General Formula (K-27) preferably represents General Formula (K-27-1) as follows.

[Chem. 54]

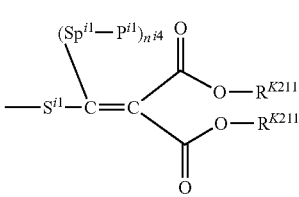
(K-27-1)

In the formula, $S^{i1}$, $P^{i1}$, $Sp^{i1}$, and $n^{i4}$ represent the same meanings as those of $S^{i1}$, $P^{i1}$, $Sp^{i1}$, and $n^{iK21}$ in General Formula (K-27), and $R^{K211}$ represents a straight chain or branched alkyl group having 1 to 3 carbon atoms, a halogenated alkyl group, or a cyanated alkyl group.

General Formula (K-28) preferably represents General Formula (K-28-1) as follows.

[Chem. 55]

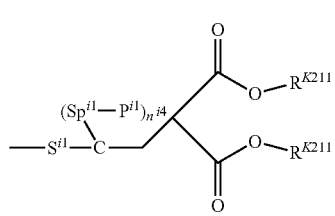
(K-28)

In the formula, $S^{i1}$, $P^{i1}$, $Sp^{i1}$, and $n^{i4}$ represent the same meanings as those of $S^{i1}$, $P^{i1}$, $Sp^{i1}$, and $n^{iK21}$ in General Formula (K-28), and $R^{K211}$ represents a straight chain or branched alkyl group having 1 to 3 carbon atoms, a halogenated alkyl group, or a cyanated alkyl group.

Preferable groups for $S^{i1}$, $P^{i1}$, and $Sp^{i1}$ are the same as those for $S^{i1}$, $P^{i1}$, and $Sp^{i1}$ in General Formula (K-24).

In Formula (i), $Z^{i1}$ and $Z^{i1}$ preferably represent a single bond, —CH=CH—, —C≡C—, —COO—, —OCO—, —OCOO—, —OOCO—, —CH=CHCOO—, —OCOCH=CH—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, a linear or branched alkylene group having 1 to 40 carbon atoms, or a group obtained by substituting one —CH$_2$— or two or more non-adjacent —CH$_2$—'s in the alkylene group with —O—, more preferably represent a single bond, —COO—, —OCO—, —CH=CHCOO—, —OCOCH=CH—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, a linear or branched alkylene group having 1 to 10 carbon atoms, or a group obtained by substituting one —CH$_2$— or two or more non-adjacent —CH$_2$—'s in the alkylene group having 2 carbon atoms with —O—, more preferably represent a single bond, a linear alkylene group having 2 to 15 carbon atoms, or a group obtained by substituting one —CH$_2$— or two or more non-adjacent —CH$_2$—'s in the alkylene group with —O—, and still more preferably represent a single bond, —COO—, —OCO—, —OCOO—, —OOCO—, —OCH$_2$CH$_2$O—, or a group (—CH$_2$O—, —OCH$_2$—) obtained by substituting one —CH$_2$— in an alkylene group (ethylene group (—CH$_2$CH$_2$—)) or an ethylene group with —O—, or a group (—CH=CHCOO—, —OCOCH=CH—) obtained by substituting one —CH$_2$— in an ethylene group with —COO— or —OCO—.

$R^{i1}$ preferably represents a straight chain or branched alkyl group having 1 to 20 carbon atoms or a halogenated alkyl group, wherein the secondary carbon atoms in the alkyl group may be substituted with —O— so that an oxygen atom is not directly adjacent thereto, and more preferably represents a straight chain or branched alkyl group having 3 to 18 carbon atoms, wherein the secondary carbon atoms in the alkyl group may be substituted with —O— so that an oxygen atom is not directly adjacent thereto. From the viewpoint of improving the alignment of the liquid crystal compound, $R^{i1}$ has preferably 3 or more carbon atoms, more preferably 4 or more carbon atoms, and more preferably 5 or more carbon atoms.

$A^{i1}$ preferably represents a divalent 6-membered ring aromatic group, a divalent 6-membered ring heteroaromatic group, a divalent 6-membered ring aliphatic group, or a divalent 6-membered ring heteroaliphatic group, a divalent 5-membered ring aromatic group, and a divalent 5-membered ring heteroaromatic group, a divalent 5-membered ring aliphatic group, or a divalent 5-membered ring heteroaliphatic group, and specifically, it preferably represents a ring structure selected from a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, a cyclopentane-1,3-diyl group, an indane-2,5-diyl group, a 1,2,3,4-tetrahydronaphthalene-2,6-diyl group, and a 1,3-dioxane-2,5-diyl group, wherein the ring structure is preferably unsubstituted or substituted with $L^{i1}$. $L^{i1}$ preferably represents an alkyl group having 1 to 12 carbon atoms, a halogenated alkoxy group having 1 to 12 carbon atoms, an alkoxy group having 1 to 12 carbon atoms, a halogenated alkoxy group having 1 to 12 carbon atoms, a halogen atom, a cyano group, or a nitro group. $A^{i1}$ preferably represents a divalent 6-membered ring aromatic group or a divalent 6-membered ring aliphatic group, and a divalent unsubstituted 6-membered ring aromatic group, a divalent unsubstituted 6-membered ring aliphatic group, or a group obtained by substituting the hydrogen atoms in these ring structures with an alkyl group having 1 to 6 carbon atoms, an alkoxy group having 1 to 6 carbon atoms, or a halogen atom, a divalent unsubstituted 6-membered ring aromatic group, a group obtained by substituting the hydrogen atom in this ring structure with a fluorine atom, or a divalent unsubstituted 6-membered ring aliphatic group is preferable, and a hydrogen atom on the substituent is more preferably a 1,4-phenylene group, a 2,6-naphthalene group or a 1,4-cyclohexyl group, which may be substituted by a halogen atom, an alkyl group, or an alkoxy group.

$A^{i2}$ and $A^{i3}$ each independently represent a divalent 6-membered ring aromatic group, a divalent 6-membered ring heteroaromatic group, a divalent 6-membered ring aliphatic group, or a divalent 6-membered ring heteroaliphatic group, a divalent 5-membered ring aromatic group, and a divalent 5-membered ring heteroaromatic group, a divalent 5-membered ring aliphatic group, or a divalent 5-membered ring heteroaliphatic group, and specifically, it preferably represents a ring structure selected from a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, a cyclopentane-1,3-diyl group, an indane-2,5-diyl group, a 1,2,3,4-tetrahydronaphthalene-2,6-diyl group, and a 1,3-dioxane-2,5-diyl group, wherein the ring structure is preferably unsubstituted or substituted with $L^{i1}$, $P^{i1}$-$Sp^{i1}$-, or $K^{i1}$. Further, $A^{i3}$ preferably represents a ring structure selected from a 1,3-phenylene group, a 1,3-cyclohexylene group, and a naphthalene 2,5-diyl group.

The preferable group for $L^{i1}$ is the same as $L^{i1}$ in $A^{i1}$. $A^{i2}$ and $A^{i3}$ preferably represent a divalent 6-membered ring aromatic group or a divalent 6-membered ring aliphatic group, and a divalent unsubstituted 6-membered ring aromatic group, a divalent unsubstituted 6-membered ring aliphatic group, or a group obtained by substituting the hydrogen atoms in these ring structures with an alkyl group having 1 to 6 carbon atoms, an alkoxy group having 1 to 6 carbon atoms, a halogen atom, or P-Sp-, a divalent unsubstituted 6-membered ring aromatic group, a group obtained by substituting the hydrogen atom in this ring structure with a fluorine atom, or a divalent unsubstituted 6-membered ring aliphatic group is preferable, and a hydrogen atom on the substituent is more preferably a 1,4-phenylene group, a 2,6-naphthalene group or a 1,4-cyclohexyl group, which may be substituted by a halogen atom, an alkyl group, an alkoxy group, or P-Sp-. $A^{i3}$ is also preferable substituted with $K^{i1}$.

Here, General Formula (i) has at least one $P^{i1}$-$Sp^{i1}$- as a substituent of $A^{i2}$ or $A^{i3}$ or as a substituent of $K^{i1}$, but from the viewpoint of further improving the reliability, the number of polymerizable groups in General Formula (i) is preferably 2 or more, and more preferably 3 or more. In a case where the reliability is regarded as important, polyfunctionalization can be easily achieved by introducing a polymerization group into the $A^{i2}$ or $A^{i3}$ moiety, and thereby a strong polymer can be constructed. The position at which $P^{i1}$-$Sp^{i3}$- in $A^{i2}$ or $A^{i3}$ is substituted is preferably in the vicinity of $K^{i1}$, and it is more preferable that $A^{i3}$ is substituted with $P^{i1}$-$Sp^{i1}$-.

$m^{i1}$ preferably represents an integer of 0 to 3, and more preferably represents an integer of 0 to 1.

The compound represented by General Formula (iv) is preferably a compound represented by General Formula (iv-1) as follows.

[Chem. 56]

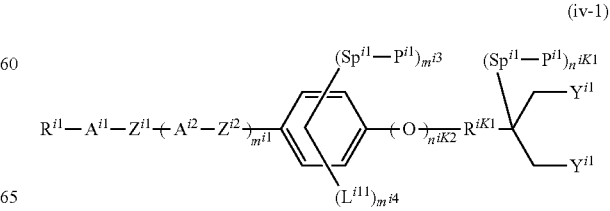

(iv-1)

In the formula, $R^{i1}$, $A^{i1}$, $A^{i2}$, $Z^{i1}$, $Z^{i2}$, $m^{i1}$, $P^{i1}$, and $Sp^{i1}$ each independently represent the same meanings as those of $R^1$, $A^{i1}$, $A^{i2}$, $Z^{i1}$, $Z^{i2}$, $m^{i1}$, $P^{i1}$, and $Sp^{i1}$ in General Formula (iv), $Y_{i1}$'s each independently represent the same meanings as those of $Y^{i1}$'s in General Formula (K-24) $R^{iK1}$, $n^{iK1}$, and $n^{iK2}$ each independently represent the same meanings as those of $R^{iK1}$, $n^{iK1}$, and $ni^{K2}$ in General Formula (K-24-1), $L^{i11}$ represents an alkyl group having 1 to 3 carbon atoms, $m^{i3}$ represents an integer of 0 to 3, $m^{i4}$ represents an integer of 0 to 3, and $m^{i3}+m^{i4}$ represents 0 to 4.

The compound represented by General Formula (iv-1) is preferably the compounds represented by General Formulae (iv-1-1), (iv-1-2), (iv-1-3a), (iv-1-3b), (iv-1-4), (iv-1-Y2), (iv-1-Y3), and (iv-1-Y4).

[Chem. 57]

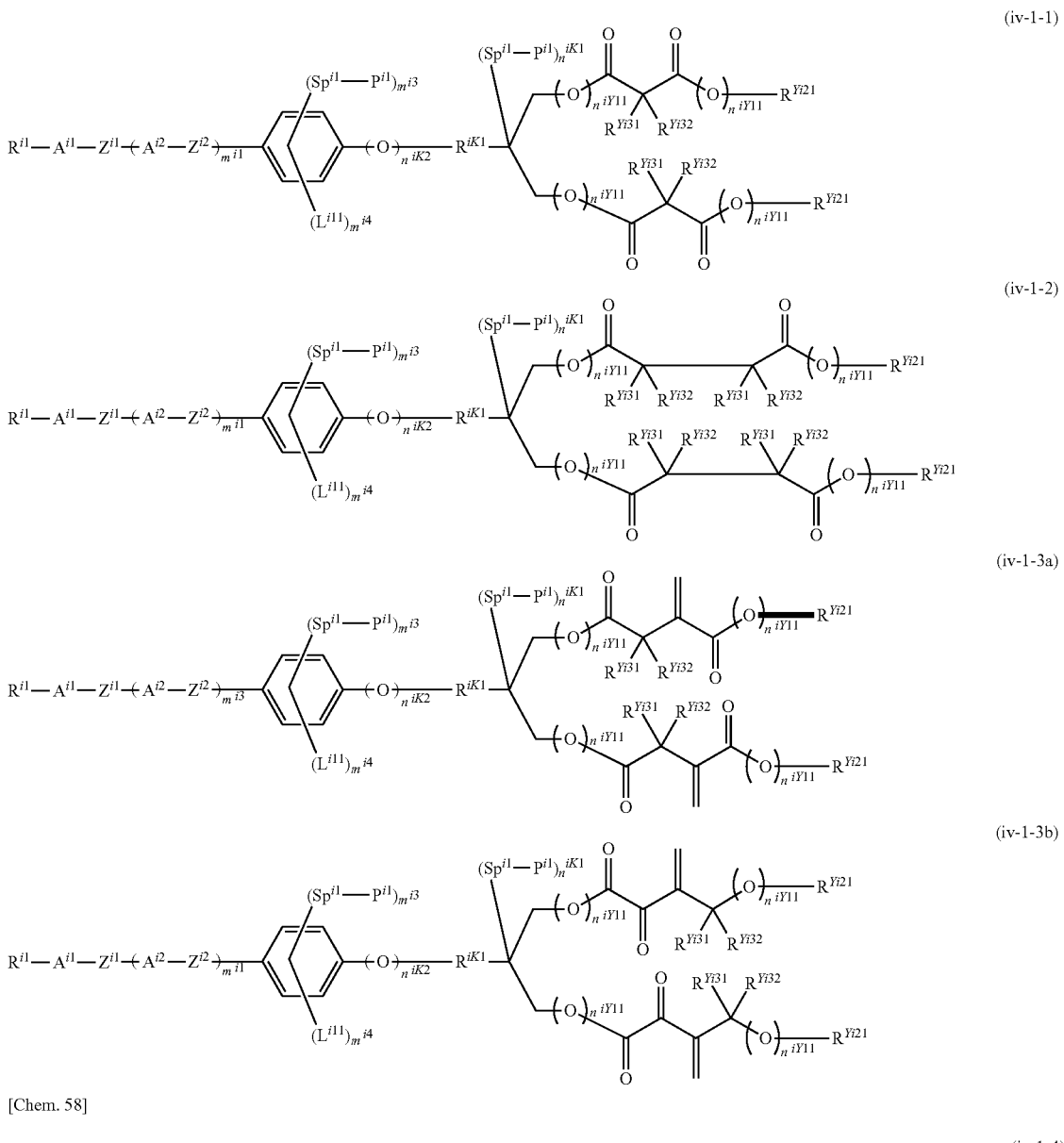

[Chem. 58]

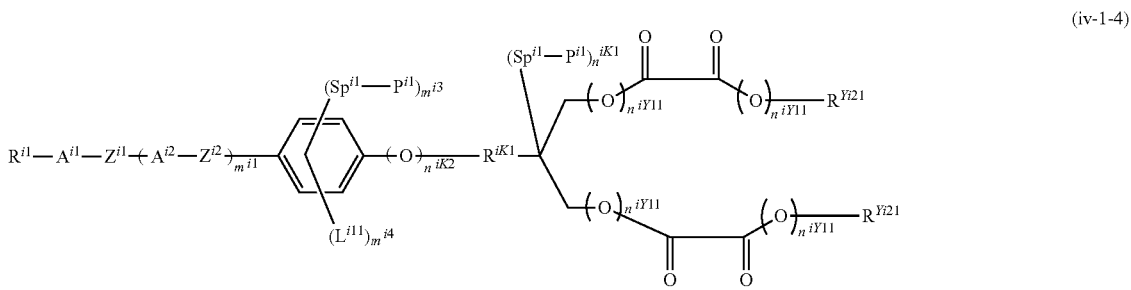

-continued

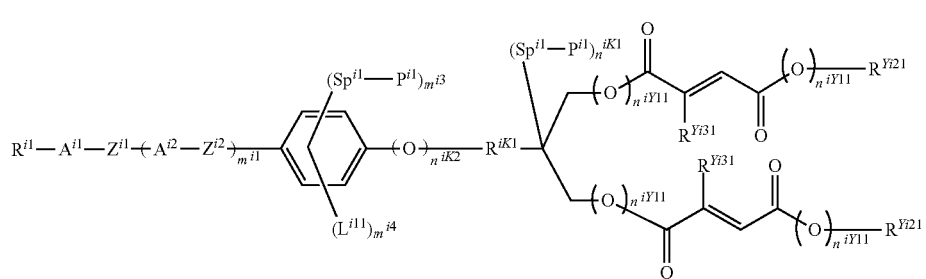
(iv-1-Y2)

[Chem. 59]

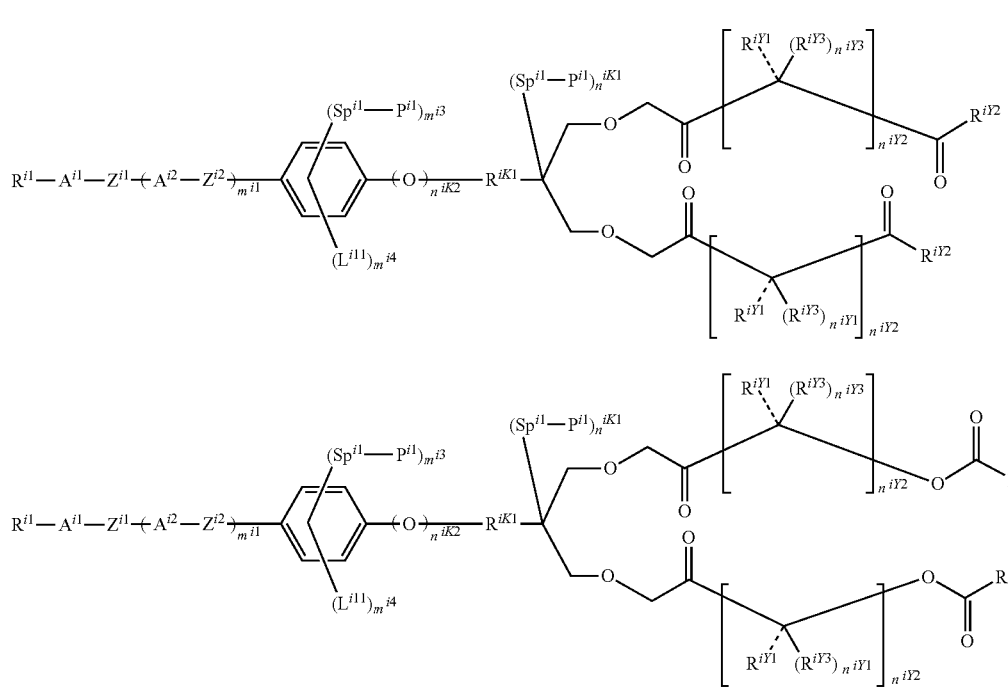
(iv-1-Y3)

(iv-1-Y4)

In the formula, $R^{i1}$, $A^{i1}$, $A^{i2}$, $Z^{i1}$, $Z^{i2}$, $m^{i1}$, $P^{i1}$, and $Sp^{i1}$ each independently represent the same meanings as those of $R^{i1}$, $A^{i1}$, $A^{i2}$, $Z^{i1}$, $Z^{i2}$, $m^{i1}$, $P^{i1}$, and $Sp^{i1}$ in General Formula (iv), $R^{iK1}$, $R^{iY21}$, $R^{i3Y1}$, $R^{i3Y2}$, $n^{iK1}$, $n^{iK2}$, and $n^{iY11}$ each independently represent the same meanings as those of $R^{iK1}$, $R^{iY21}$, $R^{i3}1$, $R^{i3}2$, $n^{iK1}$, $n^{iK2}$, and $n^{iY11}$ in General Formulae (K-24-1) to (K-24-3), $L^{i11}$ represents an alkyl group having 1 to 3 carbon atoms, $m^{i3}$ represents an integer of 0 to 3, $m^{i4}$ represents an integer of 0 to 3, and $m^{i3}+m^{i4}$ represents 0 to 4.

Note that, preferable groups of symbols in General Formula (iv-1) and General Formulae (iv-1-l), (iv-1-2), and (iv-1-3) is the same as the preferable groups in General Formula (i), General Formula (K-1), and General Formulae (K-1-1) to (K-1-3).

Further, the compound represented by General Formula (iv) is preferably a compound represented by General Formulae (iv-2) to (iv-5) as follows.

[Chem. 60]

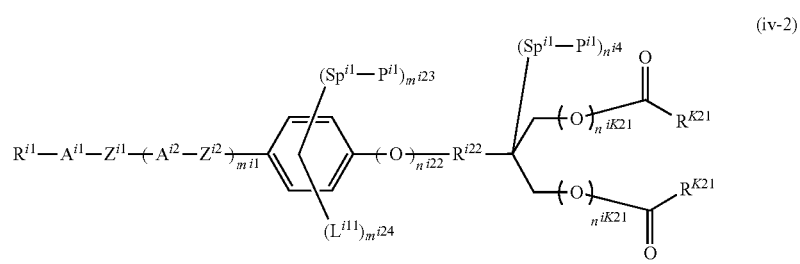
(iv-2)

(iv-3)
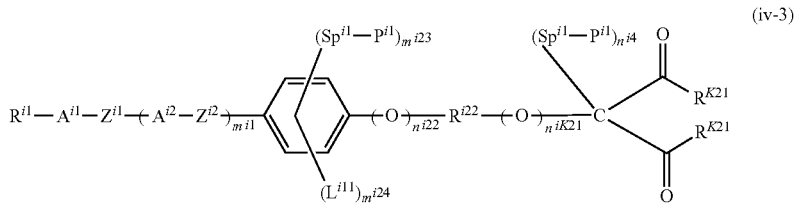

(iv-4)
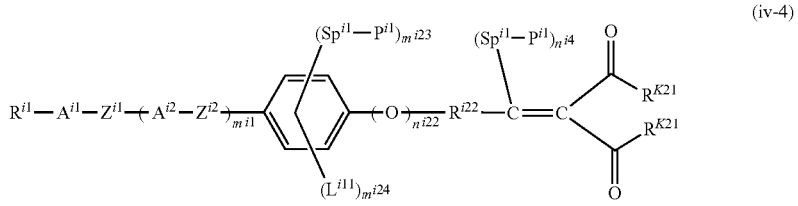

(iv-5)
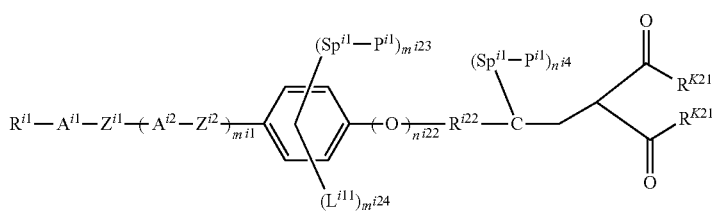

In the formula, $R^{i1}$, $A^{i1}$, $A^{i2}$, $Z^{i1}$, $Z^{i2}$, $m^{i1}$, $P^{i1}$, and $Sp^{i1}$ each independently represent the same meanings as those of $R^{i1}$, $A^{i1}$, $A^{i2}$, $Z^{i1}$, $Z^{i2}$, $m^{i1}$, $P^{i1}$, and $Sp^{i1}$ in General Formula (iv), $n^{i4}$, $n^{iK21}$, and $R^{K21}$ each independently represent the same meanings as those of $n^{i4}$, $n^{iK21}$, and $R^{K21}$ in General Formula (K-24), $R^{i22}$ represents an alkylene group having 1 to 6 carbon atoms or a single bond, wherein —$CH_2$— in the alkylene group may be substituted with —CH=CH—, —C≡C—, or —O— so that an oxygen atom is not directly adjacent thereto, $L^{i1}$ represents an alkyl group having 1 to 3 carbon atoms, $n^{i22}$ represents 0 or 1, $m^{i23}$ represents an integer of 0 to 3, $m^{i24}$ represents an integer of 0 to 3, and $m^{i23}+m^{i24}$ is 0 to 4.

$R^{i22}$ is preferably a straight chain alkylene group having 1 to 6 carbon atoms, and preferably a straight chain alkylene group having 1 to 3 carbon atoms. Note that, the preferable groups of $R^{iY21}$, $R^{iY31}$, $R^{iY32}$, $Sp^{i1}$, and $P^{i1}$ are the same as those of $R^{iY21}$, $R^{iY31}$, $R^{iY32}$, $Sp^{i1}$, and $P^{i1}$ in General Formulae (Y-1-1) to (Y-1-3) and General Formula (i). Note that, preferable groups of symbols in General Formula (iv-2) are the same as the preferable groups in General Formula (iv) and General Formula (K-24).

General Formula (iv) preferably represents General Formulae (R-1) to (R-6) as follows.

[Chem. 61]

(R-1)
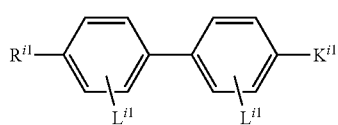

(R-2)
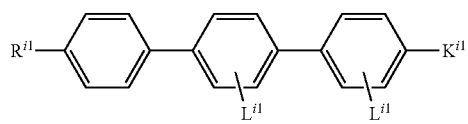

-continued (R-3)
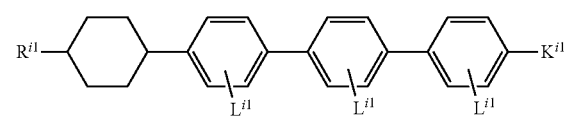

(R-4)

(R-5)

(R-6)

In the formula, $R^{i1}$, $K^{i1}$, and $L^{i1}$ represent the same meanings as those of $R^{i1}$, $K^{i1}$, and $L^{i1}$ in General Formula (iv).

Specific examples of General Formula (iv) are represented by the following Formulae (R-1-1) to (R-6-7), but are not limited thereto.

[Chem. 62]
(R-1-1)
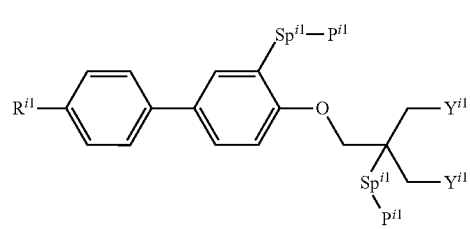
(R-1-2)
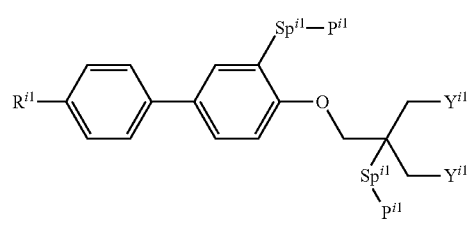
(R-2-1)
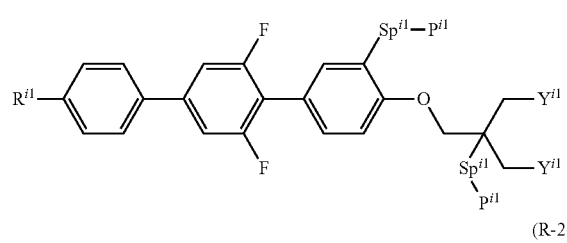
(R-2-2)
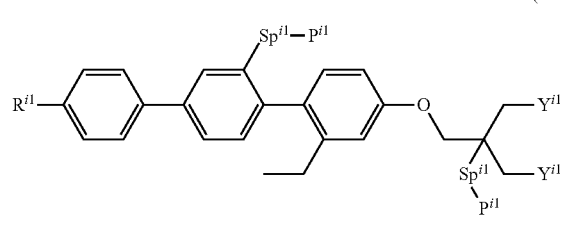
[Chem. 63]
(R-3-1)
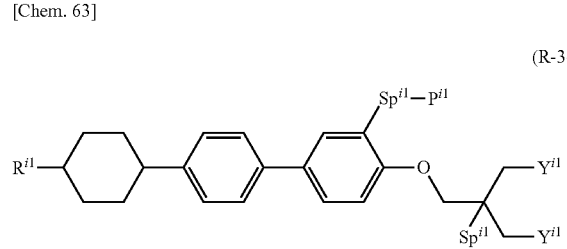
(R-3-2)
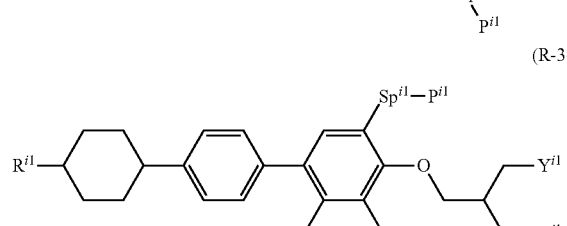
(R-3-3)
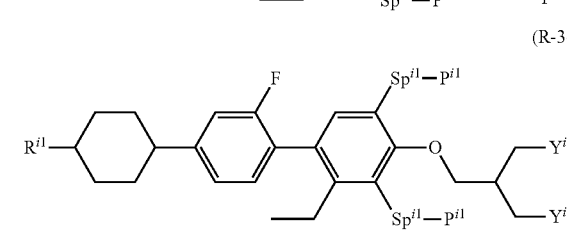
-continued
(R-3-4)
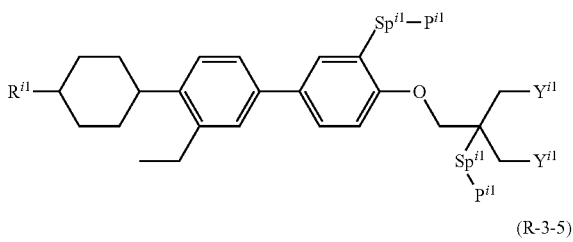
(R-3-5)
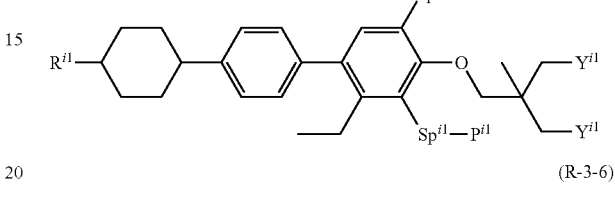
(R-3-6)
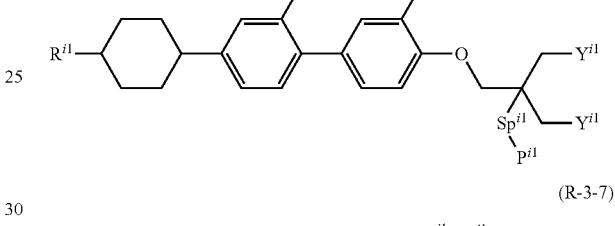
(R-3-7)
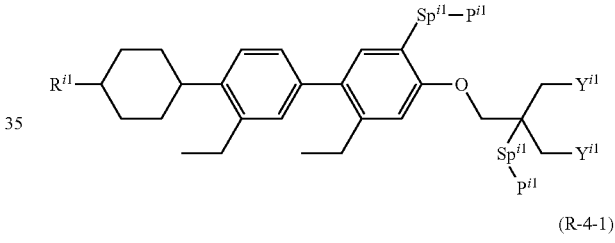
(R-4-1)
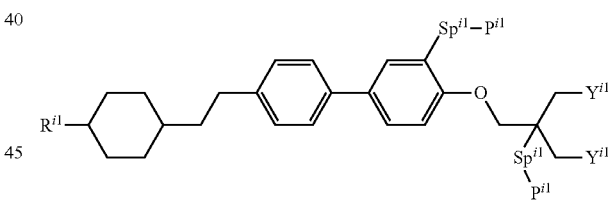
(R-4-2)
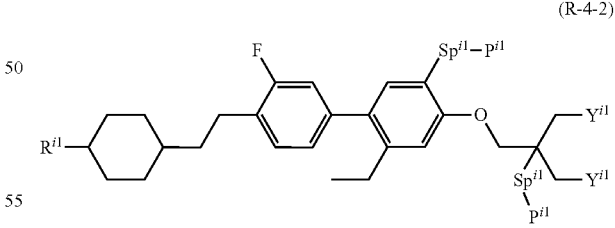
(R-4-3)
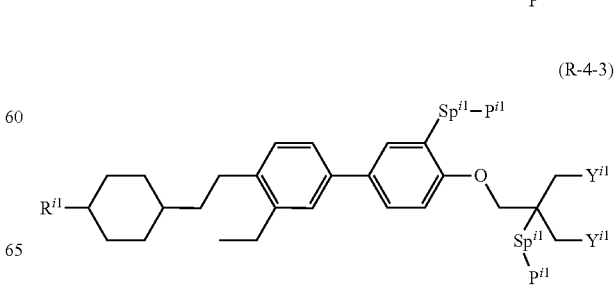

(R-5-1)
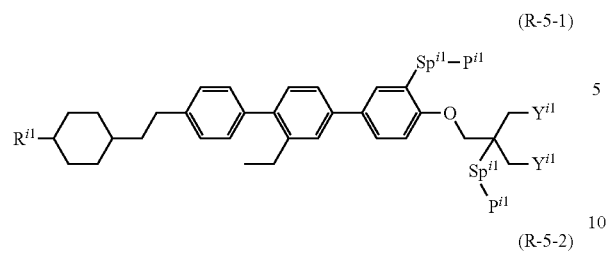

(R-5-2)
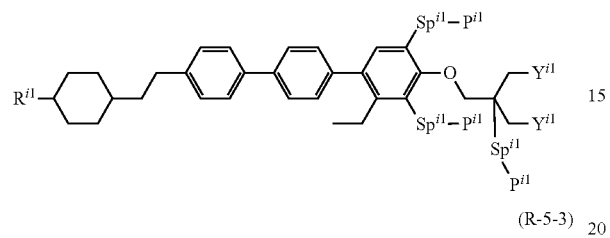

(R-5-3)
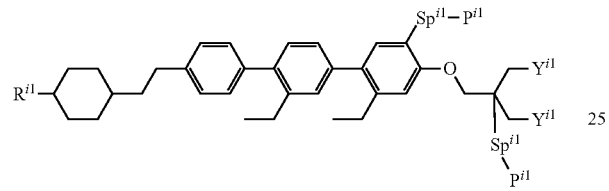

[Chem. 64]

(R-6-1)
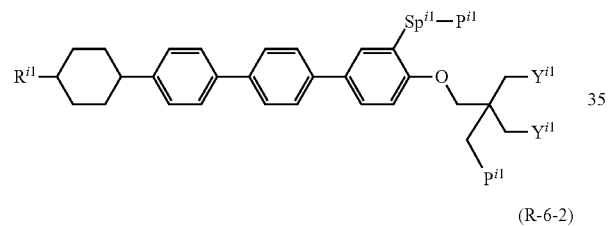

(R-6-2)
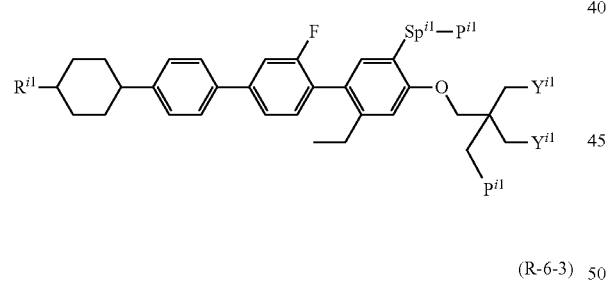

(R-6-3)
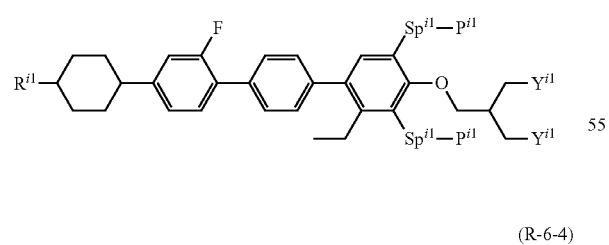

(R-6-4)
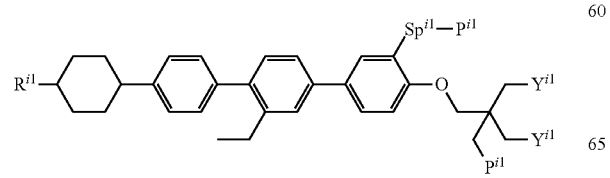

(R-6-5)
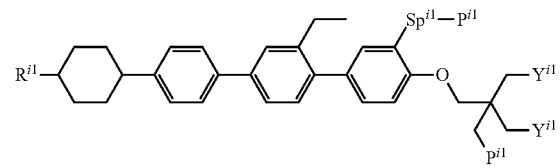

(R-6-6)
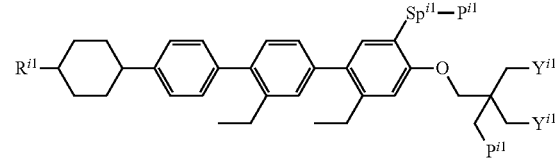

(R-6-7)
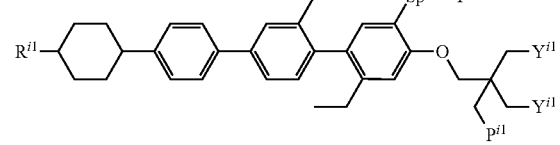

In the formula, $R^{i1}$, $P^{i1}$, $S^{i1}$, and $Y^{i1}$ each independently represent the same meanings as those of $R^{i1}$, $P^{i1}$, $S^{i1}$, and $Y^{i1}$ in General Formula (iv) and General Formula (K-1).

A lower limit of the content of the spontaneously aligning monomer represented by General Formula (I) in the liquid crystal composition of the present invention is preferably 0.02% by mass, is preferably 0.03% by mass, is preferably 0.04% by mass, is preferably 0.05% by mass, is preferably 0.06% by mass, is preferably 0.07% by mass, is preferably 0.08% by mass, is preferably 0.09% by mass, is preferably 0.1% by mass, is preferably 0.12% by mass, is preferably 0.15% by mass, is preferably 0.17% by mass, is preferably 0.2% by mass, is preferably 0.22% by mass, is preferably 0.25% by mass, is preferably 0.27% by mass, is preferably 0.3% by mass, is preferably 0.32% by mass, is preferably 0.35% by mass, is preferably 0.37% by mass, is preferably 0.4% by mass, is preferably 0.42% by mass, is preferably 0.45% by mass, is preferably 0.5% by mass, and is preferably 0.55% by mass. An upper limit of the content of the polymerizable compound represented by General Formula (I) in the liquid crystal composition of the present invention is preferably 2.5% by mass, preferably 2.3% by mass, preferably 2.1% by mass, preferably 2% by mass, preferably 1.8% by mass, preferably 1.6% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, preferably 0.55% by mass, preferably 0.5% by mass, preferably 0.45% by mass, and preferably 0.4% by mass.

Specifically, the following compounds are mentioned as preferable spontaneously aligning monomers.

[Chem. 65]
(P-K-1)
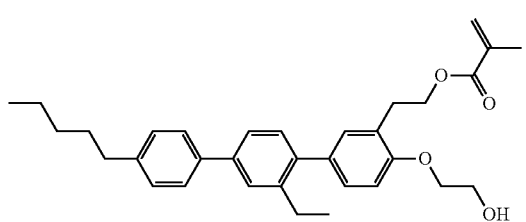
[Chem. 66]
(P-K-2)
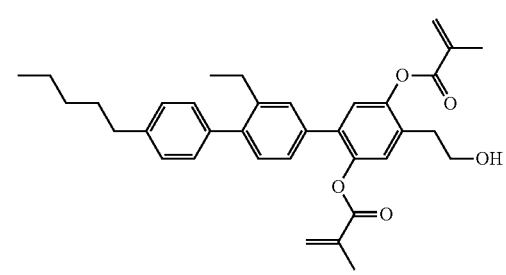
[Chem. 67]
(P-K-3)
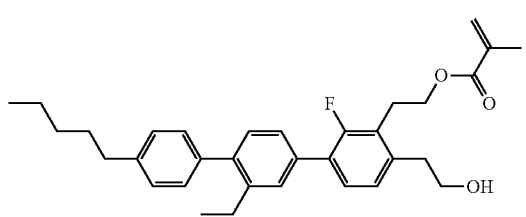
[Chem. 68]
(P-K-4)
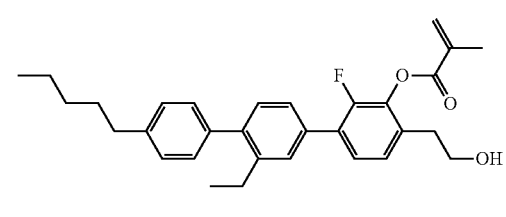
[Chem. 69]
(P-K-5)
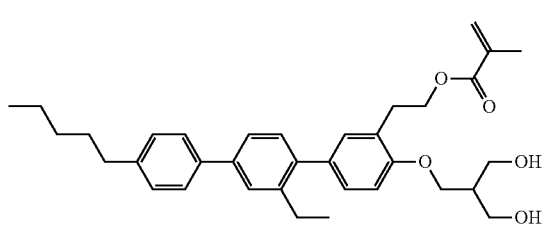
[Chem. 70]
(P-K-6)
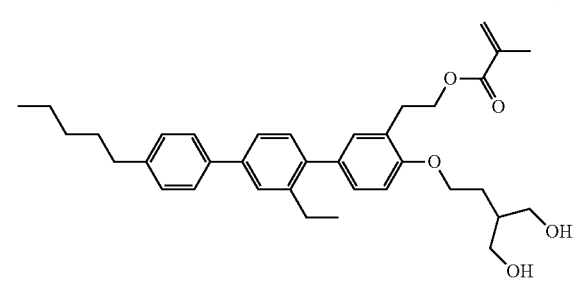
[Chem. 71]
(P-K-7)
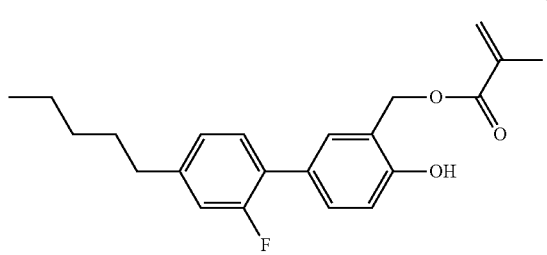
[Chem. 72]
(P-K-8)
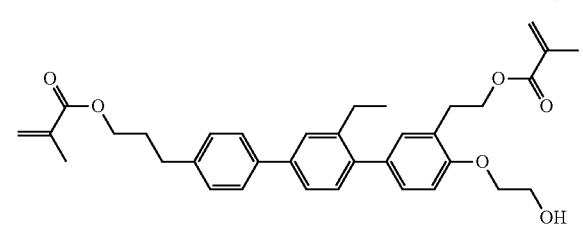

-continued
[Chem. 73]
(P-K-9)
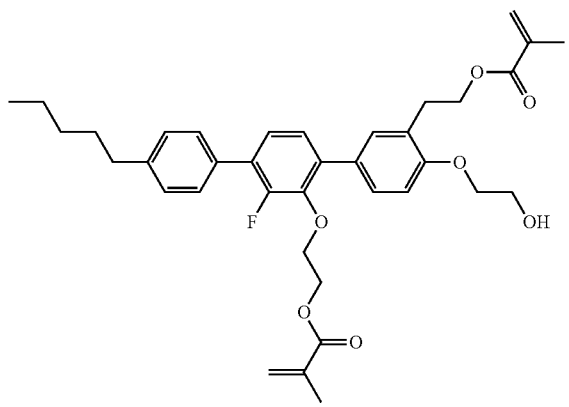
[Chem. 74]
(P-K-10)
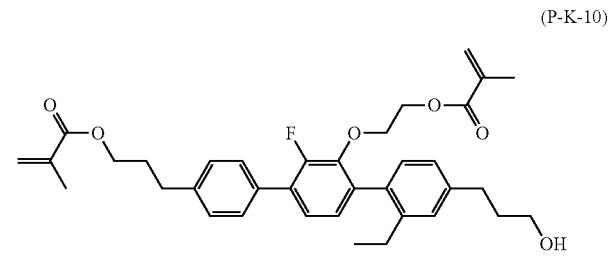
[Chem. 75]
(P-K-11)
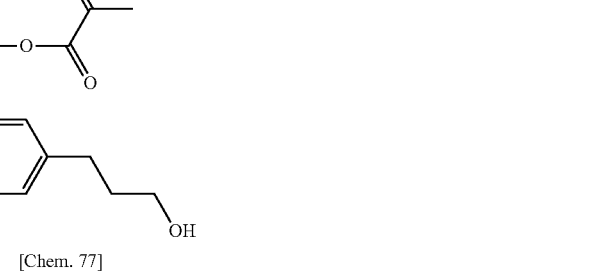
[Chem. 76]
(P-K-12)
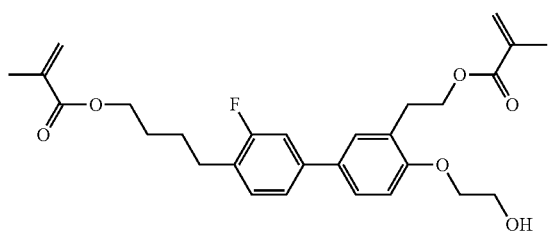
[Chem. 77]
(P-K-13)
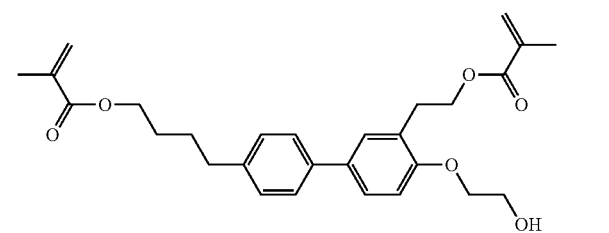
[Chem. 78]
(P-K-14)
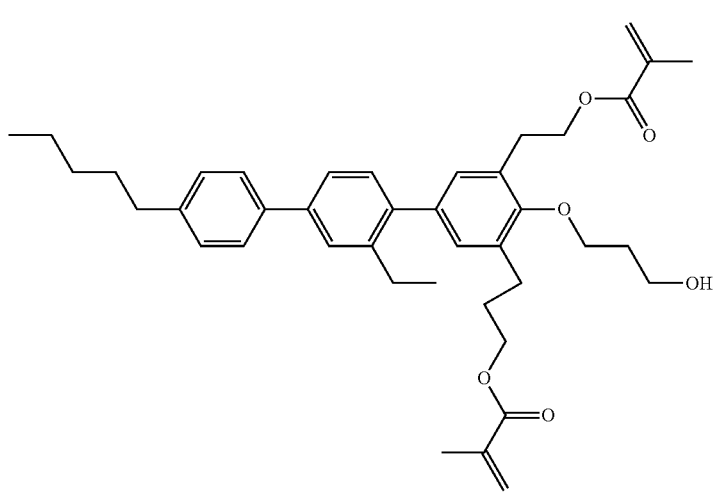

-continued
(P-K-15)
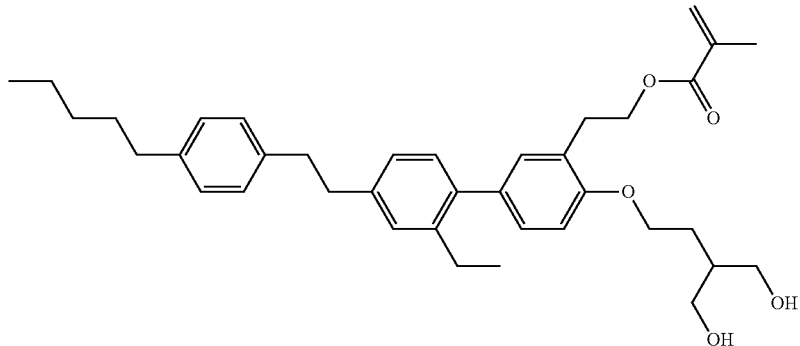
(P-K-16)
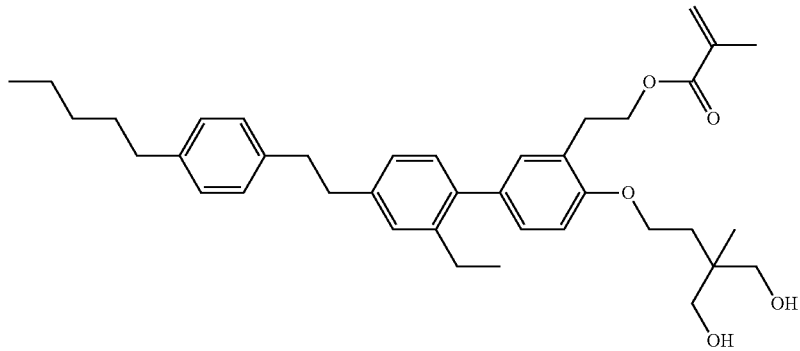
(P-K-17)
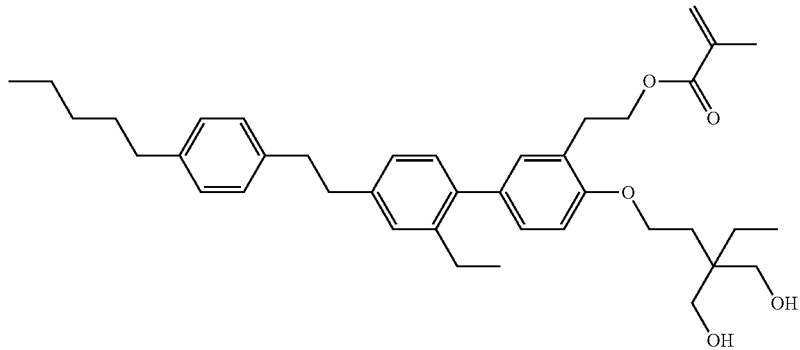
(P-K-18)
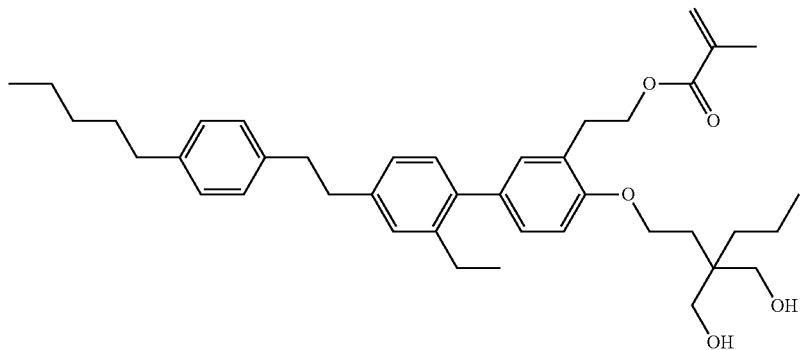

[Chem. 83]
(P-K-19)
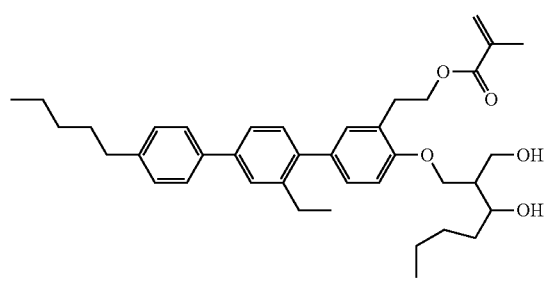
[Chem. 84]
(P-K-20)
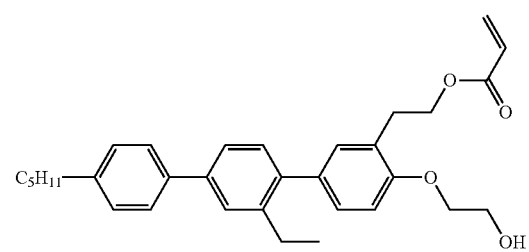
[Chem. 85]
(P-1-1)
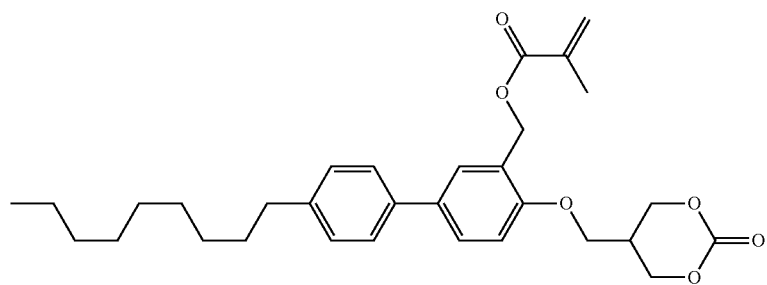
(P-1-2)
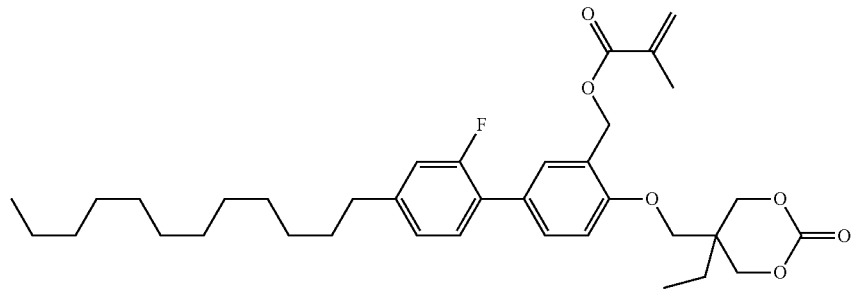
(P-1-3)
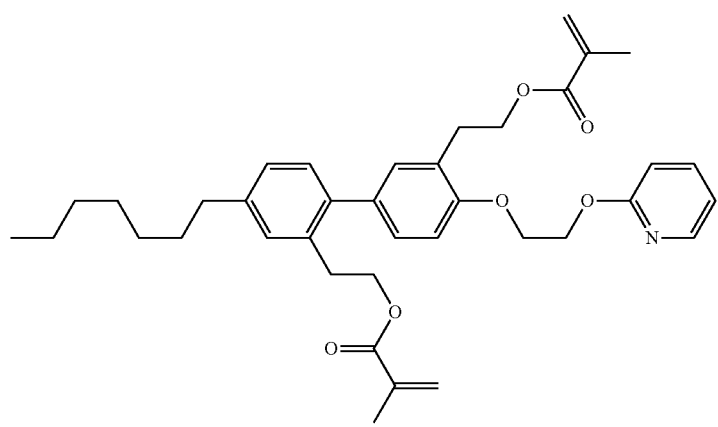
(P-1-4)
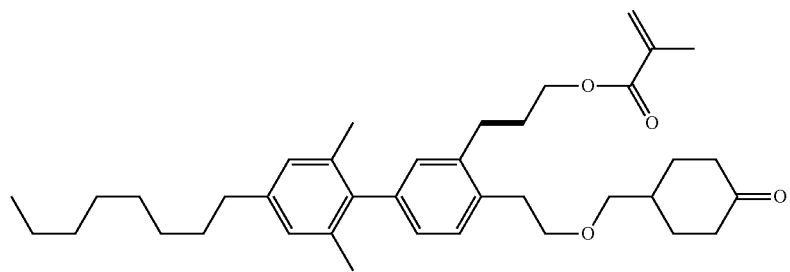

(P-1-5)
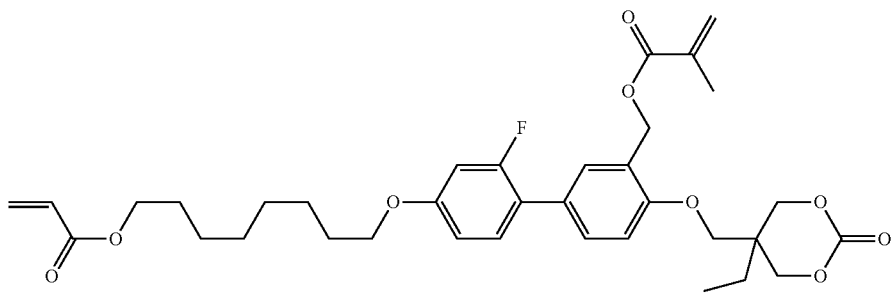
(P-1-6) (P-1-7)
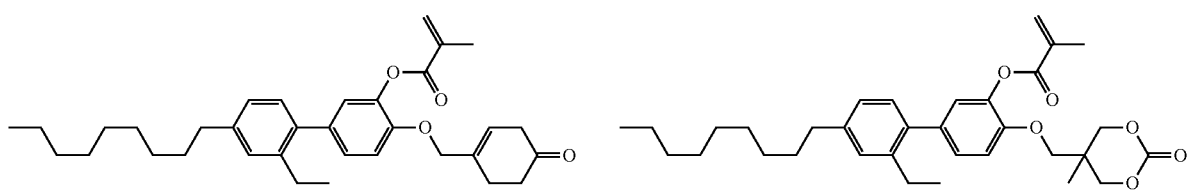
(P-1-8)
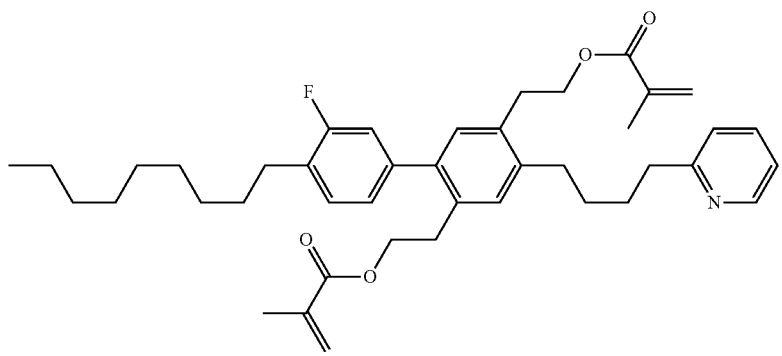
(P-1-9)
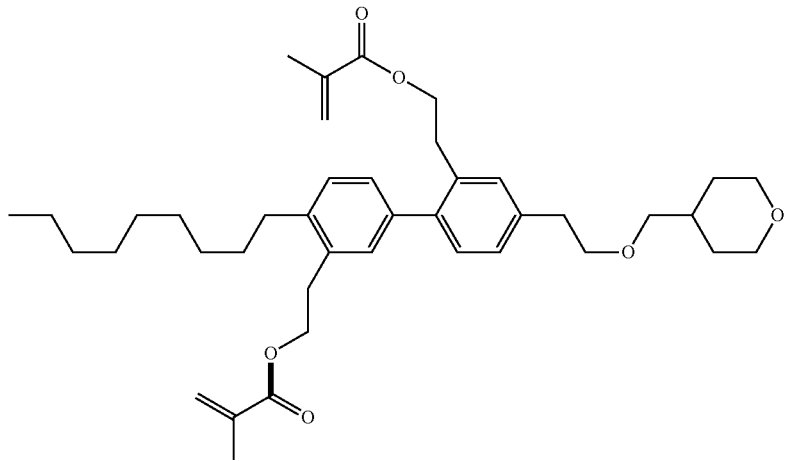

-continued
(P-1-10)
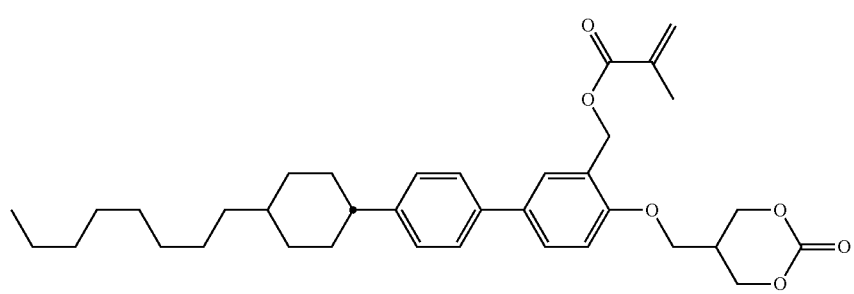
(P-1-11)
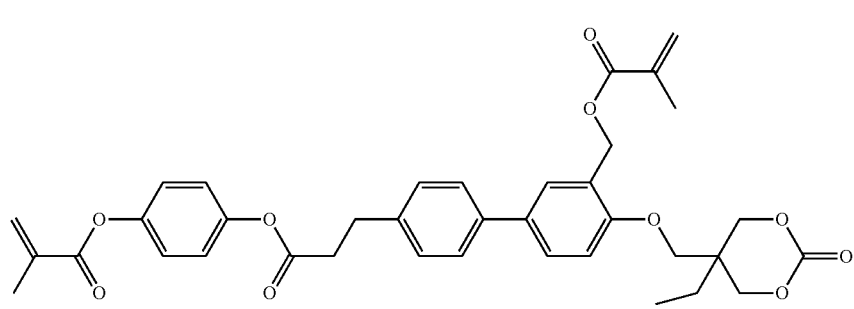
(P-1-12)
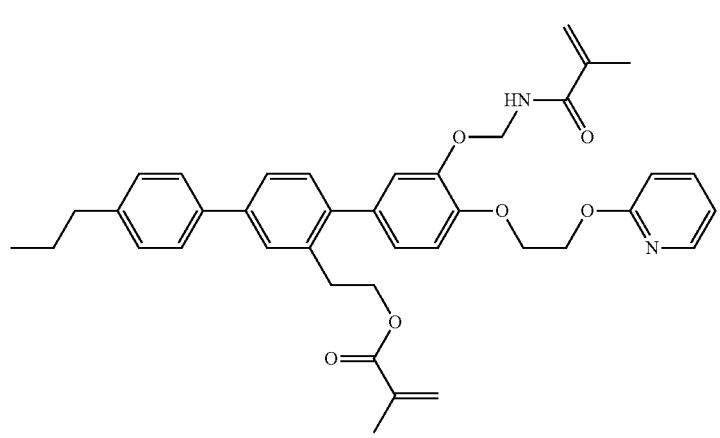
(P-1-13)
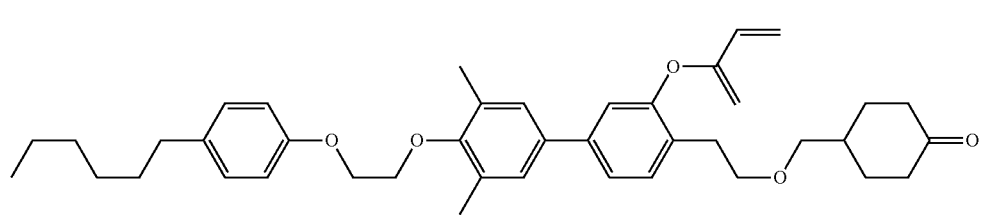
(P-1-14)
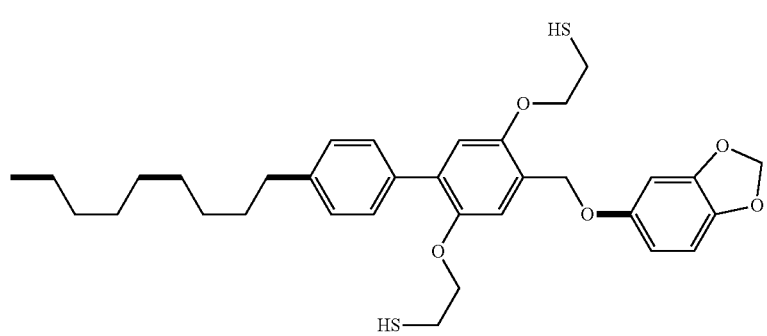

-continued
[Chem. 88]
(P-1-15)
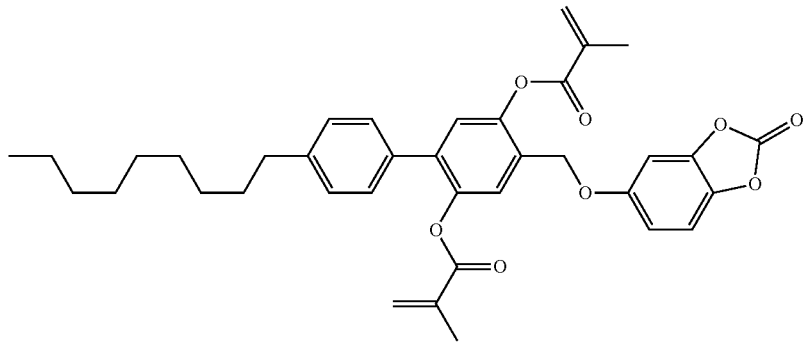
(P-1-16)
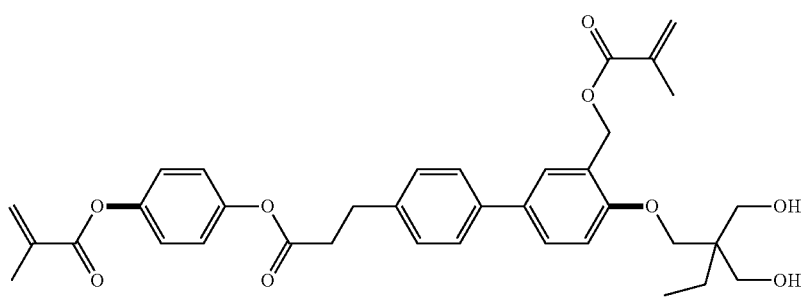
(P-1-17)
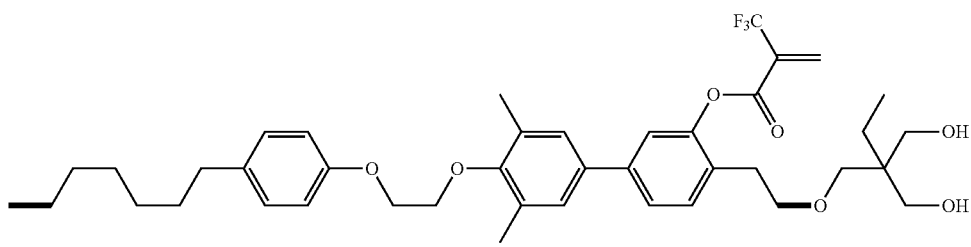
(P-1-18)
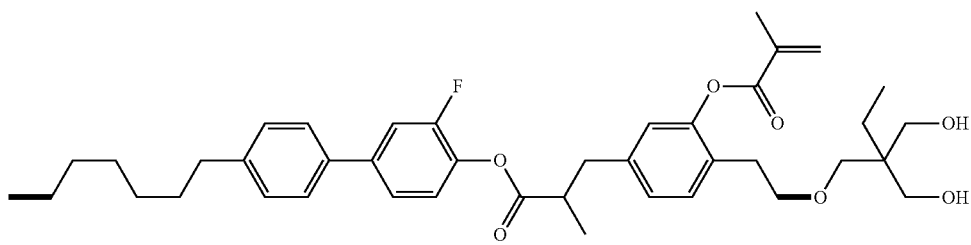
(P-1-19)
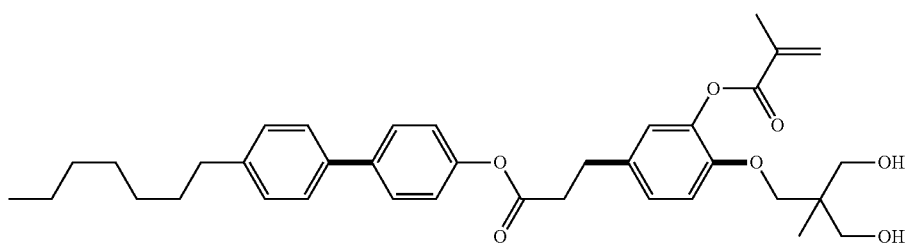

-continued
(P-1-20)
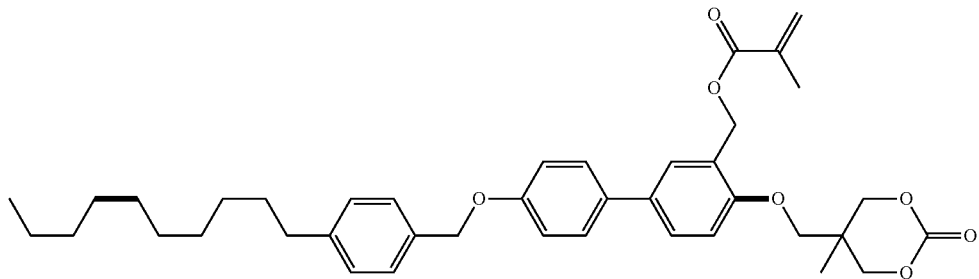
(P-1-21)
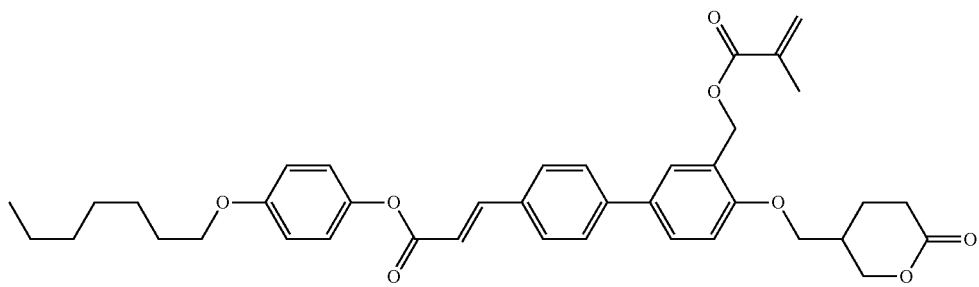
(P-1-22)
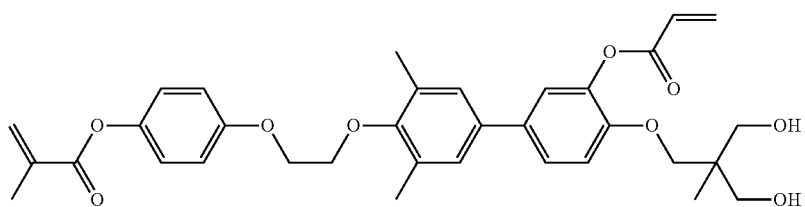
(P-1-23)
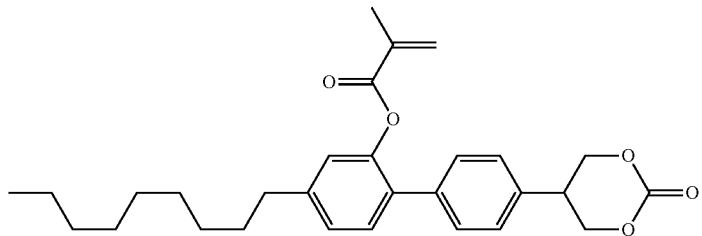
(P-1-24)
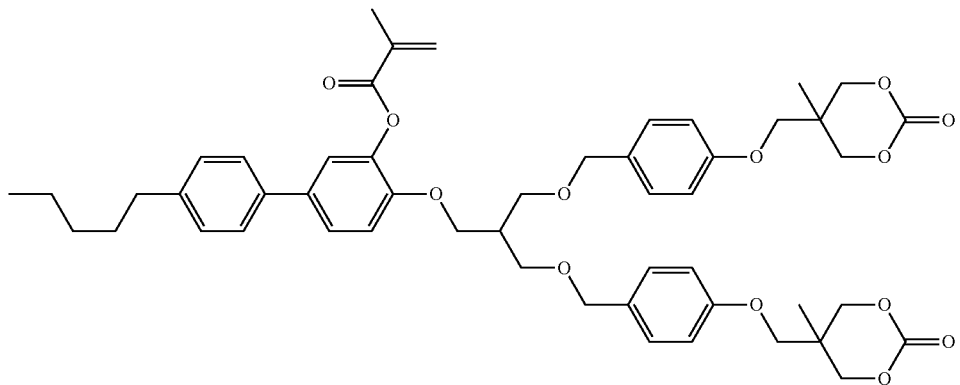

[Chem. 90]
(P-1-25)
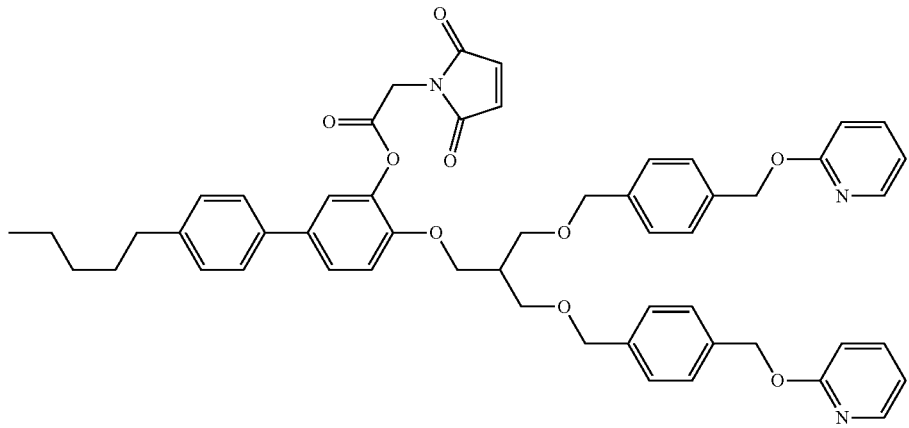
(P-1-26)
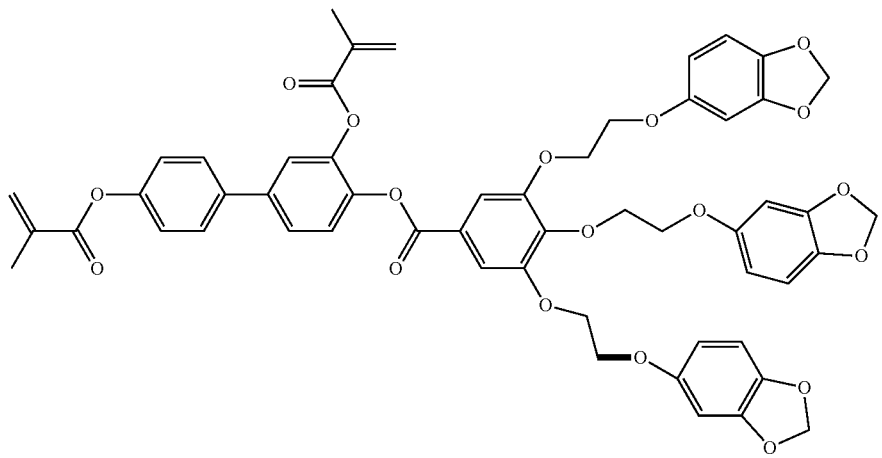
[Chem. 91]
(P-J-10)
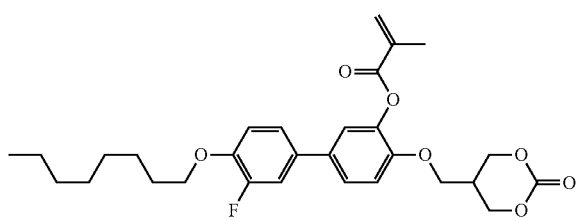
(P-J-11)
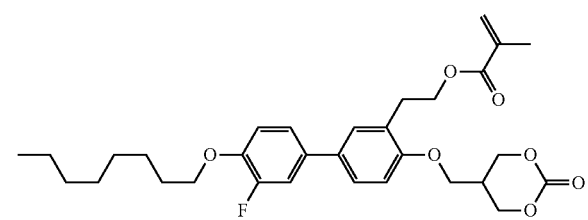
(P-J-12)
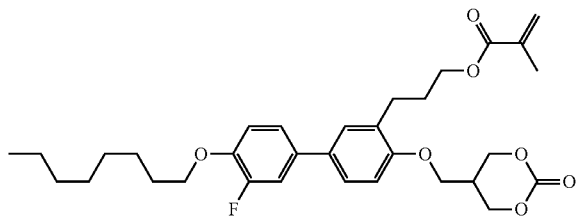
(P-J-13)
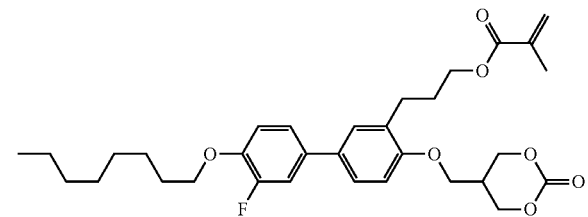

-continued
(P-J-14)
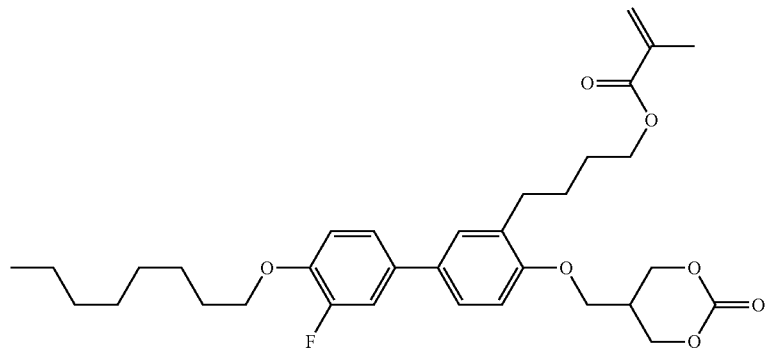
[Chem. 92]
(P-J-15)
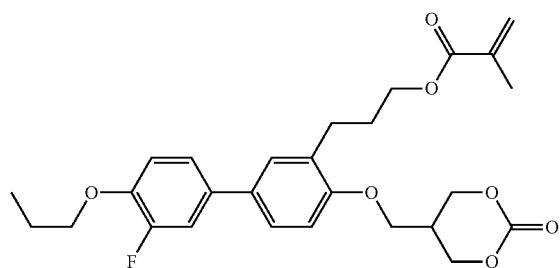
(P-J-16)
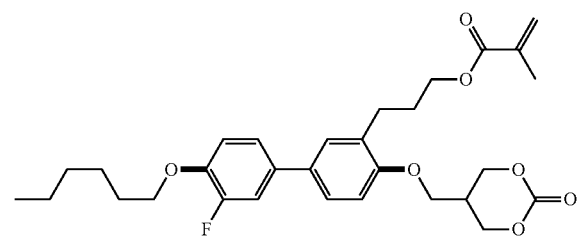
(P-J-17)
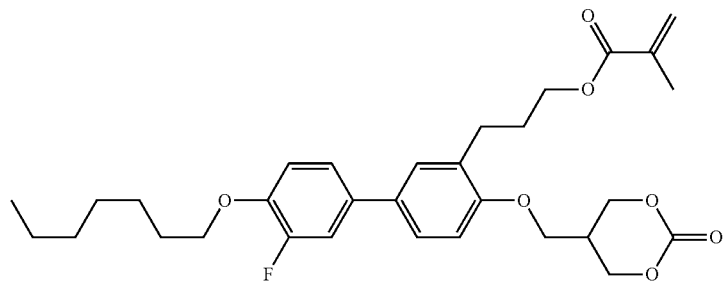
(P-J-18)
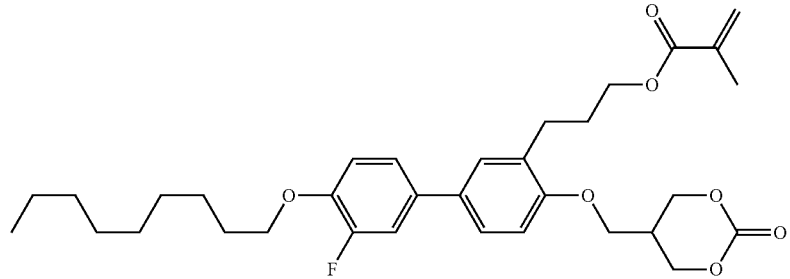
(P-J-19)
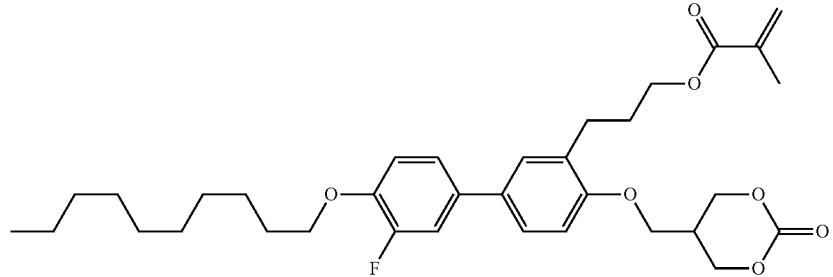

-continued
(P-J-20)
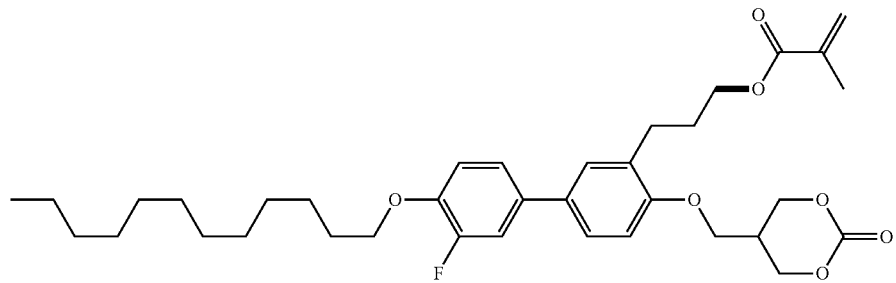
[Chem. 93]
(P-J-21) (P-J-22)
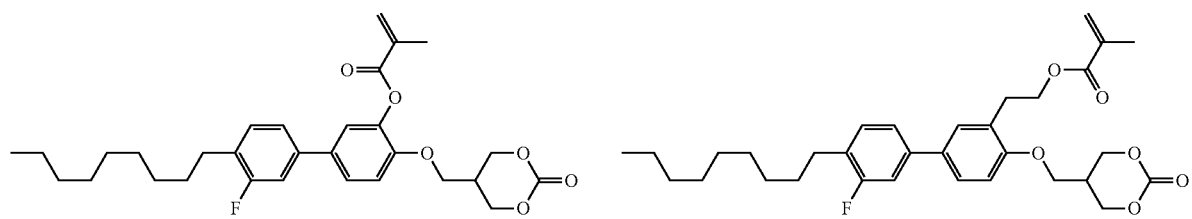
(P-J-23) (P-J-24)
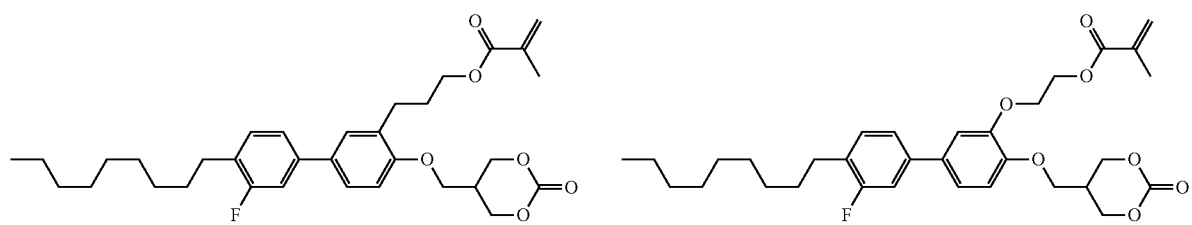
[Chem. 94]
(P-J-25) (P-J-26)
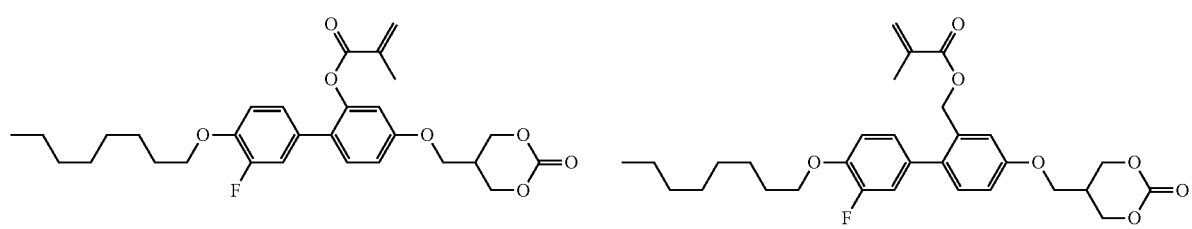
(P-J-27) (P-J-28)
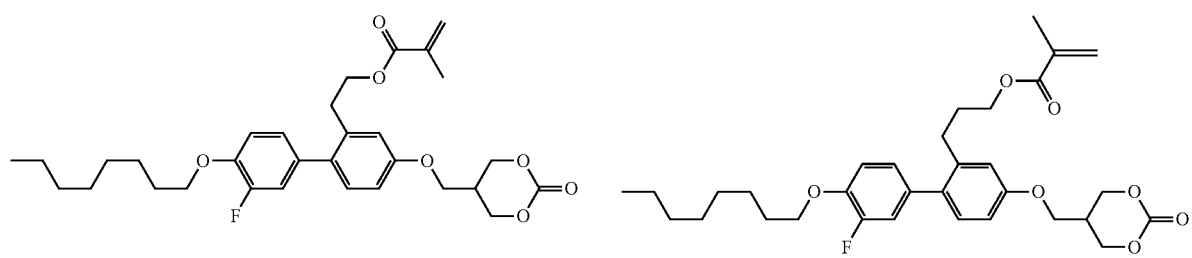

(P-J-29)
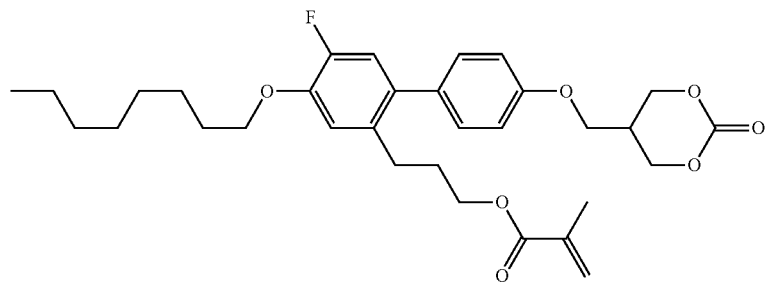
[Chem. 95]
(P-J-30)　　　　　　　　　　　　　　　　　　(P-J-31)
(P-J-32)　　　　　　　　　　　　　　　　　　(P-J-33)
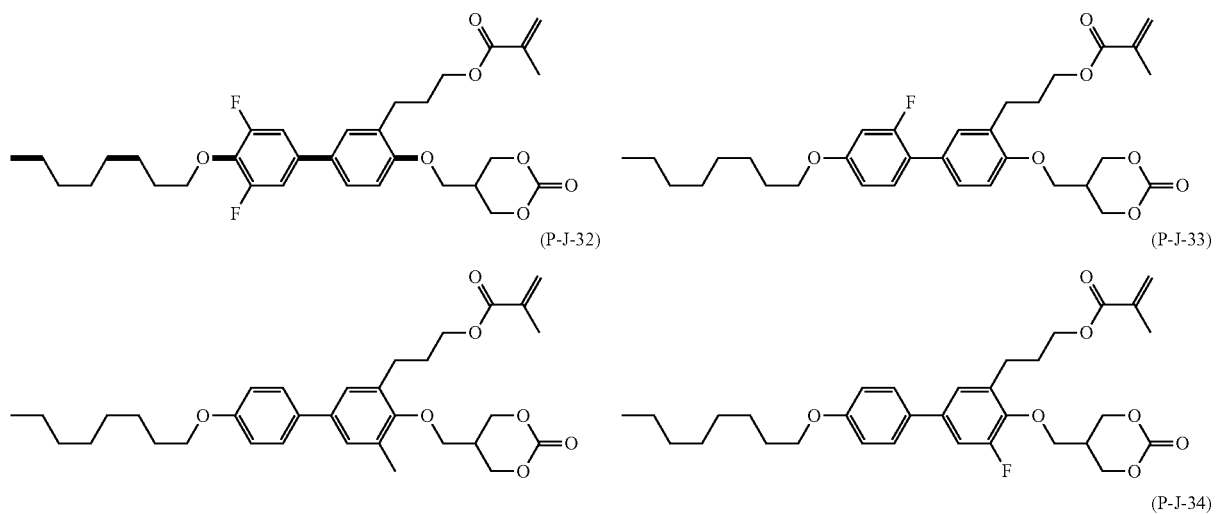
(P-J-34)
[Chem. 96]
(P-J-35)　　　　　　　　　　　　　　　　　　(P-J-36)
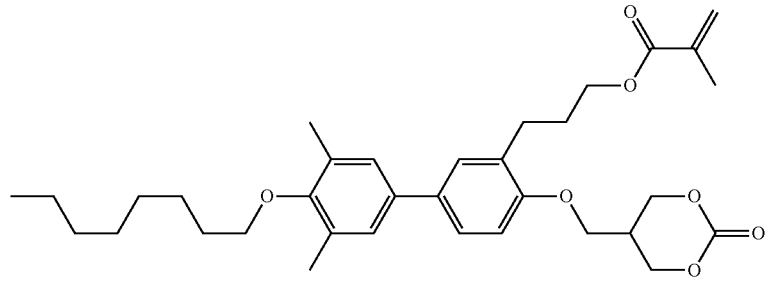
(P-J-37)　　　　　　　　　　　　　　　　　　(P-J-38)
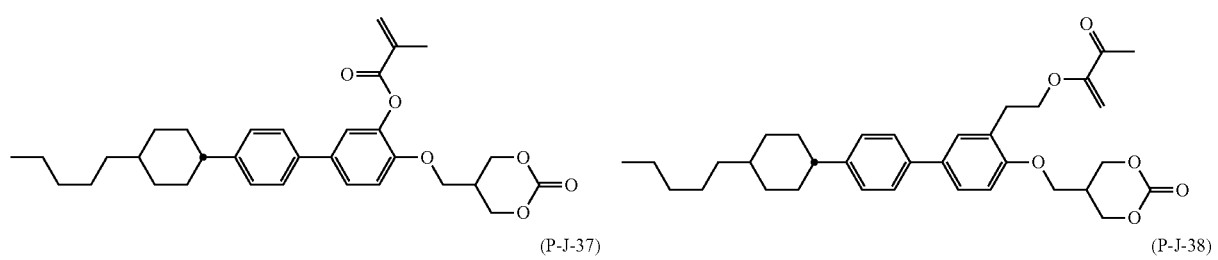
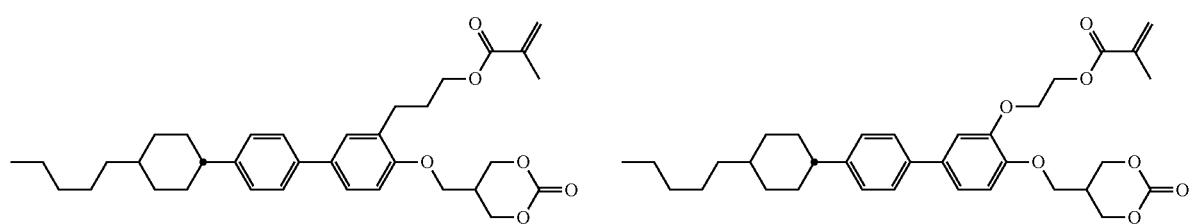

[Chem. 97]
(P-J-39)
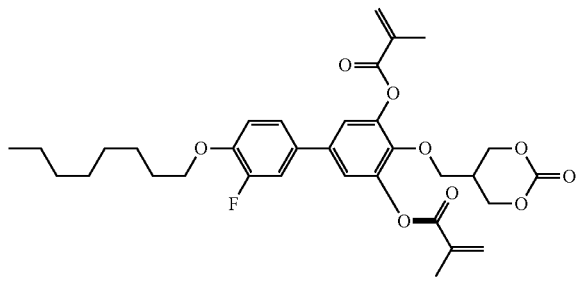
(P-J-40)
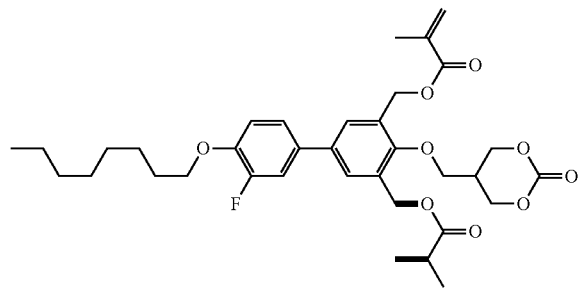
(P-J-41)
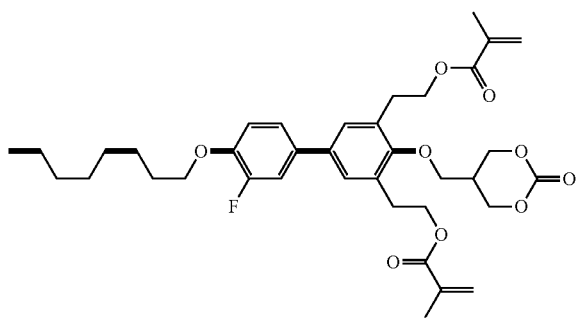
(P-J-42)
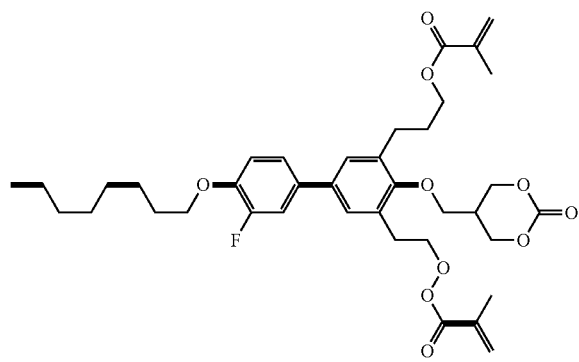
[Chem. 98]
(P-J-43)
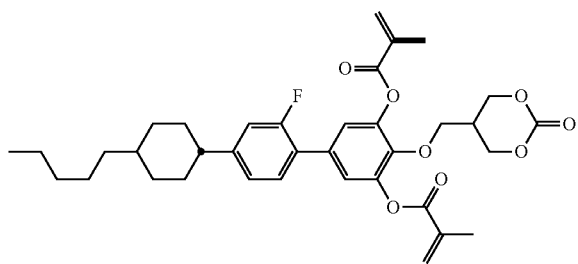
(P-J-44)
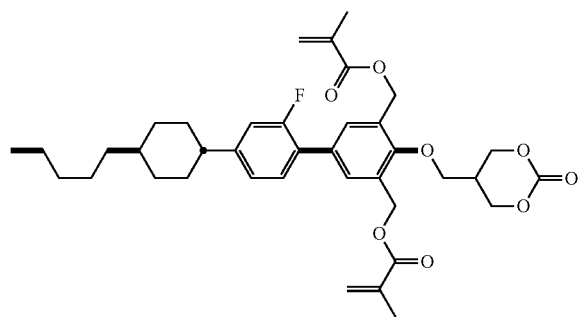
(P-J-45)
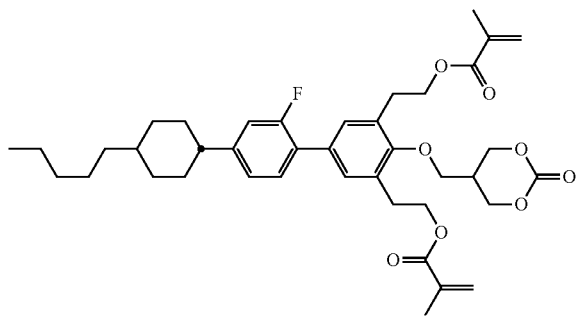
(P-J-46)
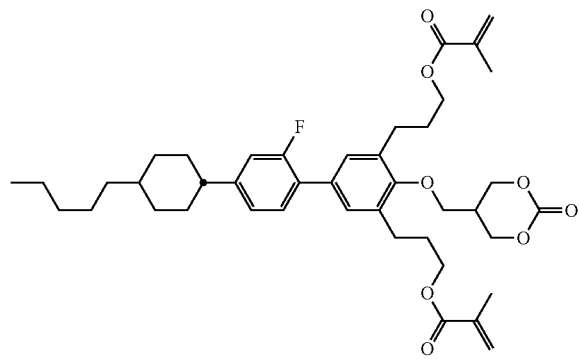

[Chem. 99]
(P-J-47)
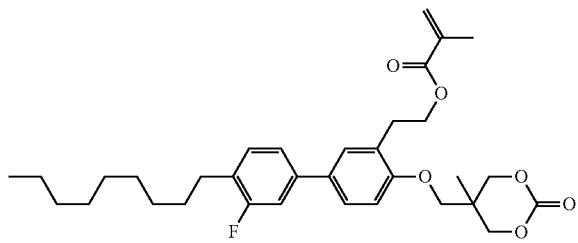
(P-J-48)
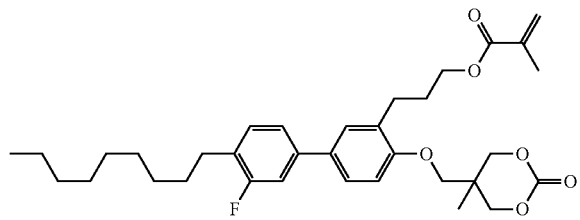
(P-J-49)
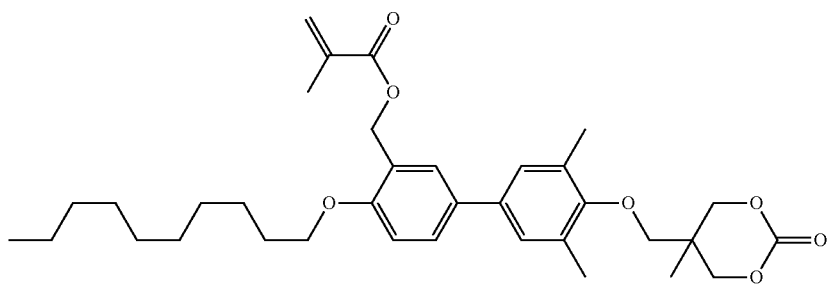
(P-J-50)
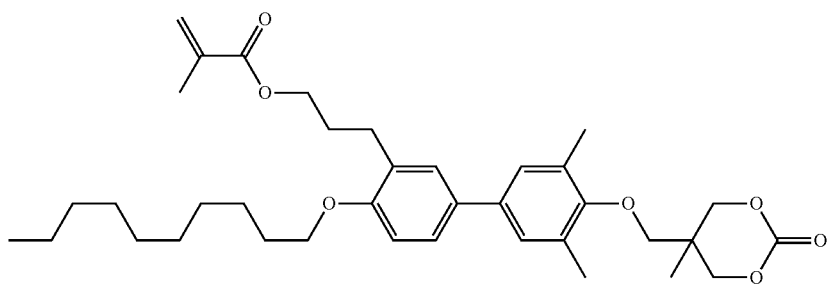
[Chem. 100]
(P-J-51)
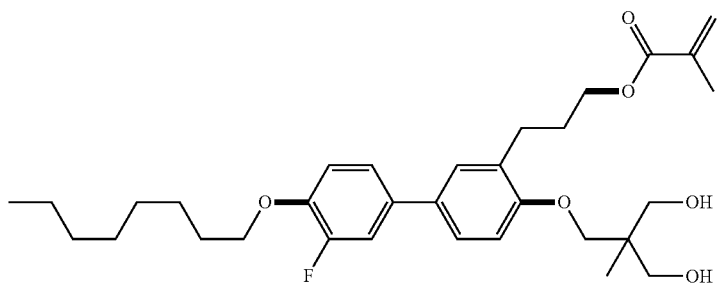
(P-J-52)
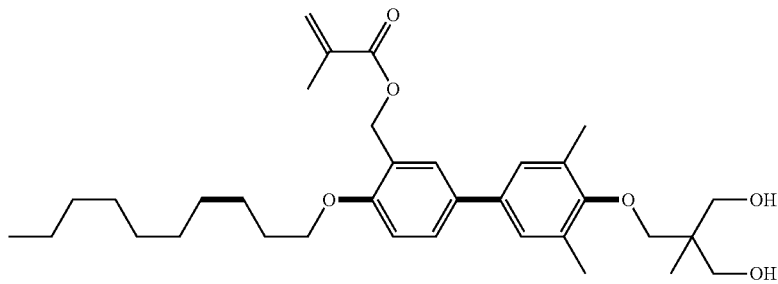

(P-J-53)
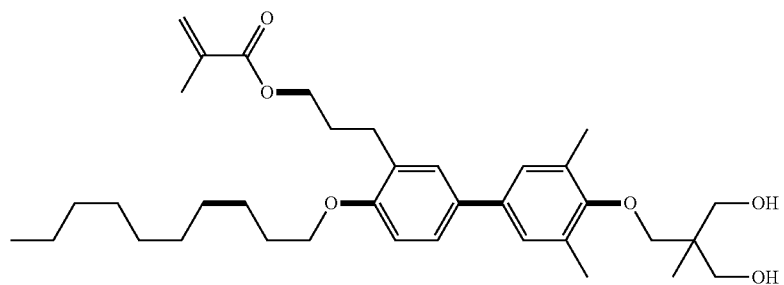
(P-J-54)
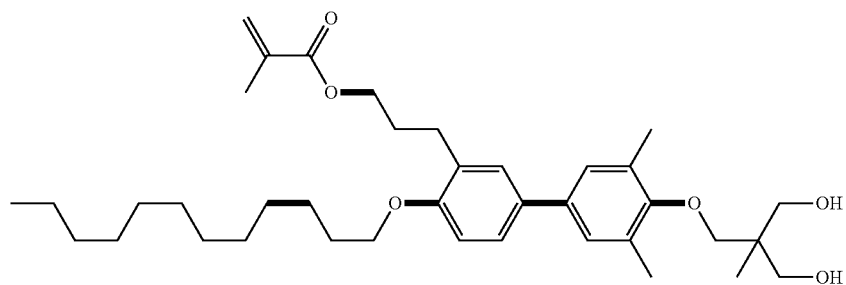
(P-J-55)
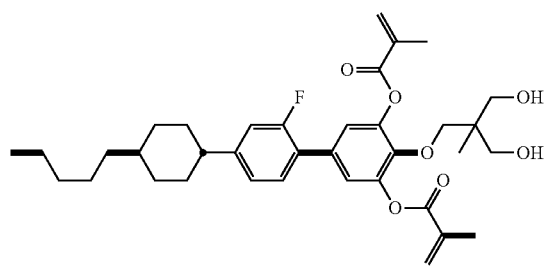
(P-J-56)
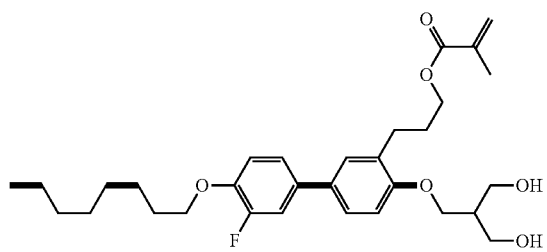
(P-J-57)
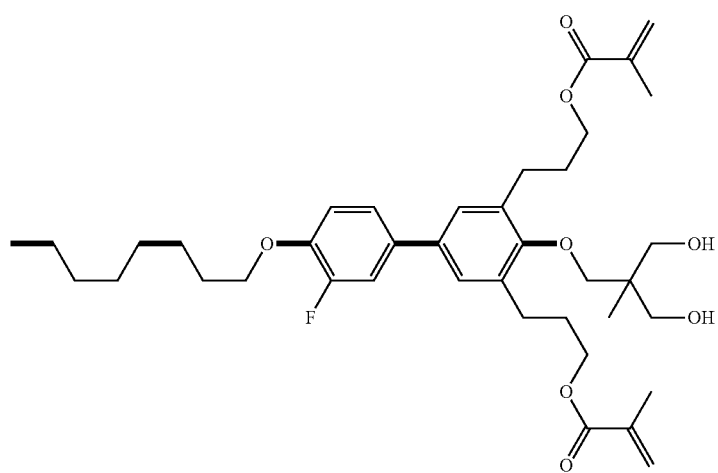

-continued
[Chem. 101]
(P-2)
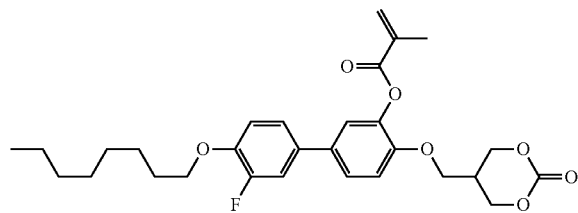
(P-3)
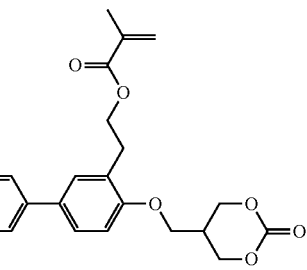
(P-4)
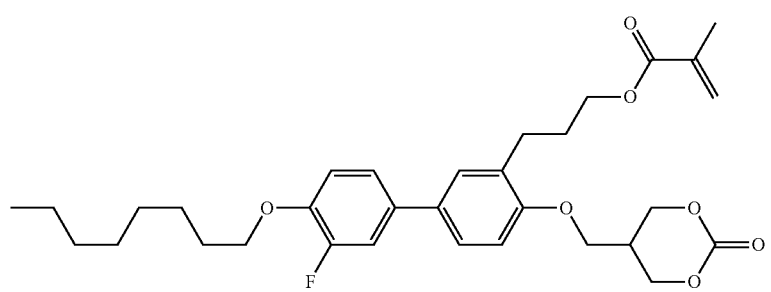
(P-5)
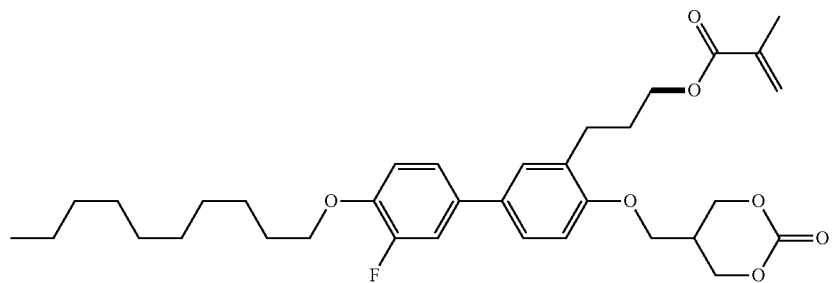
(P-6)
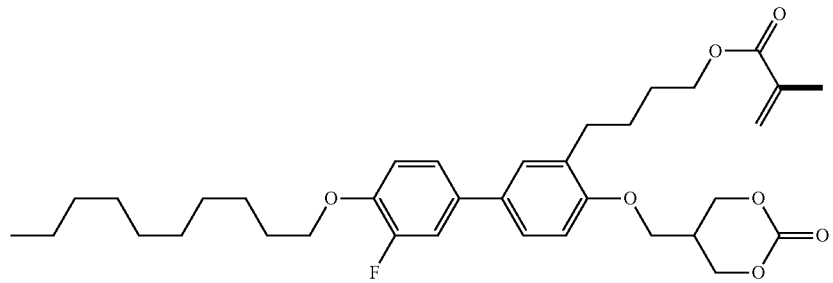
[Chem. 102]
(P-7)
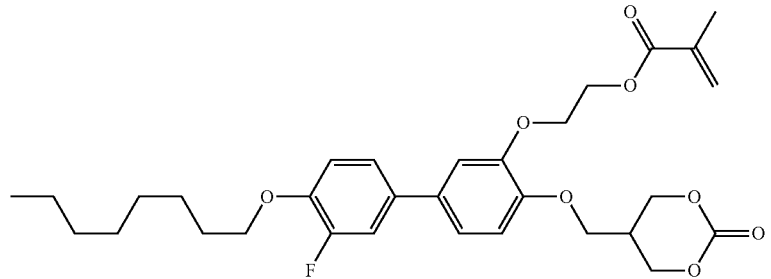

-continued
(P-8)
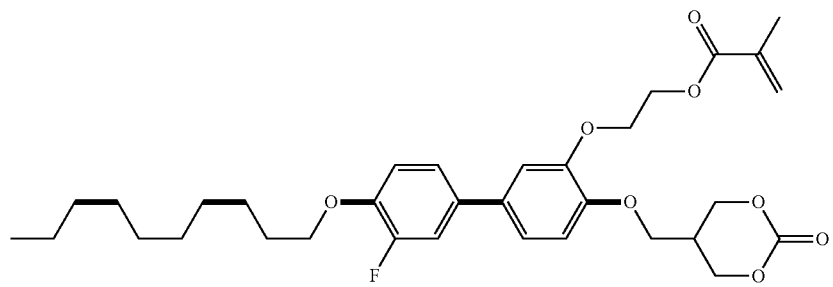
(P-9)
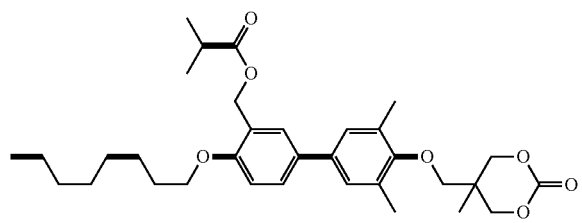
(P-10)
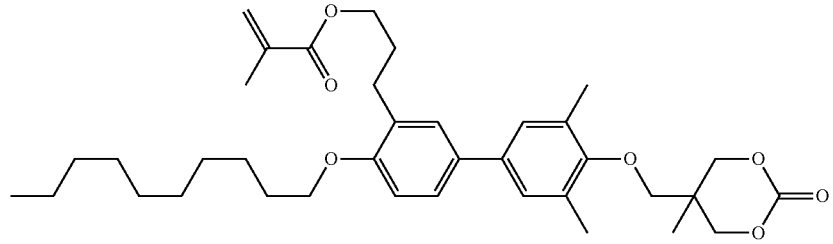
(P-11)
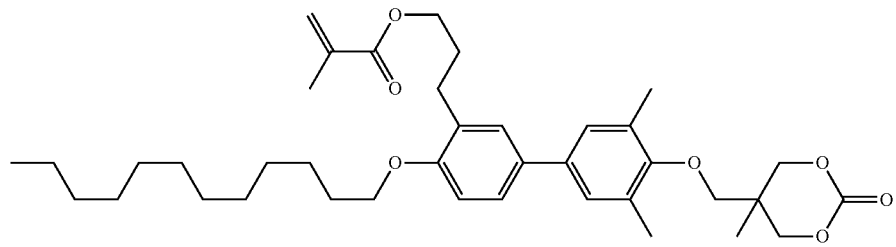
[Chem. 103]
(P-13)
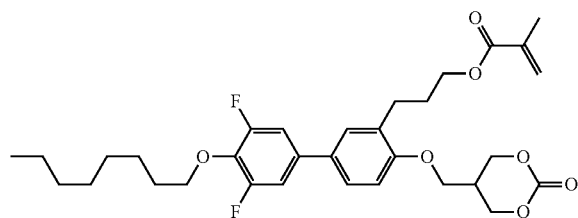
(P-14)
(P-12)
(P-15)
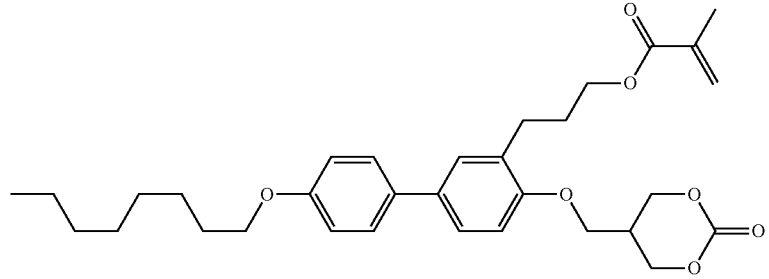

-continued
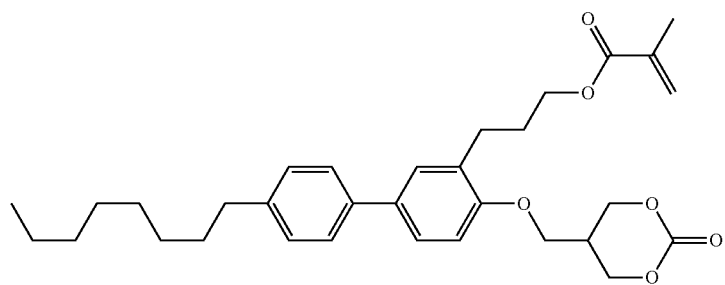
(P-16)
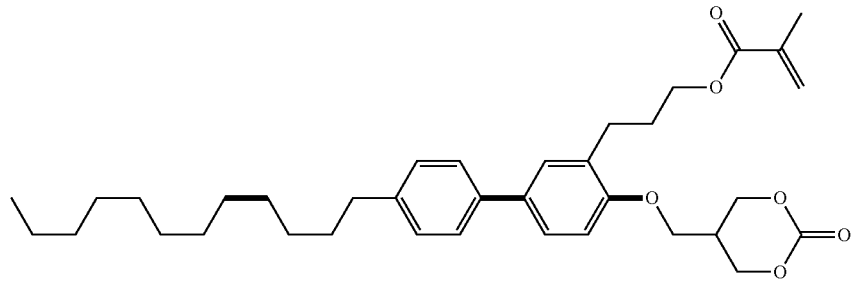
(P-17)
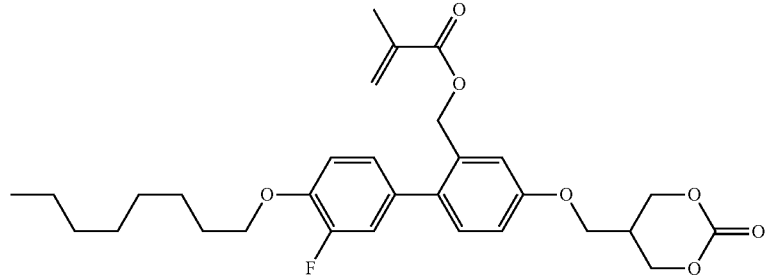
(P-18)
[Chem. 104]
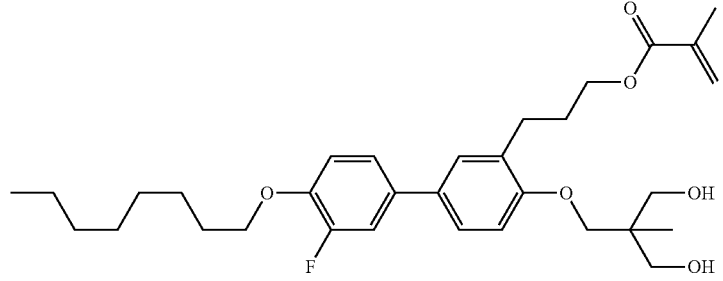
(P-19)
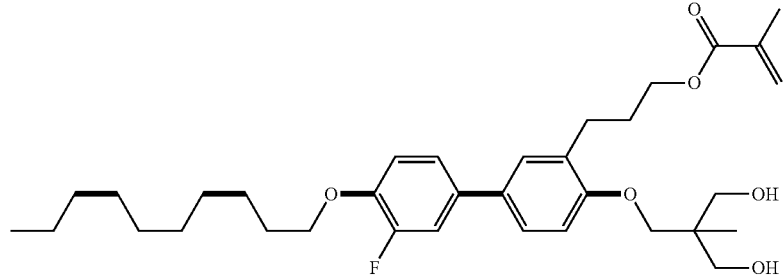
(P-20)

-continued
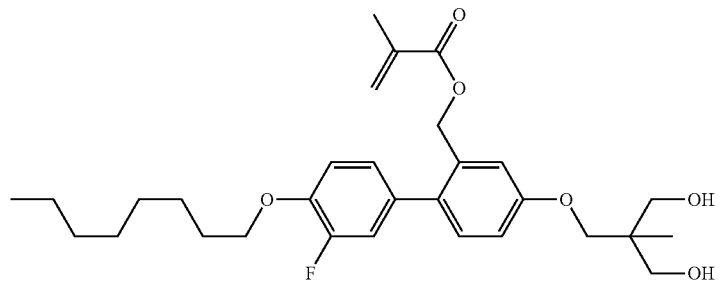
(P-21)
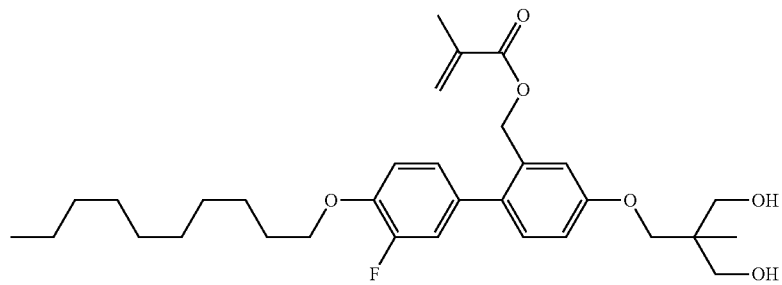
(P-22)
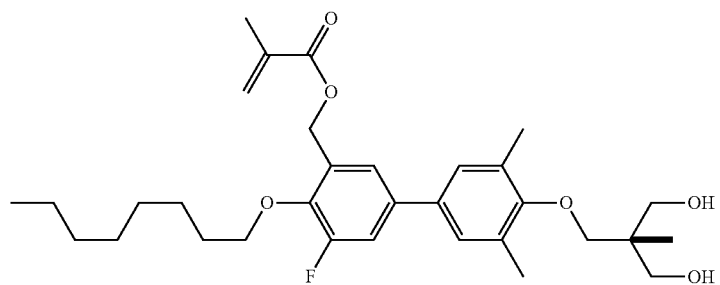
(P-23)
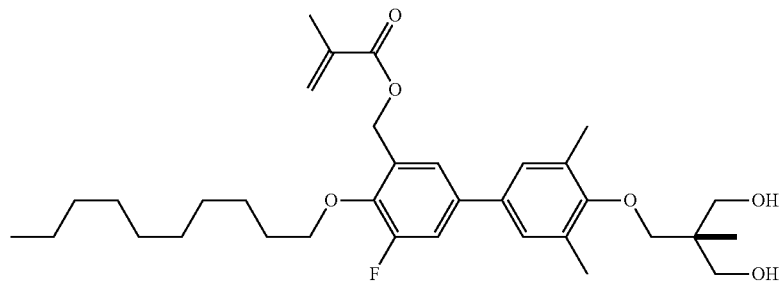
(P-24)
[Chem. 105]
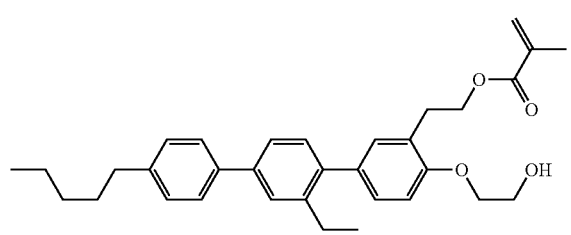
(P-25)
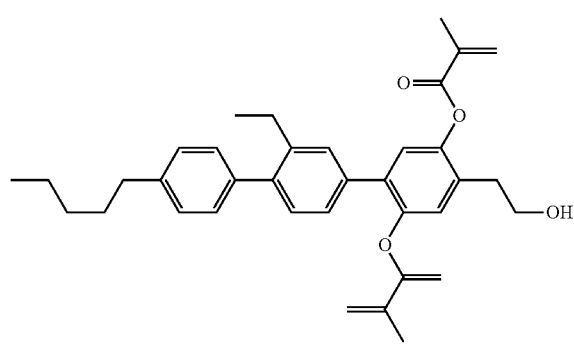
(P-26)

-continued
(P-27)
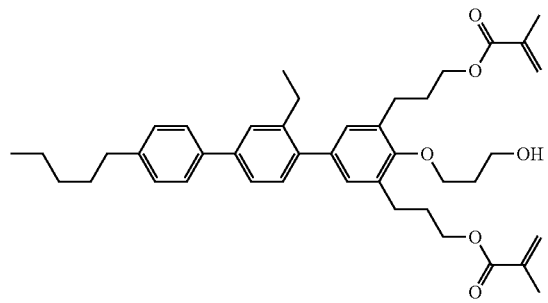
(P-28)
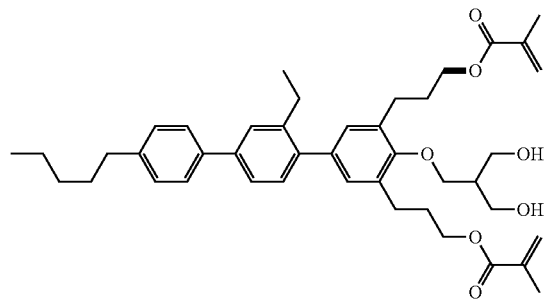
(P-29)
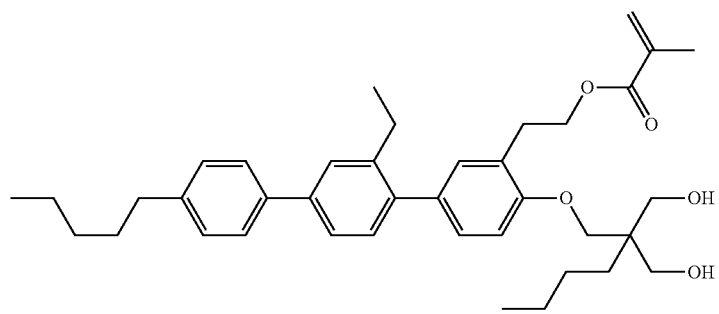
[Chem. 106]
(P-30)
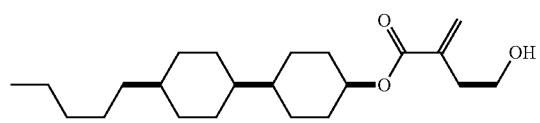
(P-31)
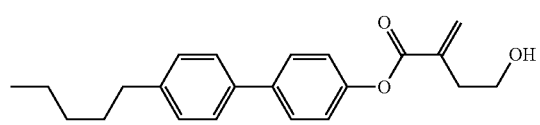
(P-32)
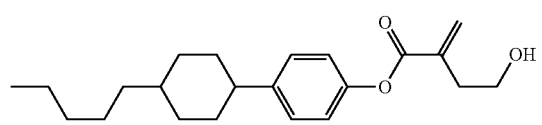
(P-33)
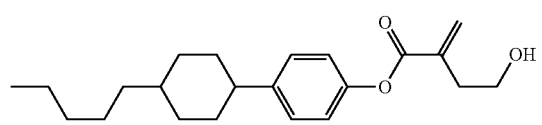
(P-34)
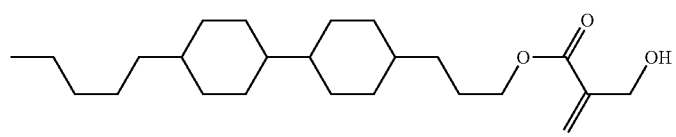
(P-35)
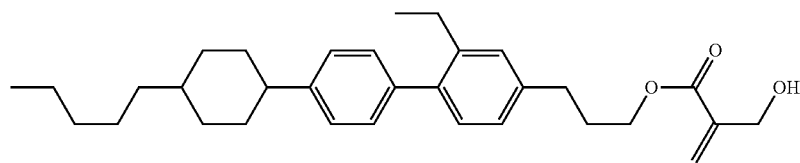

The liquid crystal composition according to the present invention preferably contains one or two or more kinds of compounds selected from the compounds represented by General Formulae (N-1), (N-2), and (N-3) other than the compound represented by General Formula (I) and spontaneously aligning monomer. These compounds correspond to dielectrically negative compounds (a sign of Δε is negative and the absolute value thereof is greater than 2).

In addition, Δε of the compound is a value extrapolated from a measured value of dielectric anisotropy of a composition prepared by adding to a dielectrically neutral composition at 25° C. In addition, although content is described by % below, this means % by mass.

[Chem. 107]

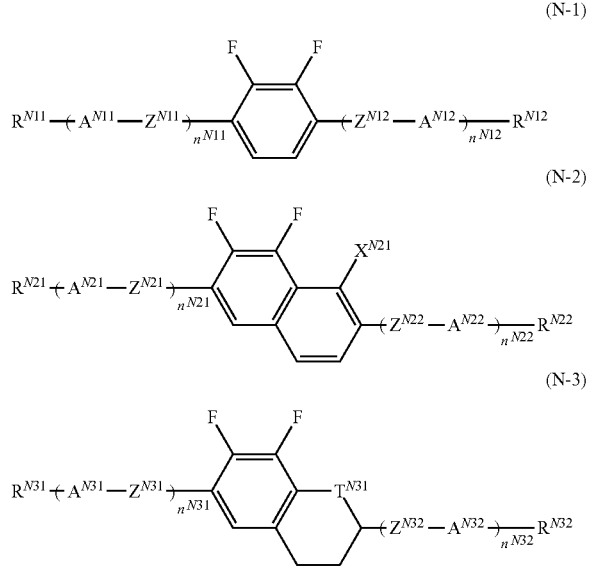

In the formula, $R^{N11}$, $R^{N12}$, $R^{N21}$, $R^{N22}$, $R^{N31}$, and $R^{N32}$ each independently represent an alkyl group having 1 to 8 carbon atoms, wherein one —CH$_2$— or two or more non-adjacent —CH$_2$—'s in the alkyl group may be each independently substituted with —CH=CH—, —C≡C—, —O—, —CO—, —COO—, or —OCO—, $A^{N11}$, $A^{N12}$, $A^{N21}$, $A^{N22}$, $A^{N31}$, and $A^{N32}$ each independently represent a group selected from the group consisting of (a) 1,4-cyclohexylene group (one —CH$_2$— or two or more non-adjacent —CH$_2$—'s present in this group may be substituted with —O—), (b) 1,4-phenylene group (one —CH= or two or more non-adjacent —CH='s present in this group may be substituted with —N=), (c) naphthalene-2,6-diyl group, 1,2,3,4-tetrahydronaphthalene-2,6-diyl group, or decahydronaphthalene-2,6-diyl group (one —CH= or two or more non-adjacent —CH='s present in the naphthalene-2,6-diyl group or the 1,2,3,4-tetrahydronaphthalene-2,6-diyl group may be substituted with —N=), and (d) 1,4-cyclohexenylene group, the group (a), the group (b), the group (c), and the group (d) may be each independently substituted with a cyano group, a fluorine atom, or a chlorine atom, $Z^{N11}$, $Z^{N12}$, $Z^{N21}$, $Z^{N22}$, $Z^{N31}$, and $Z^{N32}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—, $X^{N21}$ represents a hydrogen atom or a fluorine atom, $T^{N31}$ represents a —CH$_2$— or an oxygen atom, $n^{N11}$, $n^{N12}$, $n^{N21}$, $n^{N22}$, $n^{N31}$, and $n^{N32}$ each independently represent an integer of 0 to 3, wherein $n^{N11}$+$n^{N12}$, $n^{N21}$+nN22, and $n^{N31}$+$n^{N32}$ each independently represent 1, 2, or 3, and in a case where there are a plurality of $A^{N11}$'s to $A^{N32}$'s and $Z^{N11}$'s to $Z^{N32}$'s, those may be the same as or different from each other.

The compounds represented by General Formulae (N-1), (N-2), and (N-3) preferably compounds having a negative Ac and an absolute value larger than 3.

In General Formulae (N-1), (N-2), and (N-3), it is preferable that $R^{N11}$, $R^{N12}$, $R^{N21}$, $R^{N22}$, $R^{N31}$, and $R^{N32}$ are each independently an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, an alkyl group having 1 to 5 carbon atoms, an alkoxy group having 1 to 5 carbon atoms, an alkenyl group having 2 to 5 carbon atoms, or an alkenyloxy group having 2 to 5 carbon atoms. It is more preferable that $R^{N11}$, $R^{N21}$ and $R^{N31}$ are each independently represent an alkyl group having 1 to 5 carbon atoms or an alkenyl group having 2 to 5 carbon atoms, and it is still more preferable that $R^{N12}$, $R^{N22}$ and $R^{N32}$ are each independently an alkyl group having 1 to 5 carbon atoms, an alkoxy group having 1 to 5 carbon atoms, or an alkenyloxy group having 2 to 5 carbon atoms.

In addition, in a case where the ring structure to which the end groups ($R^{N11}$, $R^{N12}$, $R^{N21}$, $R^{N22}$, $R^{N31}$, and $R^{N32}$) are bonded is a phenyl group (aromatic), a linear alkyl group having 1 to 5 carbon atoms, a linear alkoxy group having 1 to 4 carbon atoms, and an alkenyl group 4 to 5 carbon atoms are preferable, and in a case where the ring structure to which the end group is bonded is a saturated ring structure such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms. In order to stabilize a nematic phase, the total of carbon atoms and oxygen atoms, if present, is preferably 5 or less, and is preferably linear.

The alkenyl group is preferably selected from groups represented by any one of Formula (R1) to Formula (R5). (the black spot in each formula represent carbon atoms in the ring structure)

[Chem. 108]

 (R1)

 (R2)

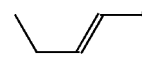 (R3)

 (R4)

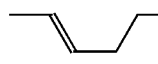 (R5)

$A^{N11}$, $A^{N12}$, $A^{N21}$, $A^{N22}$, $A^{N31}$, and $A^{N32}$ are each independently preferably aromatic in a case where it is required to increase Δn, preferably aliphatic in order to improve a response speed, preferably represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo [2.2.2] octylene group, a piperidine-1,4-diyl group, a naphthalene-2,6-diyl group, a decahydronaphthalene-2,6-diyl group, or a 1,2,3,4-tetrahydronaphthalene-2,6-diyl group, and more preferably represents the following structures.

[Chem. 109]

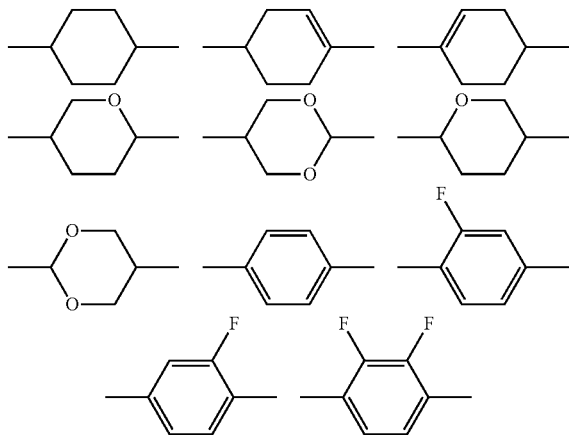

More preferably, it represents a trans-1,4-cyclohexylene group, a 1,4-cyclohexenylene group, or a 1,4-phenylene group.

$Z^{N11}$, $Z^{N12}$, $Z^{N21}$, $Z^{N22}$, $Z^{N31}$, and $Z^{N32}$ each independently preferably represent —CH$_2$O—, —CF$_2$O—, —CH$_2$CH$_2$—, —CF$_2$CF$_2$—, or a single bond, more preferably represent —CH$_2$O—, —CH$_2$CH$_2$—, or a single bond, and particularly preferably —CH$_2$O— or a single bond.

$X^{N21}$ is preferably a fluorine atom.

$T^{N31}$ is preferably an oxygen atom.

$n^{N11}+n^{N12}$, $n^{N21}+n^{N22}$, and $n^{N31}+n^{N32}$ are preferably 1 or 2, and are preferably a combination in which $n^{N11}$ is 1 and $n^{N12}$ is 0, a combination in which $n^{N11}$ is 2 and $n^{N12}$ is 0, a combination in which $n^{N11}$ is 1 and $n^{N12}$ is 1, a combination in which $n^{N11}$ is 2 and $n^{N12}$ is 1, a combination in which $n^{N21}$ is 1 and $n^{N22}$ is 0, a combination in which $n^{N21}$ is 2 and $n^{N22}$ is 0, a combination in which $n^{N31}$ is 1 $n^{N32}$ is 0, and a combination in which $n^{N31}$ is 2 and $n^{N32}$ is 0.

The lower limit value of the preferable content of the compound represented by Formula (N-1) with respect to the total amount of the composition of the present invention is 1%, 10%, 20%, 30%, 40%, 50%, 55%, 60%, 65%, 70%, 75%, and 80%. The upper limit value of the preferable content is 95%, 85%, 75%, 65%, 55%, 45%, 35%, 25%, and 20%.

The lower limit value of the preferable content of the compound represented by Formula (N-2) with respect to the total amount of the composition of the present invention is 1%, 10%, 20%, 30%, 40%, 50%, 55%, 60%, 65%, 70%, 75%, and 80%. The upper limit value of the preferable content is 95%, 85%, 75%, 65%, 55%, 45%, 35%, 25%, and 20%.

The lower limit value of the preferable content of the compound represented by Formula (N-3) with respect to the total amount of the composition of the present invention is 1%, 10%, 20%, 30%, 40%, 50%, 55%, 60%, 65%, 70%, 75%, and 80%. The upper limit value of the preferable content is 95%, 85%, 75%, 65%, 55%, 45%, 35%, 25%, and 20%.

In a case where the composition of the present invention keeps the viscosity low and a composition having a high response speed is required, the lower limit value is preferably low and the upper limit value is preferably low. Furthermore, in a case where the composition of the present invention keeps Tni high and a composition having excellent temperature stability is required, the lower limit value is preferably low and the upper limit value is preferably low. When it is desired to increase the dielectric anisotropy in order to keep the driving voltage low, it is preferable that the lower limit value is high and the upper limit value is high.

As the compound represented by General Formula (N-1), the compound groups represented by General Formulae (N-1a) to (N-1g).

[Chem. 110]

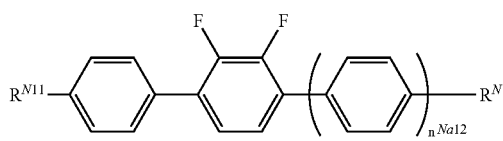

(N-1a)

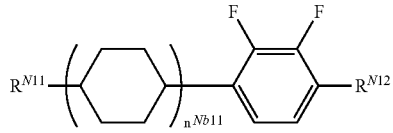

(N-1b)

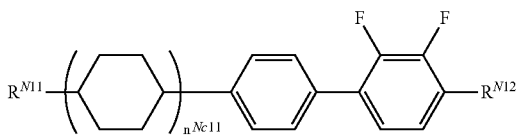

(N-1c)

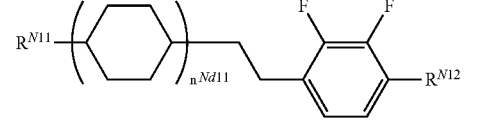

(N-1d)

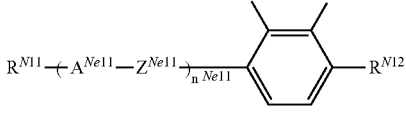

(N-1e)

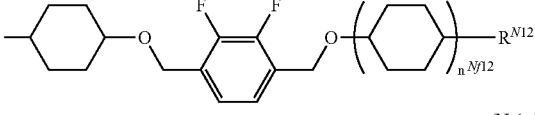

(N-1f)

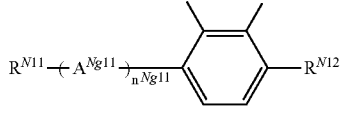

(N-1g)

In the formula, $R^{N11}$ and $R^{N12}$ represent the same meanings as those of $R^{N11}$ and $R^{N12}$ in General Formula (N-1), $n^{Na12}$ represents 0 or 1, $n^{Nb11}$ represents 0 or 1, $n^{Nc11}$ represents 0 or 1, $n^{Nd21}$ represents 0 or 1, $n^{Ne11}$ represents 1 or 2, $n^{Nf12}$ represents 1 or 2, $n^{Ng11}$ represents 1 or 2, $A^{Ne11}$ represents a trans-1,4-cyclohexylene group or a 1,4-phenylene group, and $A^{Ng11}$ represents a trans-1,4-cyclohexylene group, a 1,4-cyclohexenylene group, or a 1,4-phenylene group, wherein in a case where $n^{Ng11}$ is 1, $A^{Ng11}$ represents a 1,4-cyclohexenylene group, in a case where $n^{Ng11}$ is 2, at least one $A^{Ng11}$ represents a 1,4-cyclohexenylene group, $Z^{Ne11}$ represents a single bond or an ethylene group, and in a case where $n^{Ne11}$ is 1, $Z^{Ne11}$ represents an ethylene group. In a case where $n^{Ne11}$ is 2, at least one $Z^{ne11}$ represents an ethylene group.

More specifically, the compound represented by General Formula (N-1) is preferably a compound selected from the compound groups represented by General Formulae (N-1-1) to (N-1-22).

The compound represented by General Formula (N-1-1) is the following compound.

[Chem. 111]

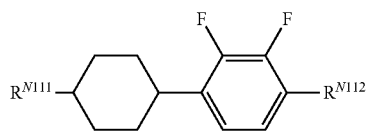

(N-1-1)

In the formula, $R^{N111}$ and $R^{N112}$ each independently represent the same meanings as those of $R^{11}$ and $R^{112}$ in General Formula (N-1).

$R^{N111}$ is preferably an alkyl group having 1 to 5 carbon atoms, an alkenyl group having 2 to 5 carbon atoms, and is preferably a propyl group, a pentyl group, or a vinyl group. $R^{N112}$ is preferably an alkyl group having 1 to 5 carbon atoms, an alkenyl group having 4 to 5 carbon atoms, or an alkoxy group having 1 to 4 carbon atoms, and is preferably an ethoxy group or a butoxy group.

The compound represented by General Formula (N-1-1) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be large, and in a case where TNI is regarded as important, it is more effective to set the content to be small. Furthermore, in a case of improving dripping marks and image sticking characteristics, it is preferable to set the content to be moderate.

The lower limit value of the preferable content of the compound represented by Formula (N-1-1) with respect to the total amount of the composition of the present invention is 5%, 10%, 13%, 15%, 17%, 20%, 23%, 25%, 27%, 30%, 33%, and 35%. The upper limit value of the preferable content with respect to the total amount of the composition of the present invention is 50%, 40%, 38%, 35%, 33%, 30%, 28%, 25%, 23%, 20%, 18%, 15%, 13%, 10%, 8%, 7%, 6%, 5%, and 3%.

Further, the compound represented by General Formula (N-1-1) is preferably a compound selected from the compound groups represented by Formula (N-1-1.1) to Formula (N-1-1.22), is preferably a compound represented by Formulae (N-1-1.1) to (N-1-1.4), and is preferably a compound represented by Formula (N-1-1.1), and Formula (N-1-1.3).

[Chem. 112]

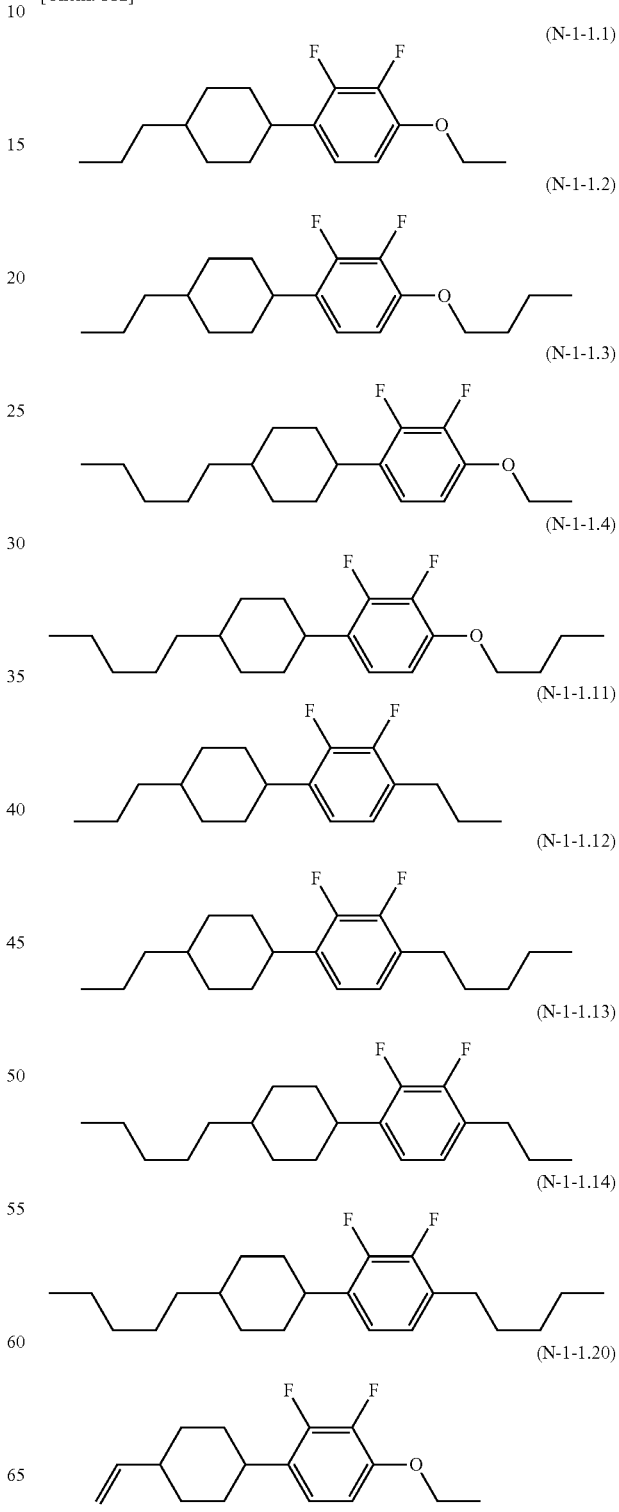

(N-1-1.21)

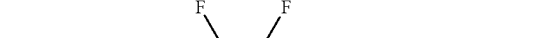
(N-1-1.22)

The compounds represented by Formulae (N-1-1.1) to (N-1-1.22) can be used alone or in combination, and the lower limit value of the preferable content of the single compound or these compounds with respect to the total amount of the composition of the present invention is 5%, 10%, 13%, 15%, 17%, 20%, 23%, 25%, 27%, 30%, 33%, and 35%. The upper limit value of the preferable content with respect to the total amount of the composition of the present invention is 50%, 40%, 38%, 35%, 33%, 30%, 28%, 25%, 23%, 20%, 18%, 15%, 13%, 10%, 8%, 7%, 6%, 5%, and 3%.

The compound represented by General Formula (N-1-2) is the following compound.

[Chem. 113]

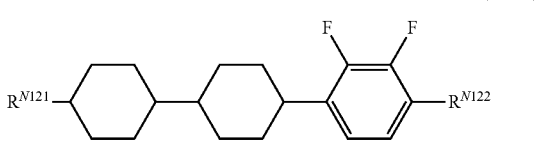
(N-1-2)

In the formula, $R^{N121}$ and $R^{N122}$ each independently represent the same meanings as those of $R^{N11}$ and $R^{12}$ in General Formula (N-1).

$R^{N121}$ is preferably an alkyl group having 1 to 5 carbon atoms or an alkenyl group having 2 to 5 carbon atoms, and is preferably an ethyl group, a propyl group, a butyl group, and a pentyl group. $R^{N122}$ is preferably an alkyl group having 1 to 5 carbon atoms, an alkenyl group having 4 to 5 carbon atoms, or an alkoxy group having 1 to 4 carbon atoms, and is preferably a methyl group, a propyl group, a methoxy group, an ethoxy group, or a propoxy group.

The compound represented by General Formula (N-1-2) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be small, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-2) with respect to the total amount of the composition of the present invention is 5%, 7%, 10%, 13%, 15%, 17%, 20%, 23%, 25%, 27%, 30%, 33%, 35%, 37%, 40%, 42%. The upper limit value of the preferable content with respect to the total amount of the composition of the present invention is 50%, 48%, 45%, 43%, 40%, 38%, 35%, 33%, 30%, 28%, 25%, 23%, 20%, 18%, 15%, 13%, 10%, 8%, 7%, 6%, and 5%.

Further, the compound represented by General Formula (N-1-2) is preferably a compound selected from the compound groups represented by Formula (N-1-2.1) to Formula (N-1-2.22), is preferably a compound represented by Formula (N-1-2.3) to Formula (N-1-2.7), Formula (N-1-2.10), Formula (N-1-2.11), Formula (N-1-2.13), and Formula (N-1-2.20), is preferably a compound represented by Formula (N-1-2.3) to Formula (N-1-2.7) in a case where the improvement of Δε is regarded as important, is preferably a compound represented by Formula (N-1-2.10), Formula (N-1-2.11), and Formula (N-1-2.13) in a case where the improvement of TNI is regarded as important, and is preferably a compound represented by Formula (N-1-2.20) in a case where the improvement of the response speed.

[Chem. 114]

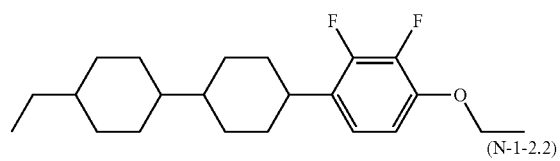
(N-1-2.1)

(N-1-2.2)

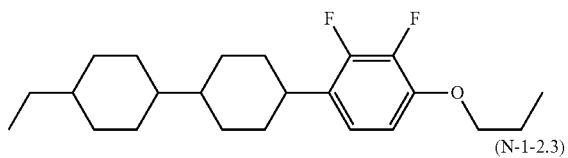
(N-1-2.3)

(N-1-2.4)

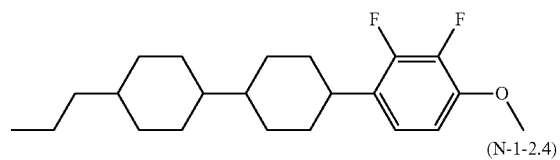
(N-1-2.5)

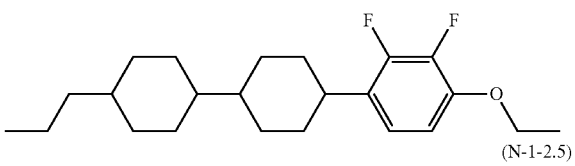
(N-1-2.6)

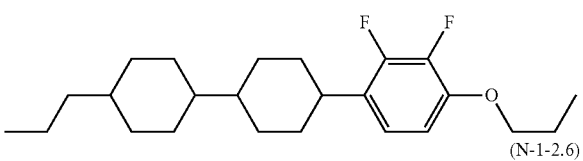

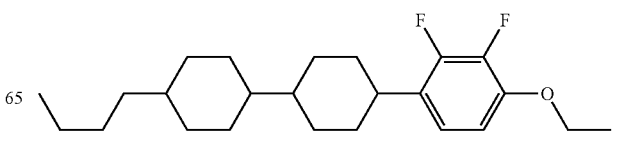

-continued (N-1-2.7)
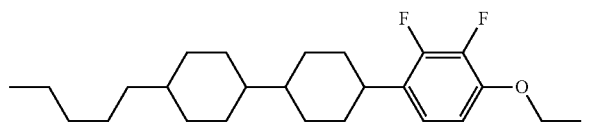

(N-1-2.10)
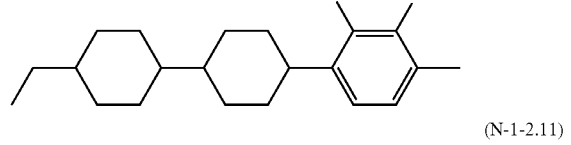

(N-1-2.11)

(N-1-2.12)
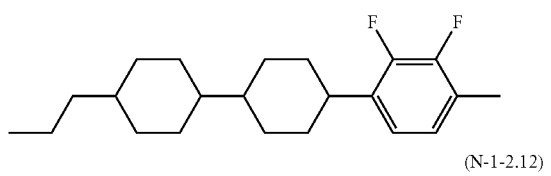

(N-1-2.13)

(N-1-2.20)
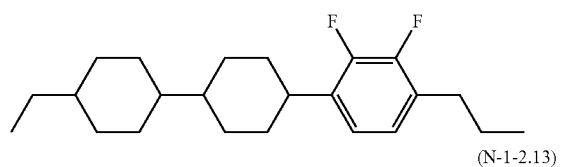

(N-1-2.21)
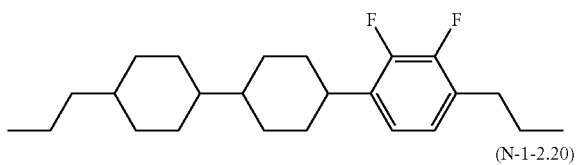

(N-1-2.22)
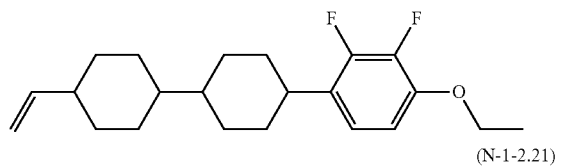

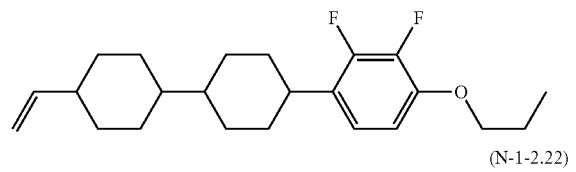

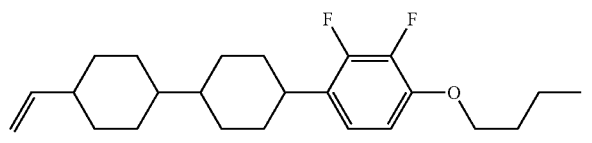

The compounds represented by Formulae (N-1-2.1) to (N-1-2.22) can be used alone or in combination, and the lower limit value of the preferable content of these compounds alone or with respect to the total amount of the composition of the present invention is 5%, 10%, 13%, 15%, 17%, 20%, 23%, 25%, 27%, 30%, 33%, and 35%. The upper limit value of the preferable content with respect to the total amount of the composition of the present invention is 50%, 40%, 38%, 35%, 33%, 30%, 28%, 25%, 23%, 20%, 18%, 15%, 13%, 10%, 8%, 7%, 6%, 5%, and 3%.

The compound represented by General Formula (N-1-3) is the following compound.

[Chem. 115]

(N-1-3)
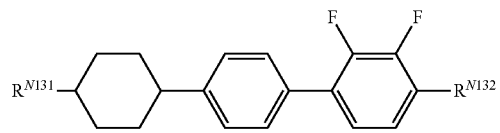

In the formula, $R^{N131}$ and $R^{N132}$ each independently represent the same meanings as those of $R^{N11}$ and $R^{N12}$ in General Formula (N-1).

$R^{N131}$ is preferably an alkyl group having 1 to 5 carbon atoms, an alkenyl group having 2 to 5 carbon atoms, and is preferably an ethyl group, a propyl group, or a butyl group. $R^{N132}$ is preferably an alkyl group having 1 to 5 carbon atoms, an alkenyl group having 3 to 5 carbon atoms, or an alkoxy group having 1 to 4 carbon atoms, and is preferably a 1-propenyl group, an ethoxy group, a propoxy group, or a butoxy group.

The compound represented by General Formula (N-1-3) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Ac is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-3) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

Further, the compound represented by General Formula (N-1-3) is preferably a compound selected from the compound groups represented by Formula (N-1-3.1) to Formula (N-1-3.21), is preferably a compound represented by Formulae (N-1-3.1) to (N-1-3.7), and Formula (N-1-3.21), and is preferably a compound represented by Formula (N-1-3.1), Formula (N-1-3.2), Formula (N-1-3.3), Formula (N-1-3.4), and Formula (N-1-3.6).

[Chem. 116]

(N-1-3.1)
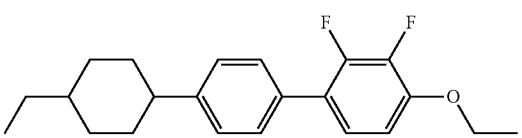

-continued

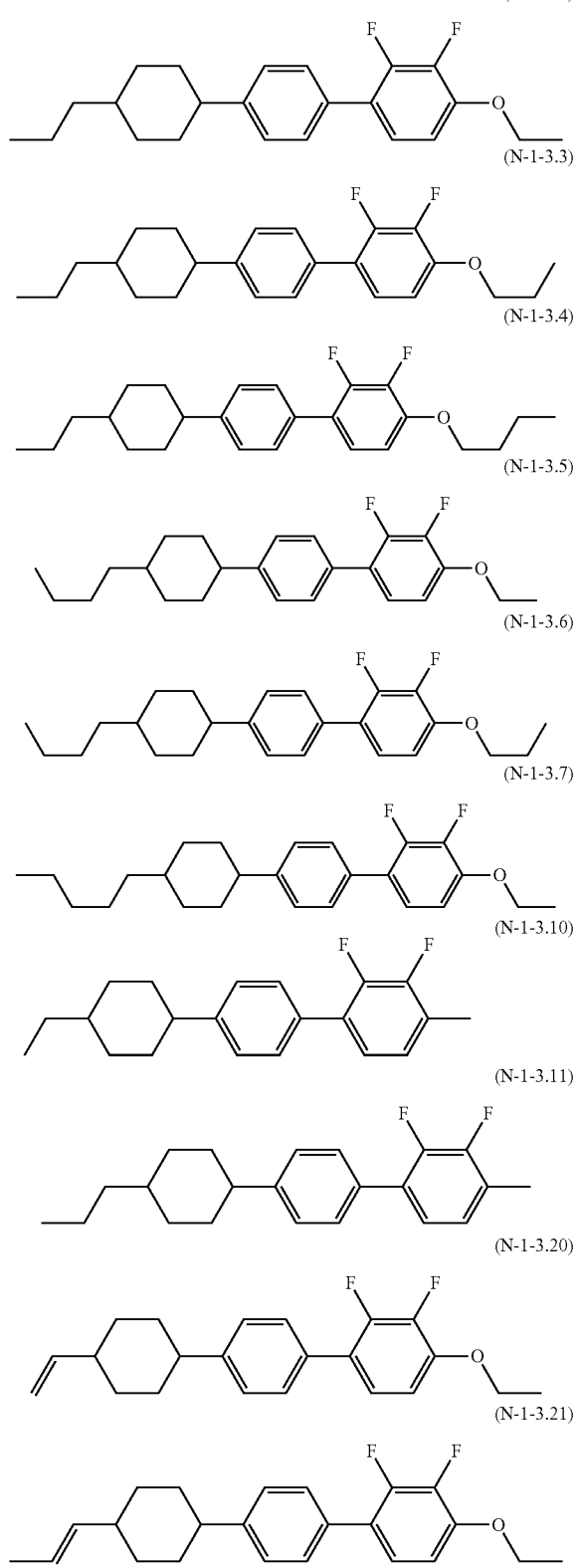

(N-1-3.2)
(N-1-3.3)
(N-1-3.4)
(N-1-3.5)
(N-1-3.6)
(N-1-3.7)
(N-1-3.10)
(N-1-3.11)
(N-1-3.20)
(N-1-3.21)

The compounds represented by Formula (N-1-3.1) to Formula (N-1-3.4), Formula (N-1-3.6), and Formula (N-1-3.21) can be used alone or in combination, and two or three kinds of combinations selected from a combination of Formula (N-1-3.1), and Formula (N-1-3.2) and a combination of Formula (N-1-3.3), Formula (N-1-3.4), and Formula (N-1-3.6) are preferable. The lower limit value of the preferable content of the single compound or these compounds with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-4) is the following compound.

[Chem. 117]

(N-1-4)

In the formula, $R^{N141}$ and $R^{N142}$ each independently represent the same meanings as those of $R^{N11}$, and $R^{N12}$ in General Formula (N-1).

$R^{N141}$ and $R^{N142}$ are each independently an alkyl group having 1 to 5 carbon atoms, an alkenyl group having 4 to 5 carbon atoms, or an alkoxy group having 1 to 4 carbon atoms, and are preferably a methyl group, a propyl group, an ethoxy group, or a butoxy group.

The compound represented by General Formula (N-1-4) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of A is regarded as important, it is preferable to set the content to be high, in a case where the solubility at low temperatures is regarded as important, it is more effective to set the content to be large, and in a case where TNI is regarded as important, it is more effective to set the content to be small. Furthermore, in a case of improving dripping marks and image sticking characteristics, it is preferable to set the content to be moderate.

The lower limit value of the preferable content of the compound represented by Formula (N-1-4) with respect to the total amount of the composition of the present invention is 3%, 5%, 7%, 10%, 13%, 15%, 17%, and 20%. The upper limit of the preferable content with respect to the total amount of the composition of the present invention is 35%, 30%, 28%, 25%, 23%, 20%, 18%, 15%, 13%, 11%, 10%, and 8%.

Further, the compound represented by General Formula (N-1-4) is preferably a compound selected from the compound groups represented by Formula (N-1-4.1) to Formula (N-1-4.14), is preferably a compound represented by Formula (N-1-4.1) to (N-1-4.4), and is preferably a compound represented by Formula (N-1-4.1), Formula (N-1-4.2), and Formula (N-1-4.4).

[Chem. 118]

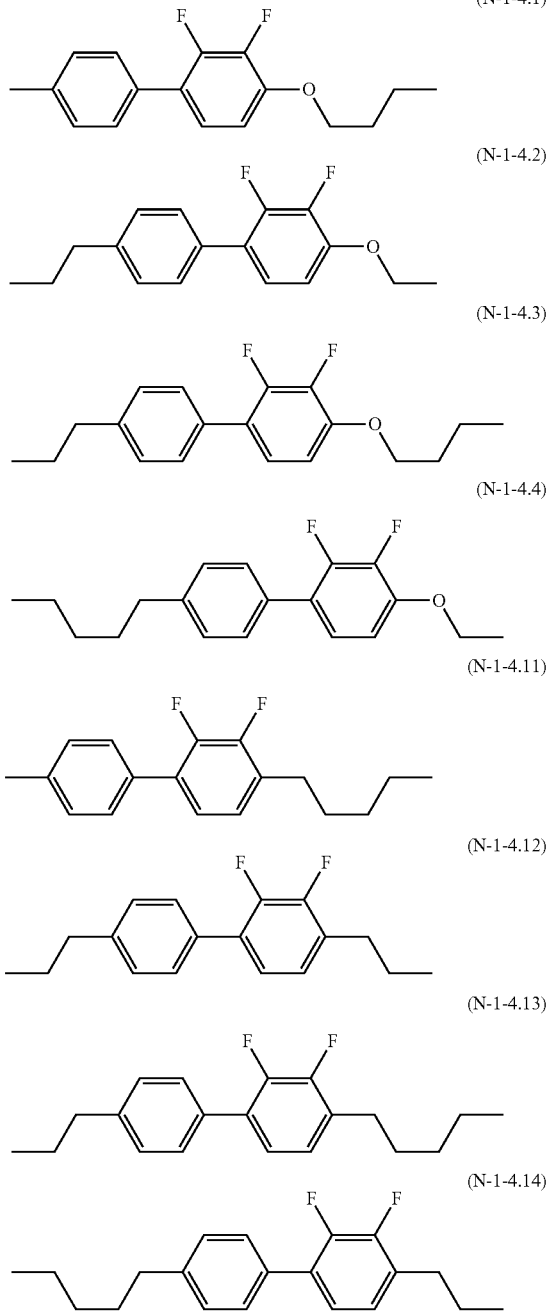

(N-1-4.1)
(N-1-4.2)
(N-1-4.3)
(N-1-4.4)
(N-1-4.11)
(N-1-4.12)
(N-1-4.13)
(N-1-4.14)

The compounds represented by Formulae (N-1-4.1) to (N-1-4.14) can be used alone or in combination, The lower limit value of the preferable content of these compounds alone or with respect to the total amount of the composition of the present invention is 3%, 5%, 7%, 10%, 13%, 15%, 17%, and 20%. The upper limit of the preferable content with respect to the total amount of the composition of the present invention is 35%, 30%, 28%, 25%, 23%, 20%, 18%, 15%, 13%, 11%, 10%, and 8%.

The compound represented by General Formula (N-1-5) is the following compound.

[Chem. 119]

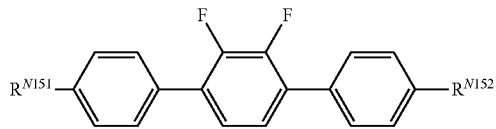

(N-1-5)

In the formula, $R^{N151}$ and $R^{N152}$ each independently represent the same meanings as those of $R^{N11}$ and $R^{N12}$ in General Formula (N-1).

$R^{N151}$ and $R^{N152}$ each independently preferably an alkyl group having 1 to 5 carbon atoms, an alkenyl group having 4 to 5 carbon atoms, or an alkoxy group having 1 to 4 carbon atoms, and are preferably an ethyl group, a propyl group, and a butyl group.

The compound represented by General Formula (N-1-5) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Ae is regarded as important, it is preferable to set the content to be high, in a case where the solubility at low temperatures is regarded as important, it is more effective to set the content to be small, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-5) with respect to the total amount of the composition of the present invention is 5%, 8%, 10%, 13%, 15%, 17%, and 20%. The upper limit of the preferable content with respect to the total amount of the composition of the present invention is 35%, 33%, 30%, 28%, 25%, 23%, 20%, 18%, 15%, and 13%.

Further, the compound represented by General Formula (N-1-5) is preferably a compound selected from the compound groups represented by Formula (N-1-5.1) to Formula (N-1-5.6), and a compound represented by Formula (N-1-5.1), Formula (N-1-5.2), and Formula (N-1-5.4).

[Chem. 120]

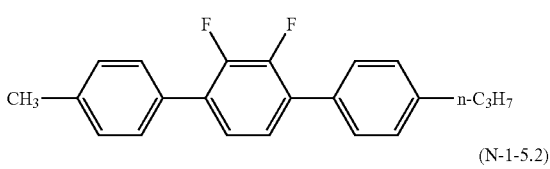

(N-1-5.1)

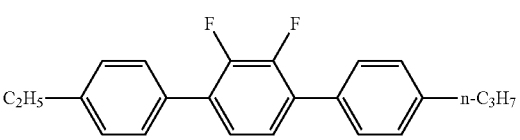

(N-1-5.2)

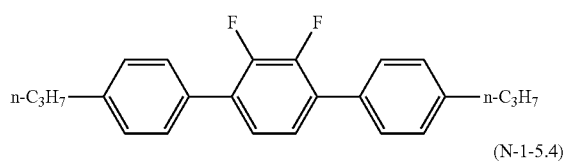

(N-1-5.3)

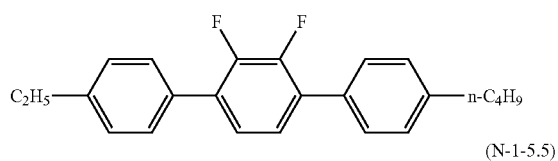

(N-1-5.4)

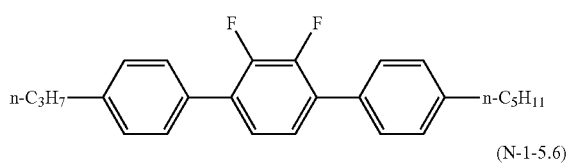

(N-1-5.5)

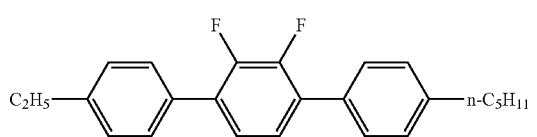

(N-1-5.6)

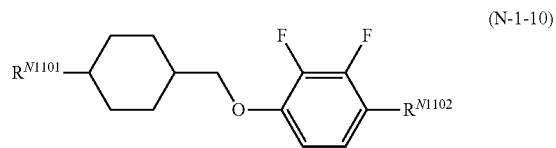

The compounds represented by Formula (N-1-5.1), Formula (N-1-5.2), and Formula (N-1-5.4) can be used alone or in combination, the lower limit value of the preferable content of the single compound or these compounds with respect to the total amount of the composition of the present invention is 5%, 8%, 10%, 13%, 15%, 17%, and 20%. The upper limit of the preferable content with respect to the total amount of the composition of the present invention is 35%, 33%, 30%, 28%, 25%, 23%, 20%, 18%, 15%, and 13%.

The compound represented by General Formula (N-1-10) is the following compound.

[Chem. 121]

(N-1-10)

In the formula, $R^{N1101}$ and $R^{N1102}$ each independently represent the same meanings as those of $R^m$ and $R^{a12}$ in General Formula (N-1).

$R^{N1101}$ is preferably an alkyl group having 1 to 5 carbon atoms or an alkenyl group having 2 to 5 carbon atoms, and is preferably an ethyl group, a propyl group, a butyl group, and a vinyl group or a 1-propenyl group. $R^{N1102}$ is preferably an alkyl group having 1 to 5 carbon atoms, an alkenyl group having 4 to 5 carbon atoms, or an alkoxy group having 1 to 4 carbon atoms, and is preferably an ethoxy group, a propoxy group, or a butoxy group.

The compound represented by General Formula (N-1-10) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-10) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

Further, the compound represented by General Formula (N-1-10) is preferably a compound selected from the compound groups represented by Formula (N-1-10.1) to Formula (N-1-10.14), is preferably a compound represented by Formula (N-1-10.1) to (N-1-10.5), Formula (N-1-10.13), and Formula (N-1-10.14), and is preferably a compound represented by Formula (N-1-10.1), Formula (N-1-10.2), Formula (N-1-10.13), and Formula (N-1-10.14).

[Chem. 122]

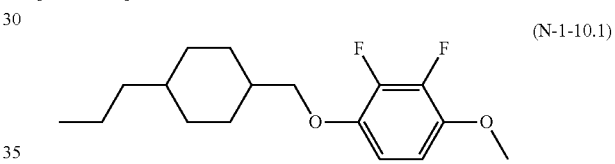

(N-1-10.1)

(N-1-10.2)

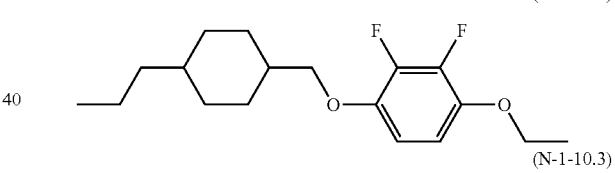

(N-1-10.3)

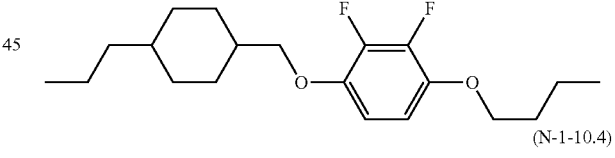

(N-1-10.4)

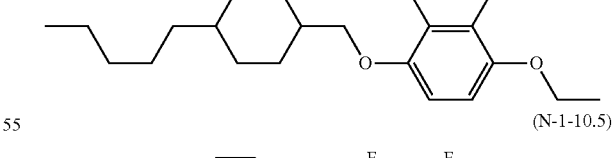

(N-1-10.5)

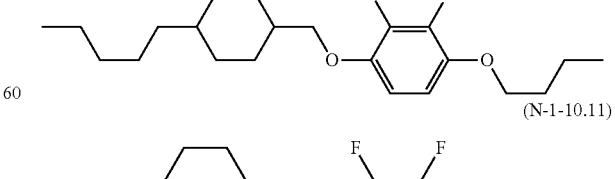

(N-1-10.11)

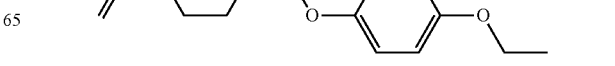

(N-1-10.12)

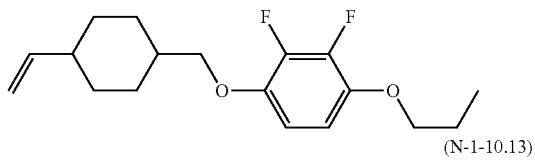

(N-1-10.13)

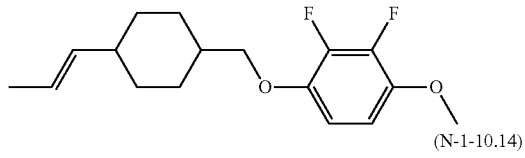

(N-1-10.14)

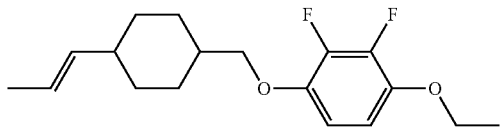

The compounds represented by Formula (N-1-10.1), Formula (N-1-10.2), Formula (N-1-10.13), and Formula (N-1-10.14) can be used alone or in combination, the lower limit value of the preferable content of the single compound or these compounds with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-11) is the following compound.

[Chem. 123]

(N-1-11)

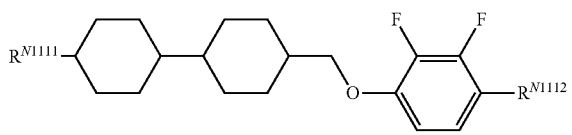

In the formula, $R^{N1111}$ and $R^{N1112}$ each independently represent the same meanings as those of $R^{N11}$ and $R^{N12}$ in General Formula (N-1).

$R^{N1111}$ is preferably an alkyl group having 1 to 5 carbon atoms or an alkenyl group having 2 to 5 carbon atoms, and is preferably an ethyl group, a propyl group, a butyl group, and a vinyl group or a 1-propenyl group. $R^{N1112}$ is preferably an alkyl group having 1 to 5 carbon atoms, an alkenyl group having 4 to 5 carbon atoms, or an alkoxy group having 1 to 4 carbon atoms, and is preferably an ethoxy group, a propoxy group, or a butoxy group.

The compound represented by General Formula (N-1-11) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be small, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-11) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

Further, the compound represented by General Formula (N-1-11) is preferably a compound selected from the compound groups represented by Formula (N-1-11.1) to Formula (N-1-11.14), is preferably a compound represented by Formulae (N-1-11.1) to (N-1-11.14), and is preferably a compound represented by Formula (N-1-11.2) and Formula (N-1-11.4).

[Chem. 124]

(N-1-11.1)
(N-1-11.2)
(N-1-11.3)
(N-1-11.4)

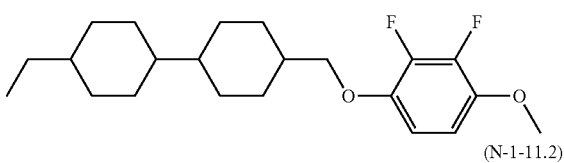

(N-1-11.5)

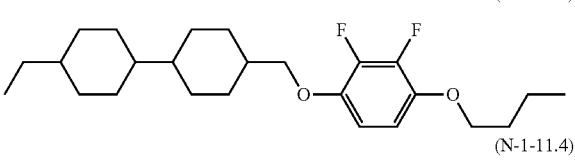

(N-1-11.11)
(N-1-11.12)

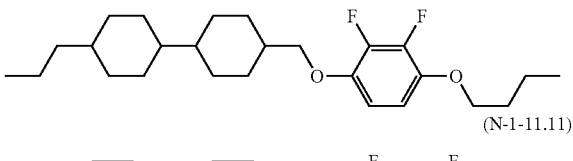

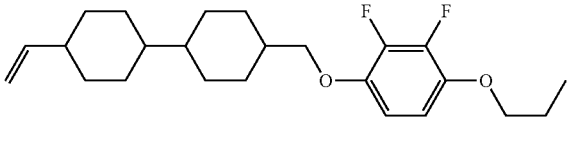

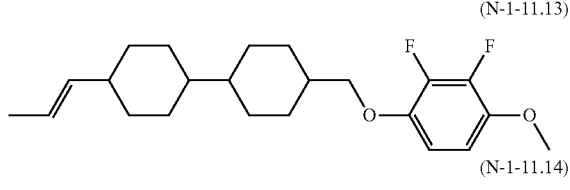

(N-1-11.13)

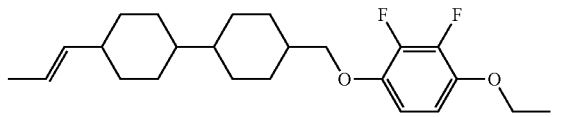

(N-1-11.14)

The compounds represented by Formula (N-1-11.2), and Formula (N-1-11.4) can be used alone or in combination, the lower limit value of the preferable content of the single compound or these compounds with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-12) is the following compound.

[Chem. 125]

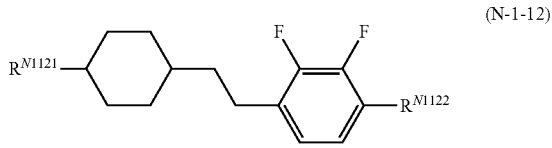

(N-1-12)

In the formula, $R^{N1121}$ and $R^{N1122}$ each independently represent the same meanings as those of $R^{N11}$ and $R^{N12}$ in General Formula (N-1).

$R^{N1121}$ is preferably an alkyl group having 1 to 5 carbon atoms, an alkenyl group having 2 to 5 carbon atoms, and is preferably an ethyl group, a propyl group, or a butyl group. $R^{1122}$ is preferably an alkyl group having 1 to 5 carbon atoms, an alkenyl group having 4 to 5 carbon atoms, or an alkoxy group having 1 to 4 carbon atoms, and is preferably an ethoxy group, a propoxy group, or a butoxy group.

The compound represented by General Formula (N-1-12) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of A is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-12) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-13) is the following compound.

[Chem. 126]

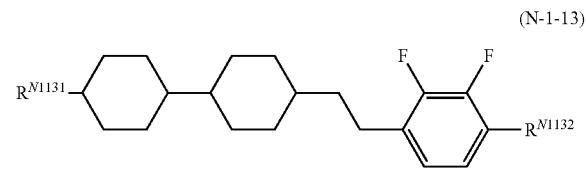

(N-1-13)

In the formula, $R^{N1131}$ and $R^{N1132}$ each independently represent the same meanings as those of $R^{N11}$ and $R^{N12}$ in General Formula (N-1).

$R^{N1131}$ is preferably an alkyl group having 1 to 5 carbon atoms, an alkenyl group having 2 to 5 carbon atoms, and is preferably an ethyl group, a propyl group, or a butyl group. $R^{N1132}$ is preferably an alkyl group having 1 to 5 carbon atoms, an alkenyl group having 4 to 5 carbon atoms, or an alkoxy group having 1 to 4 carbon atoms, and is preferably an ethoxy group, a propoxy group, or a butoxy group.

The compound represented by General Formula (N-1-13) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-13) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-14) is the following compound.

[Chem. 127]

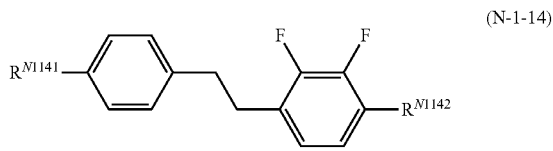

(N-1-14)

In the formula, $R^{N1141}$ and $R^{N1142}$ each independently represent the same meanings as those of $R^{N11}$ and $R^{N12}$ in General Formula (N-1).

$R^{N1141}$ is preferably an alkyl group having 1 to 5 carbon atoms, an alkenyl group having 2 to 5 carbon atoms, and is preferably an ethyl group, a propyl group, or a butyl group. $R^a1142$ is preferably an alkyl group having 1 to 5 carbon atoms, an alkenyl group having 4 to 5 carbon atoms, or an alkoxy group having 1 to 4 carbon atoms, and is preferably an ethoxy group, a propoxy group, or a butoxy group.

The compound represented by General Formula (N-1-14) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of $\Delta\varepsilon$ is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-14) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-15) is the following compound.

[Chem. 128]

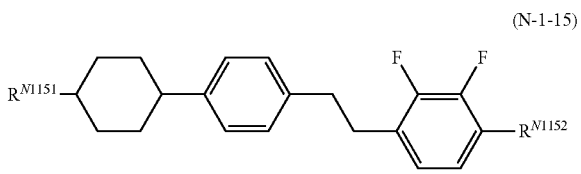

(N-1-15)

In the formula, $R^{N1151}$ and $R^{N1152}$ each independently represent the same meanings as those of $R^{N11}$ and $R^{N12}$ in General Formula (N-1).

$R^{N1151}$ is preferably an alkyl group having 1 to 5 carbon atoms, an alkenyl group having 2 to 5 carbon atoms, and is preferably an ethyl group, a propyl group, or a butyl group. $R^{N1152}$ is preferably an alkyl group having 1 to 5 carbon atoms, an alkenyl group having 4 to 5 carbon atoms, or an alkoxy group having 1 to 4 carbon atoms, and is preferably an ethoxy group, a propoxy group, or a butoxy group.

The compound represented by General Formula (N-1-15) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of $\Delta\varepsilon$ is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-15) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-16) is the following compound.

[Chem. 129]

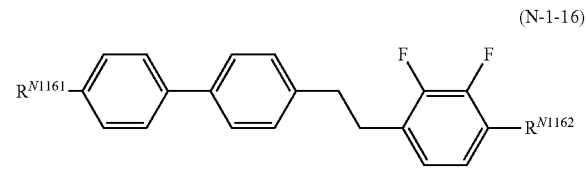

(N-1-16)

In the formula, $R^{N1161}$ and $R^{N1162}$ each independently represent the same meanings as those of $R^{N11}$ and $R^{N12}$ in General Formula (N-1).

$R^{N1161}$ is preferably an alkyl group having 1 to 5 carbon atoms, an alkenyl group having 2 to 5 carbon atoms, and is preferably an ethyl group, a propyl group, or a butyl group. $R^{N162}$ is preferably an alkyl group having 1 to 5 carbon atoms, an alkenyl group having 4 to 5 carbon atoms, or an alkoxy group having 1 to 4 carbon atoms, and is preferably an ethoxy group, a propoxy group, or a butoxy group.

The compound represented by General Formula (N-1-16) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of A is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-16) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-17) is the following compound.

[Chem. 130]

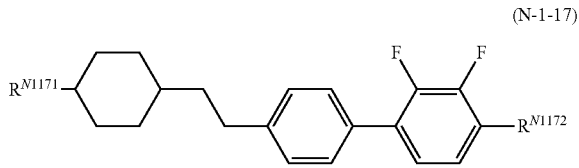

(N-1-17)

In the formula, $R^{N1171}$ and $R^{N1172}$ each independently represent the same meanings as those of $R^{N11}$ and $R^{N12}$ in General Formula (N-1).

$R^{N1171}$ is preferably an alkyl group having 1 to 5 carbon atoms, an alkenyl group having 2 to 5 carbon atoms, and is preferably an ethyl group, a propyl group, or a butyl group. $R^{1172}$ is preferably an alkyl group having 1 to 5 carbon atoms, an alkenyl group having 4 to 5 carbon atoms, or an alkoxy group having 1 to 4 carbon atoms, and is preferably an ethoxy group, a propoxy group, or a butoxy group.

The compound represented by General Formula (N-1-17) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-17) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-18) is the following compound.

[Chem. 131]

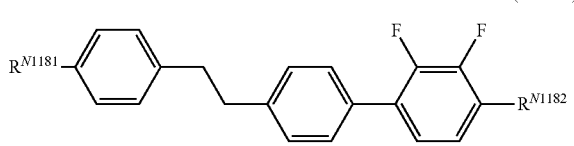

(N-1-18)

In the formula, $R^{N1181}$ and $R^{N1182}$ each independently represent the same meanings as those of $R^{N11}$ and $R^{N12}$ in General Formula (N-1).

$R^{N1181}$ is preferably an alkyl group having 1 to 5 carbon atoms or an alkenyl group having 2 to 5 carbon atoms, and is preferably an methyl group, an ethyl group, a propyl group, or a butyl group. $R^{N1182}$ is preferably an alkyl group having 1 to 5 carbon atoms, an alkenyl group having 4 to 5 carbon atoms, or an alkoxy group having 1 to 4 carbon atoms, and is preferably an ethoxy group, a propoxy group, or a butoxy group.

The compound represented by General Formula (N-1-18) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-18) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

Further, the compound represented by General Formula (N-1-18) is preferably a compound selected from the compound groups represented by Formula (N-1-18.1) to Formula (N-1-18.5), is preferably a compound represented by Formulae (N-1-18.1) to (N-1-18.3), and is preferably a compound represented by Formula (N-1-18.2), and Formula (N-1-18.3).

The compound represented by General Formula (N-1-20) is the following compound.

[Chem. 132]

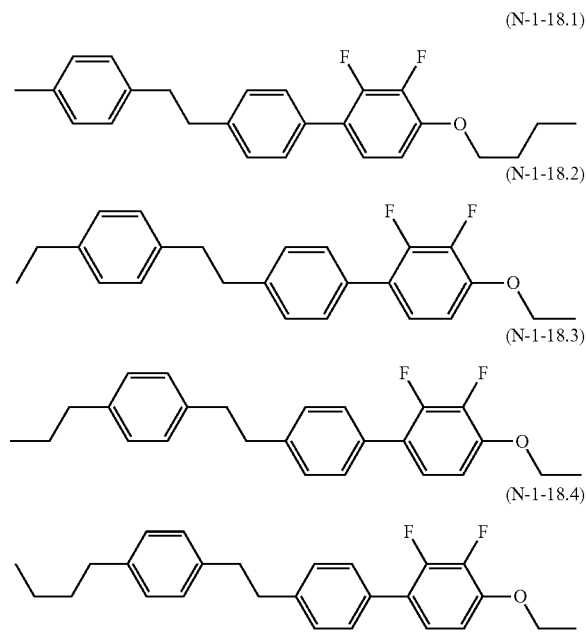

(N-1-18.5)

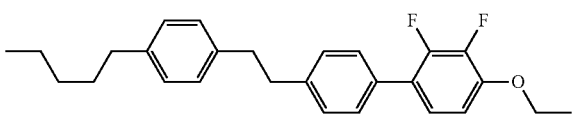

The compound represented by General Formula (N-1-20) is the following compound.

[Chem. 133]

(N-1-20)

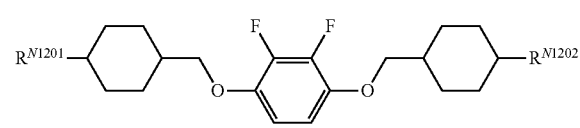

In the formula, $R^{N1201}$ and $R^{N1202}$ each independently represent the same meanings as those of $R^{N11}$ and $R^{N12}$ in General Formula (N-1).

$R^{N1201}$ and $R^{N1202}$ each independently preferably an alkyl group having 1 to 5 carbon atoms or an alkenyl group having 2 to 5 carbon atoms, and are preferably an ethyl group, a propyl group, and a butyl group.

The compound represented by General Formula (N-1-20) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-20) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-21) is the following compound.

[Chem. 134]

(N-1-21)

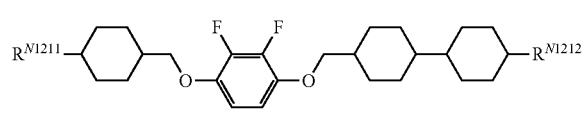

In the formula, $R^{N1211}$ and $R^{N1212}$ each independently represent the same meanings as those of $R^{N11}$ and $R^{N12}$ in General Formula (N-1).

$R^{N1211}$ and $R^{N1212}$ each independently preferably an alkyl group having 1 to 5 carbon atoms or an alkenyl group having 2 to 5 carbon atoms, and are preferably an ethyl group, a propyl group, and a butyl group.

The compound represented by General Formula (N-1-21) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-21) with respect to the total amount of the composition of the present invention is 5%, 10%, 13%, 15%, 17%, and 20%. The upper limit of the preferable content with respect to the total amount of the composition of the present invention is 35%, 30%, 28%, 25%, 23%, 20%, 18%, 15%, and 13%.

The compound represented by General Formula (N-1-22) is the following compound.

[Chem. 135]

(N-1-22)

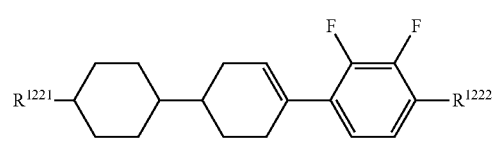

In the formula, $R^{N1221}$ and $R^{N1222}$ each independently represent the same meanings as those of $R^{N11}$ and $R^{N12}$ in General Formula (N-1).

$R^{N1221}$ and $R^{N1222}$ each independently preferably an alkyl group having 1 to 5 carbon atoms or an alkenyl group having 2 to 5 carbon atoms, and are preferably an ethyl group, a propyl group, and a butyl group.

The compound represented by General Formula (N-1-22) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be large, and in a case where TNI is regarded as important, it is more effective to set the content to be large. Furthermore, in a case of improving dripping marks and image sticking characteristics, it is preferable to set the content to be moderate.

The lower limit value of the preferable content of the compound represented by Formula (N-1-22) with respect to the total amount of the composition of the present invention is 1%, 5%, 10%, 13%, 15%, 17%, and 20%. The upper limit of the preferable content with respect to the total amount of the composition of the present invention is 35%, 30%, 28%, 25%, 23%, 20%, 18%, 15%, 13%, 10%, and 5%.

Further, the compound represented by General Formula (N-1-22) is preferably a compound selected from the compound groups represented by Formula (N-1-22.1) to Formula (N-1-22.12), is preferably a compound represented by Formulae (N-1-22.1) to (N-1-22.5), and is preferably a compound represented by Formulae (N-1-22.1) to (N-1-22.4).

[Chem. 136]

(N-1-22.1)

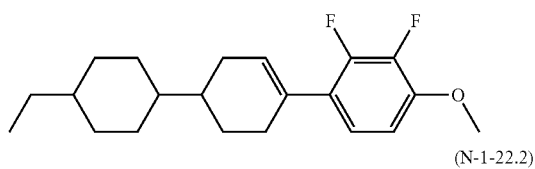

(N-1-22.2)

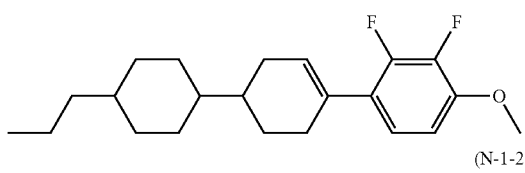

(N-1-22.3)

(N-1-22.4)

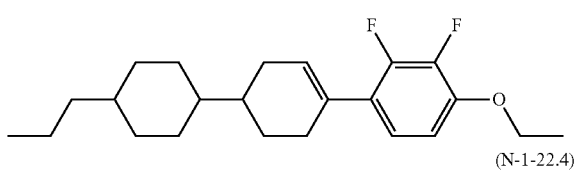

(N-1-22.5)

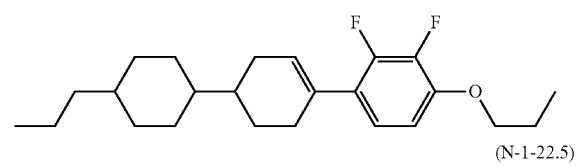

(N-1-22.6)

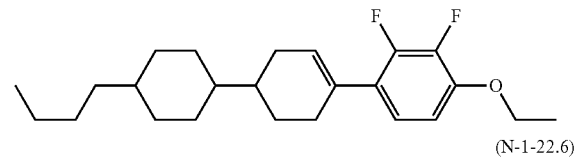

(N-1-22.11)

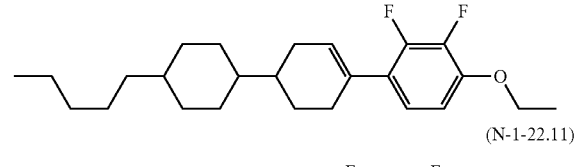

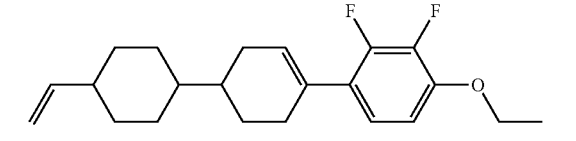

-continued (N-1-22.12)

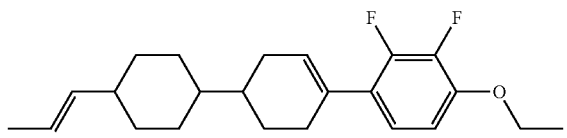

The compound represented by General Formula (N-2) is preferably a compound selected from the compound groups represented by General Formulae (N-2-1) to (N-2-3).

The compound represented by General Formula (N-2-1) is the following compound.

[Chem. 137]

(N-2-1)

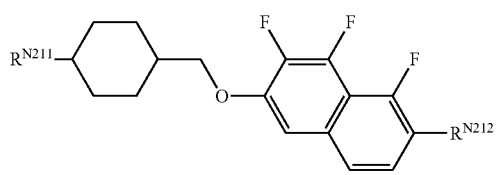

In the formula, $R^{N211}$ and $R^{N212}$ each independently represent the same meanings as those of $R^{N21}$ and $R^{N22}$ in General Formula (N-2).

The compound represented by General Formula (N-2-2) is the following compound.

[Chem. 138]

(N-2-2)

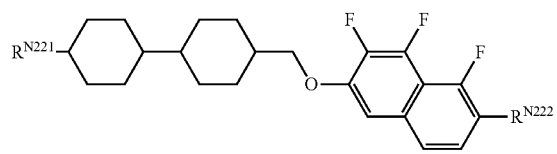

In the formula, $R^{N221}$ and $R^{N222}$ each independently represent the same meanings as those of $R^{N21}$ and $R^{N22}$ in General Formula (N-2).

The compound represented by General Formula (N-2-3) is the following compound.

[Chem. 139]

(N-2-3)

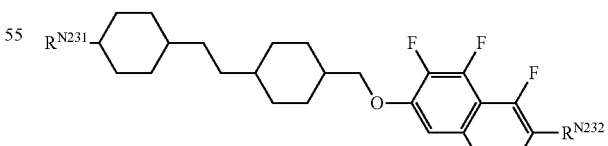

In the formula, $R^{N231}$ and $R^{N232}$ each independently represent the same meanings as those of $R^{N21}$ and $R^{N22}$ in General Formula (N-2).

The compound represented by General Formula (N-3) is preferably a compound selected from the compound groups represented by General Formula (N-3-2).

[Chem. 140]

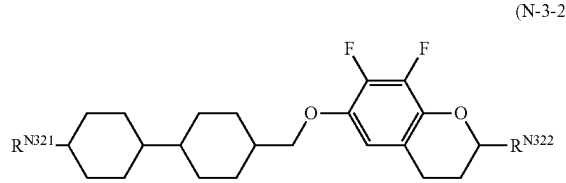

(N-3-2)

Further, the compound represented by General Formula (N-3-2) is preferably a the compound selected from the compound groups represented by Formula (N-3-2.1) to Formula (N-3-2.3).

[Chem. 141]

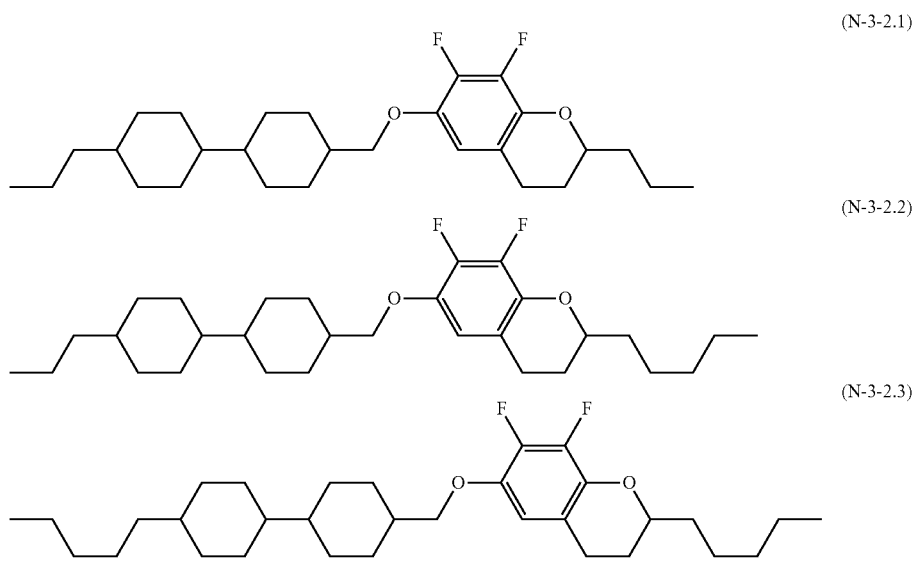

(N-3-2.1)

(N-3-2.2)

(N-3-2.3)

In the formula, $R^{N321}$ and $R^{N322}$ each independently represent the same meanings as those of $R^{N31}$ and $R^{N32}$ in General Formula (N-3).

$R^{N321}$ and $R^{N322}$ are preferably an alkyl group having 1 to 5 carbon atoms, an alkenyl group having 2 to 5 carbon atoms, and is preferably a propyl group, or a pentyl group.

The compound represented by General Formula (N-3-2) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the improvement of Δε is regarded as important, it is preferable to set the content to be high, in a case where the solubility at low temperatures is regarded as important, it is more effective to set the content to be large, and in a case where TNI is regarded as important, it is more effective to set the content to be small. Furthermore, in a case of improving dripping marks and image sticking characteristics, it is preferable to set the content to be moderate.

The lower limit value of the preferable content of the compound represented by Formula (N-3-2) with respect to the total amount of the composition of the present invention is 3%, 5%, 10%, 13%, 15%, 17%, 20%, 23%, 25%, 27%, 30%, 33%, and 35%. The upper limit value of the preferable content with respect to the total amount of the composition of the present invention is 50%, 40%, 38%, 35%, 33%, 30%, 28%, 25%, 23%, 20%, 18%, 15%, 13%, 10%, 8%, 7%, 6%, and 5%.

Further, the compound represented by General Formula (N-3-2) is preferably a the compound selected from the compound groups represented by Formula (N-3-2.1) to Formula (N-3-2.3).

The liquid crystal composition according to the present invention preferably contains one or two or more kinds of compounds represented by General Formula (L) other than the compound represented by General Formula (I). The compound represented by General Formula (L) corresponds to a dielectrically neutral compound (Δε value is −2 to 2).

[Chem. 142]

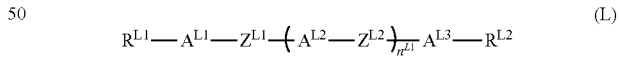

(L)

$$R^{L1}-A^{L1}-Z^{L1}-(A^{L2}-Z^{L2})_{n^{L1}}A^{L3}-R^{L2}$$

In the formula, $R^{L1}$ and $R^{L2}$ each independently represent an alkyl group having 1 to 8 carbon atoms, wherein one —CH$_2$— or two or more non-adjacent —CH$_2$—'s in the alkyl group may be each independently substituted with —CH=CH—, —C≡C—, —O—, —CO—, —COO—, or —OCO—, $n^{L1}$ represents 0, 1, 2, or 3, $A^{L1}$, $A^{L2}$, and $A^{L3}$ each independently represent a group selected from the group consisting of (a) 1,4-cyclohexylene group (one —CH$_2$— or two or more non-adjacent —CH$_2$—'s present in this group may be substituted with —O—), (b) 1,4-phenylene group (one —CH= or two or more non-adjacent —CH='s present in this group may be substituted with —N=), and (c) naphthalene-2,6-diyl group, 1,2,3,4-tetrahydronaphthalene-2,6-diyl group, or decahydronaphthalene- 2,6-diyl group (one —CH= or two or more non-adjacent —CH='s present in the naphthalene-2,6-diyl group or the 1,2,3,4-tetrahydronaphthalene-2,6-diyl group may be substituted with —N=), the group (a), the group (b), and the group (c) may be each independently substituted with a cyano group, a fluorine atom, or a chlorine atom, $Z^{L1}$ and $Z^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—, in a case where $n^{L2}$ is 2 or 3 and a plurality of $A^{L2}$'s are present, those may be the same as or different from each other, and in a case where $n^L$ is 2 or 3 and a plurality of $Z^{L2}$'s are present, those may be the same as or different from each other, but the compounds represented by General Formulae (N-1), (N-2), and (N-3) are excluded.

Although the compound represented by General Formula (L) may be used alone or can also be used in combination. There are no particular restrictions on the kinds of compounds that can be combined, but those are used in appropriate combinations according to the desired properties such as solubility at low temperatures, transition temperatures, electrical reliability, and birefringence. The kind of the compound used is, for example, one kind as one embodiment of the present invention. Alternatively, in another embodiment of the present invention, there are two kinds, three kinds, four kinds, five kinds, six kinds, seven kinds, eight kinds, nine kinds, and more than ten kinds.

In the composition of the present invention, the content of the compound represented by General Formula (L) is necessary to be appropriately adjusted according to required properties such as such as solubility at low temperatures, transition temperatures, electrical reliability, birefringence, process compatibility, dripping marks, image sticking, and dielectric anisotropy.

The lower limit value of the preferable content of the compound represented by Formula (L) with respect to the total amount of the composition of the present invention is 1%, 10%, 20%, 30%, 40%, 50%, 55%, 60%, 65%, 70%, 75%, and 80%. The upper limit value of the preferable content is 95%, 85%, 75%, 65%, 55%, 45%, 35%, and 25%.

In a case where the composition of the present invention keeps the viscosity low and a composition having a high response speed is required, the lower limit value is preferably high and the upper limit value is preferably high. Furthermore, in a case where the composition of the present invention keeps Tni high and a composition having excellent temperature stability is required, the lower limit value is preferably high and the upper limit value is preferably high. When it is desired to increase the dielectric anisotropy in order to keep the driving voltage low, it is preferable that the lower limit value is high and the upper limit value is low.

In a case where the reliability is regarded as important, both $R^{L1}$ and $R^{L2}$ are preferably alkyl groups, in a case where a decrease in the volatility of the compound is regarded as important, it is preferably an alkoxy group, and in a case where a decrease in the viscosity is regarded as important, at least one of them is preferably an alkenyl group.

The number of halogen atoms present in the molecule is preferably 0, 1, 2 or 3, is preferably 0 or 1, and 1 is preferable in a case where the compatibility with other liquid crystal molecules is regarded as important.

In a case where the ring structure to which $R^L1$ and $R^{L2}$ are bonded is a phenyl group (aromatic), $R^{L1}$ and $R^{L2}$ are each independently preferably a linear alkyl group having 1 to 5 carbon atoms, a linear alkoxy group having 1 to 4 carbon atoms, and an alkenyl group 4 to 5 carbon atoms are preferable, and in a case where the ring structure to which $R^{L1}$ and $R^{L2}$ are bonded is a saturated ring structure such as cyclohexane, pyran, and dioxane, $R^{L1}$ and $R^{L2}$ are each independently preferably a linear alkyl group having 1 to 5 carbon atoms, a linear alkoxy group having 1 to 4 carbon atoms, and a linear alkenyl group having 2 to 5 carbon atoms. In order to stabilize a nematic phase, the total of carbon atoms and oxygen atoms, if present, is preferably 5 or less, and is preferably linear.

The alkenyl group is preferably selected from groups represented by any one of Formula (R1) to Formula (R5). (the black spot in each formula represent carbon atoms in the ring structure)

[Chem. 143]

 (R1)

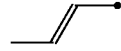 (R2)

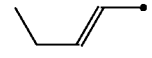 (R3)

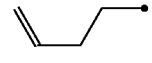 (R4)

 (R5)

In a case where the response speed is regarded as important, $n^{L1}$ is preferably 0, and is preferably 2 or 3 in order to improve the upper limit temperature of the nematic phase, and 1 is preferable for balancing these. In addition, in order to satisfy the properties required for the composition, it is preferable to combine compounds having different values.

$A^{L1}$, $A^{L2}$, and $A^{L3}$ are each independently preferably aromatic in a case where it is required to increase Δn, preferably aliphatic in order to improve a response speed, and each independently preferably represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo [2.2.2] octylene group, a piperidine-1,4-diyl group, a naphthalene-2,6-diyl group, a decahydronaphthalene-2,6-diyl group, or a 1,2,3,4-tetrahydronaphthalene-2,6-diyl group, and more preferably represents the following structures.

[Chem. 144]

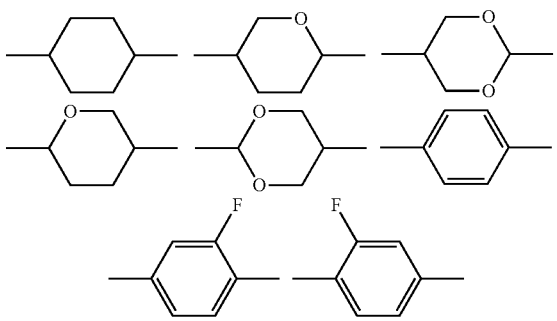

More preferably, it represents a trans-1,4-cyclohexylene group or a 1,4-phenylene group.

$Z^{L1}$ and $Z^{L2}$ are preferably single bonds in a case where the response speed is regarded as important.

The compound represented by General Formula (L) preferably has 0 or 1 halogen atom in the molecule. The halogen atom is preferably a fluorine atom or a chlorine atom, and more preferably a fluorine atom.

The compound represented by General Formula (L) is preferably a compound selected from the compound groups represented by General Formulae (L-1) to (L-7).

The compound represented by General Formula (L-1) is the following compound.

[Chem. 145]

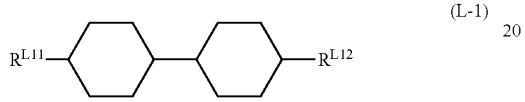

(L-1)

In the formula, $R^{L11}$ and $R^{L22}$ each independently represent the same meanings as those of $R^{L1}$ and $R^{L2}$ in General Formula (L).

$R^{L11}$ and $R^{L12}$ are preferably a linear alkyl group having 1 to 5 carbon atoms, a linear alkoxy group having 1 to 4 carbon atoms, and a linear alkenyl group having 2 to 5 carbon atoms.

The compound represented by General Formula (L-1) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

The lower limit value of the preferable content with respect to the total amount of the composition of the present invention is 1%, 2%, 3%, 5%, 7%, 10%, 15%, 20%, 25%, 30%, 35%, 40%, 45%, 50%, and 55%. The upper limit value of the preferable content with respect to the total amount of the composition of the present invention is 95%, 90%, 85%, 80%, 75%, 70%, 65%, 60%, 55%, 50%, 45%, 40%, 35%, 30%, and 25%.

In a case where the composition of the present invention keeps the viscosity low and a composition having a high response speed is required, the lower limit value is preferably high and the upper limit value is preferably high. Furthermore, in a case where the composition of the present invention keeps Tni high and a composition having excellent temperature stability is required, the lower limit value is preferably moderate and the upper limit value is preferably moderate. When it is desired to increase the dielectric anisotropy in order to keep the driving voltage low, it is preferable that the lower limit value is high and the upper limit value is low.

The compound represented by General Formula (L-1) is preferably a compound selected from the compound groups represented by General Formula (L-1-1).

[Chem. 146]

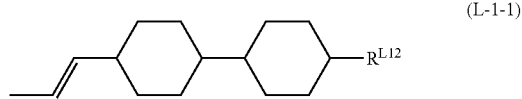

(L-1-1)

In the formula, $R^{L2}$ represents the same meaning as that in General Formula (L-1).

Further, the compound represented by General Formula (L-1-1) is preferably a compound selected from the compound groups represented by Formula (L-1-1.1) to Formula (L-1-1.3), is preferably a compound represented by Formula (L-1-1.2) or Formula (L-1-1.3), and is particularly preferably a compound represented by Formula (L-1-1.3).

[Chem.147]

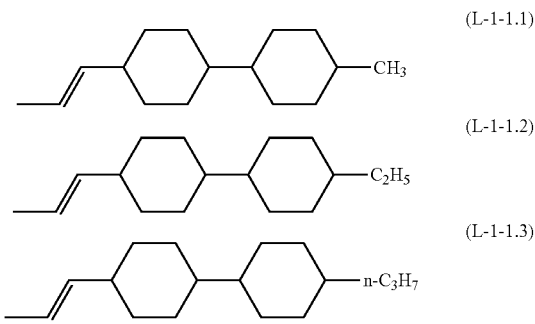

(L-1-1.1)

(L-1-1.2)

(L-1-1.3)

The lower limit value of the preferable content of the compound represented by Formula (L-1-1.3) with respect to the total amount of the composition of the present invention is 1%, 2%, 3%, 5%, 7%, and 10%. The upper limit value of the preferable content with respect to the total amount of the composition of the present invention is 20%, 15%, 13%, 10%, 8%, 7%, 6%, 5%, and 3%.

The compound represented by General Formula (L-1) is preferably a compound selected from the compound groups represented by General Formula (L-1-2).

[Chem. 148]

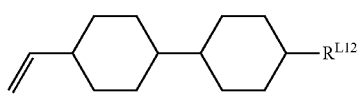

(L-1-2)

In the formula, $R^{L12}$ represents the same meaning as that in General Formula (L-1).

The lower limit value of the preferable content of the compound represented by Formula (L-1-2) with respect to the total amount of the composition of the present invention is 1%, 5%, 10%, 15%, 17%, 20%, 23%, 25%, 27%, 30%, and 35%. The upper limit value of the preferable content with respect to the total amount of the composition of the present invention is 60%, 55%, 50%, 45%, 42%, 40%, 38%, 35%, 33%, and 30%.

Further, the compound represented by General Formula (L-1-2) is preferably a compound selected from the compound groups represented by Formula (L-1-2.1) to Formula (L-1-2.4), and is preferably a compound represented by Formula (L-1-2.2) to Formula (L-1-2.4). In particular, the compound represented by Formula (L-1-2.2) is preferable because the response speed of the composition of the present invention is particularly improved. Further, when obtaining Tni higher than that of the response speed, it is preferable to use a compound represented by Formula (L-1-2.3) or Formula (L-1-2.4). The content of the compounds represented by Formula (L-1-2.3), and Formula (L-1-2.4) is not preferably 30% or more in order to improve the solubility at low temperatures.

[Chem.149]

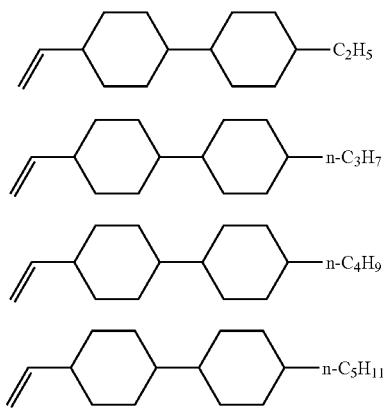

(L-1-2.1)

(L-1-2.2)

(L-1-2.3)

(L-1-2.4)

The lower limit value of the preferable content of the compound represented by Formula (L-1-2.2) with respect to the total amount of the composition of the present invention is 10%, 15%, 18%, 20%, 23%, 25%, 27%, 30%, 33%, 35%, 38%, and 40%. The upper limit value of the preferable content with respect to the total amount of the composition of the present invention is 60%, 55%, 50%, 45%, 43%, 40%, 38%, 35%, 32%, 30%, 27%, 25%, and 22%.

The lower limit value of the preferable content of the compound represented by Formula (L-1-1.3) and the compound represented by Formula (L-1-2.2) with respect to the total amount of the composition of the present invention is 10%, 15%, 20%, 25%, 27%, 30%, 35%, and 40%. The upper limit value of the preferable content with respect to the total amount of the composition of the present invention is 60%, 55%, 50%, 45%, 43%, 40%, 38%, 35%, 32%, 30%, 27%, 25%, and 22%.

The compound represented by General Formula (L-1) is preferably a compound selected from the compound groups represented by General Formula (L-1-3).

[Chem. 150]

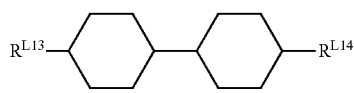

(L-1-3)

In the formula, $R^{L13}$ and $R^{L14}$ each independently represent an alkyl group having 1 to 8 carbon atoms or an alkoxy group having 1 to 8 carbon atoms.

$R^{L3}$ and $R^{14}$ are preferably a linear alkyl group having 1 to 5 carbon atoms, a linear alkoxy group having 1 to 4 carbon atoms, and a linear alkenyl group having 2 to 5 carbon atoms.

The lower limit value of the preferable content of the compound represented by Formula (L-1-3) with respect to the total amount of the composition of the present invention is 1%, 5%, 10%, 13%, 15%, 17%, 20%, 23%, 25%, and 30%. The upper limit value of the preferable content with respect to the total amount of the composition of the present invention is 60%, 55%, 50%, 45%, 40%, 37%, 35%, 33%, 30%, 27%, 25%, 23%, 20%, 17%, 15%, 13%, and 10%.

Further, the compound represented by General Formula (L-1-3) is preferably a compound selected from the compound groups represented by Formula (L-1-3.1) to Formula (L-1-3.13), and is preferably a compound represented by Formula (L-1-3.1), Formula (L-1-3.3), or Formula (L-1-3.4). In particular, the compound represented by Formula (L-1-3.1) is preferable because the response speed of the composition of the present invention is particularly improved. Further, when obtaining Tni higher than that of the response speed, it is preferable to use a compound represented by Formula (L-1-3.3), Formula (L-1-3.4), Formula (L-1-3.11), and Formula (L-1-3.12). The total content of the compounds represented by Formula (L-I-3.3), Formula (L-1-3.4), Formula (L-1-3.11), and Formula (L-1-3.12) is not preferably 20% or more in order to improve the solubility at low temperatures.

[Chem. 151]

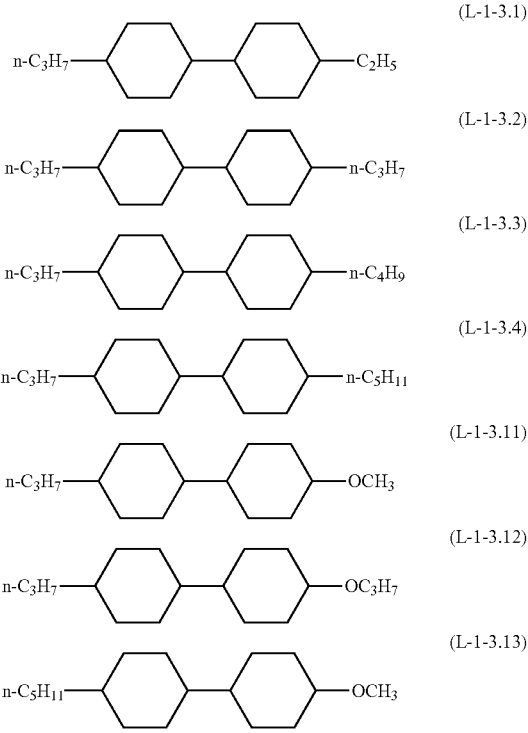

(L-1-3.1)

(L-1-3.2)

(L-1-3.3)

(L-1-3.4)

(L-1-3.11)

(L-1-3.12)

(L-1-3.13)

The lower limit value of the preferable content of the compound represented by Formula (L-1-3.1) with respect to the total amount of the composition of the present invention is 1%, 2%, 3%, 5%, 7%, 10%, 13%, 15%, 18%, and 20%. The upper limit value of the preferable content with respect to the total amount of the composition of the present invention is 20%, 17%, 15%, 13%, 10%, 8%, 7%, and 6%.

The compound represented by General Formula (L-1) is preferably a compound selected from the compound groups represented by General Formulae (L-1-4) and/or (L-1-5).

[Chem. 152]

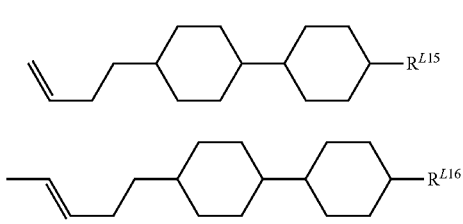
(I-1-4)
(I-1-5)

In the formula, $R^{L15}$ and $R^{L16}$ each independently represent an alkyl group having 1 to 8 carbon atoms or an alkoxy group having 1 to 8 carbon atoms.

$R^{L15}$ and $R^{L16}$ are preferably a linear alkyl group having 1 to 5 carbon atoms, a linear alkoxy group having 1 to 4 carbon atoms, and a linear alkenyl group having 2 to 5 carbon atoms.

The lower limit value of the preferable content of the compound represented by Formula (L-1-4) with respect to the total amount of the composition of the present invention is 1%, 5%, 10%, 13%, 15%, 17%, and 20%. The upper limit value of the preferable content with respect to the total amount of the composition of the present invention is 25%, 23%, 20%, 17%, 15%, 13%, and 10%.

The lower limit value of the preferable content of the compound represented by Formula (L-1-5) with respect to the total amount of the composition of the present invention is 1% t, 5%, 10%, 13%, 15%, 17%, and 20%. The upper limit value of the preferable content with respect to the total amount of the composition of the present invention is 25%, 23%, 20%, 17%, 15%, 13%, and 10%.

Further, the compound represented by General Formula (L-1-4) and (L-1-5) is preferably a compound selected from the compound groups represented by Formula (L-1-4.1) to Formula (L-1-5.3), and is preferably a compound represented by Formula (L-1-4.2) or Formula (L-1-5.2).

[Chem. 153]

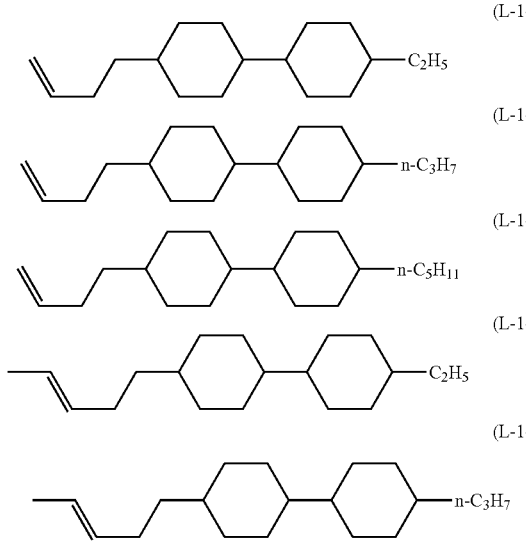
(L-1-4.1)
(L-1-4.2)
(L-1-4.3)
(L-1-5.1)
(L-1-5.2)

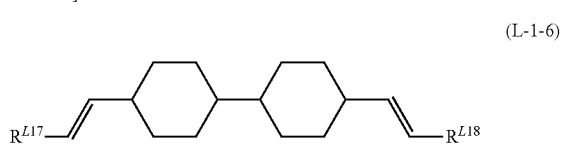
(L-1-5.3)

The lower limit value of the preferable content of the compound represented by Formula (L-1-4.2) with respect to the total amount of the composition of the present invention is 1%, 2%, 3%, 5%, 7%, 10%, 13%, 15%, 18%, and 20%. The upper limit value of the preferable content with respect to the total amount of the composition of the present invention is 20%, 17%, 15%, 13%, 10%, 8%, 7%, and 6%.

It is preferable to combine two or more kinds of compounds selected from the compounds represented by Formula (L-1-1.3), Formula (L-1-2.2), Formula (L-1-3.1), Formula (L-1-3.3), Formula (L-1-3.4), Formula (L-1-3.11), and Formula (L-1-3.12), and to combine two or more kinds of compounds selected from the compounds represented by Formula (L-1-1.3), Formula (L-1-2.2), Formula (L-1-3.1), Formula (L-1-3.3), Formula (L-1-3.4), and Formula (L-1-4.2). The lower limit value of the preferable content of the total content of these compounds with respect to the total amount of the composition of the present invention is 1%, 2%, 3%, 5%, 7%, 10%, 13%, 15%, 18%, 20%, 23%, 25%, 27%, 30%, 33%, and 35%, and the upper limit value with respect to the total amount of the composition of the present invention is 80%, 70%, 60%, 50%, 45%, 40%, 37%, 35%, 33%, 30%, 28%, 25%, 23%, and 20%. In a case where the reliability is regarded as important, it is preferable to combine two or more kinds of compounds selected from the compounds represented by Formula (L-1-3.1), Formula (L-1-3.3), and Formula (L-1-3.4)), in a case where the response speed of the composition is regarded as important, it is preferable to combine two or more kinds of compounds selected from the compounds represented by Formula (L-1-1.3) and Formula (L-1-2.2).

The compound represented by General Formula (L-1) is preferably a compound selected from the compound groups represented by General Formula (L-1-6).

[Chem. 154]

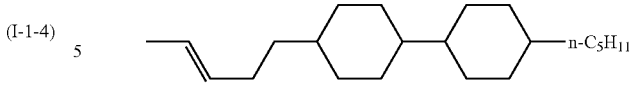
(L-1-6)

In the formula, $R^{L17}$ and $R^{L18}$ each independently represent a methyl group or a hydrogen atom.

The lower limit value of the preferable content of the compound represented by Formula (L-1-6) with respect to the total amount of the composition of the present invention is 1%, 5%, 10%, 15%, 17%, 20%, 23%, 25%, 27%, 30%, and 35%. The upper limit value of the preferable content with respect to the total amount of the composition of the present invention is 60%, 55%, 50%, 45%, 42%, 40%, 38%, 35%, 33%, and 30%.

Further, the compound represented by General Formula (L-1-6) is preferably the compound selected from the compound groups represented by Formula (L-1-6.1) to Formula (L-1-6.3).

[Chem. 155]

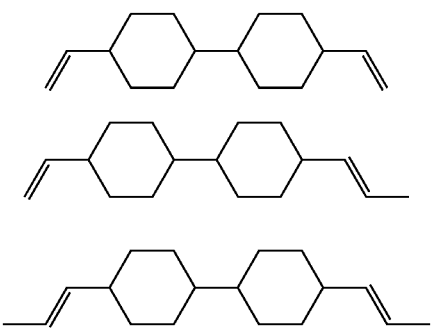

(L-1-6.1)

(L-1-6.2)

(L-1-6.3)

The compound represented by General Formula (L-2) is the following compound.

[Chem. 156]

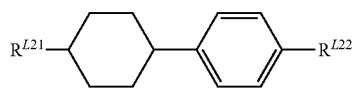

(L-2)

In the formula, $R^{L21}$ and $R^{L22}$ each independently represent the same meanings as those of $R^{L1}$ and $R^{L2}$ in General Formula (L).

$R^{L21}$ is preferably an alkyl group having 1 to 5 carbon atoms or an alkenyl group having 2 to 5 carbon atoms, $R^{L22}$ is an alkyl group having 1 to 5 carbon atoms, an alkenyl group having 4 to 5 carbon atoms, and an alkoxy group having 1 to 4 carbon atoms.

The compound represented by General Formula (L-1) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In a case where the solubility at low temperatures is regarded as important, it is more effective to set the content to be large; whereas, in a case where the response speed is regarded as important, it is more effective to set the content to be small. Furthermore, in a case of improving dripping marks and image sticking characteristics, it is preferable to set the content to be moderate.

The lower limit value of the preferable content of the compound represented by Formula (L-2) with respect to the total amount of the composition of the present invention is 1%, 2%, 3%, 5%, 7%, and 10%. The upper limit value of the preferable content with respect to the total amount of the composition of the present invention is 20%, 15%, 13%, 10%, 8%, 7%, 6%, 5%, and 3%.

Further, the compound represented by General Formula (L-2) is preferably the compound selected from the compound groups represented by Formula (L-2.1) to Formula (L-2.6), and is preferably the compound represented by Formula (L-2.1), Formula (L-2.3), Formula (L-2.4), and Formula (L-2.6).

[Chem. 157]

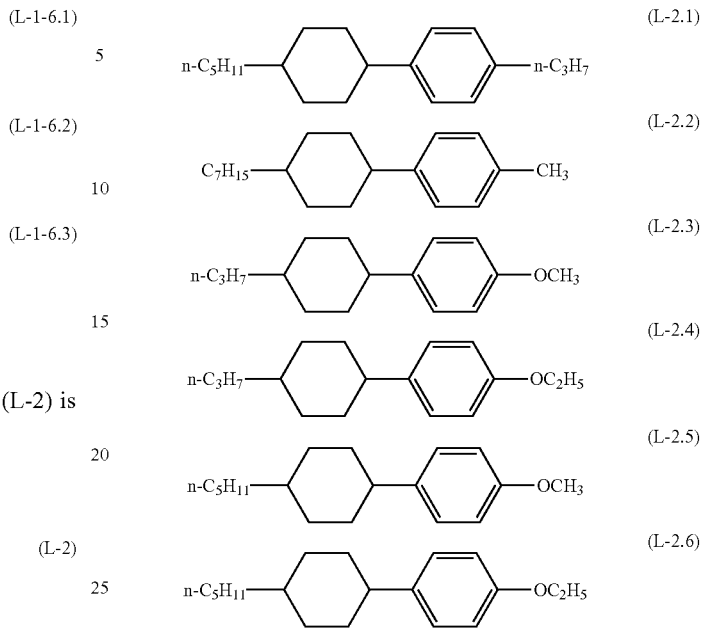

(L-2.1)

(L-2.2)

(L-2.3)

(L-2.4)

(L-2.5)

(L-2.6)

The compound represented by General Formula (L-3) is the following compound.

[Chem. 158]

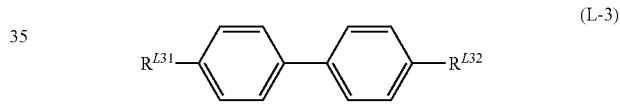

(L-3)

In the formula, $R^{L31}$ and $R^{L32}$ each independently represent the same meanings as those of $R^{L1}$ and $R^{L2}$ in General Formula (L).

$R^{L31}$ and $R^{L32}$ each independently represent preferably an alkyl group having 1 to 5 carbon atoms, an alkenyl group having 4 to 5 carbon atoms, or an alkoxy group having 1 to 4 carbon atoms.

The compound represented by General Formula (L-3) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

The lower limit value of the preferable content of the compound represented by Formula (L-3) with respect to the total amount of the composition of the present invention is 1%, 2%, 3%, 5%, 7%, and 10%. The upper limit value of the preferable content with respect to the total amount of the composition of the present invention is 20%, 15%, 13%, 10%, 8%, 7%, 6%, 5%, and 3%.

In a case where a high birefringence is obtained, it is more effective to set the content to be large; whereas, in a case where high Tni is regarded as important, it is more effective to set the content to be small. Furthermore, in a case of improving dripping marks and image sticking characteristics, it is preferable to set the content to be moderate.

Further, the compound represented by General Formula (L-3) is preferably a compound selected from the compound groups represented by Formula (L-3.1) to Formula (L-3.7), and is preferably a compound represented by Formula (L-3.2) to Formula (L-3.7).

[Chem. 159]

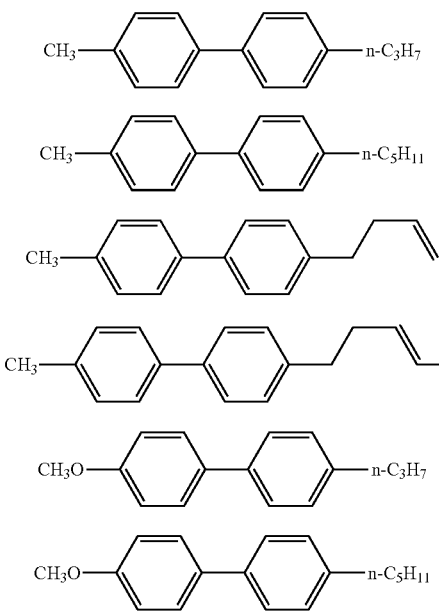

The compound represented by General Formula (L-4) is the following compound.

[Chem. 160]

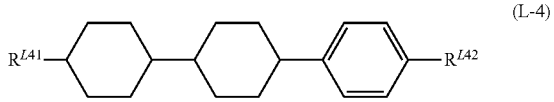

In the formula, $R^{L41}$ and $R^{L42}$ each independently represent the same meanings as those of $R^{L1}$ and $R^{L2}$ in General Formula (L).

$R^{L41}$ is preferably an alkyl group having 1 to 5 carbon atoms or an alkenyl group having 2 to 5 carbon atoms, $R^{L42}$ is an alkyl group having 1 to 5 carbon atoms, an alkenyl group having 4 to 5 carbon atoms, and an alkoxy group having 1 to 4 carbon atoms)

The compound represented by General Formula (L-4) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In the composition of the present invention, the content of the compound represented by General Formula (L-4) is necessary to be appropriately adjusted according to required properties such as such as solubility at low temperatures, transition temperatures, electrical reliability, birefringence, process compatibility, dripping marks, image sticking, and dielectric anisotropy.

The lower limit value of the preferable content of the compound represented by Formula (L-4) with respect to the total amount of the composition of the present invention is 1%, 2%, 3%, 5%, 7%, 10%, 14%, 16%, 20%, 23%, 26%, 30%, 35%, and 40%. The upper limit value of the preferable content of the compound represented by Formula (L-4) with respect to the total amount of the composition of the present invention is 50%, 40%, 35%, 30%, 20%, 15%, 10%, and 5%.

The compound represented by General Formula (L-4) is preferably, for example, a compound represented by Formula (L-4.1) to Formula (L-4.3).

[Chem. 161]

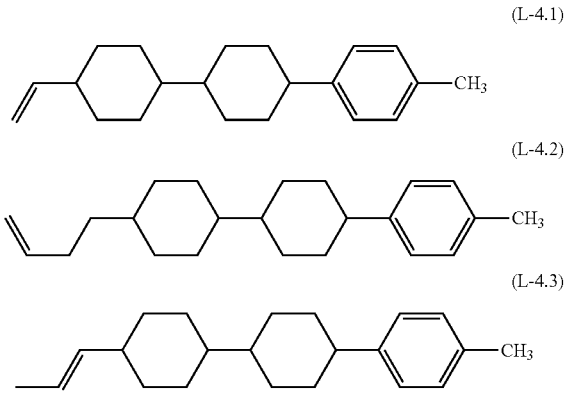

In accordance with the required properties such as solubility at low temperatures, transition temperatures, electrical reliability, and birefringence, it may contain a compound represented by Formula (L-4.1), a compound represented by Formula (L-4.2), both of the compound represented by Formula (L-4.1) and the compound represented by Formula (L-4.2), or all compounds represented by Formula (L-4.1) to Formula (L-4.3). The lower limit value of the preferable content of the compound represented by Formula (L-4.1) or Formula (L-4.2) with respect to the total amount of the composition of the present invention is 3%, 5%, 7%, 9%, 11%, 12%, 13%, 18%, and 21%, and the upper limit value of the preferable content thereof is 45%, 40%, 35%, 30%, 25%, 23%, 20%, 18%, 15%, 13%, 10%, and 8%.

In a case of containing both compound represented by Formula (L-4.1) and the compound represented by Formula (L-4.2), the lower limit value of the preferable content of both compounds with respect to the total amount of the composition of the present invention is 15%, 19%, 24%, and 30%, and the upper limit value of the preferable content thereof is 45%, 40%, 35%, 30%, 25%, 23%, 20%, 18%, 15%, and 13%.

The compound represented by General Formula (L-4) is preferably, for example, a compound represented by Formula (L-4.4) to Formula (L-4.6) and a compound represented by Formula (L-4.4).

[Chem. 162]

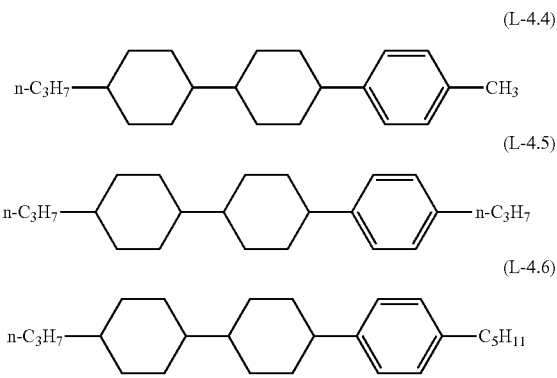

(L-4.4)
(L-4.5)
(L-4.6)

In accordance with the required properties such as solubility at low temperatures, transition temperatures, electrical reliability, and birefringence, it may contain a compound represented by Formula (L-4.4), a compound represented by Formula (L-4.5), or both of the compound represented by Formula (L-4.4) and the compound represented by Formula (L-4.5).

The lower limit value of the preferable content of the compound represented by Formula (L-4.4) or Formula (L-4.5) with respect to the total amount of the composition of the present invention is 3%, 5%, 7%, 9%, 11%, 12%, 13%, 18%, and 21%. The preferable upper limit value is 45%, 40%, 35%, 30%, 25%, 23%, 20%, 18%, 15%, 13%, 10%, and 8%.

In a case of containing both compound represented by Formula (L-4.4) and the compound represented by Formula (L-4.5), the lower limit value of the preferable content of both compounds with respect to the total amount of the composition of the present invention is 15%, 19%, 24%, and 30%, and the upper limit value of the preferable content thereof is 45%, 40%, 35%, 30%, 25%, 23%, 20%, 18%, 15%, and 13%.

The compound represented by General Formula (L-4) is preferably, for example, a compound represented by Formula (L-4.7) to Formula (L-4.10) and particularly preferably a compound represented by Formula (L-4.9).

[Chem. 163]

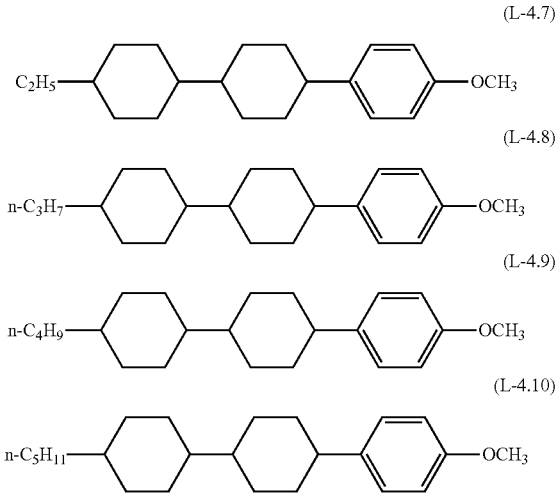

(L-4.7)
(L-4.8)
(L-4.9)
(L-4.10)

The compound represented by General Formula (L-5) is the following compound.

[Chem. 164]

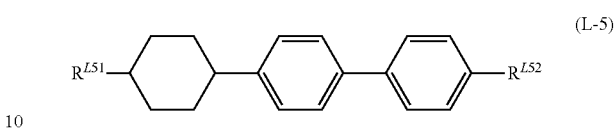

(L-5)

In the formula, $R^{L51}$ and $R^{L52}$ each independently represent the same meanings as those of $R^{L1}$ and $R^{L2}$ in General Formula (L).

$R^{L51}$ is preferably an alkyl group having 1 to 5 carbon atoms or an alkenyl group having 2 to 5 carbon atoms, $R^{L52}$ is an alkyl group having 1 to 5 carbon atoms, an alkenyl group having 4 to 5 carbon atoms, and an alkoxy group having 1 to 4 carbon atoms.

The compound represented by General Formula (L-S) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

In the composition of the present invention, the content of the compound represented by General Formula (L-5) is necessary to be appropriately adjusted according to required properties such as such as solubility at low temperatures, transition temperatures, electrical reliability, birefringence, process compatibility, dripping marks, image sticking, and dielectric anisotropy.

The lower limit value of the preferable content of the compound represented by Formula (L-5) with respect to the total amount of the composition of the present invention is 1%, 2%, 3%, 5%, 7%, 10%, 14%, 16%, 20%, 23%, 26%, 30%, 35%, and 40%. The upper limit value of the preferable content of the compound represented by Formula (L-5) with respect to the total amount of the composition of the present invention is 50%, 40%, 35%, 30%, 20%, 15%, 10%, and 5%.

The compound represented by General Formula (L-5) is preferably a compound represented by Formula (L-5.1) or Formula (L-5.2), and particularly preferably a compound represented by Formula (L-5.1).

The lower limit value of the preferable content of these compounds with respect to the total amount of the composition of the present invention is 1%, 2%, 3%, 5%, and 7%. The upper limit value of the preferable contents of these compounds is 20%, 15%, 13%, 10%, and 9%.

[Chem. 165]

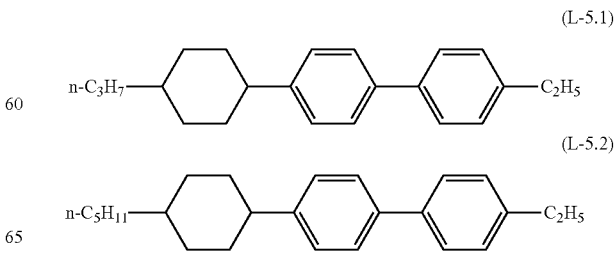

(L-5.1)
(L-5.2)

The compound represented by General Formula (L-5) is preferably a compound represented by Formula (L-5.3) or Formula (L-5.4).

The lower limit value of the preferable content of these compounds with respect to the total amount of the composition of the present invention is 1%, 2%, 3%, 5%, and 7%. The upper limit value of the preferable contents of these compounds is 20%, 15%, 13%, 10%, and 9%.

[Chem. 166]

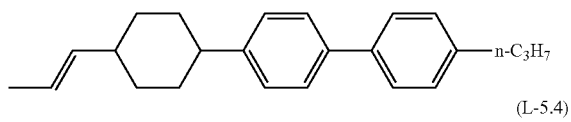

(L-5.3)

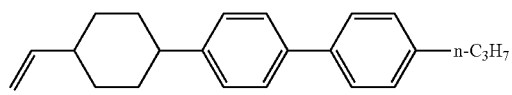

(L-5.4)

The compound represented by General Formula (L-5) is preferably a compound selected from the compound groups represented by Formula (L-5.5) to Formula (L-5.7), and particularly preferably a compound represented by Formula (L-5.7).

The lower limit value of the preferable content of these compounds with respect to the total amount of the composition of the present invention is 1%, 2%, 3%, 5%, and 7%. The upper limit value of the preferable contents of these compounds is 20%, 15%, 13%, 10%, and 9%.

[Chem. 167]

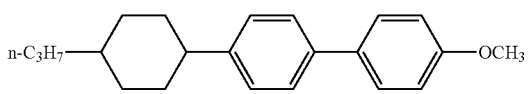

(L-5.5)

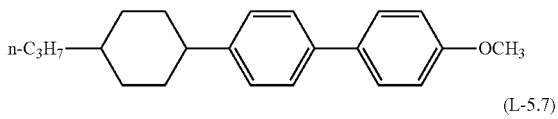

(L-5.6)

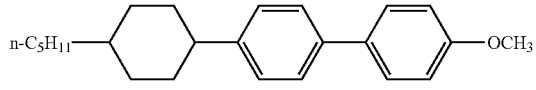

(L-5.7)

The compound represented by General Formula (L-6) is the following compound.

[Chem. 168]

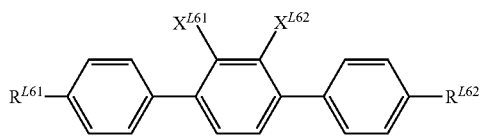

(L-6)

In the formula, $R^{L61}$ and $R^{L62}$ each independently represent the same meanings as those of $R^{L1}$ and $R^{L2}$ in General Formula (L), $X^{L61}$ and $X^{L62}$ each independently represent a hydrogen atom or a fluorine atom.

It is preferable that $R^{L61}$, and $R^{L62}$ each independently represent an alkyl group having 1 to 5 carbon atoms or an alkenyl group having 2 to 5 carbon atoms, and it is preferable that one of $X^{L61}$ and $X^{L62}$ is a fluorine atom and the other one is a hydrogen atom.

The compound represented by General Formula (L-6) can be used alone, or two or more compounds can be used in combination. There are no particular restrictions on the kinds of compounds that can be combined, but those are used in appropriate combinations according to the required properties such as solubility at low temperatures, transition temperatures, electrical reliability, and birefringence. The kind of the compound used is, for example, one kind, two kinds, three kinds, four kinds, and five kinds or more, as one embodiment of the present invention.

The lower limit value of the preferable content of the compound represented by Formula (N-6) with respect to the total amount of the composition of the present invention is 1%, 2%, 3%, 5%, 7%, 10%, 14%, 16%, 20%, 23%, 26%, 30%, 35%, and 40%. The upper limit value of the preferable content of the compound represented by Formula (L-6) with respect to the total amount of the composition of the present invention is 50%, 40%, 35%, 30%, 20%, 15%, 10%, and 5%. In a case where an increase in Δn is regarded as important, it is preferable to increase the content, and in a case where the precipitation at low temperature is regarded as important, it is preferable to decrease the content.

The compound represented by General Formula (L-6) is preferably a compound represented by Formula (L-6.1) to Formula (L-6.9).

[Chem. 169]

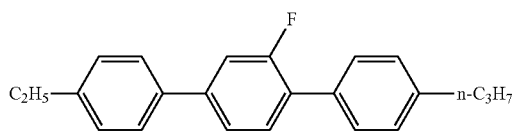

(L-6.1)

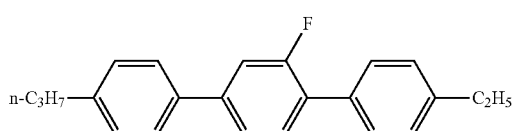

(L-6.2)

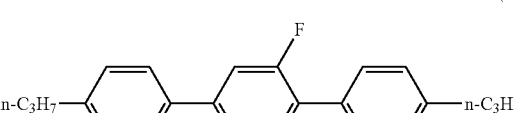

(L-6.3)

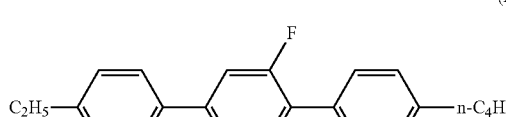

(L-6.4)

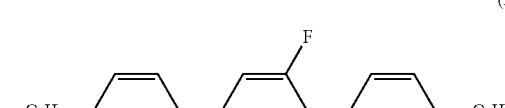

(L-6.5)

-continued (L-6.6)
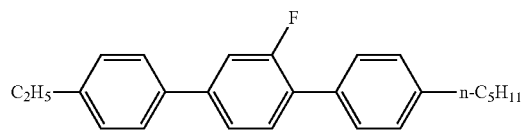

(L-6.7)
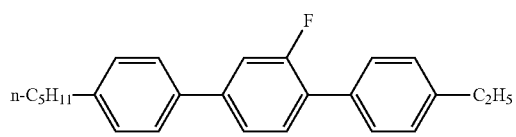

(L-6.8)
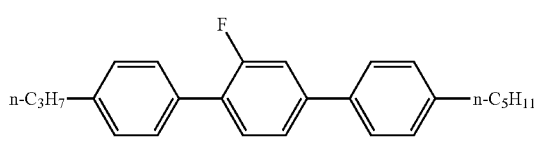

(L-6.9)
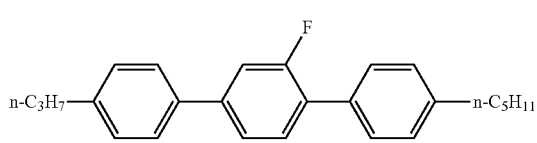

There are no particular restrictions on the kinds of compounds that can be combined, but one to three kinds of these compounds are preferably contained, and more preferably one to four kinds. Further, since the wide molecular weight distribution of the selected compound is also effective for the solubility, for example, it is preferable to select and appropriately combine one kind of the compound represented by Formula (L-6.1) or (L-6.2), Formula (L-6.4) or one kind of the compound represented by Formula (L-6.5), one kind of the compound represented by Formula (L-6.6) or Formula (L-6.7), and one kind of the compound represented by Formula (L-6.8) or (L-6.9). Among them, it is preferable to contain the compounds represented by Formula (L-6.1), Formula (L-6.3), Formula (L-6.4), Formula (L-6.6), and Formula (L-6.9).

Further, the compound represented by General Formula (L-6) is preferably, for example, a compound represented by Formula (L-6.10) to Formula (L-6.17), and among them, a compound represented by Formula (L-6.11).

[Chem. 170]

(L-6.10)
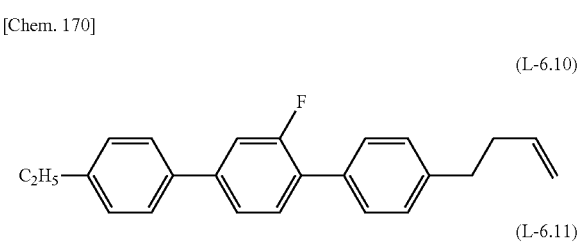

(L-6.11)
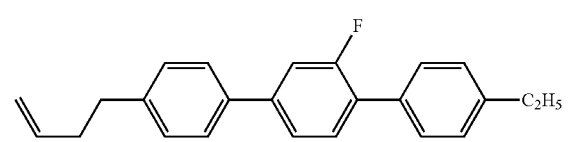

-continued (L-6.12)
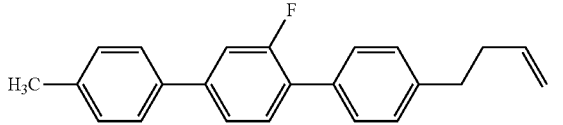

(L-6.13)
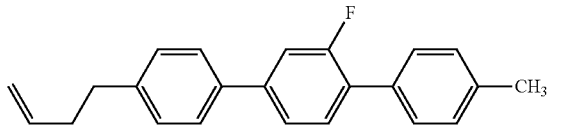

(L-6.14)
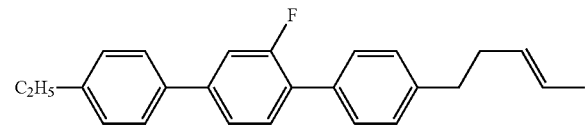

(L-6.15)
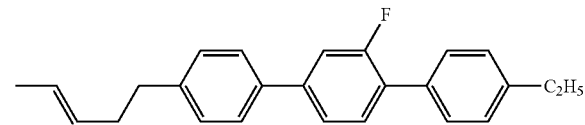

(L-6.16)
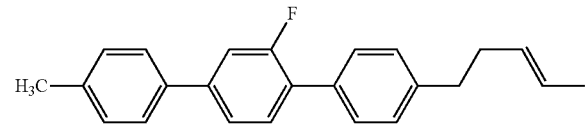

(L-6.17)
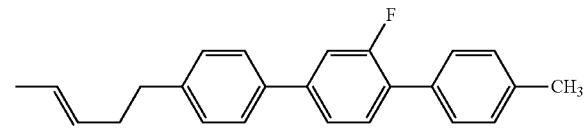

The lower limit value of the preferable content of these compounds with respect to the total amount of the composition of the present invention is 1%, 2%, 3%, 5%, and 7%. The upper limit value of the preferable contents of these compounds is 20%, 15%, 13%, 10%, and 9%.

The compound represented by General Formula (L-7) is the following compound.

[Chem. 171]

(L-7)
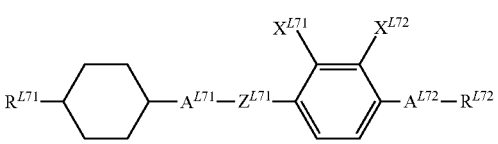

In the formula, $R^{L71}$ and $R^{L72}$ each independently represent the same meanings as those of $R^{L1}$ and $R^{L2}$ in General Formula (L), $A^{L71}$ and $A^{L72}$ each independently represent the same meanings as those of $A^{L2}$ and $A^{L3}$ in General Formula (L), wherein the hydrogen atom on $A^{L71}$ and $A^{L72}$ may be each independently substituted with a fluorine atom, $Z^{L71}$ represents the same meaning as that of $Z^{L2}$ in General Formula (L), $X^{L71}$, and $X^{L72}$ each independently represent a fluorine atom or a hydrogen atom.

In the formula, $R^{L7}$ and $R^{L72}$ are each independently preferably an alkyl group having 1 to 5 carbon atoms, an alkenyl group having 2 to 5 carbon atoms, or an alkoxy group having 1 to 4 carbon atoms, $A^{L71}$ and $A^{L72}$ are each independently preferably a 1,4-cyclohexylene group or a 1,4-phenylene group, wherein the hydrogen atom on $A^{L71}$ and $A^{L72}$ may be each independently substituted with a fluorine atom, $Z^{L71}$ is preferably a single bond or —COO—, and is more preferably a single bond, and $X^{L71}$ and $X^{L72}$ are preferably a hydrogen atom.

There are no particular restrictions on the kinds of compounds that can be combined, but those are combined according to the required properties such as solubility at low temperatures, transition temperatures, electrical reliability, and birefringence. The kind of the compound used is, for example, one kind, two kinds, three kinds, and four kinds, as one embodiment of the present invention.

In the composition of the present invention, the content of the compound represented by General Formula (L-7) is necessary to be appropriately adjusted according to required properties such as such as solubility at low temperatures, transition temperatures, electrical reliability, birefringence, process compatibility, dripping marks, image sticking, and dielectric anisotropy.

The lower limit value of the preferable content of the compound represented by Formula (L-7) with respect to the total amount of the composition of the present invention is 1%, 2%, 3%, 5%, 7%, 10%, 14%, 16%, and 20%. The upper limit value of the preferable content of the compound represented by Formula (L-7) with respect to the total amount of the composition of the present invention is 30%, 25%, 23%, 20%, 18%, 15%, 10%, and 5%.

In a case where the embodiment having high Tni is desired for the composition of the present invention, the content of the compound represented by Formula (L-7) is preferably increased, and in a case where the embodiment having low viscosity is desired, the content is preferably decreased.

Further, the compound represented by General Formula (L-7) is preferably a compound represented by Formula (L-7.1) to Formula (L-7.4) and is preferably a compound represented by Formula (L-7.2).

[Chem. 172]

(L-7.1)

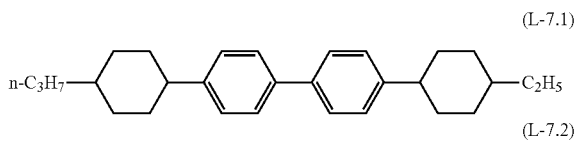

(L-7.2)

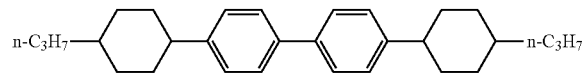

(L-7.3)

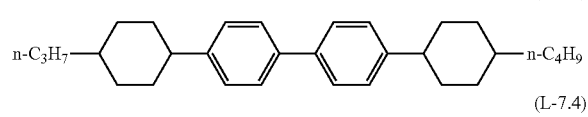

(L-7.4)

(L-7.11) to Formula (L-7.13) and is preferably a compound represented by Formula (L-7.11).

[Chem. 173]

(L-7.11)

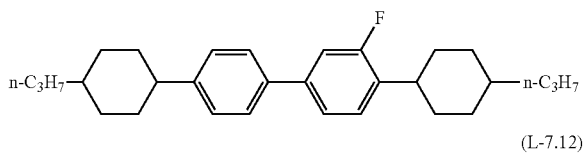

(L-7.12)

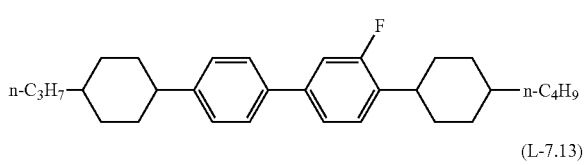

(L-7.13)

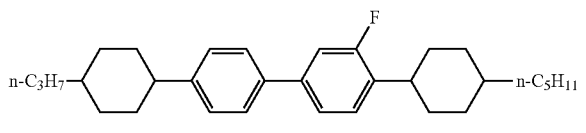

Further, the compound represented by General Formula (L-7) is a compound represented by Formula (L-7.21) to Formula (L-7.23). It is preferable a compound represented by Formula (L-7.21).

[Chem. 174]

(L-7.21)

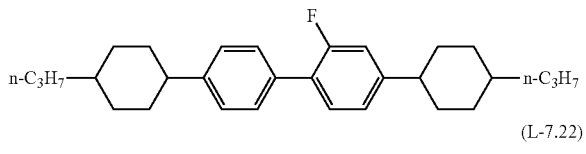

(L-7.22)

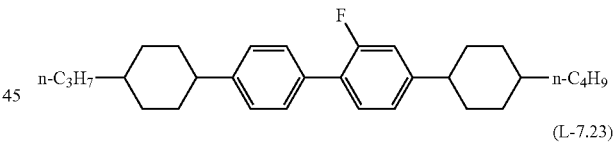

(L-7.23)

Further, the compound represented by General Formula (L-7) is preferably a compound represented by Formula (L-7.31) to Formula (L-7.34), and is preferably a compound represented by Formula (L-7.31) or/and Formula (L-7.32).

[Chem. 175]

(L-7.31)

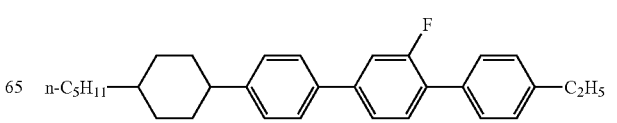

Further, the compound represented by General Formula (L-7) is preferably a compound represented by Formula (L-7.32)

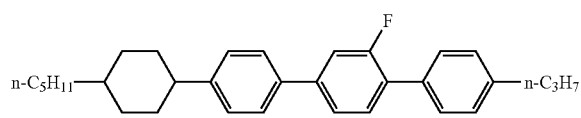

(L-7.33)

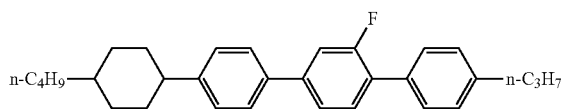

(L-7.34)

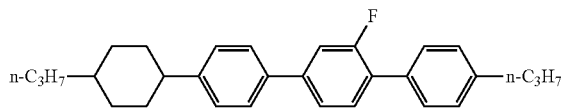

Further, the compound represented by General Formula (L-7) is preferably a compound represented by Formula (L-7.41) to Formula (L-7.44), and is preferably a compound represented by Formula (L-7.41) or/and Formula (L-7.42).

[Chem. 176]

(L-7.41)

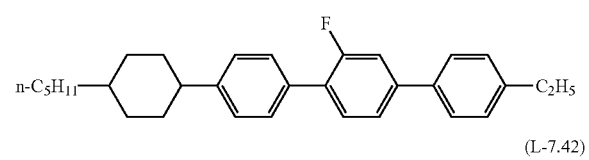

(L-7.42)

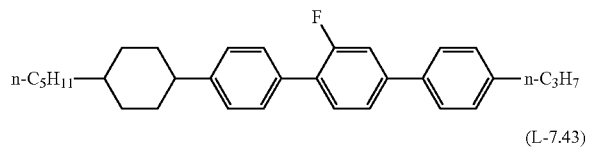

(L-7.43)

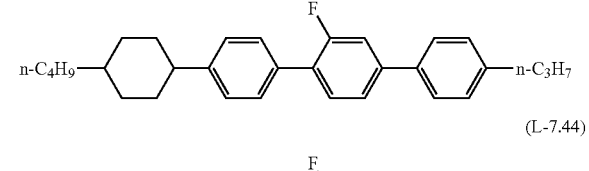

(L-7.44)

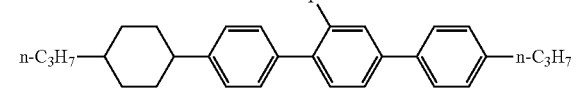

Further, the compound represented by General Formula (L-7) is preferably a compound represented by Formula (L-7.51) to Formula (L-7.53).

[Chem. 177]

(L-7.51)

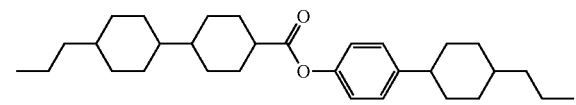

(L-7.52)

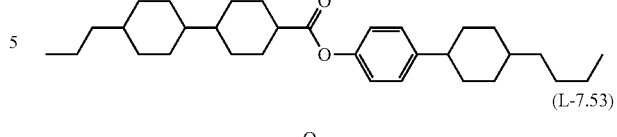

(L-7.53)

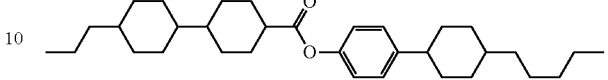

The liquid crystal composition according to the present invention contains a polymerizable monomer and a spontaneously aligning monomer represented by General Formula (I), and may be used in combination with other polymerizable compounds. That is, the liquid crystal composition according to the present invention preferably further contains a polymerizable compound represented by General Formula (II).

Examples of the other polymerizable compounds preferably include polymerizable compounds represented by General Formula (II):

[Chem. 178]

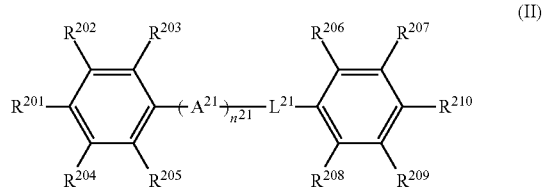

In the formula, $R^{201}$, $R^{202}$, $R^{203}$, $R^{204}$, $R^{205}$, $R^{206}$, $R^{207}$, $R^{208}$, $R^{209}$, and $R^{210}$ each independently represent any of $P^{21}$—$S^{22}$—, an alkyl group having 1 to 18 carbon atoms which may be substituted with a fluorine atom, an alkoxy group having 1 to 18 carbon atoms which may be substituted with a fluorine atom, a fluorine atom, and a hydrogen atom, $P^{21}$ represents any of (R-I) to (R-IX) in General Formula (I), $S^{21}$ represents a single bond or an alkylene group having 1 to 15 carbon atoms, and one or two or more —$CH_2$—'s in the alkylene group may be substituted with —O—, —OCO—, or —COO— so that an oxygen atom is not directly adjacent thereto, $n^{21}$ represents 0, 1, or 2, $A^{21}$ represents a group selected from the group consisting of (a) 1,4-cyclohexylene group (one —$CH_2$— or two or more non-adjacent —$CH_2$—'s present in this group may be substituted with —O—), (b) 1,4-phenylene group (one —CH═ or two or more non-adjacent —CH═'s present in this group may be substituted with —N═), and (c) naphthalene-2,6-diyl group, 1,2,3,4-tetrahydronaphthalene-2,6-diyl group, or decahydronaphthalene-2,6-diyl group (one —CH═ or two or more non-adjacent —CH═'s present in the naphthalene-2,6-diyl group or the 1,2,3,4-tetrahydronaphthalene-2,6-diyl group may be substituted with —N═), the group (a), the group (b), and the group (c) may be each independently substituted with an alkyl group having 1 to 12 carbon atoms, an alkoxy group having 1 to 12 carbon atoms, a halogen group, a cyano group, a nitro group, or $P^{21}$—$S^1$—, at least two or more $P^{21}$—$S^{21}$— are included in one molecule of General Formula (II), $L^{21}$ represents a single bond, —$OCH_2$—, —$CH_2O$—, —$C_2H_4$—, —$OC_2H_4O$—, —COO—, —OCO—, —CH═$CR^a$—COO—, —CH═CR$^a$—OCO—, —COO—CR$^a$═CH—, —OCO—CR$^a$═CH—, —(CH$_2$)$_z$—COO—, —(CH$_2$)$_z$—OCO—, —OCO—(CH$_2$)$_z$—, —COO—(CH$_2$)$_z$—, —CH═CH—, —CF$_2$O—, —OCF$_2$—, or —C≡C—, wherein R$^a$'s each independently represent a hydrogen atom or an alkyl group having 1 to 3 carbon atoms, and in the formula, z's each independently represent an integer of 1 to 4, wherein in a case where there is a plurality of P$^{21}$'s, S$^{21}$'s, and A$^{21}$'s, those may be the same as or different from each other, here, the compound represented by General Formula (I) is excluded.

The liquid crystal composition containing the polymerizable compound represented by General Formula (I) and the polymerizable compound represented by General Formula (II) is effective from the viewpoint that the occurrence of display failure can be further reduced.

In General Formula (II), it is preferable that one or two or more P$^{21}$—S$^{21}$-'s or four or less P$^{21}$—S$^{21}$-'s are included in one molecule of the compound represented by General Formula (II), the number of P$^{21}$—S$^{21}$-'s present in one molecule of the compound represented by General Formula (II) is preferably 1 to 4, and is more preferably 1 to 3, and the number of P$^{21}$—S$^{21}$-'s in the molecule of the compound represented by General Formula (II) is particularly preferably 2 or 3.

That is, the compound represented by General Formula (II) has a structure in which two benzene rings and, if necessary, a ring A$^{21}$ are linked, and these two benzene rings and the ring A$^{21}$ have at least one P$^{21}$—S$^{21}$—, and therefore, the compound represented by General Formula (II) has an action and effect as a polymerizable compound.

In General Formula (II), one or two or more kinds selected from R$^{201}$, R$^{202}$, R$^{203}$, R$^{204}$, R$^{205}$, R$^{206}$, R$^{207}$, R$^{208}$, R$^{209}$, and R$^{210}$ are P$^{21}$—S$^{21}$—'s, any of R$^{201}$, R$^{202}$, R$^{204}$, R$^{207}$, R$^{209}$, and R$^{210}$ is preferably one or two or more kinds of P$^{21}$—S$^{21}$—'s, and R$^{201}$ and R$^{210}$ are more preferably P$^{21}$—S$^{21}$—'s.

In General Formula (II), R$^{201}$ and R$^{210}$ are each independently P$^{21}$—S$^{21}$—, and in this case, R$^{20}$ and R$^{210}$ may be the same P$^{21}$—S$^{21}$— or different P$^{21}$—S$^{21}$—.

In General Formula (II), R$^{201}$, R$^{202}$, R$^{203}$, R$^{204}$, R$^{205}$, R$^{206}$, R$^{207}$, R$^{208}$, R$^{209}$, and R$^{210}$ each independently represent any of P$^{21}$—S$^{21}$—, an alkyl group having 1 to 18 carbon atoms, which may be substituted with a fluorine atom, an alkoxy group having 1 to 18 carbon atoms, which may be substituted with a fluorine atom, a fluorine atom, or a hydrogen atom, and in this case, the number of preferable carbon atoms of the alkyl group and the alkoxy group is 1 to 16, is more preferably 1 to 10, is still more preferably 1 to 8, is further still more preferably 1 to 6, is even more preferably 1 to 4, and is particularly preferably 1 to 3. In addition, the alkyl group and the alkoxy group may be linear or branched, and the linear shape is particularly preferable.

In General Formula (II), R$^{202}$, R$^{203}$, R$^{204}$, R$^{205}$, R$^{206}$, R$^{207}$, R$^{208}$, and R$^{209}$ are each independently preferably P$^{21}$—S$^{21}$—, an alkyl group having 1 to 3 carbon atoms, a fluorine atom, or a hydrogen atom, P$^{22}$—S$^{21}$—, more preferably a fluorine atom or a hydrogen atom, and are still more preferably a fluorine atom a fluorine atom or a hydrogen atom.

P$^{21}$ is preferably Formula (R-1), is more preferably an crylic group or a methacrylic group, and is still more preferably a methacrylic group.

S$^{21}$ is preferably a single bond or an alkylene group having 1 to 3 carbon atoms, and is more preferably a single bond.

In General Formula (II), n$^{21}$ is preferably 0 or 1.

In General Formula (II), A$^{21}$ is preferably a 1,4-phenylene group or a naphthalene-2,6-diyl group, and is more preferably a 1,4-phenylene group.

In General Formula (II), L$^{21}$ is preferably a single bond, —OCH$_2$—, —CH$_2$O—, —C$_2$H$_4$—, —COO—, —OCO—, —CH═CH—COO—, —CH═CH—OCO—, —COO—CH═CH—, —OCO—CH═CH—, —C$_2$H$_4$—COO—, —C$_2$H$_4$—OCO—, —OCO—C$_2$H$_4$—, —COO—C$_2$H$_4$—, —CH═CH—, —CF$_2$O—, —OCF$_2$—, or —C≡C—.

The content of the polymerizable compound represented by General Formula (II) is 0.01% to 5% by mass, and the lower limit of the content is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.15% by mass, preferably 0.2% by mass, preferably 0.25% by mass, preferably 0.3% by mass, preferably 0.35% by mass, preferably 0.4% by mass, preferably 0.5% by mass, and preferably 0.55% by mass, and the upper limit of the content is preferably 4.5% by mass, preferably 4% by mass, preferably 3.5% by mass, preferably 3% by mass, preferably 2.5% by mass, preferably 2% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, and preferably 0.55% by mass.

With respect to the entire content (100% by mass) of the liquid crystal composition according to the present invention, the upper limit value of the total content of the polymerizable compound General Formula (I) and General Formula (II) is preferably 6% by mass, preferably 5.8% by mass, preferably 5.5% by mass, preferably 5.2% by mass, preferably 5% by mass, preferably 4.8% by mass, preferably 4.6% by mass, preferably 4.4% by mass, preferably 4.2% by mass, preferably 4% by mass, preferably 3.5% by mass, preferably 3% by mass, preferably 2.5% by mass, preferably 2% by mass, 1.5% by mass, 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, and preferably 0.55% by mass.

The lower limit value of the total content is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.15% by mass, preferably 0.2% by mass, preferably 0.25% by mass, preferably 0.3% by mass, preferably 0.35% by mass, preferably 0.4% by mass, and preferably 0.5% by mass.

The compound represented by General Formula (II) according to the present invention is preferably a polymerizable compound represented by General Formula (IV).

[Chem. 179]

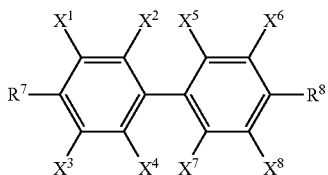
(IV)

In General Formula (IV), $R^7$ and $R^8$ each independently represent any of Formula (R-1) to Formula (R-9), X1 to X8 each independently represent a trifluoromethyl group, a fluorine atom, or a hydrogen atom.

In General Formula (IV), $R^7$ and $R^8$ are each independently a methacrylic group or an acrylic group.

The compound represented by General Formula (IV) is more preferably one or two or more kinds from the group consisting of Formula (IV-11) to Formula (IV-15), and is particularly preferably Formula (IV-11).

[Chem. 180]

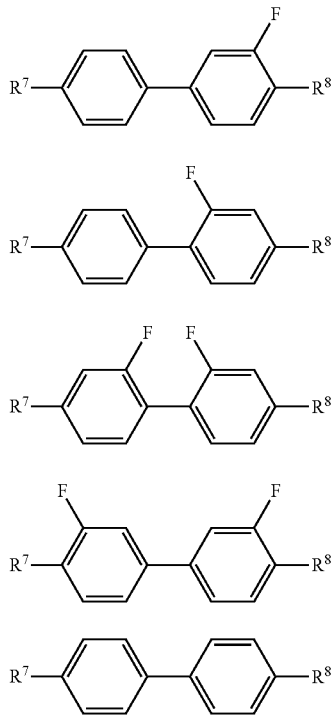

In a case of using the combination of the polymerizable compound represented by Formula (IV-11) to Formula (IV-15) with the polymerizable compound represented by General Formula (I), a better alignment state can be obtained.

Specifically, the compound represented by General Formula (II) according to the present invention is preferably, for example, a compound represented by Formula (XX-1) to General Formula (XX-13), and is more preferably a compound represented by Formula (XX-1) to Formula (XX-7).

[Chem. 181]

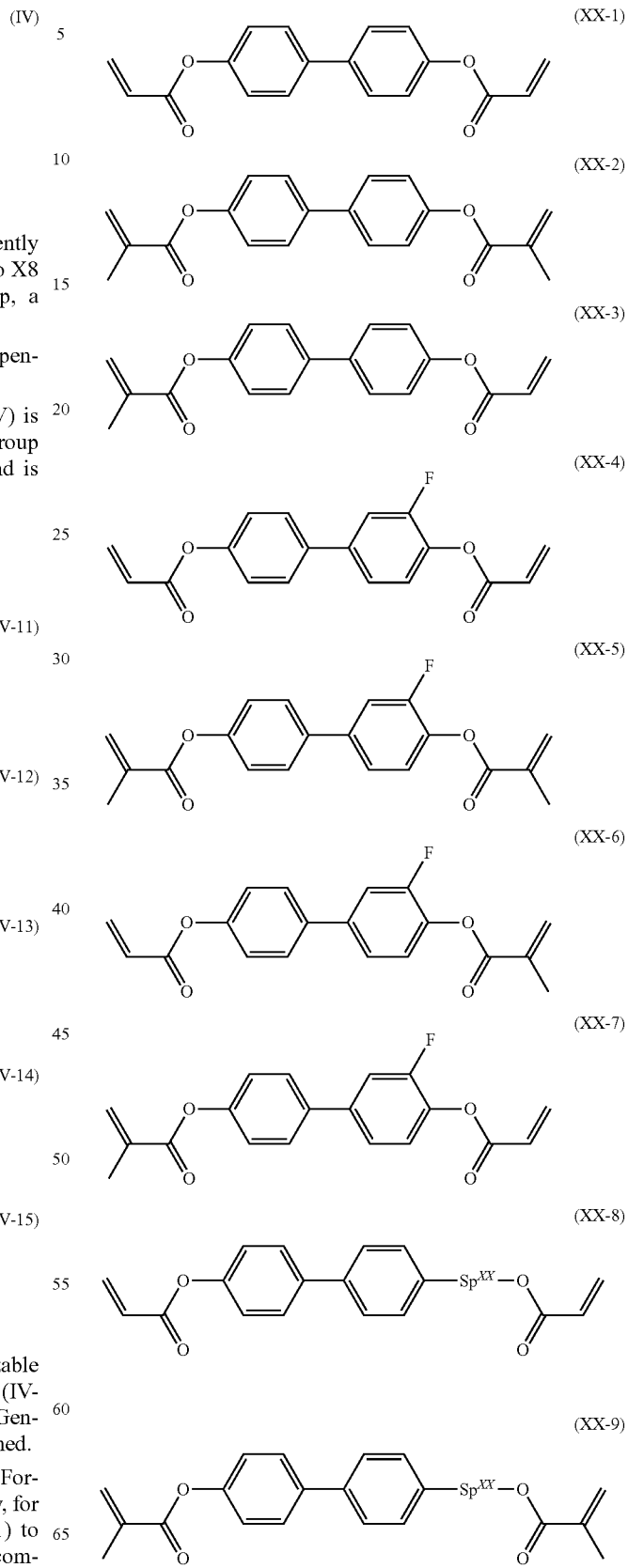

165
-continued (XX-10)
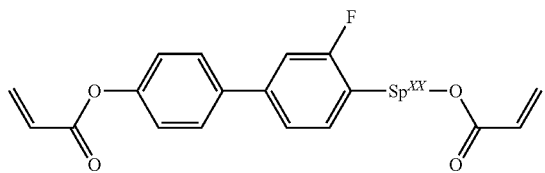

(XX-11)
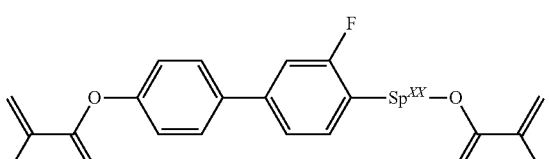

(XX-12)
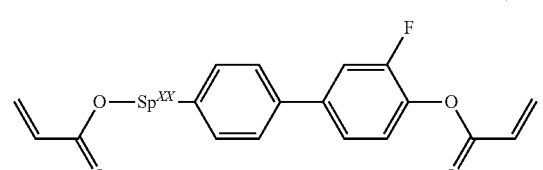

(XX-13)
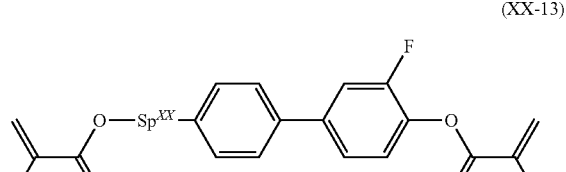

In Formula (XX-1) to General Formula (XX-13), $Sp^{xx}$- represents an alkylene group having 1 to 8 carbon atoms or —O—$(CH_3)_s$—, wherein, s represents an integer of 1 to 7, and an oxygen atom is bonded to a ring.

In Formula (XX-1) to General Formula (XX-13), a hydrogen atom in a 1,4-phenylene group may be further substituted with any of —F, —Cl, —$CF_3$, —$CH_3$, or Formula (R-1) to Formula (R-15).

In addition, the compound represented by General Formula (II) is preferably, for example, a polymerizable compound represented by Formula (M1) to Formula (M18).

[Chem. 182]

(M1)
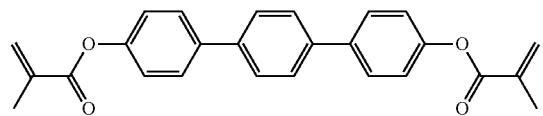

(M2)
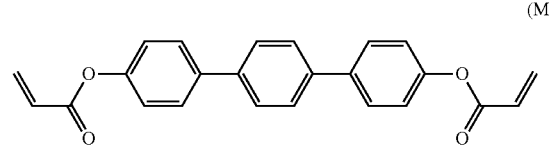

166
-continued (M3)
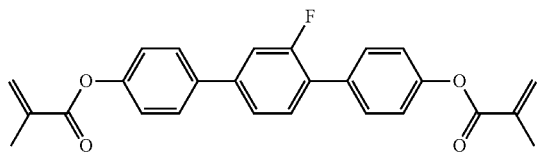

(M4)
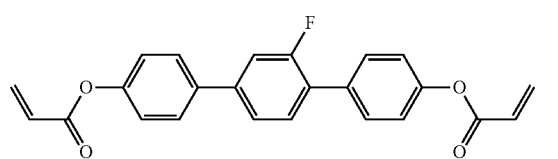

(M5)
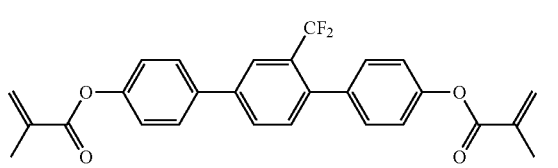

(M6)
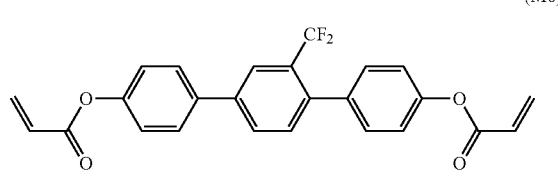

(M7)
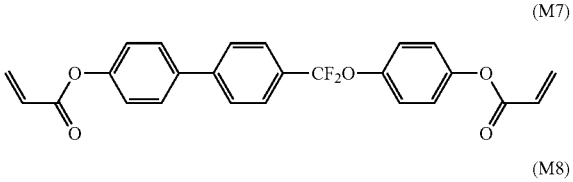

(M8)
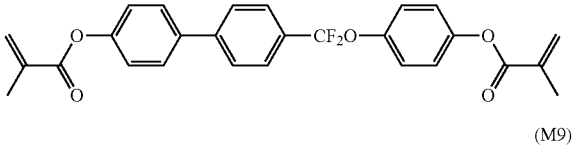

(M9)
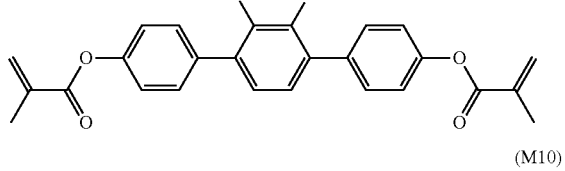

(M10)
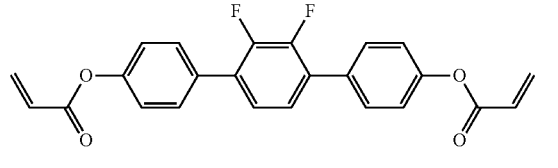

(M11)
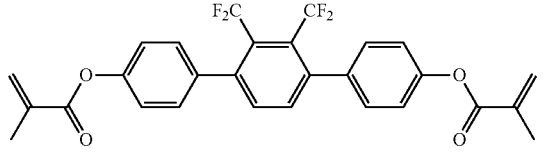

(M12)
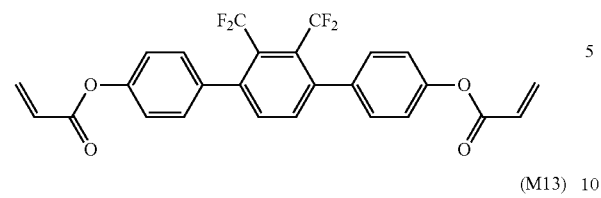
(M13)
(M14)
(M15)
(M16)
(M17)
(M18)
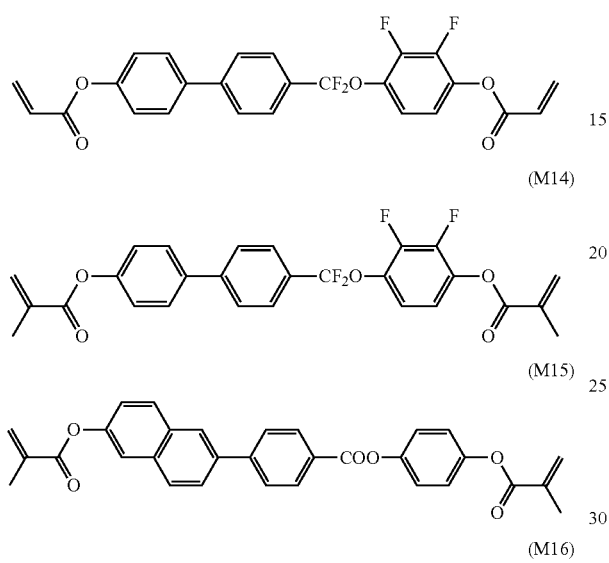
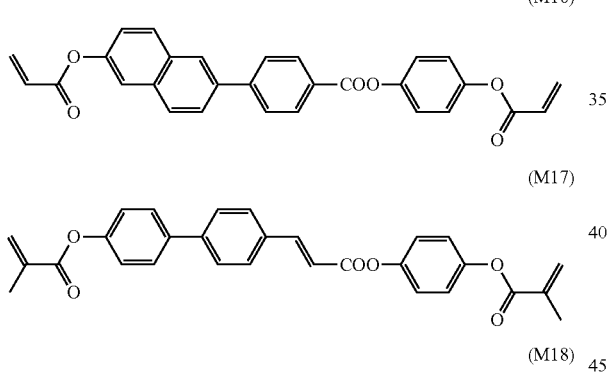
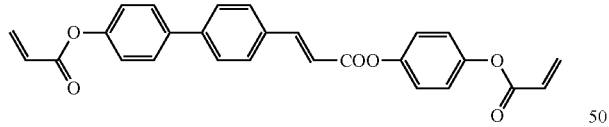
In addition, polymerizable compounds represented by Formula (M19) to Formula (M34) are also preferable.
[Chem. 183]
(M19)
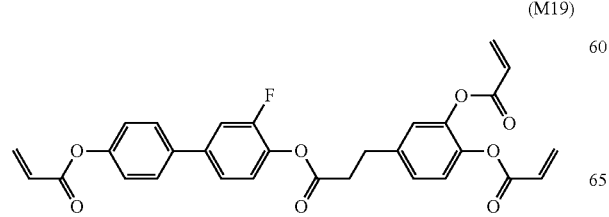
(M20)
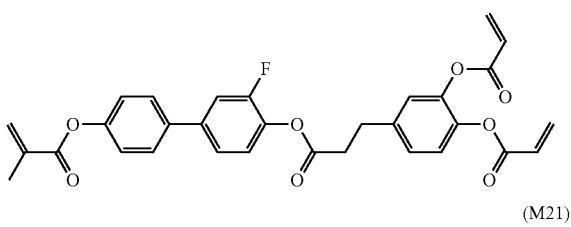
(M21)
(M22)
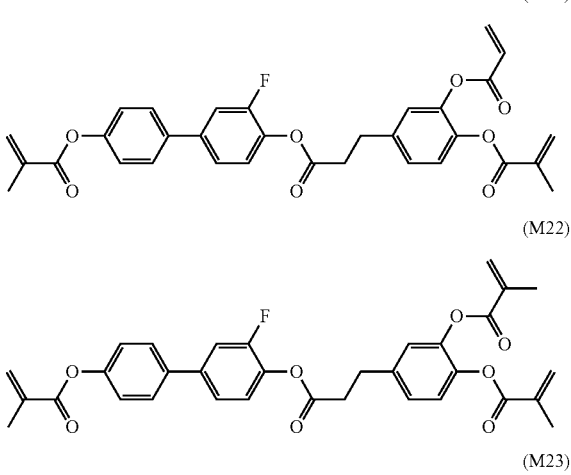
(M23)
(M24)
(M25)
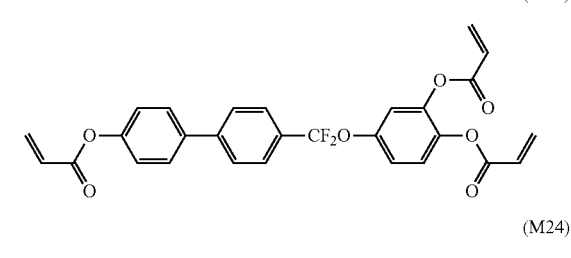
(M26)
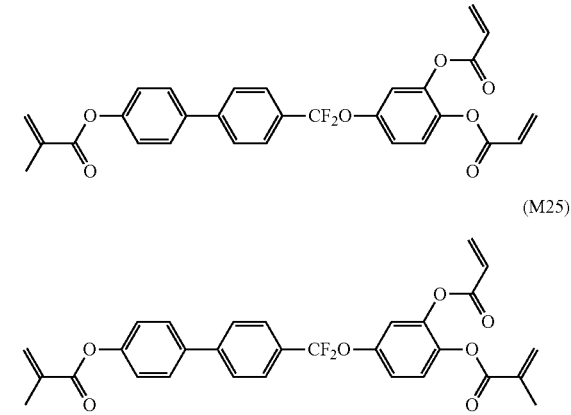

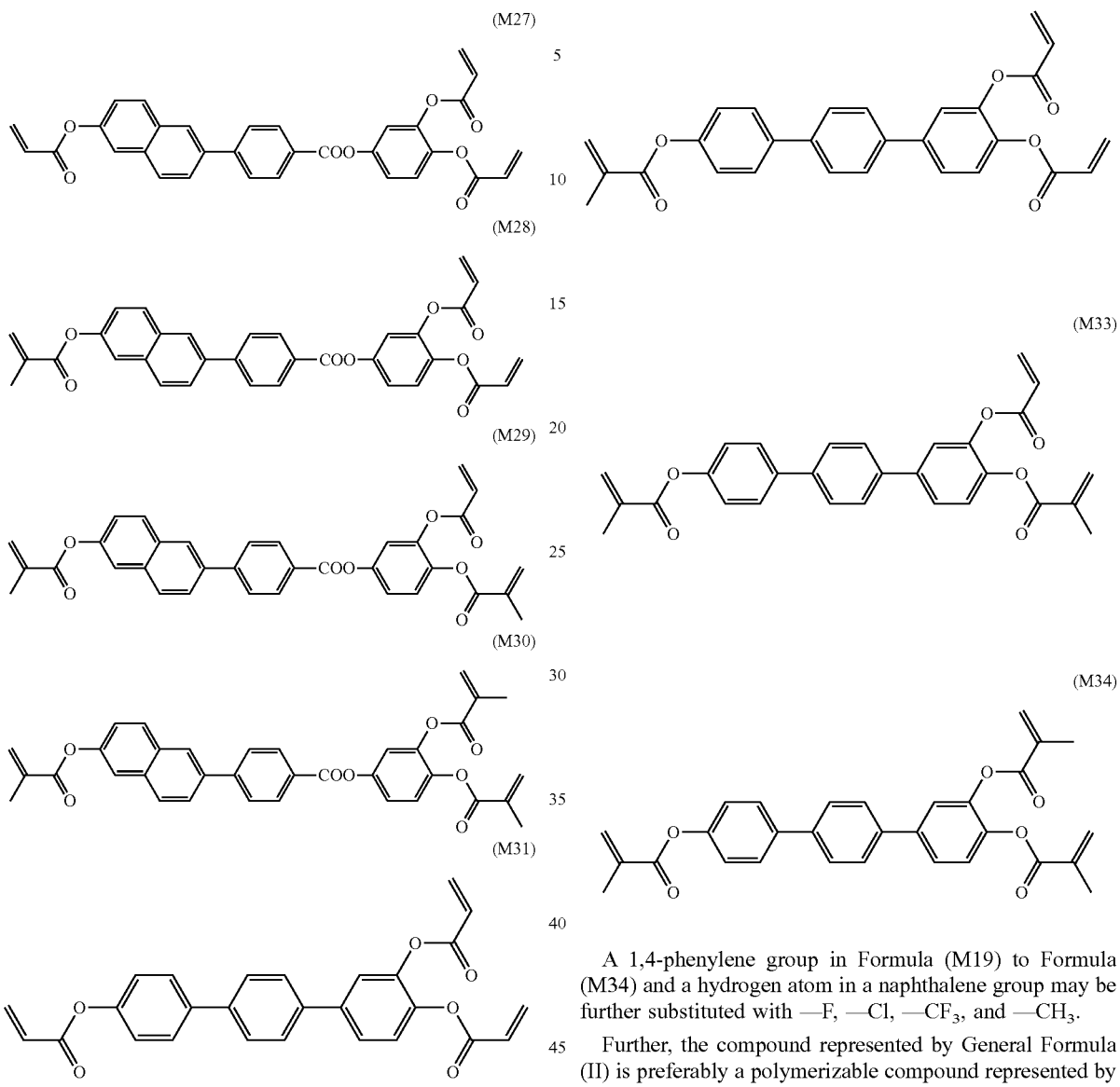
A 1,4-phenylene group in Formula (M19) to Formula (M34) and a hydrogen atom in a naphthalene group may be further substituted with —F, —Cl, —CF$_3$, and —CH$_3$.
Further, the compound represented by General Formula (II) is preferably a polymerizable compound represented by Formula (M35) to Formula (M65).
[Chem. 185]
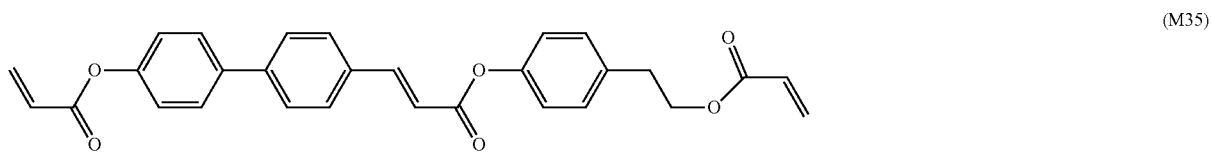
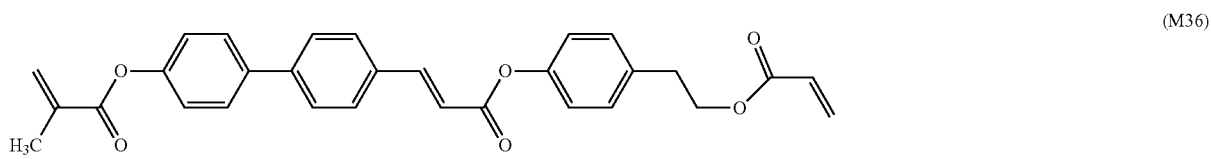

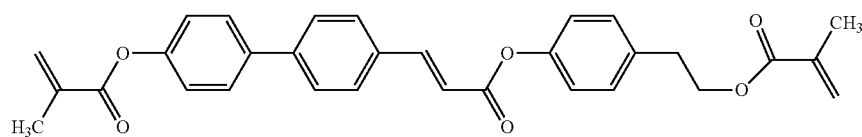
(M37)
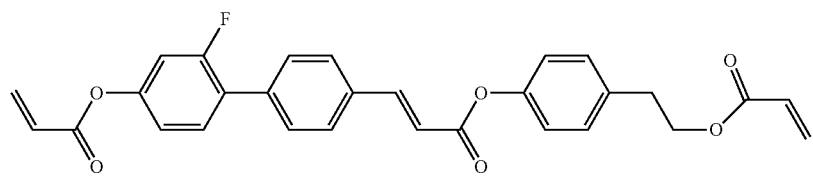
(M38)
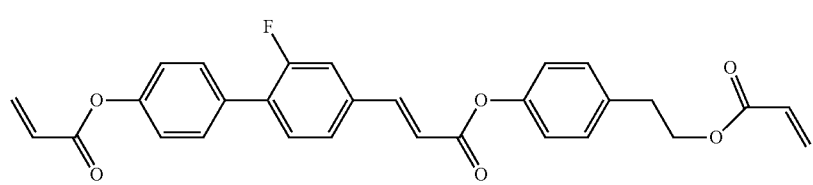
(M39)
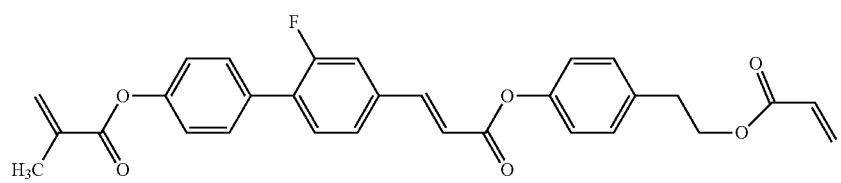
(M40)
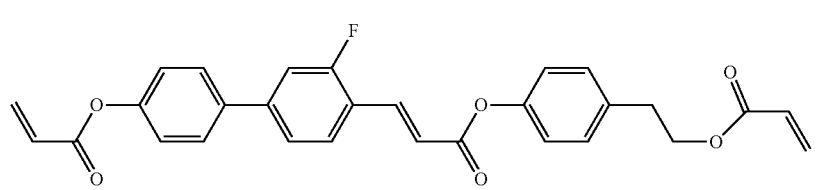
(M41)
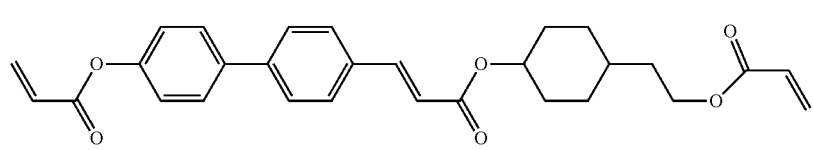
(M42)
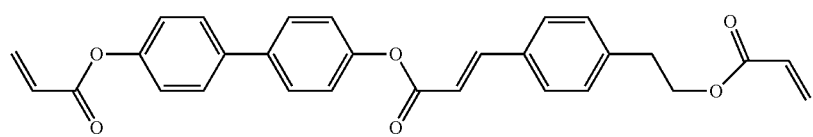
(M43)
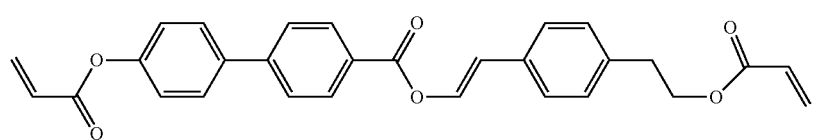
(M44)
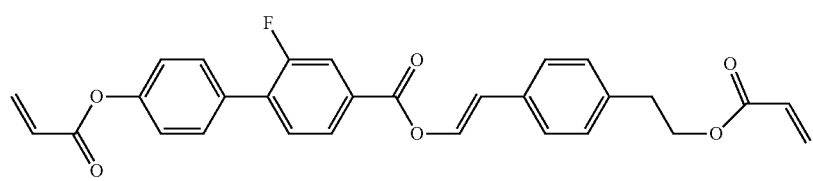
(M45)

(M46)
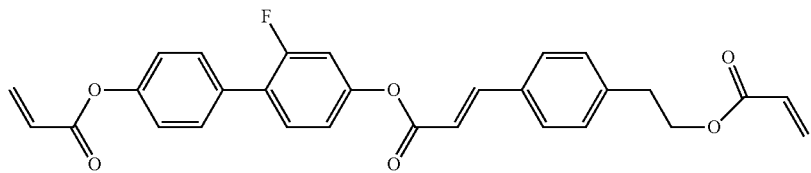
(M47)
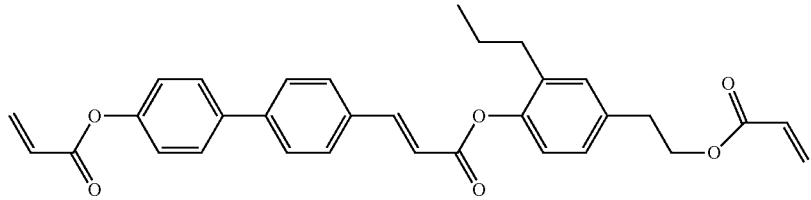
[Chem. 186]
(M48)
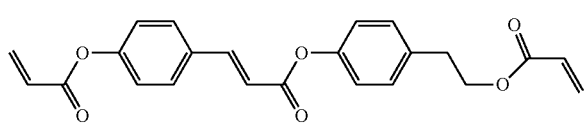
(M49)
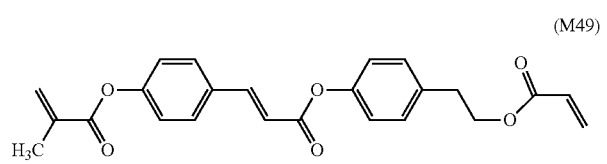
(M50)
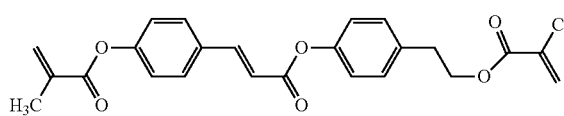
(M51)
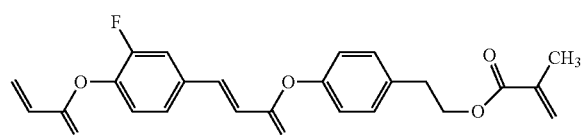
(M52)
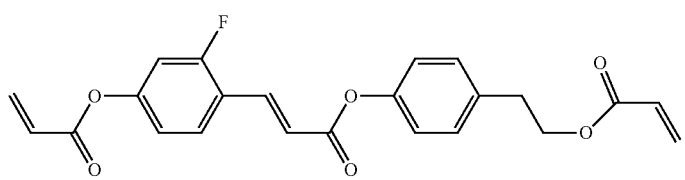
[Chem. 187]
(M53)
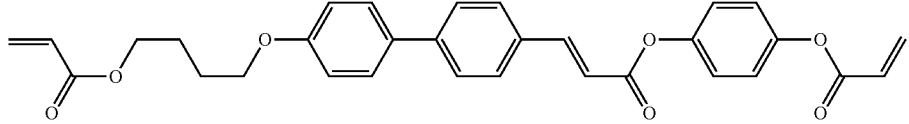
(M54)
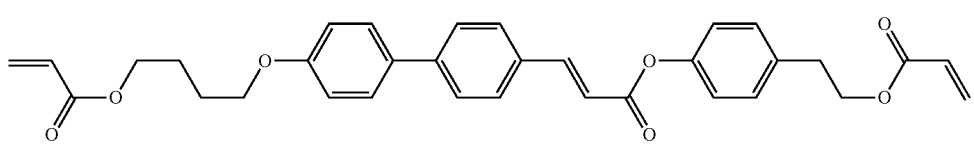
(M55)
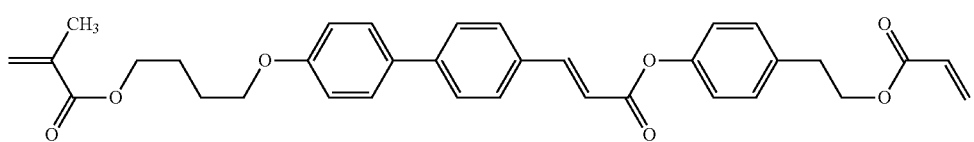
(M56)
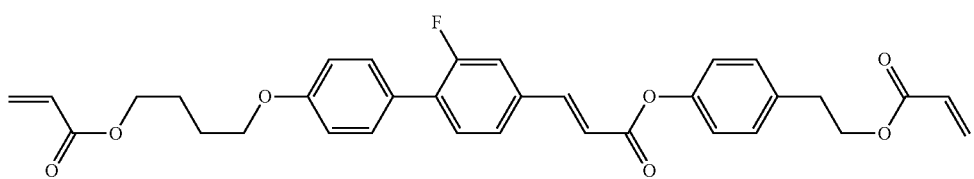

-continued
(M57)
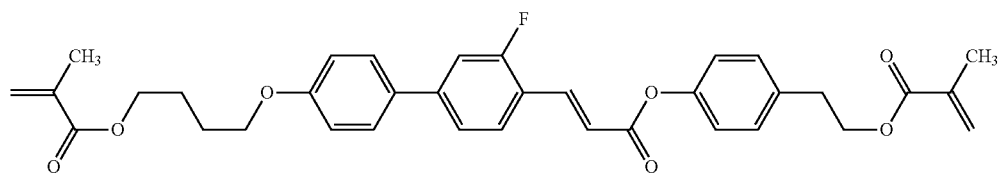
[Chem. 188]
(M58)
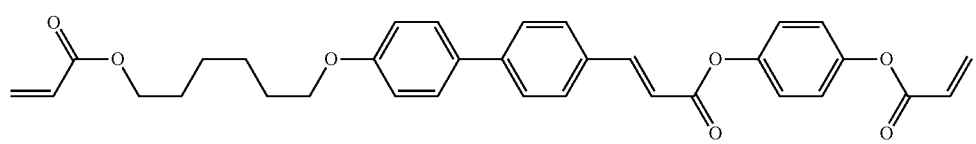
(M59)
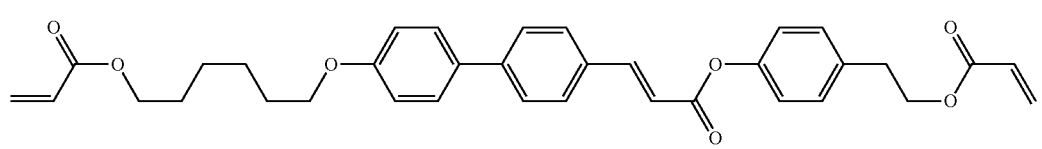
(M60)
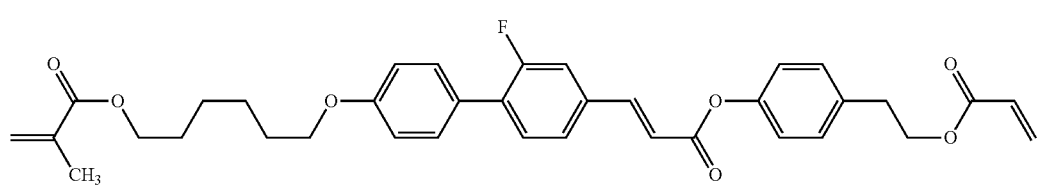
(M61)
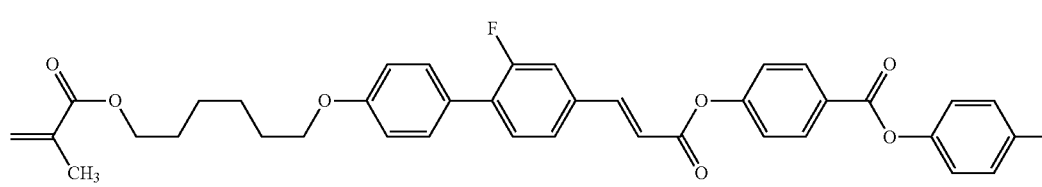
[Chem. 189]
(M62)
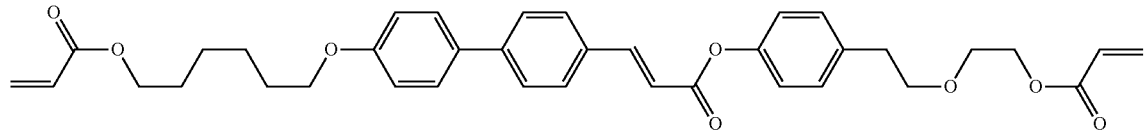
(M63)
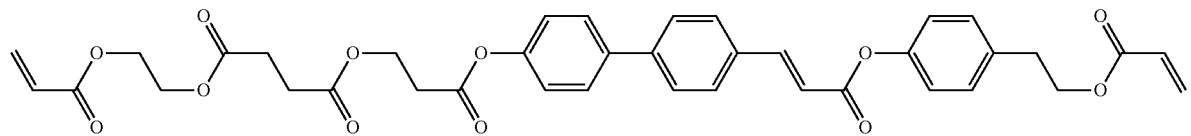
(M64)
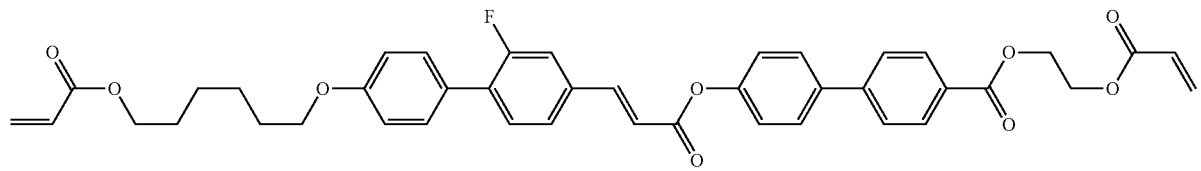
(M65)
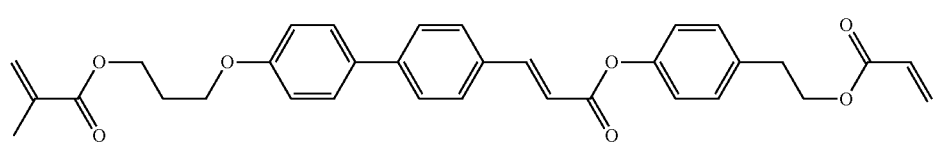

In the liquid crystal composition according to the present invention, the content of the polymerizable compound represented by Formula (M1) to Formula (M65) with respect to the total amount of the liquid crystal compositions is 0.01% to 5% by mass, and the lower limit of the content is preferably 0.02% by mass, is preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.15% by mass, preferably 0.2% by mass, preferably 0.25% by mass, preferably 0.3% by mass, preferably 0.35% by mass, preferably 0.4% by mass, preferably 0.5% by mass, preferably 0.55% by mass, and the upper limit of the content is preferably 4.5% by mass, preferably 4% by mass, preferably 3.5% by mass, preferably 3% by mass, preferably 2.5% by mass, preferably 2% by mass, preferably 1.5% by mass, preferably 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, and preferably 0.55% by mass.

The liquid crystal composition of the present invention may contain a normal nematic liquid crystal, a smectic liquid crystal, a cholesteric liquid crystal, an antioxidant, an ultraviolet absorber, a light stabilizer, or an infrared absorber in addition to the above compounds.

Examples of the antioxidant include hindered phenols represented by General Formula (H-1) to General Formula (H-4).

[Chem. 190]

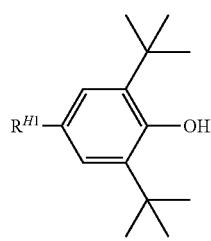
(H-1)

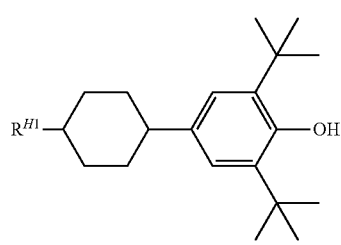
(H-2)

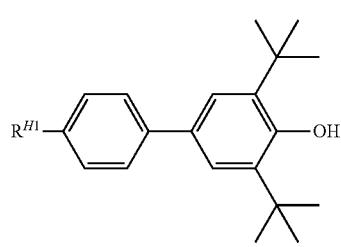
(H-3)

-continued

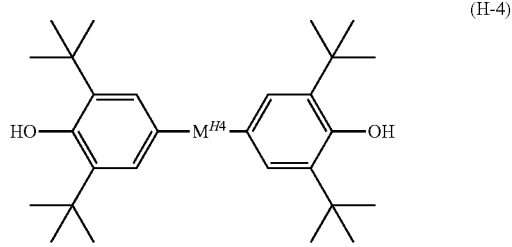
(H-4)

In General Formula (H-1) to General Formula (H-4), $R^{H1}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, wherein one —$CH_2$— or two or more non-adjacent —$CH_2$—'s in the group may be each independently substituted with —O— or —S—, and one or two or more hydrogen atoms present in the group may be each independently substituted with a fluorine atom or a chlorine atom. More specifically, an alkyl group having 2 to 7 carbon atoms, an alkoxy group having 2 to 7 carbon atoms, an alkenyl group having 2 to 7 carbon atoms, or an alkenyloxy group having 2 to 7 carbon atoms is preferable, and an alkyl group having 3 to 7 carbon atoms or an alkenyl group having 2 to 7 carbon atoms is more preferable.

In General Formula (H-4), $M^{H4}$ represents an alkylene group having 1 to 15 carbon atoms (one or two or more —$CH_2$—'s in the alkylene group may be substituted with —O—, —CO—, —COO—, or —OCO— so that an oxygen atom is not directly adjacent thereto), —$OCH_2$—, —$CH_2O$—, —COO—, —OCO—, —$CF_2O$—, —$OCF_2$—, —$CF_2CF_2$—, —CH=CH—COO—, —CH=CH—OCO—, —COO—CH=CH—, —OCO—CH=CH—, —CH=CH—, and —C≡C—, a single bond, a 1,4-phenylene group (any hydrogen atom in the 1,4-phenylene group may be substituted with a fluorine atom), or a trans-1,4-cyclohexylene group, is preferably an alkylene group having 1 to 14 carbon atoms, and from the viewpoint that when considering the volatility, the number of carbon atoms is preferably large; whereas, when considering the viscosity, the number of carbon atoms is preferably not too large, 2 to 12 carbon atoms are more preferable, 3 to 10 carbon atoms are more preferable, 4 to 10 carbon atoms are more preferable, 5 to 10 carbon atoms are more preferable, and 6 to 10 carbon atoms are more preferable.

In General Formula (H-1) to General Formula (H-4), one —CH= or two or more non-adjacent —CH='s in the 1,4-phenylene group may be substituted with —N=. In addition, hydrogen atoms in the 1,4-phenylene group each independently may be substituted with a fluorine atom or a chlorine atom.

In General Formula (H-1) to General Formula (H-4), one —$CH_2$— or two or more non-adjacent —$CH_2$—'s in the 1,4-phenylene group may be substituted with —O— or —S—. In addition, hydrogen atoms in the 1,4-cyclohexylene group each independently may be substituted with a fluorine atom or a chlorine atom.

More specifically, for example, Formulae (H-11) to (H-15) are exemplified.

[Chem. 191]

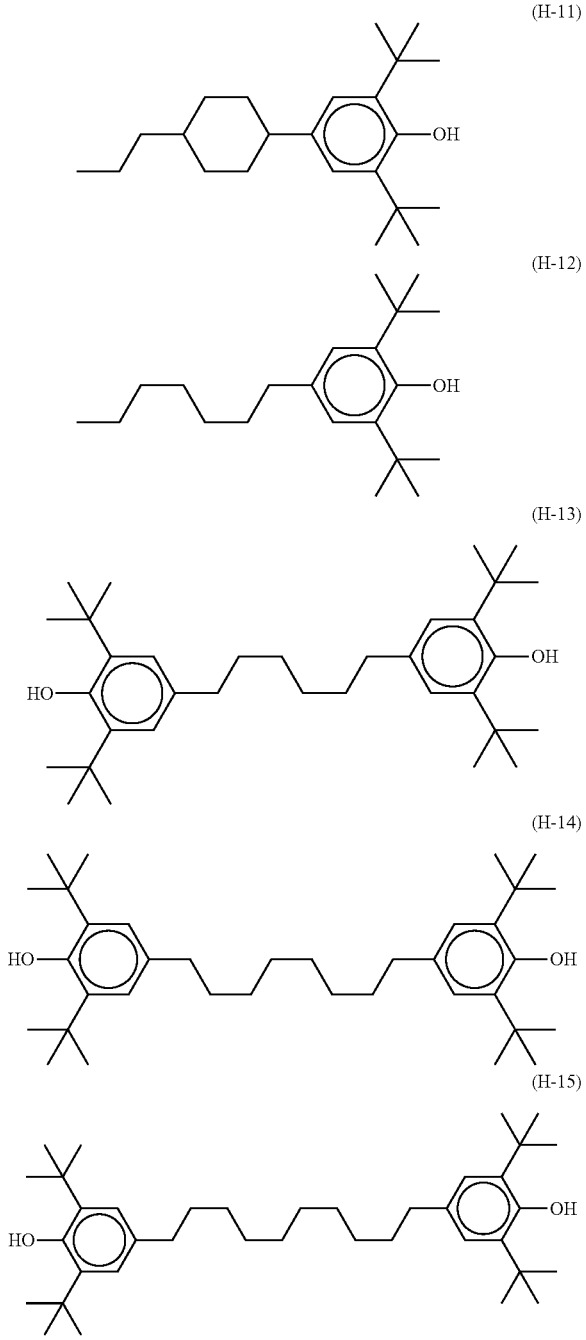

In a case where the antioxidant is contained in the liquid crystal composition of the present invention, 10 mass ppm or more is preferable, 20 mass ppm or more is preferable, and 50 mass ppm or more is preferable. The upper limit in a case of containing the antioxidant, it is 10000 mass ppm, and it is preferably 1000 mass ppm, is preferably 500 mass ppm, and is preferably 100 mass ppm.

The liquid crystal composition of the present invention has a dielectric anisotropy (Δε) at 20° C. of −2.0 to −8.0, preferably −2.0 to −6.0, more preferably −2.0 to −5.0, and particularly preferably −2.5 to −5.0.

The liquid crystal composition of the present invention has a refractive index anisotropy (Δn) at 20° C. of 0.08 to 0.14, more preferably 0.09 to 0.13, and particularly preferably 0.09 to 0.12. More specifically, it is preferably 0.10 to 0.13 in a case of dealing with a thin cell gap, and preferably 0.08 to 0.10 in a case of dealing with a thick cell gap.

The liquid crystal composition of the present invention has a viscosity (η) at 20° C. of 10 to 50 m Pa·S, which is preferably 10 to 45 m Pa·S, preferably 10 to 40 m Pa·S, preferably 10 to 35 m Pa·S, preferably 10 to 30 m Pa·S, more preferably 10 to 25 m Pa·S, and particularly preferably 10 to 22 m Pa·S.

The liquid crystal composition of the present invention has a rotational viscosity (γ1) at 20° C. of 50 to 160 m Pa·S, which is preferably 55 to 160 m Pa·S, preferably 60 to 160 m Pa·S, preferably 60 to 150 m Pa·S, preferably 60 to 140 m Pa·S, preferably 60 to 130 m Pa·S, preferably 60 to 125 m Pa*S, more preferably 60 to 120 m Pa·S, more preferably 60 to 115 m Pa·S, more preferably 60 to 110 m Pa·S, and particularly preferably 60 to 100 m Pa·S.

The liquid crystal composition of the present invention has a nematic phase-isotropic liquid phase transition temperature (Tni) of is 60° C. to 120° C., which is more preferably 70° C. to 100° C., and particularly preferably 70° C. to 85° C.

For example, in a case where the entire liquid crystal composition according to the present invention shows negative dielectric anisotropy, it is preferable to contain the spontaneously aligning monomer, the polymerizable monomer represented by General Formula (I), one or two or more kinds of the compounds selected from compounds represented by General Formulae (N-1), (N-2), and (N-3), and the compound represented by General Formula (L).

Among the entire liquid crystal compositions according to the present invention, the upper limit value of the proportion of the component composed only of one or two or more kinds of spontaneously aligning monomers, one or two or more kinds of polymerizable monomers represented by General Formula (I), and the compounds represented by General Formula (N-1), General Formula (N-2), General Formula (N-3), and General Formula (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, and 84% by mass.

In addition, among the entire liquid crystal compositions according to the present invention, the lower limit value of the proportion of the component composed only of one or two or more kinds of spontaneously aligning monomers, one or two or more kinds of polymerizable monomers represented by General Formula (I), and the compounds represented by General Formula (N-1), General Formula (N-2), General Formula (N-3), and General Formula (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, and 99% by mass.

Among the entire liquid crystal compositions according to the present invention, the upper limit value of the proportion of the component composed only of one or two or more kinds of spontaneously aligning monomers, one or two or more kinds of polymerizable monomers represented by General Formula (I), and the compounds represented by General Formula (N-1a), General Formula (N-1b), General Formula (N-1c), General Formula (N-1d), General Formula (N-1e), and General Formula (L), and General Formula (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, and 84% by mass.

In addition, among the entire liquid crystal compositions according to the present invention, the lower limit value of the proportion of the component composed only of one or two or more kinds of spontaneously aligning monomers, one or two or more kinds of polymerizable monomers represented by General Formula (I), and the compounds represented by General Formula (N-1a), General Formula (N-1b), General Formula (N-1c), General Formula (N-1d), General Formula (N-1e), and General Formula (L), and General Formula (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, 98% by mass, and 99% by mass.

Among the entire liquid crystal compositions according to the present invention, the upper limit value of the proportion of the component composed only of one or two or more kinds of spontaneously aligning monomers, the polymerizable monomer represented by General Formula (I), the polymerizable compound represented by General Formula (II), and the compounds represented by General Formula (N-1a), General Formula (N-1b), General Formula (N-1c), General Formula (N-1d), General Formula (N-1e), and General Formula (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, and 85% by mass.

In addition, among the entire liquid crystal compositions according to the present invention, the lower limit value of the proportion of the component composed only of one or two or more kinds of spontaneously aligning monomers, the polymerizable monomer represented by General Formula (I), the polymerizable compound represented by General Formula (II), and the compounds represented by General Formula (N-1a), General Formula (N-1b), General Formula (N-1c), General Formula (N-1d), General Formula (N-1e), and General Formula (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, and 98% by mass.

Among the entire liquid crystal compositions according to the present invention, the upper limit value of the proportion of the component composed only of one or two or more kinds of spontaneously aligning monomers, the polymerizable monomer represented by General Formula (I), the polymerizable compound represented by General Formula (II), and the compounds represented by General Formula (N-1a), General Formula (N-1b), General Formula (N-1c), General Formula (N-1d), General Formula (N-1e), and General Formula (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, and 85% by mass.

In addition, among the entire liquid crystal compositions according to the present invention, the lower limit value of the proportion of the component composed only of one or two or more kinds of spontaneously aligning monomers, the polymerizable monomer represented by General Formula (I), the polymerizable compound represented by General Formula (II), and the compounds represented by General Formula (N-1a), General Formula (N-1b), General Formula (N-1c), General Formula (N-1d), General Formula (N-1e), and General Formula (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, and 98% by mass.

Among the entire liquid crystal compositions according to the present invention, the upper limit value of the proportion of the component composed only of one or two or more kinds of spontaneously aligning monomers, the polymerizable monomer represented by General Formula (II-1), and the compounds represented by General Formula (N-1a), General Formula (N-1b), General Formula (N-1c), General Formula (N-1d), General Formula (N-1e), and General Formula (L), and General Formula (L) is preferably 100% by mass, 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, and 85% by mass.

In addition, among the entire liquid crystal compositions according to the present invention, the lower limit value of the proportion of the component composed only of one or two or more kinds of spontaneously aligning monomers, the polymerizable monomer represented by General Formula (II-1), and the compounds represented by General Formula (N-1a), General Formula (N-1b), General Formula (N-1c), General Formula (N-1d), General Formula (N-1e), and General Formula (L), and General Formula (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, and 98% by mass.

In addition, in a case where the alignment is regarded as important, the liquid crystal composition according to the present invention essentially contains one or two or more kinds of spontaneously aligning monomers and one or two or more kinds of polymerizable monomers represented by General Formula (I), and preferably contains the compound represented by General Formula (N-1-1), General Formula (N-1-2), General Formula (N-1-3), or General Formula (N-1-4).

In addition, in a case where the response speed is regarded as important, the liquid crystal composition according to the present invention essentially contains one or two or more kinds of spontaneously aligning monomers and one or two or more kinds of polymerizable monomers represented by General Formula (I), and preferably contains the compound represented by General Formula (N-1-10) or General Formula (N-1-11).

In addition, in a case where the alignment is regarded as important, the liquid crystal composition according to the present invention essentially contains one or two or more kinds of spontaneously aligning monomers, one or two or more kinds of polymerizable monomers represented by General Formula (I), and one or two or more kinds of the polymerizable compounds represented by General Formula (II), and preferably contains the compound represented by General Formula (N-1-1), General Formula (N-1-2), General Formula (N-1-3), or General Formula (N-1-4).

In addition, in a case where the response speed is regarded as important, the liquid crystal composition according to the present invention essentially contains one or two or more kinds of spontaneously aligning monomers, one or two or more kinds of polymerizable monomers represented by General Formula (I), and one or two or more kinds of the polymerizable compounds represented by General Formula (II), and preferably contains the compound represented by General Formula (N-1-10) or General Formula (N-1-11).

In addition, in a case where the alignment is regarded as important, the liquid crystal composition according to the present invention essentially contains one or two or more kinds of spontaneously aligning monomers and two or more kinds of polymerizable compounds represented by General Formula (II-1), and preferably contains the compound represented by General Formula (N-1-1), General Formula (N-1-2), General Formula (N-1-3), or General Formula (N-1-4).

In addition, in a case where the response speed is regarded as important, the liquid crystal composition according to the present invention essentially contains one or two or more kinds of spontaneously aligning monomers and two or more kinds of polymerizable compounds represented by General Formula (II-1), and preferably contains the compound represented by General Formula (N-1-10) or General Formula (N-1-11).

Among the entire liquid crystal compositions according to the present invention, the upper limit value of the proportion of the component composed only of one or two or more kinds of spontaneously aligning monomers, the compounds represented by General Formula (N-1-4), General Formula (N-1b), General Formula (N-1c), General Formula (N-1d), General Formula (N-1e), and General Formula (L) is preferably 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, and 84% by mass.

In addition, among the entire liquid crystal compositions according to the present invention, the upper limit value of the proportion of the component composed only of one or two or more kinds of spontaneously aligning monomers, the compounds represented by General Formula (N-1-4), General Formula (N-1b), General Formula (N-1c), General Formula (N-id), General Formula (N-1e), and General Formula (L) is preferably 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, and 98% by mass.

Among the entire liquid crystal compositions according to the present invention, the upper limit value of the proportion of the component composed only of one or two or more kinds of spontaneously aligning monomers, the compounds represented by General Formula (N-1a), General Formula (N-1b), General Formula (N-1c), General Formula (N-1d), General Formula (N-1e), General Formula (L-1), General Formula (L-3), General Formula (L-4), General Formula (L-5), and General Formula (L-6) is preferably 99% by mass, 98% by mass, 97% by mass, 96% by mass, 95% by mass, 94% by mass, 93% by mass, 92% by mass, 91% by mass, 90% by mass, 89% by mass, 88% by mass, 87% by mass, 86% by mass, 85% by mass, 84% by mass, 83% by mass, 82% by mass, 81% by mass, and 80% by mass.

In addition, among the entire liquid crystal compositions according to the present invention, the upper limit value of the proportion of the component composed only of one or two or more kinds of spontaneously aligning monomers, the compounds represented by General Formula (N-1a), General Formula (N-1b), General Formula (N-1c), General Formula (N-id), General Formula (N-1e), General Formula (L-1), General Formula (L-3), General Formula (L-4), General Formula (L-5), and General Formula (L-6) is preferably 68% by mass, 70% by mass, 71% by mass, 73% by mass, 75% by mass, 78% by mass, 80% by mass, 81% by mass, 83% by mass, 85% by mass, 86% by mass, 87% by mass, 88% by mass, 89% by mass, 90% by mass, 91% by mass, 92% by mass, 93% by mass, 94% by mass, 95% by mass, 96% by mass, 97% by mass, and 98% by mass.

The liquid crystal display device using the liquid crystal composition of the present invention has a remarkable characteristic of high-speed response. In addition, a sufficient tilt angle can be obtained, and there is no unreacted polymerizable compound, or it is so small that it does not matter, and the voltage holding rate (VHR) is high. Therefore, there is no defect such as alignment failure and display failure, or it is sufficiently suppressed. In addition, since the tilt angle and the residual amount of the polymerizable compound can be easily controlled, it is easy to optimize and reduce the energy cost for production, which is optimal for improving production efficiency and stable mass production.

The liquid crystal display device using the liquid crystal composition of the present invention is particularly useful for a liquid crystal display device for active matrix drive, and can be used as a liquid crystal display device for PSA mode, PSVA mode, VA mode, PS-IPS mode, or PS-FFS mode.

The liquid crystal display device according to the present invention preferably includes a first substrate and a second substrate disposed opposite to each other, a common electrode provided on the first substrate or the second substrate, a pixel electrode which is provided on the first substrate or the second substrate, and includes a thin film transistor, and a liquid crystal layer which contains a liquid crystal composition provided between the first substrate and the second substrate. If necessary, an alignment film for controlling the alignment direction of the liquid crystal molecules may be provided on the opposing surface side of at least one of the first substrate and/or the second substrate so as to be in contact with the liquid crystal layer. The alignment film may be a known alignment film such as a vertical alignment film or a horizontal alignment film, which can be appropriately selected in accordance with the driving mode of the liquid crystal display device, or a rubbing alignment film (for example, polyimide) or a photo-alignment film (decomposable polyimide or the like). Furthermore, a color filter may be provided as appropriate on the first substrate or the second substrate, and a color filter may be provided on the pixel electrode or the common electrode.

The two substrates of the liquid crystal cell used in the liquid crystal display device according to the present invention may be made of a transparent material having flexibility such as glass or plastic, and one of them may be an opaque material such as silicon. A transparent substrate having a transparent electrode layer can be obtained, for example, by sputtering indium tin oxide (ITO) on a transparent substrate such as a glass plate.

The color filter can be created by, for example, a pigment dispersion method, a printing method, an electrodeposition method, or a dyeing method. When it comes to describe the method for creating a color filter by the pigment dispersion method as an example, a curable coloring composition for a color filter is applied on the transparent substrate, subjected to a patterning treatment, and cured by heating or light irradiation. By performing this process for each of the three colors red, green, and blue, a pixel portion for a color filter can be created. In addition, a pixel electrode provided with an active device such as a TFT, a thin film diode, or a metal insulator metal specific resistance device may be provided on the substrate.

It is preferable that the first substrate and the second substrate are disposed opposite to each other so that the common electrode and the pixel electrode layer are on the inner side.

A gap between the first substrate and the second substrate may be adjusted via a spacer. In this case, it is preferable to adjust so that a thickness of a light control layer obtained is 1 to 100 µm. More preferably, the thickness is 1.5 to 10 µm, and in a case where a polarizing plate is used, it is preferable to adjust the product of the refractive index anisotropy Δn of the liquid crystal and a cell thickness d so that the contrast is maximized. In addition, in a case where there are two polarizing plates, the polarizing axis of each polarizing plate can be adjusted so that the viewing angle and contrast are excellent. Furthermore, a retardation film for widening the viewing angle can also be used. Examples of the spacer include a glass particle, a plastic particle, an alumina particle, and a photoresist material. Thereafter, a sealant such as an epoxy thermosetting composition is screen-printed on the substrates with a liquid crystal inlet, the substrates are bonded together, and heated to thermally cure the sealant.

As a method for sandwiching the liquid crystal composition between the two substrates, a normal vacuum injection method, an ODF method, or the like can be used.

According to a second aspect of the present invention, there is provided a liquid crystal composition used for the liquid crystal display device which is not equipped with the alignment film on the surface of at least one substrate among a pair of substrates, the composition contains a polymerizable compound which has two or more kinds of biphenyl skeletons. When two or more kinds of polymerizable compounds having a biphenyl group are contained, a difference in a reaction speed is generated, and thus alignment unevenness and display failure can be reduced.

The polymerizable compound having a biphenyl skeleton may be any compound having a biphenyl skeleton in which two benzene rings are directly linked, and is a concept including terphenyl. Therefore, the polymerizable compound having two or more biphenyl skeletons means that there are two or more kinds of polymerizable compounds having a biphenyl skeleton to which two benzene rings are directly linked.

The polymerizable compound having a biphenyl group according to the present invention is preferably represented by the following Formula (II-1):

[Chem. 192]

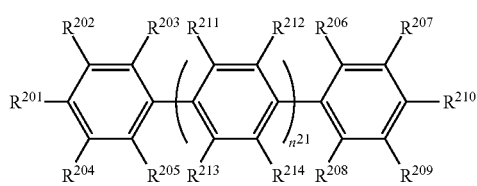

(II-1)

In General Formula (II-1), $R^{201}$, $R^{202}$, $R^{203}$, $R^{204}$, $R^{205}$, $R^{206}$, $R^{207}$, $R^{208}$, $R^{209}$, $R^{210}$, $R^{211}$, $R^{212}$, $R^{213}$, and $R^{214}$ each independently represent any of $P^{21}$—$S^{21}$—, an alkyl group having 1 to 18 carbon atoms, which may be substituted with a fluorine atom, an alkoxy group having 1 to 18 carbon atoms, which may be substituted with a fluorine atom, a halogen atom (a fluorine atom), or a hydrogen atom, $P^{21}$ represents any of (R-I) to (R-IX) in General Formula (I), $S^{21}$ represents a single bond or an alkylene group having 1 to 15 carbon atoms, wherein one or two or more —$CH_2$—'s in the alkylene group may be substituted with —O—, —OCO—, or —COO— so that an oxygen atom is not directly adjacent thereto, and $n^{21}$ represents 0, 1, or 2.

In General Formula (II-1), it is preferable that one or two or more $P^{21}$—$S^{21}$—'s or four or less $P^{21}$—$S^{21}$—'s are contained in one molecule of the compound represented by General Formula (II-1), the number of $P^{21}$—$S^{21}$—'s present in one molecule of the compound represented by General Formula (II) is preferably 1 to 4, and is more preferably 1 to 3, and the number of $P^{21}$—$S^{21}$—'s in the molecule of the compound represented by General Formula (II) is particularly preferably 2 or 3.

That is, the compound represented by General Formula (II-1) has two benzene rings (biphenyl structure) and these two benzene rings have at least one $P^{21}$—$S^{21}$—, and therefore, the compound represented by General Formula (II) has an action and effect as a polymerizable compound.

In General Formula (II-1), in a case of containing one or two or more kinds of $P^{21}$—$S^{21}$—'s, any of $R^{201}$, $R^{202}$, $R^{204}$, $R^{207}$, $R^{209}$, and $R^{210}$ is preferably one or two or more kinds of $P^{21}$—$S^2$-'s, and $R^{201}$ and $R^{210}$ are more preferably $P^{21}$—$S^{21}$—'s.

In General Formula (II-1), $R^{201}$ and $R^{210}$ are each independently $P^{21}$—$S^{21}$—, and in this case, $R^{201}$ and $R^{210}$ may be the same $P^{21}$—$S^{21}$— or different $P^{21}$—$S^{21}$—.

In General Formula (II), $R^{201}$, $R^{202}$, $R^{203}$, $R^{204}$, $R^{205}$, $R^{206}$, $R^{207}$, $R^{208}$, $R^{209}$, $R^{210}$, $R^{211}$, $R^{212}$, $R^{213}$, and $R^{214}$ each independently represent any of $P^{21}$—$S^{21}$—, an alkyl group having 1 to 18 carbon atoms, which may be substituted with a fluorine atom, an alkoxy group having 1 to 18 carbon atoms, which may be substituted with a fluorine atom, a fluorine atom, or a hydrogen atom, and in this case, the number of preferable carbon atoms of the alkyl group and the alkoxy group is 1 to 16, is more preferably 1 to 10, is still more preferably 1 to 8, is further still more preferably 1 to 6, is even more preferably 1 to 4, and is particularly preferably 1 to 3. In addition, the alkyl group and the alkoxy group may be linear or branched, and the linear shape is particularly preferable.

In General Formula (II-1), $R^{201}$, $R^{202}$, $R^{203}$, $R^{204}$, $R^{205}$, $R^{206}$, $R^{207}$, $R^{208}$, $R^{209}$, $R^{210}$, $R^{211}$, $R^{212}$, $R^{213}$, and $R^{214}$ each independently preferably $P^{21}$—$S^2$2-, an alkyl group having 1 to 3 carbon atoms, an alkoxy group having 1 to 3 carbon atoms, a fluorine atom, or a hydrogen atom, $P^{21}$—$S^{21}$—, more preferably a fluorine atom or a hydrogen atom, and are still more preferably a fluorine atom a fluorine atom or a hydrogen atom.

In General Formula (II-1), $P^21$ is preferably Formula (R-I), is more preferably an crylic group or a methacrylic group, and is still more preferably a methacrylic group.

In General Formula (II-1), $S^{21}$ is preferably a single bond or an alkylene group having 1 to 3 carbon atoms, and is more preferably a single bond.

In General Formula (II-1), $n^{21}$ is preferably 0.

The liquid crystal composition according to the present invention preferably contains two to six kinds of polymerizable compounds having a biphenyl group represented by General Formula (II-1), is more preferably two to five kinds, is still more preferably two to four kinds, is even more preferably two to three kinds, and is particularly preferably two kinds. When two or more kinds of polymerizable compounds having a biphenyl group represented by General Formula (II-1) provided with different chemical structures are contained, a difference in a reaction speed is generated, and thus alignment unevenness and display failure can be reduced.

Moreover, the compound represented by General Formula (Ia) may be used as one of the polymerizable compounds which have two or more kinds of the biphenyl skeletons.

Examples of the polymerizable compound having a biphenyl skeleton that can be suitably used in the liquid crystal composition according to the present invention include polymerizable compounds represented by Formula (XX-1) to General Formula (XX-13), and polymerizable compounds represented by Formulae RM-1 to RM-14 and Formula I-1-1 to Formula I-7-6.

Therefore, in the liquid crystal composition according to the present invention, preferable embodiments of the polymerizable compound having two or more kinds of the biphenyl skeletons include polymerizable compounds represented by Formula (XX-1) to General Formula (XX-13), a polymerizable compound represented by Formulae RM-1 to RM-14, and a polymerizable compound represented by the formulae I-1-1 to I-7-6.

The total content of the polymerizable compound having two or more kinds of the biphenyl skeletons is 0.02% to 10% by mass, and the lower limit of the content is preferably 0.02% by mass, preferably 0.03% by mass, preferably 0.04% by mass, preferably 0.05% by mass, preferably 0.06% by mass, preferably 0.07% by mass, preferably 0.08% by mass, preferably 0.09% by mass, preferably 0.1% by mass, preferably 0.15% by mass, preferably 0.2% by mass, preferably 0.25% by mass, preferably 0.3% by mass, preferably 0.35% by mass, preferably 0.4% by mass, preferably 0.5% by mass, and preferably 0.55% by mass, and the upper limit of the content is preferably 5% by mass, 4.5% by mass, 4% by mass, 3.5% by mass, 3% by mass, 2.5% by mass, 2% by mass, 1.5% by mass, 1% by mass, preferably 0.95% by mass, preferably 0.9% by mass, preferably 0.85% by mass, preferably 0.8% by mass, preferably 0.75% by mass, preferably 0.7% by mass, preferably 0.65% by mass, preferably 0.6% by mass, and preferably 0.55% by mass.

The liquid crystal composition according to the present invention preferably contains a spontaneously aligning monomer having a chemical structure different from each of the polymerizable compounds having two or more kinds of the biphenyl skeletons and having a polar group.

As the spontaneously aligning monomer, the above spontaneously aligning monomers can be preferably used.

Further, as a preferable embodiment of the liquid crystal composition according to the present invention, two or more kinds of the polymerizable compounds having a biphenyl group represented by General Formula (II-1), one or more kinds of the spontaneously aligning monomers, a compound group represented by General Formulae (N-1a) to (N-1g), and a compound represented by General Formula (L) are contained, and these compounds are preferable to occupy 85% to 100% by mass of the liquid crystal compositions.

According to a third aspect of the present invention, there is provided a liquid crystal display device which is not provided with an alignment film on a surface of at least one substrate, the device including a first substrate and a second substrate which are disposed opposite to each other, a liquid crystal layer which is placed between the first substrate and the second substrate, an electrode layer which has a plurality of gate bus lines and data bus lines arranged in a matrix, a thin film transistor provided at each intersection of the gate bus lines and the data bus lines, and a pixel electrode driven by the thin film transistor for each pixel, on the first substrate, a common electrode which is formed on the first substrate or the second substrate, and a resin component obtained by curing a polymerizable compound having two or more biphenyl skeletons between the first substrate and the second substrate.

As a method for polymerizing the polymerizable compound or the polymerizable monomer and the spontaneously aligning monomer contained in the liquid crystal composition of the present invention, an appropriate polymerization speed is desirable in order to obtain excellent alignment performance of the liquid crystal, and thus it is preferable to employ a method for polymerizing by irradiation with active energy rays such as an electron beam alone or in combination or sequentially. In a case where the ultraviolet rays are used, a polarized light source or a non-polarized light source may be used. Further, in a case where the polymerization is performed with the liquid crystal composition sandwiched between two substrates, at least the substrate on the irradiation surface side is to be given appropriate transparency with respect to the active energy rays. Moreover, a method in such a manner that after polymerizing only a specific part using a mask during light irradiation, the alignment state of the unpolymerized part is changed by changing conditions such as an electric field, a magnetic field, or temperature, and further irradiation with active energy rays is performed for polymerization may be used. In particular, when ultraviolet exposure is performed, it is preferable to perform ultraviolet exposure while applying an alternating electric field to the liquid crystal composition. The alternating electric field to be applied is preferably an alternating current having a frequency of 10 Hz to 10 kHz, is more preferably a frequency of 60 Hz to 10 kHz, and the voltage is selected depending on a desired pretilt angle of the liquid crystal display device. That is, the pretilt angle of the liquid crystal display device can be controlled by the applied voltage. In a PSVA mode liquid crystal display device, it is preferable to control the pretilt angle from 80 degrees to 89.9 degrees from the viewpoint of alignment stability and contrast.

The temperature at the time of irradiation with active energy rays such as ultraviolet rays or electron beams used when polymerizing the polymerizable compound contained in the liquid crystal composition of the present invention is not particularly limited. For example, in a case where the liquid crystal composition of the present invention is applied to a liquid crystal display device including a substrate having an alignment film, it is preferably within a temperature range in which the liquid crystal state of the liquid crystal composition is maintained. Polymerization is preferably performed at a temperature close to room temperature, that is, typically 15° C. to 35° C.

On the other hand, for example, in a case where the liquid crystal composition of the present invention is applied to a liquid crystal display device with a substrate that does not have an alignment film, a temperature range may be wider than the temperature range applied at irradiation time of the liquid crystal display device with the substrate having the alignment film.

As a lamp for generating ultraviolet rays, a metal halide lamp, a high-pressure mercury lamp, an ultra-high pressure mercury lamp, or the like can be used. Moreover, as a wavelength of the ultraviolet rays to irradiate, the irradiation is preferably performed with the ultraviolet rays of the wavelength range which is not an absorption wavelength range of the liquid crystal composition, and the ultraviolet rays are preferably cut as needed to be used. The intensity of the ultraviolet rays to irradiate is preferably 0.1 mW/cm$^2$ to 100 W/cm$^2$, and is more preferably 2 mW/cm$^2$ to 50 W/cm$^2$. The amount of energy of the ultraviolet rays to irradiate can be adjusted as appropriate, but is preferably 10 mJ/cm² to 500 J/cm², and is more preferably 100 mJ/cm² to 200 J/cm². When irradiating with the ultraviolet rays, the intensity may be changed. The time for irradiation with the ultraviolet rays is appropriately selected depending on the intensity of the ultraviolet rays to irradiate, and is preferably 10 seconds to 3600 seconds, and more is preferably 10 seconds to 600 seconds.

According to a third aspect of the present invention, there is provided a compound represented by General Formula (I).

[Chem. 193]

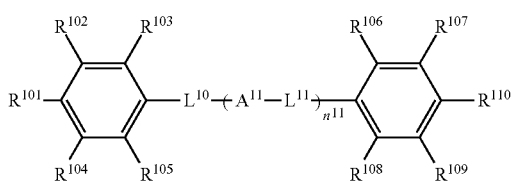
(I)

In General Formula (I), $R^{101}$, $R^{102}$, $R^{103}$, $R^{104}$, $R^{105}$, $R^{106}$, $R^{107}$, $R^{108}$, $R^{109}$, and $R^{110}$ each independently represent any of $P^{11}$—$S^{11}$—, an alkyl group having 1 to 18 carbon atoms, an alkoxy group having 1 to 18 carbon atoms, a halogen atom, and a hydrogen atom, and $P^{11}$ represents any of the following Formula (R-I) to Formula (R-IX).

[Chem. 194]

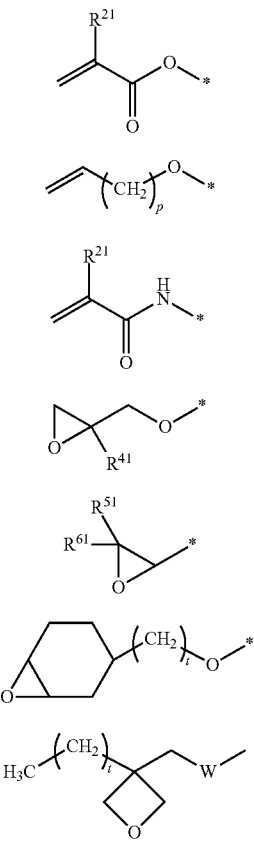

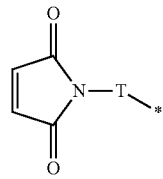

In Formulae (R-I) to (R-IX), $R^{21}$, $R^{31}$, $R^{41}$, $R^{51}$, and $R^{61}$ are each independently a hydrogen atom or an alkyl group having 1 to 5 carbon atoms, W is a single bond, —O—, or a methylene group, T is a single bond or —COO—, and p, t, and q are each independently 0, 1, or 2.

$S^{11}$ represents a single bond or an alkylene group having 1 to 15 carbon atoms, and one or two or more —CH₂—'s in the alkylene group may be substituted with —O—, —OCO—, or —COO— so that an oxygen atom is not directly adjacent thereto, $n^{11}$ represents 0, 1, or 2, $A^{11}$ represents a group selected from the group consisting of a group (a), a group (b), and a group (c) as follows: (a) 1,4-cyclohexylene group (one —CH₂— or two or more non-adjacent —CH₂—'s present in this group may be substituted with —O—), (b) 1,4-phenylene group (one —CH= or two or more non-adjacent —CH='s present in this group may be substituted with —N=), and (c) naphthalene-2,6-diyl group, 1,2,3,4-tetrahydronaphthalene-2,6-diyl group, or decahydronaphthalene-2,6-diyl group (one —CH= or two or more non-adjacent —CH='s present in the naphthalene-2,6-diyl group or the 1,2,3,4-tetrahydronaphthalene-2,6-diyl group may be substituted with —N=), the group (a), the group (b), and the group (c) may be each independently substituted with an alkyl group having 1 to 12 carbon atoms, an alkoxy group having 1 to 12 carbon atoms, halogen atoms, a cyano group, a nitro group, or $P^{11}$—$S^{11}$—, $L^{10}$ and $L^{11}$ each independently represent a single bond, —OCH₂—, —CH₂O—, —C₂H₄—, —OC₂H₄O—, —COO—, —OCO—, —CH=CR—COO—, —CH=CR$^a$—OCO—, —COO—CR$^a$=CH—, —OCO—CR$^a$=CH—, —(CH₂)—COO—, —(CH₂)$_z$OCO—, —OCO—(CH₂)$_z$—, —COO—(CH₂)$_z$—, —CH=CH—, —CF₂O—, —OCF₂—, or —C≡C—, wherein R$^a$'s each independently represent a hydrogen atom or an alkyl group having 1 to 3 carbon atoms, and in the formula, z's each independently represent an integer of 1 to 4, at least two or more $P^{11}$—$S^{11}$—'s are included in one molecule of General Formula (I), an alkyl group having 1 to 18 carbon atoms is contained in one molecule of General Formula (I), and one —CH₂— or two or more non-adjacent —CH₂—'s in the alkyl group may be each independently substituted with —O—, and in a case where there are a plurality of $P^{11}$'s, $S^{11}$'s, $L^{11}$'s, and $A^{11}$'s, those may be the same as or different from each other.

Preferable forms of the compound represented by General Formula (I) according to the present invention are as described above. The most preferable form of the compound represented by General Formula (I) according to the present invention is that, in General Formula (I), $A^{11}$ is an alkyl group having 1 to 12 carbon atoms, an alkoxy group having 1 to 12 carbon atoms, a halogen, a cyano group, a nitro group, or a 1,4-phenylene group which may be substituted with $P^{11}$—$S^{11}$—, L10 and $L^{11}$ are both single bonds, $R^{101}$, $R^{102}$, $R^{100}$, $R^{104}$, $R^{105}$, $R^{106}$, $R^{107}$, $R^{108}$, $R^{109}$, and $R^{110}$ each independently represent any of $P^{11}$—$S^{11}$—, a linear alkyl group having 1 to 10 carbon atoms, a linear alkoxy group having 1 to 10 carbon atoms, a halogen atom, and a hydrogen atom, at least two or more $P^{11}$—$S^{11}$'s are included in one molecule of the polymerizable monomer represented by General Formula (I), at least one alkyl group having 1 to 10 carbon atoms is contained in one molecule of General Formula (I), and one —$CH_2$— or two or more non-adjacent —$CH_2$—'s in the alkyl group may be each independently substituted with —O—, $n^{11}$ represents 0 or 1, and it is particularly preferred that $P^{11}$ is Formula (R-1) and $S^{11}$ is a single bond or an alkylene group having 1 to 3 carbon atoms.

Hereinafter, synthesis of an example of the compound represented by General Formula (I) according to the present invention will be described.

Preparation of Compound Represented by General Formula (RM-3)

Suzuki coupling reaction of 4-bromo-2,6-dimethylphenol and 4-bromo-2,6-dimethylphenol using a palladium catalyst is carried out to obtain (S-1). Next, due to esterification reaction with methacrylic acid by performing deacetalization, a target product (RM-3) can be obtained.

[Chem. 195]

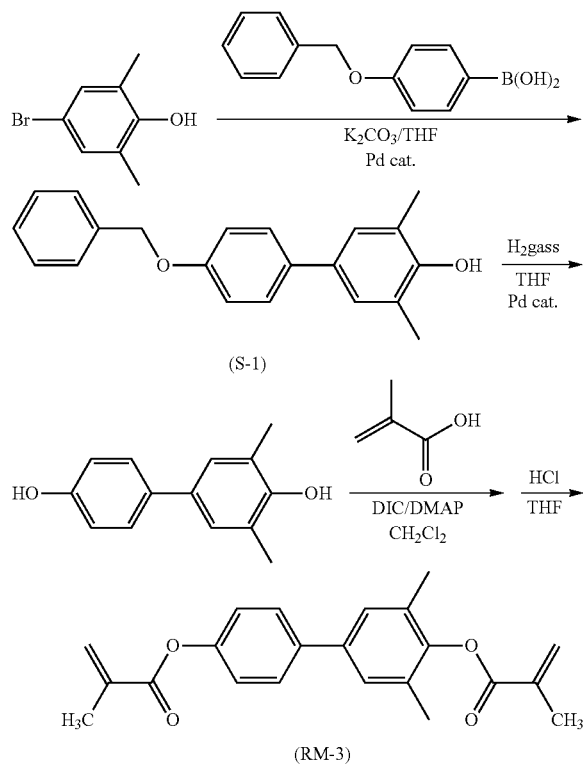

(RM-3)

Hereinafter, the present invention will be described in further detail with reference to examples, but the present invention is not limited to these examples. In addition, "%" in the compositions of the following Examples and Comparative Examples refers to "mass %". The following abbreviations are used for the description of compounds in Examples.

Synthetic Example 1

"Synthesis Method for RM-3"

In a reaction vessel equipped with a stirrer, a cooler, and a dropping funnel, 20 g of 4-bromo-2,6-dimethylphenol, 100 ml of 2 mol/l potassium carbonate aqueous solution, 3.5 g of dichlorobis [di-t-butyl (p-dimethyl aminophenol) phosphino]palladium, and 100 ml of THF were charged and stirred at 50° C. 100 ml of a THF solution of 24 g of 4-benzyloxyphenyl boronic acid was slowly added dropwise. A reaction was allowed to proceed at 50° C. for 5 hours. After completion of the reaction, the reaction mixture was cooled, 200 ml of ethyl acetate was added, an organic layer was washed with water and saturated brine, a solvent was distilled off, and purification with a silica gel column and recrystallization with hexane/ethyl acetate were performed to obtain 26 g of a target compound 4'-benzyloxy-3,5-dimethyl-4-biphenol was obtained.

[Chem. 196]

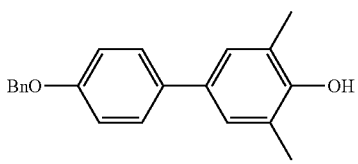

18 g of 4'-benzyloxy-3,5-dimethyl-4-biphenol, 0.9 g of 5% palladium carbon, and 100 ml of THF were added into an autoclave, and the mixture was stirred at 50° C. for 3 hours under a hydrogen pressure of 0.5 MPa. After the reaction, it was filtered through cellulose and further washed with THF, the filtrate was concentrated, purified with a silica gel column, and dispersed and washed with hexane to obtain 13 g of a target compound 4,4'-dihydroxy-3,5-biphenyl.

[Chem. 197]

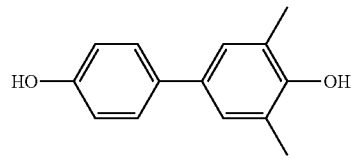

Further, in a reaction vessel equipped with a stirrer, a cooler, and a thermometer, 8 g (37 mmol) of synthesized 4,4'-dihydroxy-3,5-biphenyl, 7.1 g (82 mmol) of methacrylic acid, 0.23 g of dimethyl aminopyridine, and 160 ml of dichloromethane were charged, the reaction vessel was kept at 5° C. or lower with an ice-cooled bath, and 11 g (90 mmol) of diisopropyl carbodiimide was slowly added dropwise. After completion of dropping, the reaction vessel was returned to room temperature and reacted for 11 hours. After the reaction solution was filtered, 150 ml of dichloromethane was added to the filtrate, washed with a 5% aqueous hydrochloric acid solution, further washed with saturated brine, and the organic layer was dried with anhydrous sodium sulfate. After the solvent was distilled off, purification was performed by column chromatography using silica gel to obtain 11 g of a target compound represented by Formula (RM-3).

[Chem. 198]

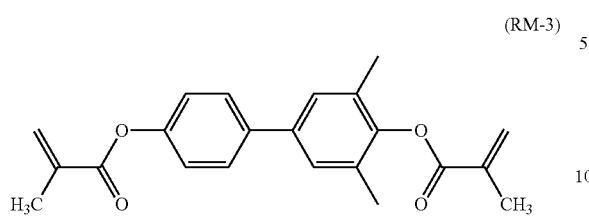

(RM-3)

The physical properties (¹H-NMR, ¹³C-NMR, and melting point) of the obtained compound are as follows. Physical properties: ¹H-NMR (solvent: deuterated chloroform): δ: 7.57-7.54 (m, 2H), 7.26 (s, 2H), 7.19-7.15 (m, 2H), 6.39 (d, 2H), 5.76 (dq, 2H), 2.21 (s, 6H), 2.11 (d, 3H), 2.07 (d, 3H)

¹³C-NMR (solvent: deuterated chloroform): δ 165.8, 165.1, 150.2, 147.8, 138.4, 138.0, 135.8, 135.5, 130.5, 130.5, 128.0, 128.0, 127.3, 127.3, 127.2, 127.1, 121.7, 121.7, 18.4, 18.3, 16.4, 16.4

Melting point: 111° C.

Synthetic Example 2

"Synthesis Method for RM-4"

In a reaction vessel equipped with a stirrer, a cooler, and a dropping funnel, 10 g of 4-bromo-3,5-dimethylphenol, 50 ml of 2 mol/l potassium carbonate aqueous solution, 1.8 g of dichlorobis[di-t-butyl (p-dimethyl aminophenol) phosphino] palladium, and 50 ml of THF were charged and stirred at 50° C. 36 ml of a THF solution of 12 g of 4-benzyloxyphenyl boronic acid was slowly added dropwise. A reaction was allowed to proceed at 50° C. for 4 hours. After completion of the reaction, the reaction mixture was cooled, 50 ml of ethyl acetate was added, an organic layer was washed with water and saturated brine, a solvent was distilled off, and purification with a silica gel column and washing with hexane/ethyl acetate were performed to obtain 13 g of a target compound 4'-benzyloxy-2,6-dimethyl-4-biphenol was obtained.

[Chem. 199]

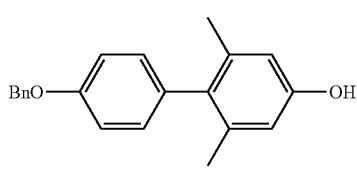

11 g of 4'-benzyloxy-2,6-dimethyl-4-biphenol, 0.6 g of 5% palladium carbon, and 100 ml of THF were added into an autoclave, and the mixture was stirred at 50° C. for 3 hours under a hydrogen pressure of 0.5 MPa. After the reaction, it was filtered through cellulose and further washed with THF, the filtrate was concentrated, purified with a silica gel column, and dispersed and washed with hexane to obtain 7 g of a target compound 4,4'-dihydroxy-2,6-biphenyl.

[Chem. 200]

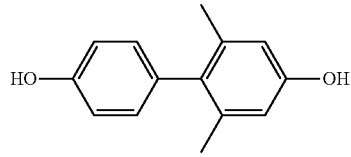

Further, in a reaction vessel equipped with a stirrer, a cooler, and a thermometer, 7 g (32 mmol) of 4,4'-dihydroxy-2,6-biphenyl, 6.0 g (70 mmol) of methacrylic acid, 0.2 g of dimethyl aminopyridine, and 140 ml of dichloromethane were charged, the reaction vessel was kept at 5° C. or lower with an ice-cooled bath, and 50 ml of THF dissolved in 9.6 g (76 mmol) of diisopropyl carbodiimide was slowly added dropwise. After completion of dropping, the reaction vessel was returned to room temperature and reacted for 15 hours. After the reaction solution was filtered, 120 ml of dichloromethane was added to the filtrate, washed with a 5% aqueous hydrochloric acid solution, further washed with saturated brine, and the organic layer was dried with anhydrous sodium sulfate. After the solvent was distilled off, purification was performed by column chromatography using amino silica gel, and further dispersed and washed with methanol. After precipitation at −20° C., filtration and vacuum drying were performed to obtain 11 g of a target compound represented by Formula (RM-4).

[Chem. 201]

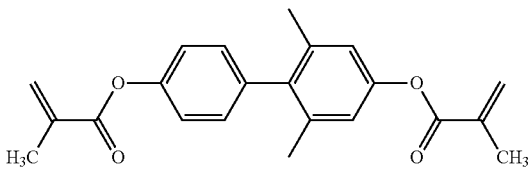

(RM-4)

The physical properties (¹H-NMR, ¹³C-NMR, and melting point) of the obtained compound are as follows. Physical properties: ¹H-NMR (solvent: deuterated chloroform): δ 7.64-7.54 (m, 4H), 7.26 (S, 2H), 6.75 (d, 2H), 6.15 (dq, 2H), 2.48-2.46 (m, 6H), 2.43 (S, 6H)

¹³C-NMR (solvent: deuterated chloroform): δ 166.4, 166.1, 150.1, 149.9, 138.8, 138.1, 136.3, 136.2, 130.5, 130.5, 128.4, 128.4, 127.5, 127.4, 122.2, 121.9, 120.4, 120.4, 21.3, 21.2, 18.7, 18.7

Melting point: 89° C.

Synthetic Example 3

"Synthesis Method for RM-7"

Under a nitrogen atmosphere, in a reaction vessel equipped with a stirrer, a cooler, and a thermometer, 25 g of 1-benzyloxy-2-bromobenzene, 10 g of triethylamine, 13 g of 1-trimethylsilyl-1-propyne, and 250 ml of N,N-dimethyl formamide were charged, 1.5 g of tetrakistriphenyl phosphine palladium was added as a catalyst at room temperature, and then the reaction vessel was heated to 70° C. and stirred for 7 hours. After allowing to cool, water and toluene were added for liquid separation, toluene was added to an aqueous layer for extraction, and the combined organic layer was washed with water and saturated brine. After adding anhydrous sodium sulfate and drying, the organic solvent was distilled off under reduced pressure, and the residue was purified by silica gel column chromatography to obtain 18 g of a target compound represented by the following chemical formula.

[Chem. 202]

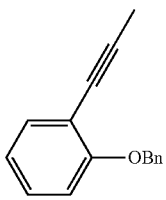

18 g of the compound synthesized previously, 0.5 g of 5% palladium carbon, and 60 ml of THF were added into an autoclave, and the mixture was stirred at 40° C. for 5 hours under a hydrogen pressure of 0.5 MPa. After the reaction, it was filtered through cellulose and further washed with THF, and the filtrate was concentrated and purified with a silica gel column to obtain 16 g of a target compound represented by the following chemical formula.

[Chem. 203]

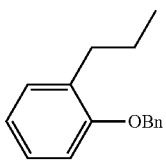

In a reaction vessel equipped with a stirrer, a cooler, and a thermometer, 16 g of 1-benzyloxy-2-propyl benzene and 100 ml of acetonitrile were charged, 12.5 g of N-bromosuccinimide was added at 0° C., and the mixture was stirred at room temperature for 4 hours. After the reaction solution was concentrated under reduced pressure, hexane was added, and the precipitate was filtered. The filtrate was washed with water and saturated brine, and dried with anhydrous sodium sulfate. The solvent was concentrated under reduced pressure to obtain 18 g of a target compound represented by the following chemical formula.

[Chem. 204]

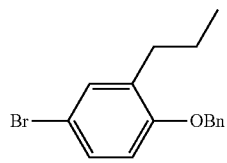

In a reaction vessel equipped with a stirrer, a cooler, and a dropping funnel, 17 g of 4-bromo-1-benzyloxy-2-propyl benzene and 60 ml of 2 mol/l potassium carbonate aqueous solution, 0.8 g of tetrakistriphenyl phosphine palladium, and 60 ml of ethanol were charged, and stirred at 50° C. 20 ml of a THF solution of 9 g of 4-hydroxyphenyl boronic acid was slowly added dropwise. A reaction was allowed to proceed at 50° C. for 6 hours. After completion of the reaction, the reaction mixture was cooled, 100 ml of ethyl acetate was added, an organic layer was washed with water and saturated brine, a solvent was distilled off, purification with a silica gel column and recrystallization with hexane were performed to obtain 13 g of a target compound represented by the following chemical formula.

[Chem. 205]

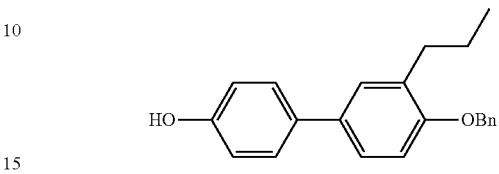

12 g of the compound synthesized previously, 0.6 g of 5% palladium carbon, and 80 ml of THF were added into an autoclave, and the mixture was stirred at 50° C. for 4 hours under a hydrogen pressure of 0.5 MPa. After the reaction, it was filtered through cellulose and further washed with THF, and the filtrate was concentrated and purified with a silica gel column to obtain 11 g of a target compound represented by the following chemical formula.

[Chem. 206]

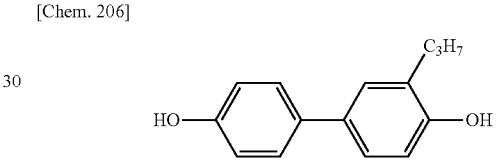

Further, in a reaction vessel equipped with a stirrer, a cooler, and a thermometer, 10 g (43 mmol) of the previously synthesized compound, 7.7 g (90 mmol) of methacrylic acid, 0.2 g of dimethyl aminopyridine, and 100 ml of dichloromethane were charged, the reaction vessel was kept at 5° C. or lower with an ice-cooled bath, and 50 ml of THF dissolved in 11.6 g (91 mmol) of diisopropyl carbodiimide was slowly added dropwise. After completion of dropping, the reaction vessel was returned to room temperature and reacted for 10 hours. After the reaction solution was filtered, 100 ml of dichloromethane was added to the filtrate, washed with a 5% aqueous hydrochloric acid solution, further washed with saturated brine, and the organic layer was dried with anhydrous sodium sulfate. After the solvent was distilled off, purification was performed by column chromatography using amino silica gel, and further dispersed and washed with methanol. After allowing to stand at −20° C., filtration and vacuum drying were performed to obtain 11 g of a target compound represented by Formula (RM-7).

[Chem. 207]

(RM-7)

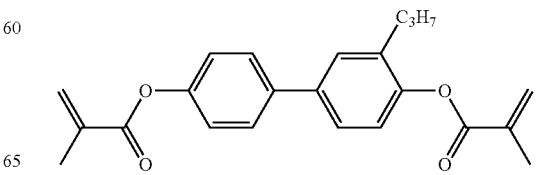

The physical properties ($^1$H-NMR, $^{13}$C-NMR, and melting point) of the obtained compound are as follows. Physical properties: $^1$H-NMR (solvent: deuterated chloroform): δ 7.70-7.58 (m, 4H), 7.34 (d, 1H), 7.18 (d, 2H), 6.55 (d, 2H), 6.15 (d, 2H), 2.46 (t, 2H), 2.18 (s, 6H), 1.66 (m, 2H), 0.96 (t, 3H)

$^{13}$C-NMR (solvent: deuterated chloroform): δ 166.2, 166.1, 150.2, 146.9, 138.0, 137.6, 136.0, 135.7, 132.5, 128.0, 128.0, 127.8, 127.8, 122.1, 121.9, 121.8, 120.7, 120.6, 32.6, 24.1, 18.1, 18.0, 12.8

Melting point: 119° C.

Synthetic Example 4

"Synthesis Method for RM-18"

Under a nitrogen atmosphere, in a reaction vessel equipped with a stirrer, a cooler, and a thermometer, 30 g of 1-benzyloxy-2,6-dibromobenzene, 10 g of triethylamine, 25 g of 1-trimethylsilyl-1-propyne, and 300 ml of N,N-dimethyl formamide were charged, 2 g of tetrakistriphenyl phosphine palladium was added as a catalyst at room temperature, and then the reaction vessel was heated to 70° C. and stirred for 8 hours. After allowing to cool, water and toluene were added for liquid separation, toluene was added to an aqueous layer for extraction, and the combined organic layer was washed with water and saturated brine. After adding anhydrous sodium sulfate and drying, the organic solvent was distilled off under reduced pressure, and the residue was purified by silica gel column chromatography to obtain 20 g of a target compound.

[Chem. 208]

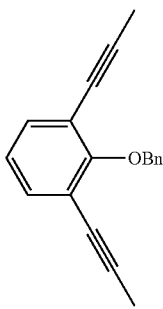

20 g of the compound synthesized previously, 0.6 g of 5% palladium carbon, and 100 ml of THF were added into an autoclave, and the mixture was stirred at 50° C. for 5 hours under a hydrogen pressure of 0.5 MPa. After the reaction, it was filtered through cellulose and further washed with THF, and the filtrate was concentrated and purified with a silica gel column to obtain 18 g of a target compound represented by the following chemical formula.

[Chem. 209]

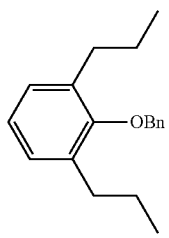

In a reaction vessel equipped with a stirrer, a cooler, and a thermometer, 16 g of 1-benzyloxy-2,6-propyl benzene and 100 ml of acetonitrile were charged, 12 g of N-bromosuccinimide was added at 0° C., and the mixture was stirred at room temperature for 6 hours. After the reaction solution was concentrated under reduced pressure, hexane was added, and the precipitate was filtered. The filtrate was washed with water and saturated brine, and dried with anhydrous sodium sulfate. The solvent was concentrated under reduced pressure to obtain 18 g of a target compound represented by the following chemical formula.

[Chem. 210]

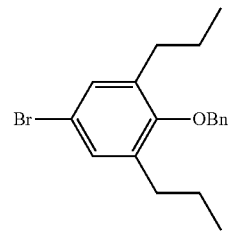

In a reaction vessel equipped with a stirrer, a cooler, and a dropping funnel, 16 g of 4-bromo-1-benzyloxy-3,5-dipropyl benzene and 60 ml of 2 mol/l potassium carbonate aqueous solution, 1.0 g of tetrakistriphenyl phosphine palladium, and 50 ml of ethanol were charged, and stirred at 50° C. 30 ml of a THF solution of 12 g of 4-hydroxyphenyl boronic acid was slowly added dropwise. A reaction was allowed to proceed at 60° C. for 10 hours. After completion of the reaction, the reaction mixture was cooled, 100 ml of ethyl acetate was added, an organic layer was washed with water and saturated brine, a solvent was distilled off, purification with a silica gel column and recrystallization with hexane were performed to obtain 12 g of a target compound represented by the following chemical formula.

[Chem. 211]

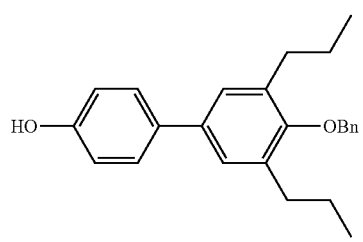

11 g of the compound synthesized previously, 0.6 g of 5% palladium carbon, and 50 ml of THF were added into an autoclave, and the mixture was stirred at 50° C. for 5 hours under a hydrogen pressure of 0.5 MPa. After the reaction, it was filtered through cellulose and further washed with THF, and the filtrate was concentrated and purified with a silica gel column to obtain 7.5 g of a target compound represented by the following chemical formula.

[Chem. 212]

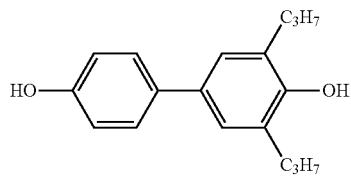

Further, in a reaction vessel equipped with a stirrer, a cooler, and a thermometer, 7 g (25 mmol) of the compound represented above, 4.7 g (54 mmol) of methacrylic acid, 0.2 g of dimethyl aminopyridine, and 100 ml of dichloromethane were charged, the reaction vessel was kept at 5° C. or lower with an ice-cooled bath, and 50 ml of THF dissolved in 7 g (55 mmol) of diisopropyl carbodiimide was slowly added dropwise. After completion of dropping, the reaction vessel was returned to room temperature and reacted for 15 hours. After the reaction solution was filtered, 100 ml of dichloromethane was added to the filtrate, washed with a 5% aqueous hydrochloric acid solution, further washed with saturated brine, and the organic layer was dried with anhydrous sodium sulfate. After the solvent was distilled off, purification was performed by column chromatography using amino silica gel, and further dispersed and washed with methanol. After precipitation at −20° C., filtration and vacuum drying were performed to obtain 8 g of a target compound represented by Formula (RM-18).

[Chem. 213]

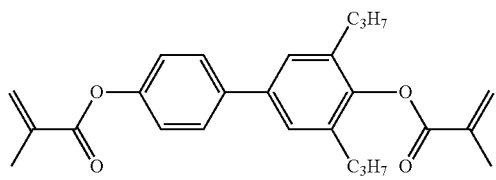

The physical properties ($^1$H-NMR, $^{13}$C-NMR, and melting point) of the obtained compound are as follows. Physical properties: =H-NMR (solvent; deuterated chloroform): δ 7.64-7.54 (m, 4H), 7.26 (S, 2H), 6.75 (d, 2H), 6.15 (dq, 2H), 2.48-2.46 (t, 4H), 2.23 (S, 6H), 1.64 (m, 4H), 0.96 (t, 6H)

$^{13}$C-NMR (solvent: deuterated chloroform): δ 166.4, 166.0, 150.2, 146.8, 138.4, 137.6, 136.0, 135.8, 132.5, 132.5, 128.0, 128.0, 127.8, 127.8, 122.1, 121.9, 120.7, 120.6, 32.8, 32.8, 24.3, 24.2, 17.9, 17.9, 12.8, 12.8

Melting point: 125° C.

In the examples, the measured characteristics are as follows.

Tni: Nematic phase-isotropic liquid phase transition temperature (° C.)

Δn: Refractive index anisotropy at 20° C.

η: Viscosity at 20° C. (mPa·s)

$γ_1$: Rotational viscosity at 20° C. (m Pa·S)

Δε: Dielectric anisotropy at 20° C.

$K_{33}$: Elastic constant at 20° C. $K_{33}$ (pN)

<Ring Structure>

[Chem. 214]

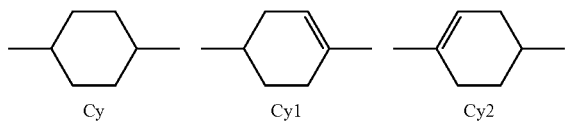

Cy  Cy1  Cy2

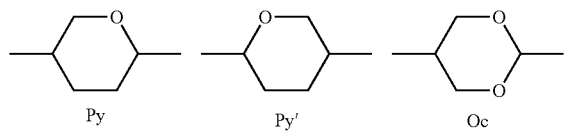

Py  Py'  Oc

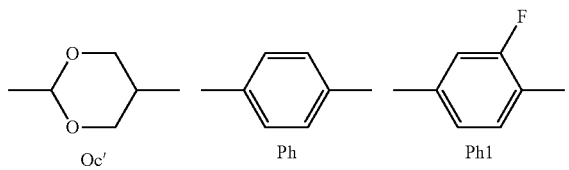

Oc'  Ph  Ph1

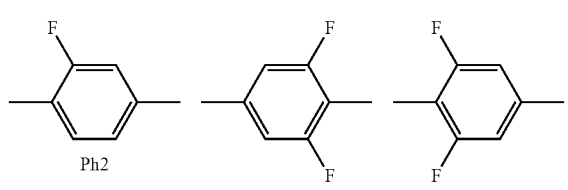

Ph2  Ph3  Ph4

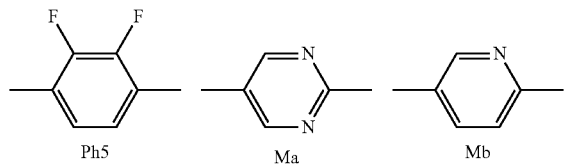

Ph5  Ma  Mb

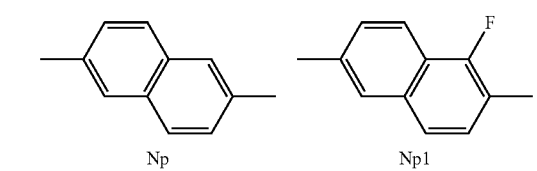

Np  Np1

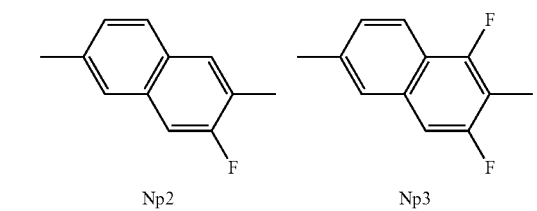

Np2  Np3

-continued

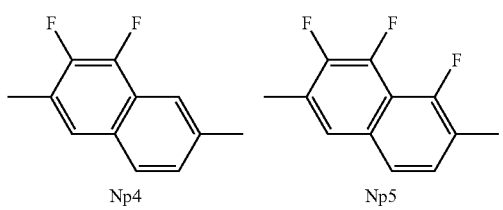

Np4   Np5

<Side Chain Structure>

TABLE 1

| No. | Chemical Structure |
|---|---|
| -n | —$C_nH_{2n+1}$ |
| n- | $C_nH_{2n+1}$— |
| —On | —$OC_nH_{2n+1}$ |
| nO— | $C_nH_{2n+1}O$— |
| —V | —CH=$CH_2$ |
| V— | $CH_2$=CH— |
| —V1 | —CH=CH—$CH_3$ |
| 1V— | $CH_3$—CH=CH— |
| -2V | —$CH_2$—$CH_2$—CH=$CH_2$ |
| V2- | $CH_2$=CH—$CH_2$—$CH_2$— |
| -2V1 | —$CH_2$—$CH_2$—CH=CH—$CH_3$ |
| 1V2- | $CH_3$—CH=CH—$CH_2$—$CH_2$— |

(However, n in the table is a natural number)

<Linking Structure>

TABLE 2

| No. | Chemical Structure |
|---|---|
| -n- | —$C_nH_{2n}$— |
| -nO— | —$CnH_{2n}O$— |
| —On- | —$OC_nH_{2n}$— |
| —COO— | —C(=O)—O— |
| —OCO— | —O—C(—O)— |
| —V— | —CH=CH— |
| -nV— | —$C_nH_{2n}$—CH=CH— |
| —Vn- | —CH=CH—$C_nH_{2n}$— |
| -T- | —C≡C— |
| —CF2O— | —$CF_2$—O— |
| —OCF2- | —O—$CF_2$— |

(However, n in the table is a natural number)

Evaluation of "low temperature storage stability", "vertical alignment", "pretilt angle formation", and "response characteristics" in examples and comparative examples were performed by the following methods.

(Evaluation Test for Low Temperature Storage Stability)

The liquid crystal composition was filtered with a membrane filter (manufactured by Agilent Technologies, PTFE 13 m to 0.2 μm), and left for 15 minutes under vacuum decompression conditions to remove dissolved air. 0.5 g of this was weighed into a vial that had been washed with acetone and sufficiently dried, and was allowed to stand in an environment at −25° C. for 10 days. Then, the presence or absence of precipitation was visually observed and determined using the following two grades.

A: Precipitation cannot be checked.

B: Precipitation was performed after one week.

D: Precipitation can be checked.

(Evaluation Test for Vertical Alignment)

A first substrate (common electrode substrate) and a second substrate (pixel electrode substrate) were produced. The first substrate had a transparent electrode layer made of a transparent common electrode patterned on an insulating layer and a color filter layer, but did not have any alignment film. The second substrate had a pixel electrode layer having a transparent pixel electrode driven by an active device, but did not have an alignment film. The liquid crystal composition was dropped onto the first substrate, sandwiched between the first and second substrates, and sealed with a sealing material cured at 110° C. for 2 hours under normal pressure, so that a liquid crystal cell having a cell gap of 3.2 μm was obtained. The vertical alignment and alignment unevenness such as dropping marks at this time were observed using a polarizing microscope and evaluated using the following four grades.

A: Uniform vertical alignment over the entire surface

B: Acceptable level even though there are very few alignment defects

C: Unacceptable level due to alignment defects

D: Alignment defect is considerably poor (Evaluation Test for Pretilt Angle Formation)

The pretilt angle in the initial state of the liquid crystal cell used in the above (evaluation test for vertical alignment) was measured using OPTIPRO manufactured by Shintech.

(Evaluation Test for Response Characteristics)

The cell with a cell gap of 3.2 μm used in the above (evaluation test for pretilt angle formation) was further irradiated with a UV fluorescent lamp manufactured by Toshiba Lighting & Technology Corporation for 60 minutes (illuminance at 313 nm: 1.7 mW/cm$^2$). The response speed was measured for the cell thus obtained. The response speed was measured using a DMS703 of AUTRONIC-MELCHERS, with a Voff at 6V at a temperature of 25° C.

(Preparation of Liquid Crystal Composition and Evaluation Results)

A liquid crystal composition was prepared in a mixing ratio with the compound obtained in the synthesis example or the compound below, and the composition was set as LC-1. The configuration of the liquid crystal composition and the results of the physical properties are described below.

LC-1 nematic phase-isotropic liquid phase transition temperature (TNI) was 75° C., solid phase-nematic phase transition temperature (TCN) was −33° C., refractive index anisotropy (Δn) was 0.11, dielectric anisotropy (Δε) was −2.8, and rotational viscosity (γ1) was 98 m Pa·S. The refractive index anisotropy (Δn), the dielectric anisotropy (Δε), and the rotational viscosity (γ1) are all measured results at 25° C. (the same applies hereinafter).

TABLE 3

| | | LC-1 |
|---|---|---|
| Liquid crystal compound [% by mass] | 3-Ph—Ph—O1 | 6 |
| | 3-Ph—Ph-1 | 9 |
| | 3-Cy-Cy-Ph-1 | 7 |
| | 3-Cy-1O—Ph5—O1 | 6 |

TABLE 3-continued

|  |  | LC-1 |
|---|---|---|
|  | 3-Cy-1O—Ph5—O2 | 8 |
|  | 2-Cy-Cy-10-Ph5—O2 | 6 |
|  | 3-Cy-Cy-10-Ph5—O2 | 8 |
|  | 2-Cy-Ph—Ph5—O2 | 7 |
|  | 3-Cy-Ph—Ph5—O2 | 6 |
|  | 3-Cy-Ph—Ph5—O3 | 6 |
|  | 3-Cy-Cy-2 | 20 |
|  | 3-Cy-Cy-5 | 5 |
|  | 3-Cy-Ph—Ph-2 | 6 |
|  | Total | 100 |
| Physical Properties | Tni [° C.] | 75 |
|  | Δn | 0.112 |
|  | Δε | −3 |
|  | $Y_1$ [mPa · s] | 122 |
|  | $K_{11}$ [pN] | 14.1 |
|  | $K_{33}$ [pN] | 13.9 |

Comparative Examples 1 to 4

A liquid crystal composition containing a polymerizable compound to which 1.0 parts by mass of the following spontaneously aligning monomer (P-1) and 0.3 parts by mass of the compound represented by Formula (RM-R1) were added with respect to 100 parts by mass of LC-1 was set as Comparative Example 1.

A liquid crystal composition containing a polymerizable compound which contains 1.0 parts by mass of the following spontaneously aligning monomer (P-1) and 0.3 parts by mass of the compound represented by Formula (RM-R2) with respect to 100 parts by mass of liquid crystal composition LC-1 was used as Comparative Example 2.

A liquid crystal composition containing a polymerizable compound which contains 1.0 parts by mass of the following spontaneously aligning monomer (P-1) and 0.6 part by mass of the compound represented by Formula (RM-R2) with respect to 100 parts by mass of liquid crystal composition LC-1 was used as Comparative Example 3.

A liquid crystal composition containing a polymerizable compound which contains 1.0 parts by mass of the following spontaneously aligning monomer (P-1) and 0.9 part by mass of the compound represented by Formula (RM-R2) with respect to 100 parts by mass of liquid crystal composition LC-1 was used as Comparative Example 4.

The results of the vertical alignment test of the polymerizable compounds after the ultraviolet irradiation in Comparative Examples 1 to 4 are indicated in Table 2.

[Chem. 215]

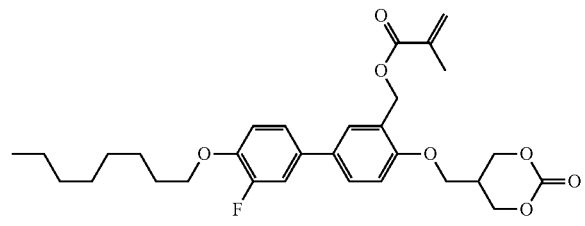

(P-1)

[Chem. 216]

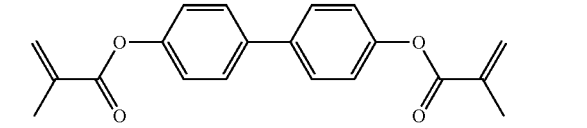

RM-R1

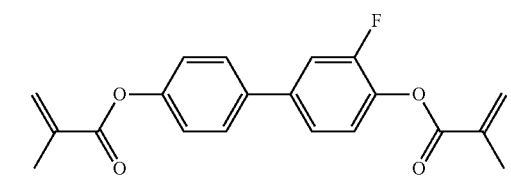

RM-R2

TABLE 4

|  | Base composition (100 parts by mass) | Spontaneously aligning monomer | Polymerizable compound | Addition amount (parts by mass) | Low temperature storage stability | Vertical alignment test |
|---|---|---|---|---|---|---|
| Comparative Example 1 | LC-1 | P-1 | RM-R1 | 0.3 | A | C |
| Comparative Example 2 | LC-1 | P-1 | RM-R2 | 0.3 | A | C |
| Comparative Example 3 | LC-1 | P-1 | RM-R2 | 0.6 | A | C |
| Comparative Example 4 | LC-1 | P-1 | RM-R2 | 0.9 | B | D |

Examples 1-111

A liquid crystal composition was prepared in the same manner as in Comparative Example 1 except that the following spontaneously aligning monomers (P-2) to (P-35) and polymerizable monomers (RM-1) to (RM-15) were added to LC-1 in the addition amounts indicated in Table 3 below, respectively.

[Chem. 217]
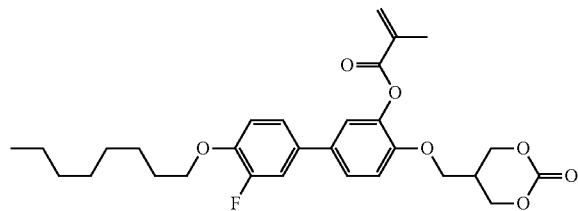
(P-2)
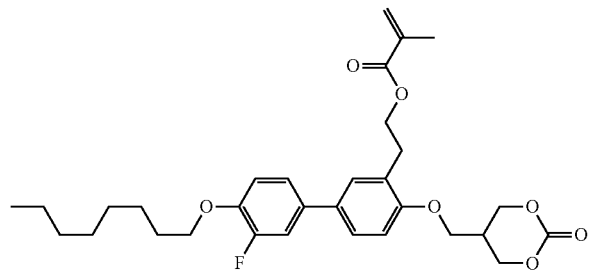
(P-3)
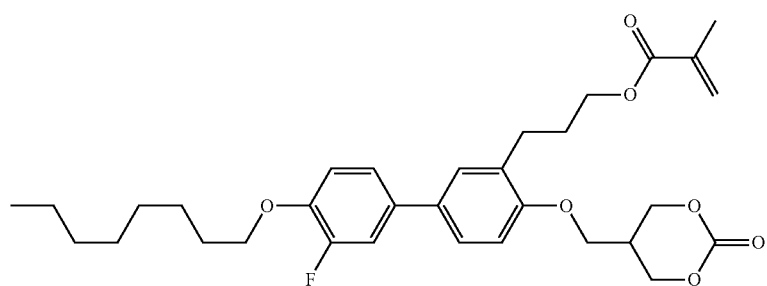
(P-4)
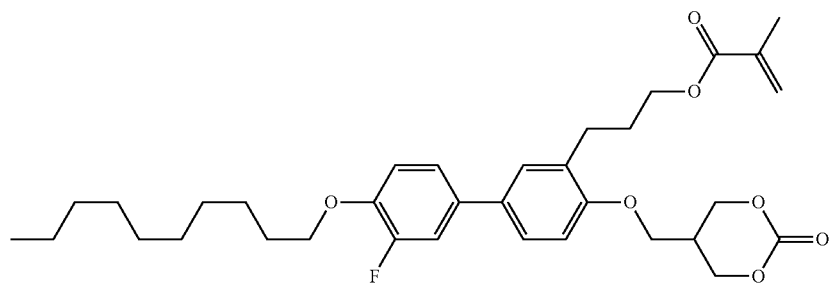
(P-5)
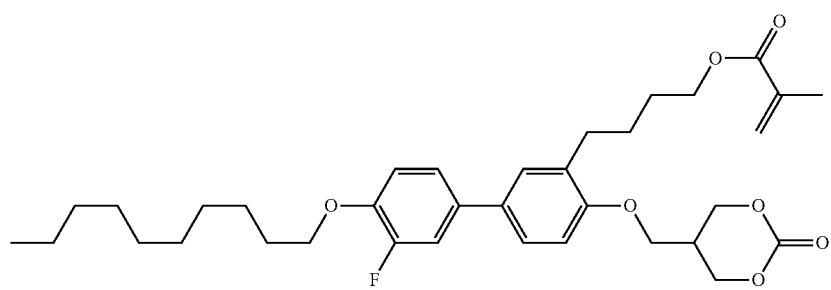
(P-6)
[Chem. 218]
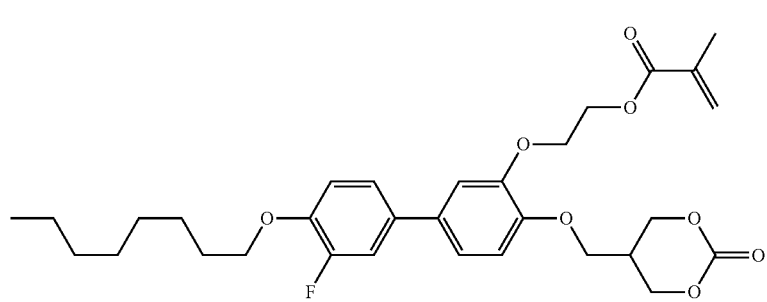
(P-7)

-continued
(P-8)
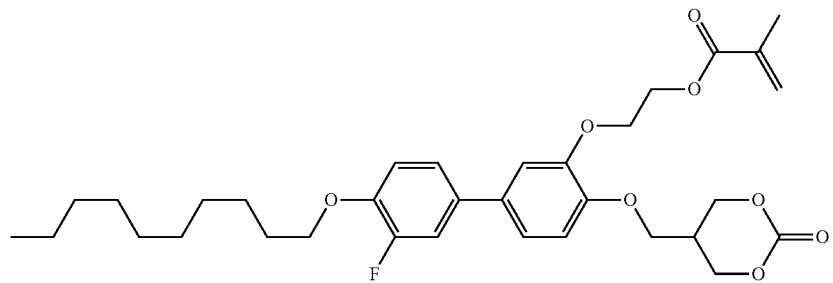
(P-9)
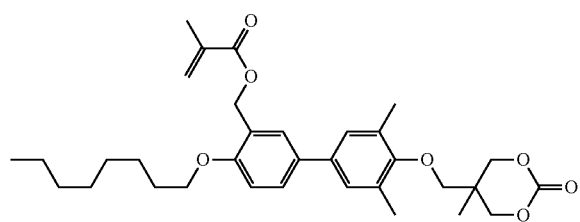
(P-10)
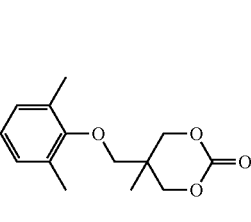
(P-11)
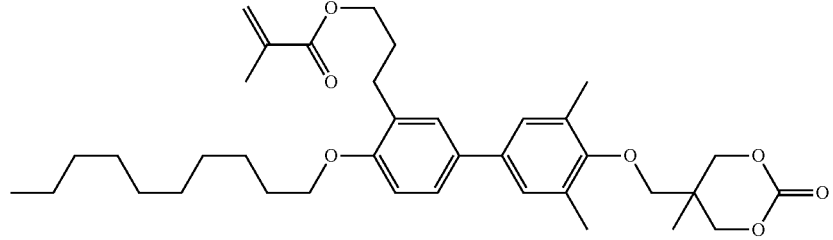
(P-12)
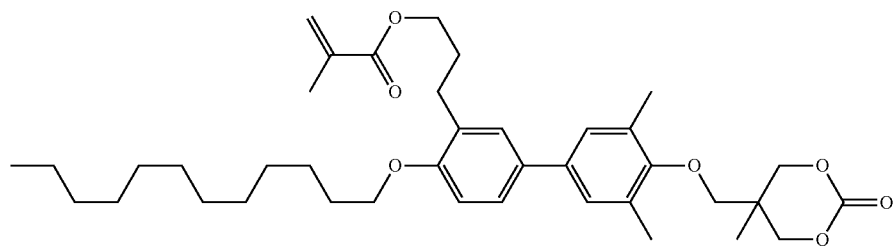
[Chem. 219]
(P-13)
(P-14)
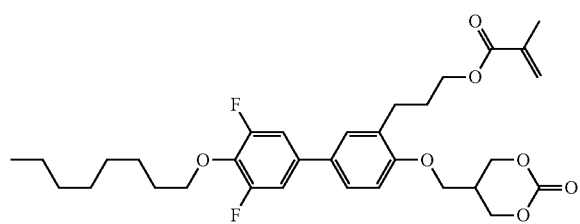
(P-15)
(P-16)
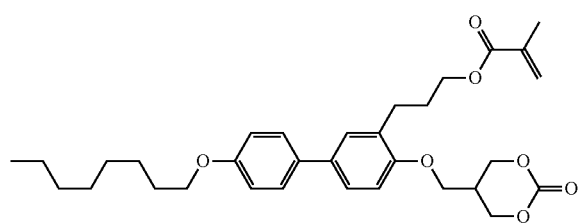
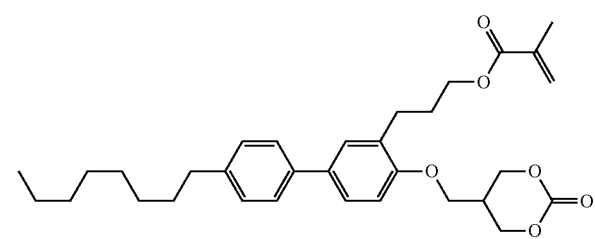

-continued
(P-17)
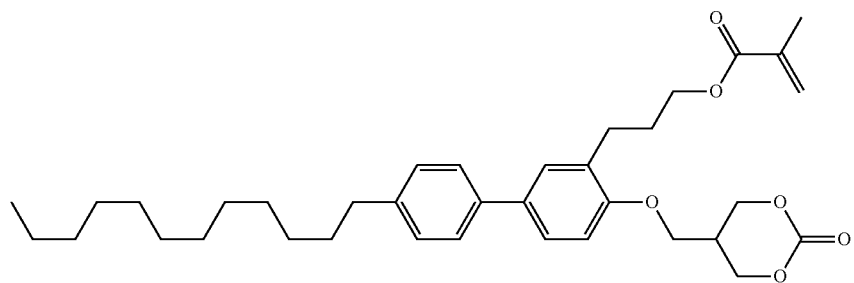
(P-18)
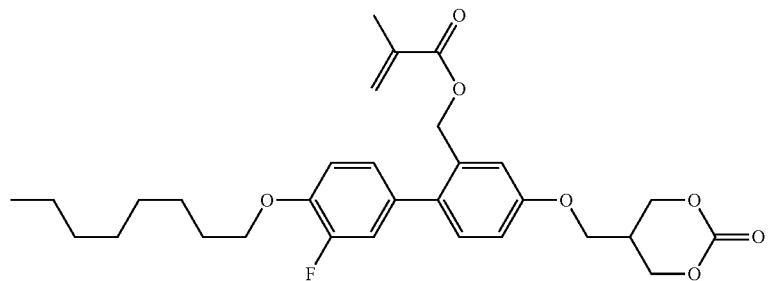
[Chem. 220]
(P-19)
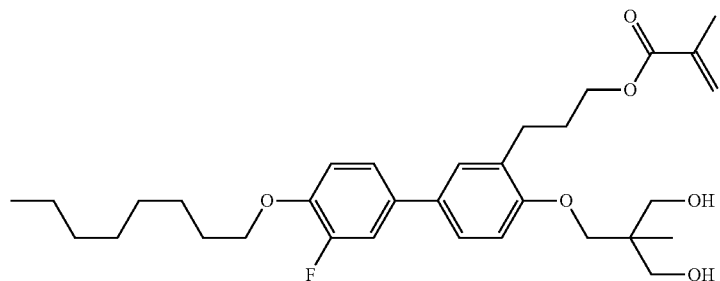
(P-20)
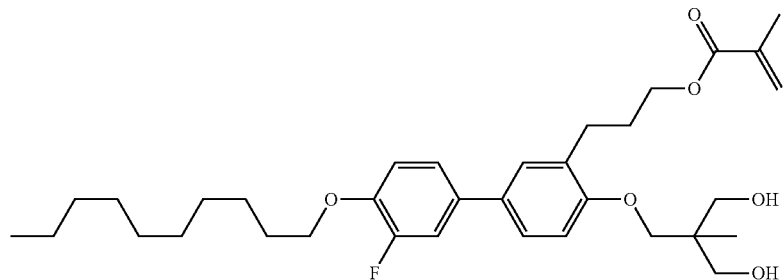
(P-21)
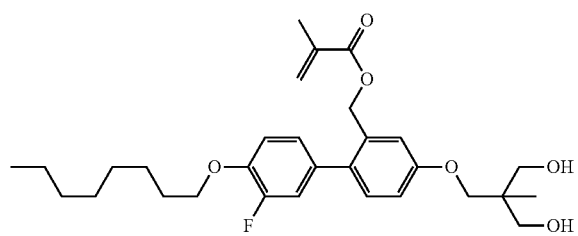
(P-22)
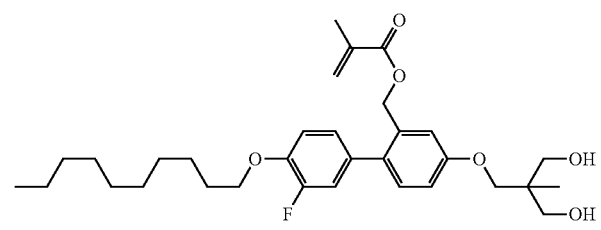

-continued
(P-23)
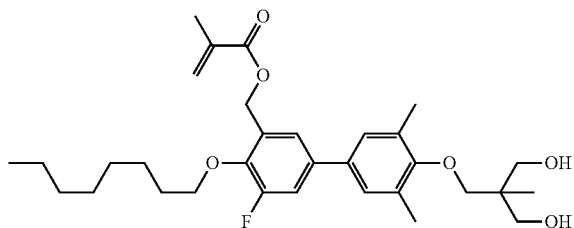
(P-24)
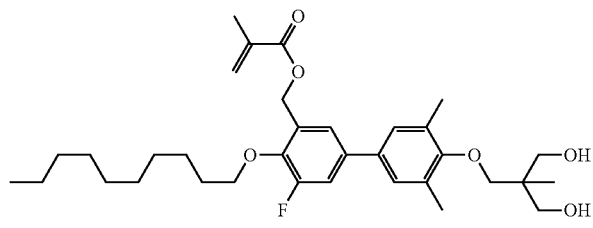
[Chem. 221]
(P-25)
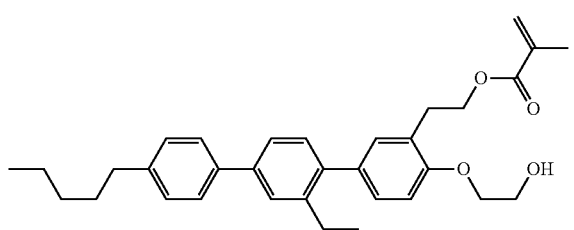
(P-26)
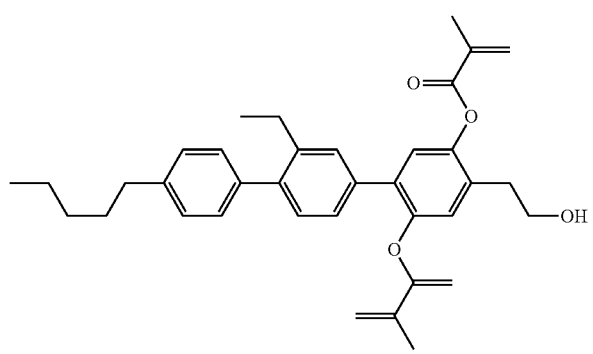
(P-27)
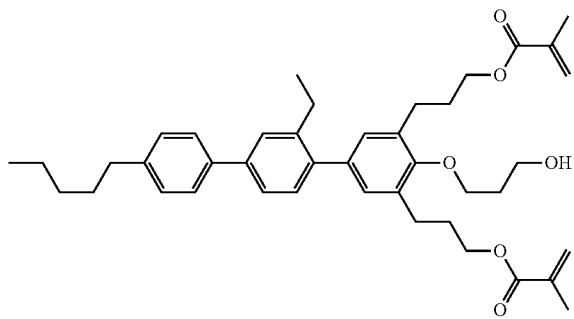
(P-28)
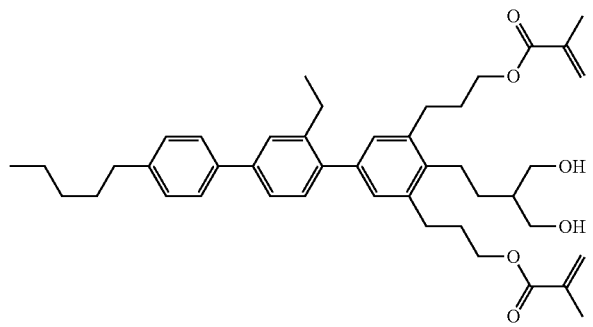
(P-29)
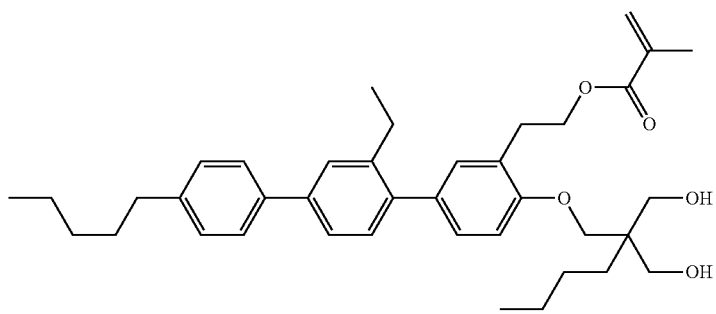
[Chem. 222]
(P-30)
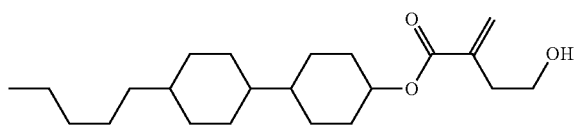
(P-31)
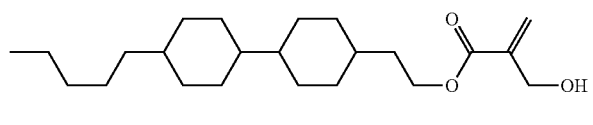

-continued
(P-32)
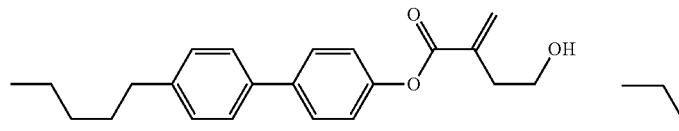
(P-33)
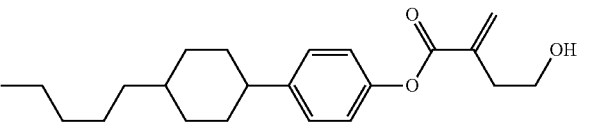
(P-34)
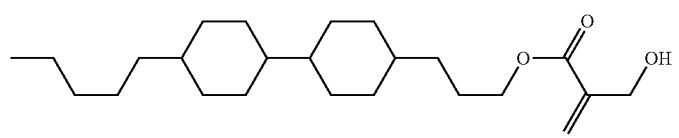
(P-35)
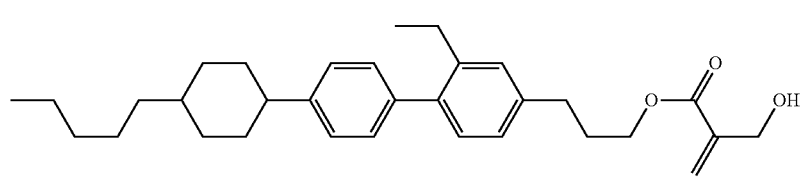
[Chem. 223]
RM-1
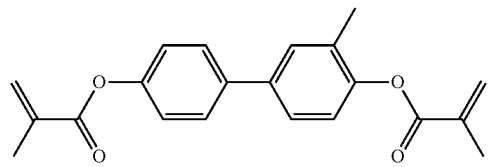
RM-2
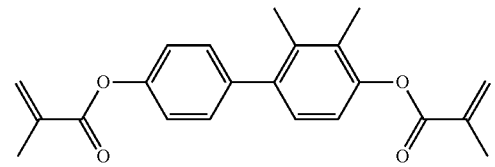
RM-3
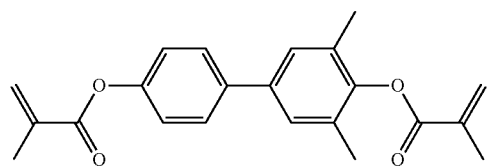
RM-4
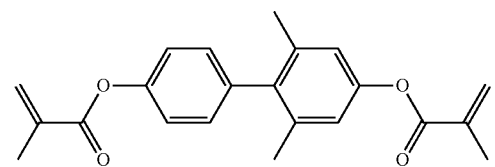
RM-5
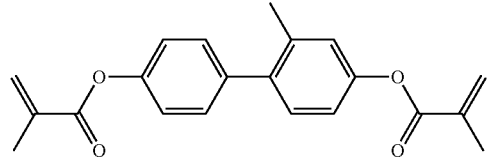
RM-6
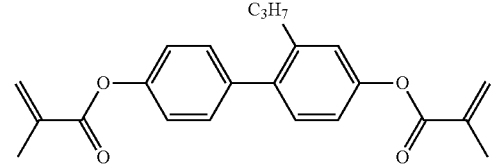
RM-7
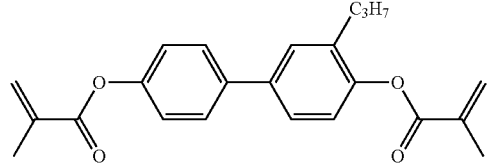
RM-8
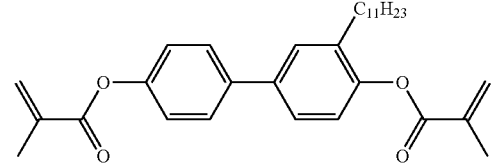
RM-9
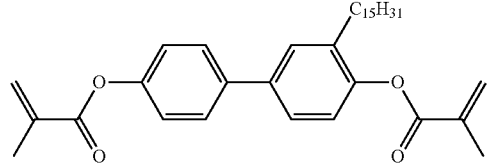
RM-10
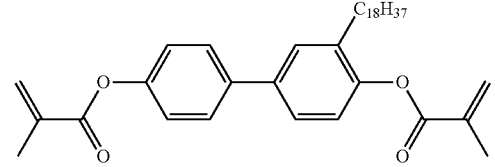
RM-11
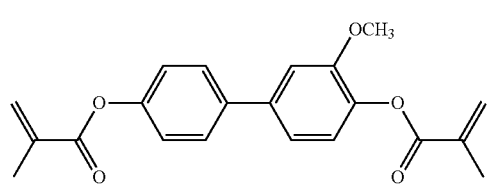
RM-12
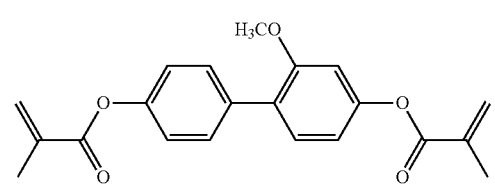

-continued

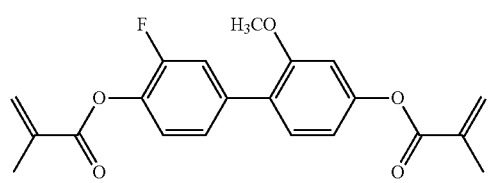
RM-13

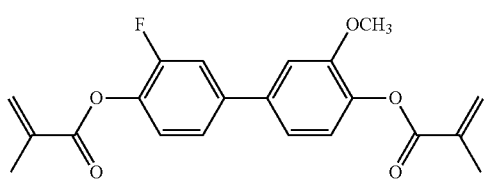
RM-14

RM-15

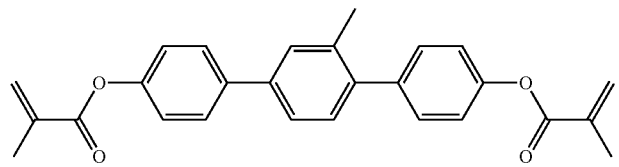

TABLE 5

| | Base composition (100 parts by mass) | Spontaneously aligning monomer | Addition amount (% by mass) | Polymerizable monomer | Addition amount (parts by mass) | Low temperature storage stability | Vertical alignment test |
|---|---|---|---|---|---|---|---|
| Example 1 | LC-1 | P-1 | 0.5 | RM-1 | 0.3 | A | B |
| Example 2 | LC-1 | P-1 | 0.5 | RM-2 | 0.3 | A | A |
| Example 3 | LC-1 | P-1 | 0.5 | RM-3 | 0.3 | A | A |
| Example 4 | LC-1 | P-1 | 0.5 | RM-4 | 0.3 | A | A |
| Example 5 | LC-1 | P-1 | 0.5 | RM-5 | 0.3 | A | B |
| Example 6 | LC-1 | P-1 | 0.5 | RM-6 | 0.3 | A | B |
| Example 7 | LC-1 | P-1 | 0.5 | RM-7 | 0.3 | A | A |
| Example 8 | LC-1 | P-1 | 0.5 | RM-8 | 0.3 | B | A |
| Example 9 | LC-1 | P-1 | 0.5 | RM-9 | 0.3 | B | A |
| Example 10 | LC-1 | P-1 | 0.5 | RM-10 | 0.3 | B | A |
| Example 11 | LC-1 | P-1 | 0.5 | RM-11 | 0.3 | A | B |
| Example 12 | LC-1 | P-1 | 0.5 | RM-12 | 0.3 | A | B |
| Example 13 | LC-1 | P-1 | 0.5 | RM-13 | 0.3 | A | B |
| Example 14 | LC-1 | P-1 | 0.5 | RM-14 | 0.3 | A | B |
| Example 15 | LC-1 | P-1 | 0.5 | RM-15 | 0.3 | A | A |
| Example 16 | LC-1 | P-2 | 1 | RM-1 | 0.3 | A | B |
| Example 17 | LC-1 | P-2 | 1 | RM-2 | 9.3 | A | A |
| Example 13 | LC-1 | P-2 | 1 | RM-3 | 0.3 | A | A |
| Example 19 | LC-1 | P-2 | 1 | RM-4 | 0.3 | A | A |
| Example 20 | LC-1 | P-2 | 1 | RM-7 | 0.3 | A | A |
| Example 21 | LC-1 | P-2 | 1 | RM-8 | 9.3 | B | A |
| Example 22 | LC-1 | P-2 | 1 | RM-15 | 0.3 | B | A |
| Example 23 | LC-1 | P-3 | 1 | RM-1 | 0.3 | A | B |
| Example 24 | LC-1 | P-3 | 1 | RM-2 | 9.3 | A | A |
| Example 25 | LC-1 | P-3 | 1 | RM-3 | 0.3 | A | A |
| Example 26 | LC-1 | P-3 | 1 | RM-4 | 0.3 | A | A |
| Example 27 | LC-1 | P-3 | 1 | RM-7 | 0.3 | A | A |

TABLE 6

| | Base composition (100 part by mass) | Spontaneously aligning monomer | Addition amount (parts by mass) | Polymerizable monomer | Addition amount (parts by mass) | Low temperature storage stability | Vertical alignment test |
|---|---|---|---|---|---|---|---|
| Example 28 | LC-1 | P-3 | 1 | RM-8 | 0.3 | B | A |
| Example 29 | LC-1 | P-3 | 1 | RM-15 | 0.3 | B | A |
| Example 30 | LC-1 | P-4 | 1 | RM-1 | 0.3 | A | B |
| Example 31 | LC-1 | P-4 | 1 | RM-2 | 0.3 | A | A |
| Example 32 | LC-1 | P-4 | 1 | RM-3 | 0.3 | A | A |
| Example 33 | LC-1 | P-4 | 1 | RM-4 | 0.3 | A | A |
| Example 34 | LC-1 | P-4 | 1 | RM-7 | 0.3 | A | A |
| Example 35 | LC-1 | P-4 | 1 | RM-8 | 0.3 | B | A |
| Example 36 | LC-1 | P-4 | 1 | RM-11 | 0.3 | A | B |
| Example 37 | LC-1 | P-4 | 1 | RM-15 | 0.3 | B | A |
| Example 38 | LC-1 | P-5 | 1 | RM-1 | 0.3 | A | B |
| Example 39 | LC-1 | P-5 | 1 | RM-2 | 0.3 | A | A |
| Example 40 | LC-1 | P-5 | 1 | RM-3 | 0.3 | A | A |
| Example 41 | LC-1 | P-5 | 1 | RM-4 | 0.3 | A | A |

TABLE 6-continued

|  | Base composition (100 part by mass) | Spontaneously aligning monomer | Addition amount (parts by mass) | Polymerizable monomer | Addition amount (parts by mass) | Low temperature storage stability | Vertical alignment test |
|---|---|---|---|---|---|---|---|
| Example 42 | LC-1 | P-5 | 1 | RM-5 | 0.3 | A | A |
| Example 43 | LC-1 | P-5 | 1 | RM-7 | 0.3 | A | A |
| Example 44 | LC-1 | P-5 | 1 | RM-8 | 0.3 | B | A |
| Example 45 | LC-1 | P-5 | 1 | RM-10 | 0.3 | B | A |
| Example 46 | LC-1 | P-6 | 1 | RM-1 | 0.3 | A | B |
| Example 47 | LC-1 | P-6 | 1 | RM-2 | 0.3 | A | A |
| Example 48 | LC-1 | P-6 | 1 | RM-3 | 0.3 | A | A |
| Example 49 | LC-1 | P-6 | 1 | RM-4 | 0.3 | A | A |
| Example 50 | LC-1 | P-6 | 1 | RM-5 | 0.3 | A | A |
| Example 51 | LC-1 | P-6 | 1 | RM-7 | 0.3 | A | A |
| Example 52 | LC-1 | P-6 | 1 | RM-8 | 0.3 | B | A |
| Example 53 | LC-1 | P-6 | 1 | RM-10 | 0.3 | B | A |
| Example 54 | LC-1 | P-6 | 1 | RM-15 | 0.3 | B | A |

TABLE 7

|  | Base composition (100 parts by mass) | Spontaneously aligning monomer | Addition amount (parts by mass) | Polymerizable monomer | Addition amount (parts by mass) | Low temperature storage stability | Vertical alignment test |
|---|---|---|---|---|---|---|---|
| Example 55 | LC-1 | P-7 | 1 | RM-2 | 0.3 | A | A |
| Example 56 | LC-1 | P-8 | 1 | RM-3 | 0.3 | A | A |
| Example 57 | LC-1 | P-9 | 1 | RM-4 | 0.3 | A | A |
| Example 58 | LC-1 | P-10 | 1 | RM-7 | 0.3 | A | A |
| Example 59 | LC-1 | P-11 | 1 | RM-8 | 0.3 | B | A |
| Example 60 | LC-1 | P-12 | 1 | RM-19 | 0.3 | B | A |
| Example 61 | LC-1 | P-13 | 1 | RM-2 | 0.3 | A | A |
| Example 62 | LC-1 | P-13 | 1 | RM-3 | 0.3 | A | A |
| Example 63 | LC-1 | P-13 | 1 | RM-4 | 0.3 | A | A |
| Example 64 | LC-1 | P-13 | 1 | RM-7 | 0.3 | A | A |
| Example 65 | LC-1 | P-13 | 1 | RM-8 | 0.3 | B | A |
| Example 66 | LC-1 | P-13 | 1 | RM-10 | 0.3 | B | A |
| Example 67 | LC-1 | P-14 | 1 | RM-2 | 0.3 | A | A |
| Example 68 | LC-1 | P-14 | 1 | RM-3 | 0.3 | A | A |
| Example 69 | LC-1 | P-14 | 1 | RM-1 | 0.3 | A | A |
| Example 79 | LC-1 | P-14 | 1 | RM-7 | 0.3 | A | A |
| Example 71 | LC-1 | P-14 | 1 | RM-8 | 0.3 | B | A |
| Example 72 | LC-1 | P-14 | 1 | RM-10 | 0.3 | B | A |
| Example 73 | LC-1 | P-15 | 1 | RM-1 | 0.3 | A | B |
| Example 74 | LC-1 | P-16 | 1 | RM-2 | 0.3 | A | A |
| Example 75 | LC-1 | P-17 | 1 | RM-3 | 0.3 | A | A |
| Example 76 | LC-1 | P-18 | 1 | RM-4 | 0.3 | A | A |
| Example 77 | LC-1 | P-19 | 1 | RM-8 | 0.3 | A | A |
| Example 78 | LC-1 | P-20 | 1 | RM-3 | 0.3 | A | A |
| Example 79 | LC-1 | P-20 | 1 | RM-4 | 0.3 | A | A |
| Example 80 | LC-1 | P-20 | 1 | RM-8 | 0.3 | A | A |

TABLE 8

|  | Base composition (100 parts by mass) | Spontaneously aligning monomer | Addition amount (parts by mass) | Polymerizable monomer | Addition amount (parts by mass) | Low temperature storage stability | Vertical alignment test |
|---|---|---|---|---|---|---|---|
| Example 81 | LC-1 | P-25 | 0.5 | RM-2 | 0.3 | A | A |
| Example 82 | LC-1 | P-25 | 0.5 | RM-3 | 0.3 | A | A |
| Example 33 | LC-1 | P-25 | 0.5 | RM-4 | 0.3 | A | A |
| Example 84 | LC-1 | P-25 | 0.5 | RM-7 | 0.3 | A | A |
| Example 85 | LC-1 | P-25 | 0.5 | RM-8 | 0.3 | B | A |
| Example 86 | LC-1 | P-25 | 0.5 | RM-10 | 0.3 | B | A |
| Example 87 | LC-1 | P-26 | 0.5 | RM-2 | 0.3 | A | A |
| Example 88 | LC-1 | P-26 | 0.5 | RM-3 | 0.3 | A | A |
| Example 89 | LC-1 | P-26 | 0.5 | RM-4 | 0.3 | A | A |
| Example 90 | LC-1 | P-26 | 0.5 | RM-7 | 0.3 | A | A |
| Example 91 | LC-1 | P-28 | 0.5 | RM-8 | 0.3 | B | A |
| Example 92 | LC-1 | P-26 | 0.5 | RM-10 | 0.3 | B | A |
| Example 93 | LC-1 | P-28 | 0.5 | RM-3 | 0.3 | A | A |
| Example 94 | LC-1 | P-28 | 0.5 | RM-4 | 0.3 | A | A |

TABLE 8-continued

| | Base composition (100 parts by mass) | Spontaneously aligning monomer | Addition amount (parts by mass) | Polymerizable monomer | Addition amount (parts by mass) | Low temperature storage stability | Vertical alignment test |
|---|---|---|---|---|---|---|---|
| Example 95 | LC-1 | P-28 | 0.5 | RM-7 | 0.3 | A | A |
| Example 96 | LC-1 | P-28 | 0.5 | RM-8 | 0.3 | B | A |
| Example 97 | LC-1 | P-29 | 0.5 | RM-3 | 0.3 | A | A |
| Example 98 | LC-1 | P-29 | 0.5 | RM-4 | 0.3 | A | A |
| Example 99 | LC-1 | P-29 | 0.5 | RM-7 | 0.3 | A | B |
| Example 100 | LC-1 | P-29 | 0.5 | RM-8 | 0.3 | B | A |
| Example 101 | LC-1 | P-30 | 1 | RM-2 | 0.3 | A | A |
| Example 102 | LC-1 | P-30 | 1 | RM-3 | 0.3 | A | A |
| Example 103 | LC-1 | P-30 | 1 | RM-4 | 0.3 | A | A |
| Example 104 | LC-1 | P-30 | 1 | RM-7 | 0.3 | A | A |
| Example 105 | LC-1 | P-30 | 1 | RM-8 | 0.3 | B | A |
| Example 106 | LC-1 | P-30 | 1 | RM-10 | 0.3 | B | A |
| Example 107 | LC-1 | P-32 | 1 | RM-3 | 0.3 | A | A |
| Example 108 | LC-1 | P-32 | 1 | RM-4 | 0.3 | A | A |
| Example 109 | LC-1 | P-32 | 1 | RM-7 | 0.3 | A | A |
| Example 110 | LC-1 | P-32 | 1 | RM-8 | 0.3 | B | A |
| Example 111 | LC-1 | P-32 | 1 | RM-10 | 0.3 | B | A |

Figure 2:
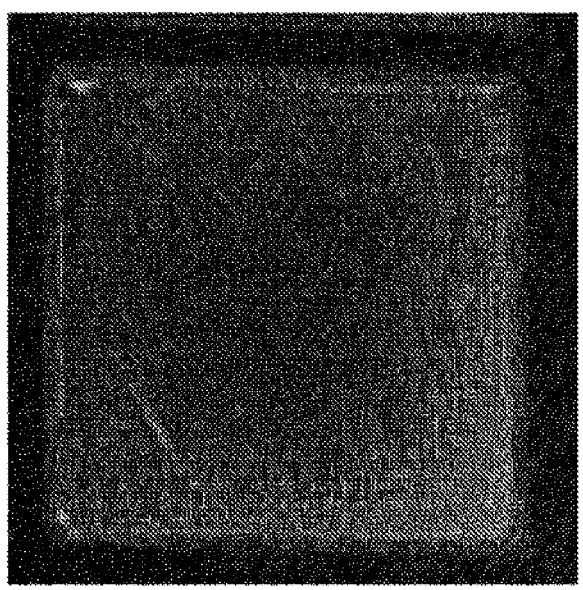
FIG. 2 is a diagram illustrating an evaluation result of an alignment test of the present invention.

Regarding the low temperature storage stability of Examples 1-111, precipitation begins to occur in about 1 week in the polymerizable monomer having a long-chain alkyl group. In addition, a short-chain alkyl or alkoxy group-containing polymerizable compound was excellent in the solubility and low temperature storage stability. In addition, a cell in which a liquid crystal composition containing a vertical alignment assistant and a polymerizable monomer was enclosed was set in a polarizing microscope in which a polarizer and an analyzer were arranged orthogonally, and transmitted light was observed. If the liquid crystal molecules are vertically aligned, light cannot be transmitted by the action of the polarizing plate, and the cell is displayed in black. When the samples were evaluated by this test method, it was checked that no alignment unevenness occurred in all the samples and uniform vertical alignment was exhibited. The evaluation results of typical alignment tests are illustrated in FIG. 1 and FIG. 2. FIG. 1 is a photograph under crossed Nicols of a cell in which the liquid crystal of Comparative Example 2 was injected, and FIG. 2 is a photograph under crossed Nicols of a cell in which the liquid crystal of Example 40 was injected. A part that appears white in a peripheral portion of the cell in FIG. 1 is a part that is not vertically aligned but is obliquely or horizontally aligned, and shows alignment unevenness. In FIG. 1, many white parts are seen, and there are many moieties that are not vertically aligned. In addition, the domain that is divided into four is seen in the cell. This is dripping unevenness, that is, unevenness that does not mix uniformly when the compositions are spread when the liquid crystal composition is dropped and spreads, which is also a kind of defect. However, in FIG. 2, a white line is hardly seen and black is shown uniformly. In FIG. 1 and FIG. 2, the white straight line that is partially visible is not alignment unevenness but a scratch on the physical glass, and thus is not alignment defect. Therefore, this indicates that the liquid crystals are vertically aligned, and it is checked that the liquid crystal molecules are vertically aligned by appropriately combining the vertical alignment assistant (spontaneously aligning monomer) and the polymerizable monomer.

Moreover, when the pretilt angle generated by the polymerization due to irradiation with the ultraviolet rays was evaluated, it was checked that an appropriate tilt angle was given to all the samples. It has been checked that the liquid crystal display device using these has a sufficiently fast response due to the pretilt angle which is sufficiently given.

Further, when a liquid crystal cell was produced with a composition containing RM-2 to RM-4 used in Examples 2 to 4 as a polymerizable monomer, the extensibility (wetting and spreading) was excellent.

Examples 112 to 129

A liquid crystal composition containing a polymerizable monomer which contains 1.0 parts by mass of the following spontaneously aligning monomer (P-1), 0.3 parts by mass of the compound represented by Formula (RM-R2), and 0.5 parts by mass of the compound represented by Formula (RM-1) with respect to 100 parts by mass of liquid crystal composition LC-1 was used as Example 112.

A liquid crystal composition containing a polymerizable monomer which contains 1.0 parts by mass of the following spontaneously aligning monomer (P-1), 0.3 parts by mass of the compound represented by Formula (RM-R2), and 1.0 parts by mass of the compound represented by Formula (RM-2) with respect to 100 parts by mass of liquid crystal composition LC-1 was used as Example 113.

A liquid crystal composition containing a polymerizable monomer which contains 1.0 parts by mass of the following spontaneously aligning monomer (P-5), 0.3 parts by mass of the compound represented by Formula (RM-R2), and 0.3 parts by mass of the compound represented by Formula (RM-3) with respect to 100 parts by mass of liquid crystal composition LC-1 was used as Example 114.

A liquid crystal composition containing a polymerizable monomer which contains 1.0 parts by mass of the following spontaneously aligning monomer (P-5), 0.3 parts by mass of the compound represented by Formula (RM-R2), and 0.6 parts by mass of the compound represented by Formula (RM-3) with respect to 100 parts by mass of liquid crystal composition LC-1 was used as Example 115.

A liquid crystal composition containing a polymerizable monomer which contains 1.0 parts by mass of the following spontaneously aligning monomer (P-6), 0.3 parts by mass of the compound represented by Formula (RM-R2), and 0.5 parts by mass of the compound represented by Formula (RM-3) with respect to 100 parts by mass of liquid crystal composition LC-1 was used as Example 116.

A liquid crystal composition containing a polymerizable monomer which contains 1.0 parts by mass of the following spontaneously aligning monomer (P-6), 0.3 parts by mass of the compound represented by Formula (RM-R2), and 1.0 parts by mass of the compound represented by Formula (RM-3) with respect to 100 parts by mass of liquid crystal composition LC-1 was used as Example 117.

A liquid crystal composition containing a polymerizable monomer which contains 1.0 parts by mass of the following spontaneously aligning monomer (P-6), 0.3 parts by mass of the compound represented by Formula (RM-R2), and 0.3 parts by mass of the compound represented by Formula (RM-4) with respect to 100 parts by mass of liquid crystal composition LC-1 was used as Example 118.

A liquid crystal composition containing a polymerizable monomer which contains 1.0 parts by mass of the following spontaneously aligning monomer (P-6), 0.3 parts by mass of the compound represented by Formula (RM-R2), and 0.6 parts by mass of the compound represented by Formula (RM-4) with respect to 100 parts by mass of liquid crystal composition LC-1 was used as Example 119.

A liquid crystal composition containing a polymerizable monomer which contains 1.0 parts by mass of the following spontaneously aligning monomer (P-13), 0.3 parts by mass of the compound represented by Formula (RM-R2), and 0.3 parts by mass of the compound represented by Formula (RM-7) with respect to 100 parts by mass of liquid crystal composition LC-1 was used as Example 120.

A liquid crystal composition containing a polymerizable monomer which contains 1.0 parts by mass of the following spontaneously aligning monomer (P-13), 0.3 parts by mass of the compound represented by Formula (RM-R2), and 0.6 parts by mass of the compound represented by Formula (RM-7) with respect to 100 parts by mass of liquid crystal composition LC-1 was used as Example 121.

A liquid crystal composition containing a polymerizable monomer which contains 1.0 parts by mass of the following spontaneously aligning monomer (P-14), 0.3 parts by mass of the compound represented by Formula (RM-R2), and 0.5 parts by mass of the compound represented by Formula (RM-8) with respect to 100 parts by mass of liquid crystal composition LC-1 was used as Example 122.

A liquid crystal composition containing a polymerizable monomer which contains 1.0 parts by mass of the following spontaneously aligning monomer (P-14), 0.3 parts by mass of the compound represented by Formula (RM-R2), and 1.0 part by mass of the compound represented by Formula (RM-8) with respect to 100 parts by mass of liquid crystal composition LC-1 was used as Example 123.

A liquid crystal composition containing a polymerizable monomer which contains 0.5 parts by mass of the spontaneously aligning monomer (P-1), 1.0 parts by mass of the spontaneously aligning monomer (P-5), 0.3 parts by mass of the compound represented by Formula (RM-R2), and 0.3 parts by mass of the compound represented by Formula (RM-4) with respect to 100 parts by mass of liquid crystal composition LC-1 was used as Example 124.

A liquid crystal composition containing a polymerizable monomer which contains 0.5 parts by mass of the spontaneously aligning monomer (P-5), 1.2 parts by mass of the spontaneously aligning monomer (P-6), 0.3 parts by mass of the compound represented by Formula (RM-R2), and 1.0 parts by mass of the compound represented by Formula (RM-3) with respect to 100 parts by mass of liquid crystal composition LC-1 was used as Example 125.

A liquid crystal composition containing a polymerizable monomer which contains 1.0 parts by mass of the spontaneously aligning monomer (P-5), 0.5 parts by mass of the spontaneously aligning monomer (P-8), 0.3 parts by mass of the compound represented by Formula (RM-R2), and 0.5 parts by mass of the compound represented by Formula (RM-4) with respect to 100 parts by mass of liquid crystal composition LC-1 was used as Example 126.

A liquid crystal composition containing a polymerizable monomer which contains 0.8 parts by mass of the spontaneously aligning monomer (P-5), 0.2 parts by mass of the spontaneously aligning monomer (P-17), 0.3 parts by mass of the compound represented by Formula (RM-R2), and 1.0 parts by mass of the compound represented by Formula (RM-4) with respect to 100 parts by mass of liquid crystal composition LC-1 was used as Example 127.

A liquid crystal composition containing a polymerizable monomer which contains 1.2 parts by mass of the spontaneously aligning monomer (P-6), 0.3 parts by mass of the spontaneously aligning monomer (P-13), 0.3 parts by mass of the compound represented by Formula (RM-R2), and 0.5 parts by mass of the compound represented by Formula (RM-3) with respect to 100 parts by mass of liquid crystal composition LC-1 was used as Example 128.

A liquid crystal composition containing a polymerizable monomer which contains 1.0 parts by mass of the spontaneously aligning monomer (P-6), 0.5 parts by mass of the spontaneously aligning monomer (P-19), 0.3 parts by mass of the compound represented by Formula (RM-R2), and 0.6 parts by mass of the compound represented by Formula (RM-3) with respect to 100 parts by mass of liquid crystal composition LC-1 was used as Example 129.

A liquid crystal composition containing a polymerizable monomer which contains 1.0 parts by mass of the spontaneously aligning monomer (P-6), 0.3 parts by mass of the spontaneously aligning monomer (P-26), 0.3 parts by mass of the compound represented by Formula (RM-R2), and 0.5 parts by mass of the compound represented by Formula (RM-4) with respect to 100 parts by mass of liquid crystal composition LC-1 was used as Example 130.

A liquid crystal composition containing a polymerizable monomer which contains 1.0 parts by mass of the spontaneously aligning monomer (P-6), 0.5 parts by mass of the spontaneously aligning monomer (P-32), 0.3 parts by mass of the compound represented by Formula (RM-R2), and 0.3 parts by mass of the compound represented by Formula (RM-4) with respect to 100 parts by mass of liquid crystal composition LC-1 was used as Example 131.

TABLE 9

| | Composition (100 parts by mass) | Spontaneous alignment aid 1 | Spontaneous alignment aid 2 | Polymerizable compound 1 | Polymerizable compound 2 | Polymerizable compound 2 Addition amount (% by mass) | Low temperature storage stability | Vertical alignment test |
|---|---|---|---|---|---|---|---|---|
| Example 112 | LC-1 | P-1 | — | RM-R2 | RM-1 | 0.5 | A | A |
| Example 113 | LC-1 | P-1 | — | RM-R2 | RM-2 | 1 | B | A |
| Example 114 | LC-1 | P-5 | — | RM-R2 | RM-3 | 0.3 | A | B |
| Example 115 | LC-1 | P-5 | — | RM-R2 | RM-3 | 0.6 | A | A |
| Example 116 | LC-1 | P-6 | — | RM-R2 | RM-3 | 0.5 | A | A |
| Example 117 | LC-1 | P-6 | — | RM-R2 | RM-3 | 1 | A | A |

TABLE 9-continued

| | Composition (100 parts by mass) | Spontaneous alignment aid 1 | Spontaneous alignment aid 2 | Polymerizable compound 1 | Polymerizable compound 2 | Polymerizable compound 2 Addition amount (% by mass) | Low temperature storage stability | Vertical alignment test |
|---|---|---|---|---|---|---|---|---|
| Example 118 | LC-1 | P-6 | — | RM-R2 | RM-4 | 0.3 | A | A |
| Example 119 | LC-1 | P-6 | — | RM-R2 | RM-4 | 0.6 | A | A |
| Example 120 | LC-1 | P-13 | — | RM-R2 | RM-7 | 0.3 | A | A |
| Example 121 | LC-1 | P-13 | — | RM-R2 | RM-7 | 0.6 | A | A |
| Example 122 | LC-1 | P-14 | — | RM-R2 | RM-8 | 0.5 | A | A |
| Example 123 | LC-1 | P-14 | — | RM-R2 | RM-8 | 1 | B | A |
| Example 124 | LC-1 | P-1 | P-5 | RM-R2 | RM-4 | 0.3 | A | A |
| Example 125 | LC-1 | P-5 | P-5 | RM-R2 | RM-3 | 1 | A | A |
| Example 126 | LC-1 | PS | P-8 | RM-R2 | RM-4 | 0.5 | A | A |
| Example 127 | LC-1 | P-5 | P-17 | RM-R2 | RM-4 | 1 | A | A |
| Example 128 | LC-1 | P-6 | P-13 | RM-R2 | RM-3 | 0.5 | A | A |
| Example 129 | LC-1 | P-6 | P-19 | RM-R2 | RM-3 | 0.6 | A | A |
| Example 130 | LC-1 | P-6 | P-26 | RM-R2 | RM-4 | 0.5 | A | A |
| Example 131 | LC-1 | P-6 | P-32 | RM-R2 | RM-3 | 1 | A | A |

In Examples 112 to 123, the low temperature storage stability and the vertical alignment were evaluated in a case where one kind of spontaneous alignment aid and two kinds of polymerizable compounds (or polymerizable monomers) were used, and as a result, it was checked that the low temperature storage stability and the vertical alignment were improved by adding a new polymerizable compound even when the polymerizable compound used for comparative examples was used. In a case where the solubility of the spontaneously aligning monomer in the liquid crystal is low, the concentration of one component can be lowered, and a different spontaneously aligning monomer can be added to improve the vertical alignment. In Examples 124 to 131, it was checked that the low temperature storage stability and the vertical alignment were improved by mixing two kinds of spontaneously aligning monomers and two kinds of polymerizable compounds.

Further, when a liquid crystal cell was produced with a composition containing RM-2 to RM-4 used in Examples 113 to 118 as a polymerizable monomer, the extensibility (wetting and spreading) was excellent.

Examples 132 to 140

Further, instead of the composition LC-1, a composition consisting of the following compounds and mixing ratios was prepared, and the prepared liquid crystal compositions were set as LC-2 to LC-8.

TABLE 10

| | | LC-2 | LC-3 | LC-4 | LC-5 | LC-6 | LC-7 | LC-8 |
|---|---|---|---|---|---|---|---|---|
| | 3-Ph—Ph-1 | 11 | 13 | 8 | 9 | 12.7 | | |
| | 3-Cy-1O—Ph5—O1 | | 16 | | 8.5 | 6 | | |
| | 3-Cy-1O—Ph5—O2 | | | | | 6.5 | | |
| | 3-Cy-Ph—O1 | | | 14 | 15 | | 7 | |
| | 3-Cy-Ph—O2 | | | 14 | | | | |
| | 2-Cy-Cy-1O—Ph5—O2 | | | | | 15 | | |
| | 3-Cy-Cy-1O—Ph5—O2 | 16 | | 21 | 17 | 1.8 | | |
| | 2-Cy-Ph—Ph5—O2 | 6 | | 6 | 6.5 | 6 | 8.5 | 3 |
| | 3-Cy-Ph—Ph5—O2 | 7 | | 8 | 8 | | 8.5 | 8.5 |
| | 3-Cy-Ph—Ph5—O3 | | | | | 7 | | |
| | 3-Cy-Ph—Ph5—O4 | 6 | | 12 | 8.5 | 9 | | |
| | 3-Cy-Cy-2 | 24 | 21 | 17 | 16.5 | 18 | 23.5 | 8 |
| | 3-Cy-Cy-4 | 7 | | | 3 | 7.5 | 10 | 7.5 |
| | 3-Cy-Ph5—O2 | 7 | | | | | 13 | 7 |
| | 5-Cy-Ph5—O2 | 7 | | | | | | |
| | 3-Ph—Ph5—O2 | | 14 | | | | | 16 |
| | 3-Cy-Cy-Ph5—O2 | | | | | | | 10 |
| | 4-Cy-Cy-Ph5—O2 | | | | | | 9 | |
| | 5-Cy-Cy-Ph5—O2 | | | | | | 5 | 8 |
| | 3-Cy-Cy-Ph-1 | 3 | 10 | | | | | |
| | 3-Cy-Ph—Ph-1 | 3 | | | | | | |
| | 3-Cy-Ph—Ph-2 | 3 | 10 | | 8 | 6 | | |
| | 5-Cy-Ph—Ph-2 | | 16 | | | 4.5 | | |
| | 3-Ph—Ph5—Ph-2 | | | | | | 7.5 | 8 |
| | 4-Ph—Ph5—Ph-2 | | | | | | 8 | |
| | 3-Cy-Cy-V | | | | | | | 14.5 |
| | 3-Cy-Cy-V-1 | | | | | | | 9.5 |
| | | 100 | 100 | 100 | 100 | 100 | 100 | 100 |
| Physical properties | Tni [° C.] | 77 | 77 | 75.9 | 75 | 75.5 | 75.3 | 74.4 |
| | Δn | 0.112 | 0.112 | 0.109 | 0.112 | 0.102 | 0.1057 | 0.1069 |
| | Δε | −3 | −3 | −2.9 | −3.2 | −2.6 | −2.67 | −2.87 |

TABLE 10-continued

|  | LC-2 | LC-3 | LC-4 | LC-5 | LC-6 | LC-7 | LC-8 |
|---|---|---|---|---|---|---|---|
| $Y_1[mPa \cdot s]$ | 110 | 110 | 124 | 121 | 87 | 93 | 79 |
| $K_{11}[pN]$ | 16.6 | 16.6 |  | 14.9 |  | 12.5 | 13.7 |
| $K_{33}[pN]$ | 14.7 | 14.7 |  | 12.3 |  | 11.7 | 13.5 |

For the liquid crystal compositions LC-2 to LC-8, the spontaneously aligning monomer (P-5, P-6, P-J-23, P-K-5, P-K-6, P-28, or P-35) and the polymerizable monomer (RM-2, RM-3, or RM-4) were mixed at an appropriate concentration, and the alignment test was evaluated in the same manner as described above, and as a result, it was checked that the performance was improved.

The invention claimed is:

1. A liquid crystal composition for a liquid crystal display device, the liquid crystal composition comprising:
   a polymerizable monomer represented by General Formula (I); and
   a spontaneously aligning monomer selected from the group consisting of compounds represented by Formulae (P-1-1) to (P-1-15), (P-1-20) to (P-1-26), (P-J-10) to (P-J-50), and (P-1) to (P-18),
   wherein the content of the polymerizable monomer represented by General Formula (I) is 0.02 to 2.5% by mass, and the content of the spontaneously aligning monomer is 0.02 to 2.5% by mass,

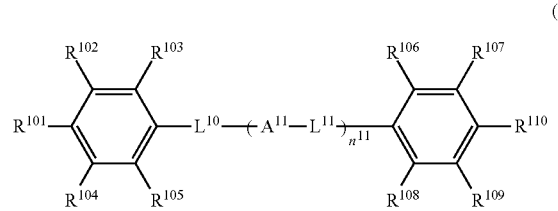
(I)

wherein $R^{101}$, $R^{102}$, $R^{103}$, $R^{104}$, $R^{105}$, $R^{106}$, $R^{107}$, $R^{108}$, $R^{109}$, and $R^{110}$ each independently represent any selected from the group consisting of $P^{11}$—$S^{11}$—, an alkyl group having 1 to 18 carbon atoms, an alkoxy group having 1 to 18 carbon atoms, a halogen atom, and a hydrogen atom, and $P^{11}$ represents any of the following Formula (R-I) to Formula (R-IX):

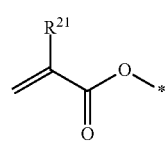
(R-I)

(R-II)

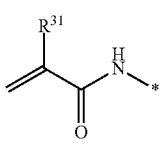
(R-III)

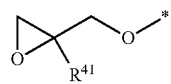
(R-IV)

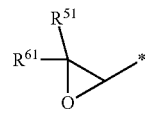
(R-V)

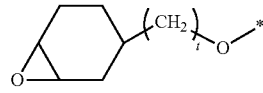
(R-VI)

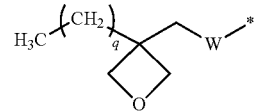
(R-VII)

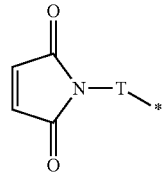
(R-VIII)

HS—*  (R-IX)

wherein
$R^{21}$, $R^{31}$, $R^{41}$, $R^{51}$, and $R^{61}$ are each independently a hydrogen atom or an alkyl group having 1 to 5 carbon atoms,
W is a single bond, —O—, or a methylene group,
T is a single bond or —COO—,
p, t, and q are each independently 0, 1, or 2,
$S^{11}$ represents a single bond or an alkylene group having 1 to 15 carbon atoms, and one or two or more —$CH_2$—'s in the alkylene group may be substituted with —O—, —OCO—, or —COO— so that an oxygen atom is not directly adjacent thereto,
$n^{11}$ represents 0, 1, or 2,
$A^{11}$ represents a group selected from the group consisting of a group (a), a group (b), and a group (c) as follows:
(a) 1,4-cyclohexylene group (one —$CH_2$— or two or more non-adjacent —$CH_2$—'s present in this group may be substituted with —O—),
(b) 1,4-phenylene group (one —CH= or two or more non-adjacent —CH='s present in this group may be substituted with —N=), and
(c) naphthalene-2,6-diyl group, 1,2,3,4-tetrahydronaphthalene-2,6-diyl group, or decahydronaphthalene-2,6-diyl group (one —CH= or two or more non-adjacent —CH='s present in the naphthalene-2,6-diyl group or the 1,2,3,4-tetrahydronaphthalene-2,6-diyl group may be substituted with —N=),
the group (a), the group (b), and the group (c) may be each independently substituted with an alkyl group having 1 to 12 carbon atoms, an alkoxy group having 1 to 12 carbon atoms, halogen atoms, a cyano group, a nitro group, or $P^{11}$—$S^{11}$—, $L^{10}$ and $L^{11}$ each independently represent a single bond, —OCH$_2$—, —CH$_2$O—, —C$_2$H$_4$—, —OC$_2$H$_4$O—, —COO—, —OCO—, —CH=CR$^a$—COO—, —CH=CR$^a$—OCO—, —COO—CR$^a$=CH—, —OCO—CR$^a$=CH—, —(CH$_2$)$_z$—COO—, —(CH$_2$)$_z$—OCO—, —OCO—(CH$_2$)$_z$—, —COO—(CH$_2$)$_z$—, —CH=CH—, —CF$_2$O—, —OCF$_2$—, or —C≡C— (wherein, R$^a$'s each independently represent a hydrogen atom or an alkyl group having 1 to 3 carbon atoms, and z's each independently represent an integer of 1 to 4), at least two or more $P^{11}$—$S^{11}$—'s are included in one molecule of General Formula (I), and at least one alkyl group having 1 to 18 carbon atoms is included in the polymerizable monomer represented by General Formula (I), in which one —CH$_2$— or two or more non-adjacent —CH$_2$—'s in an alkylene group of said at least one alkyl group may be each independently substituted with —O—, and in a case where there are a plurality of $P^{11}$'s, $S^{11}$'s, $L^{11}$'s, and $A^{11}$'s, those may be the same as or different from each other,

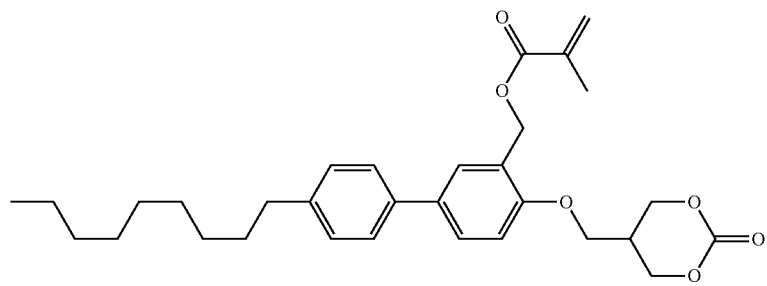
(P-1-1)

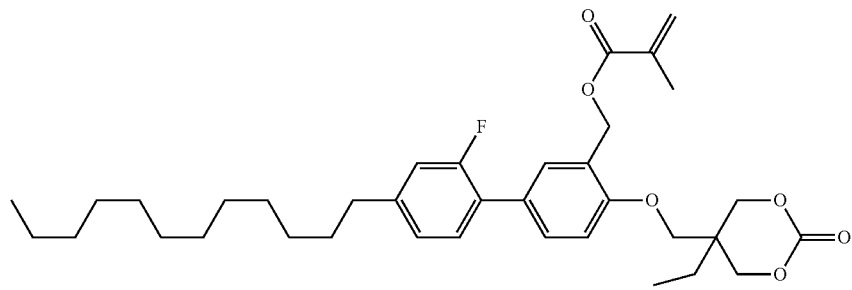
(P-1-2)

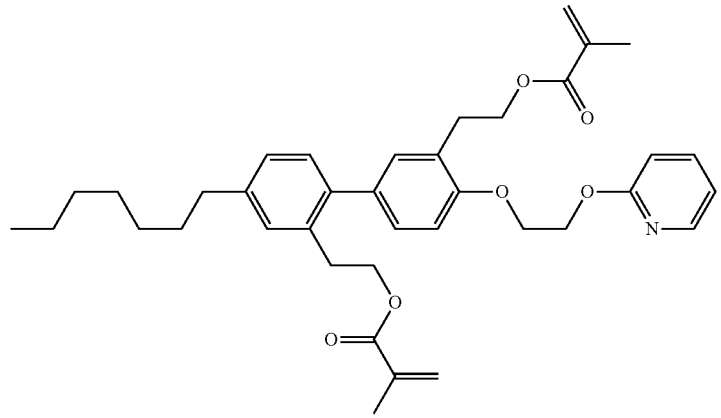
(P-1-3)

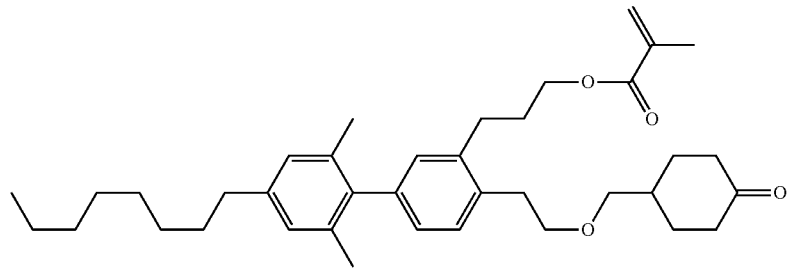
(P-1-4)

-continued
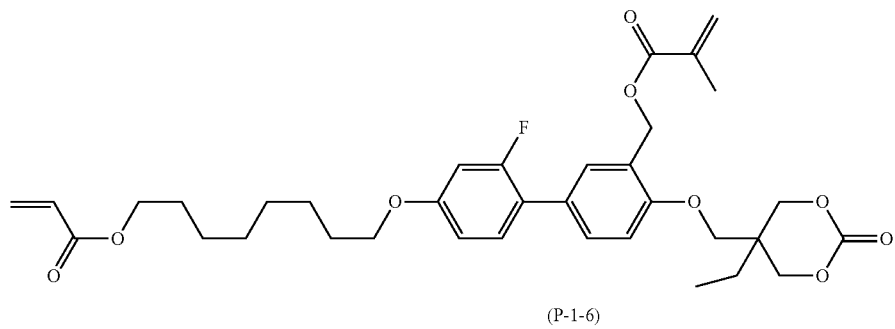
(P-1-5)
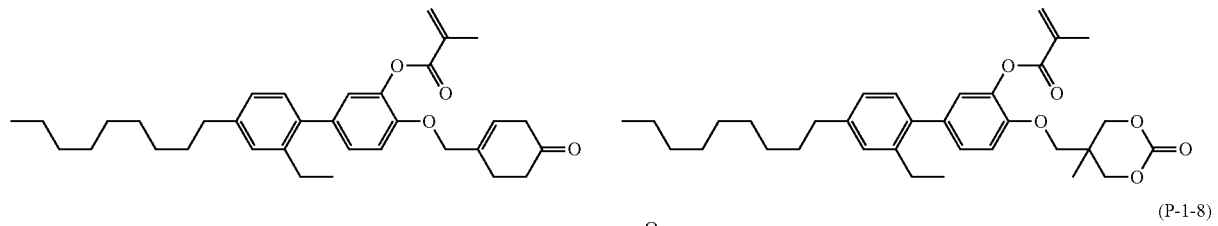
(P-1-6) (P-1-7)
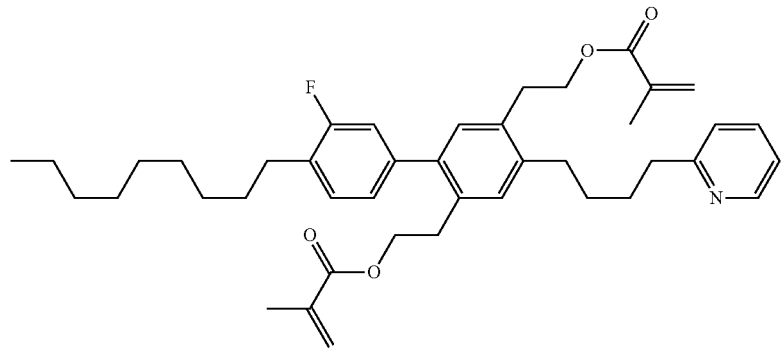
(P-1-8)
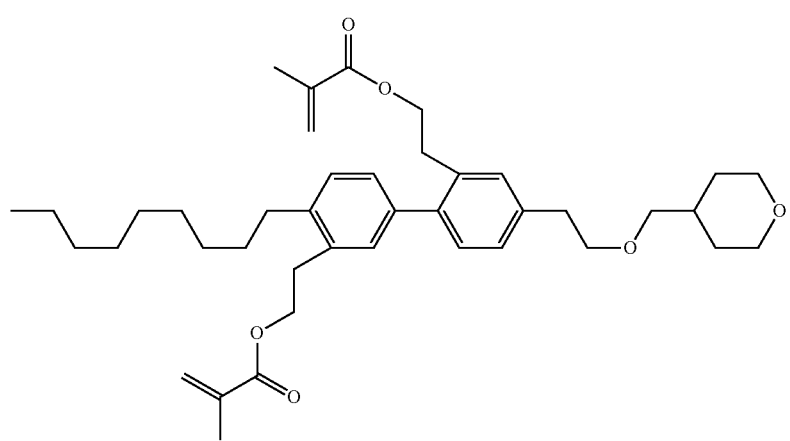
(P-1-9)
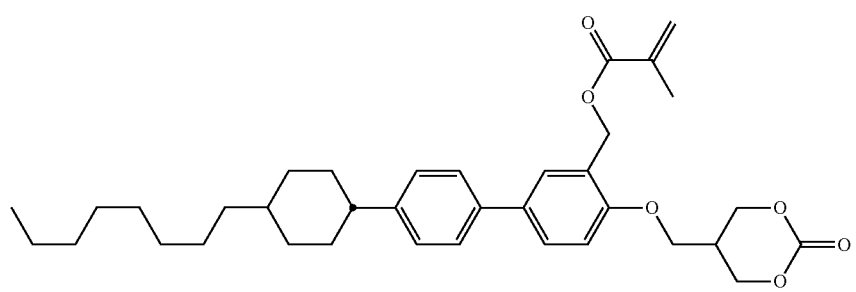
(P-1-10)

-continued
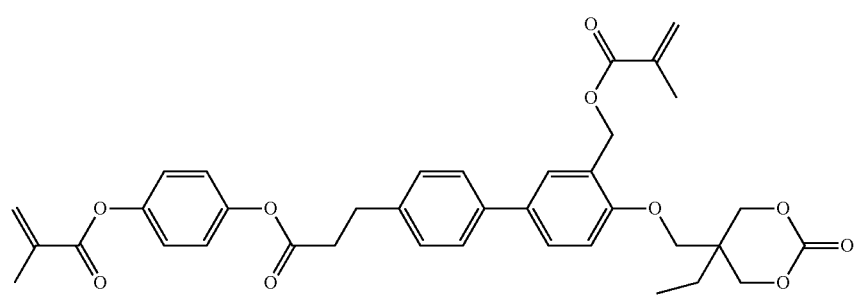
(P-1-11)
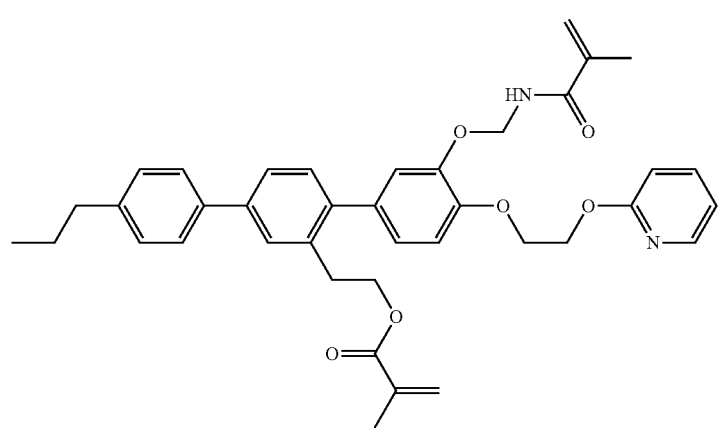
(P-1-12)
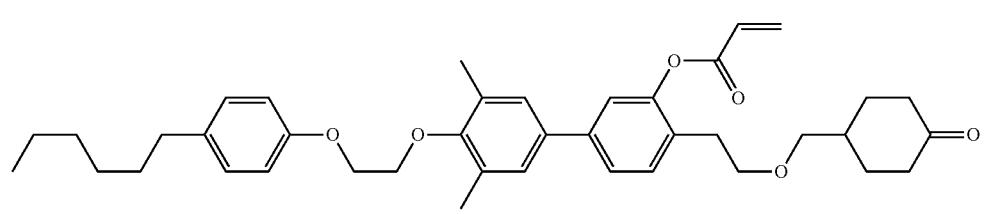
(P-1-13)
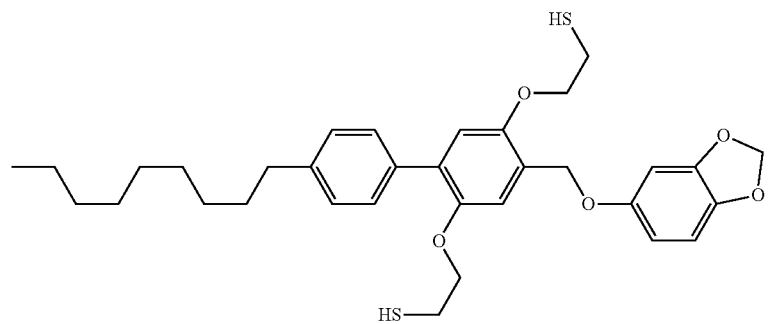
(P-1-14)
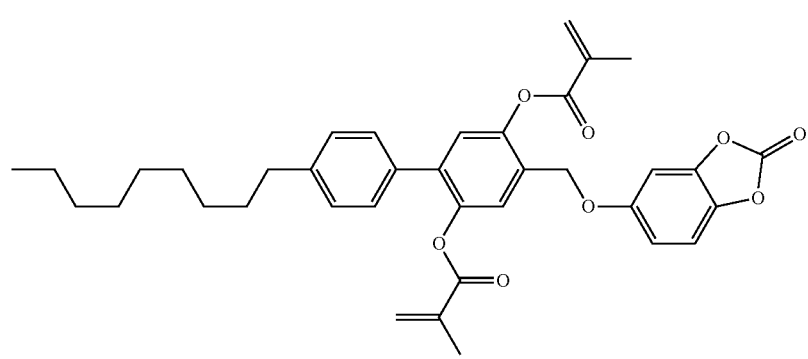
(P-1-15)

-continued
(P-1-20)
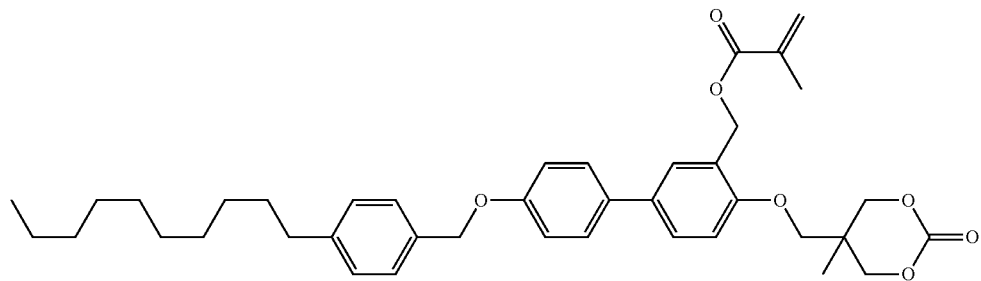
(P-1-21)
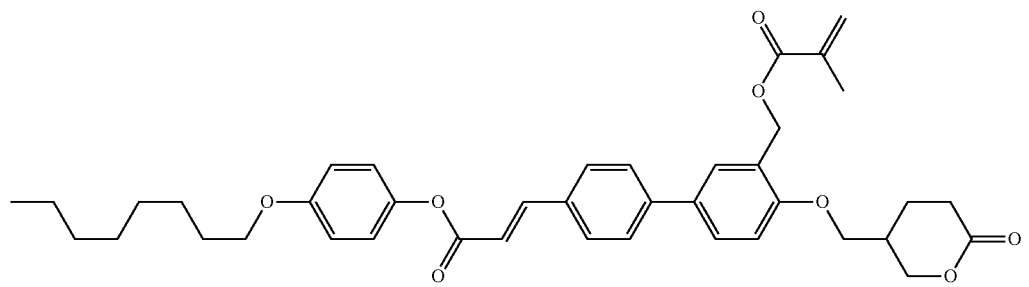
(P-1-22)
(P-1-23)
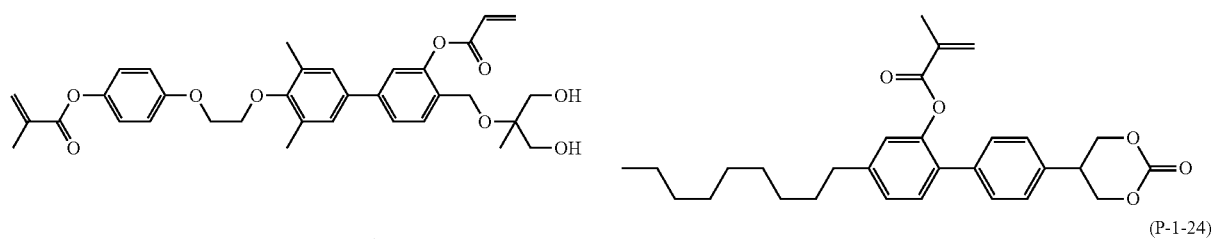
(P-1-24)
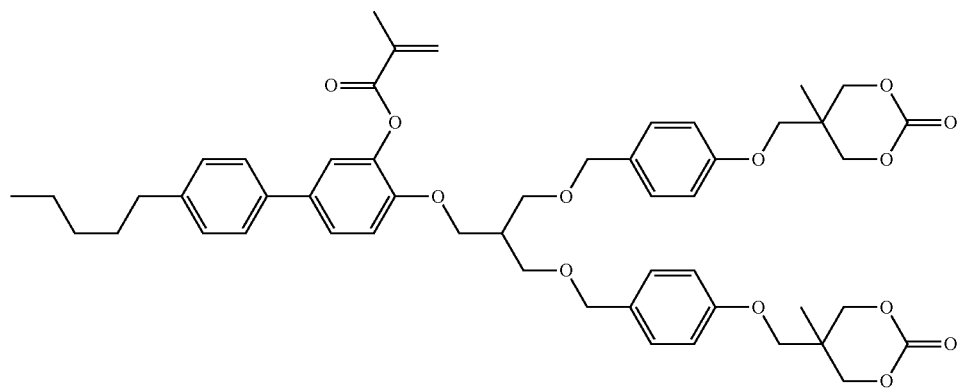
(P-1-25)
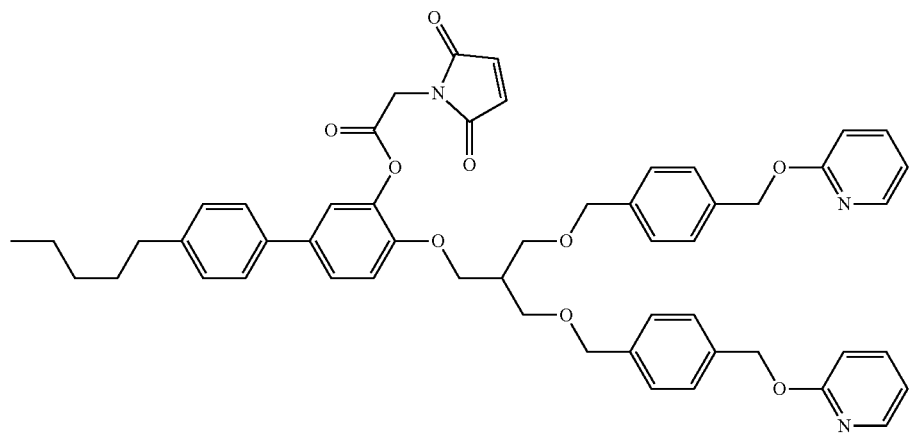

-continued
(P-1-26)
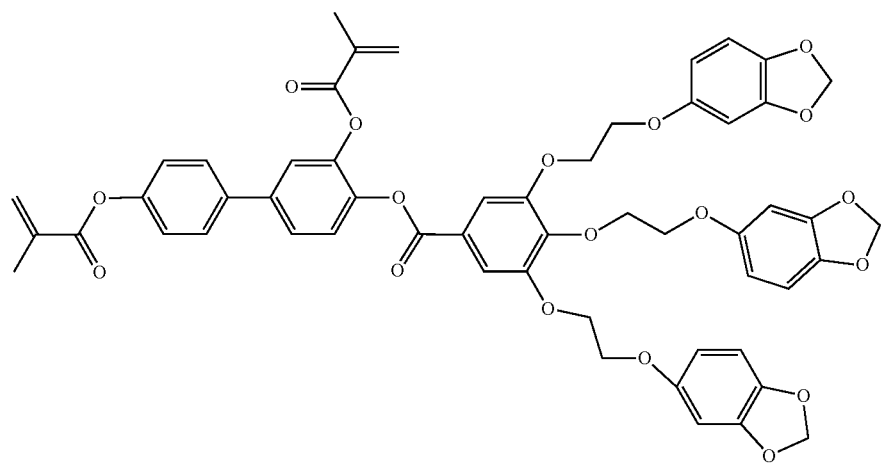
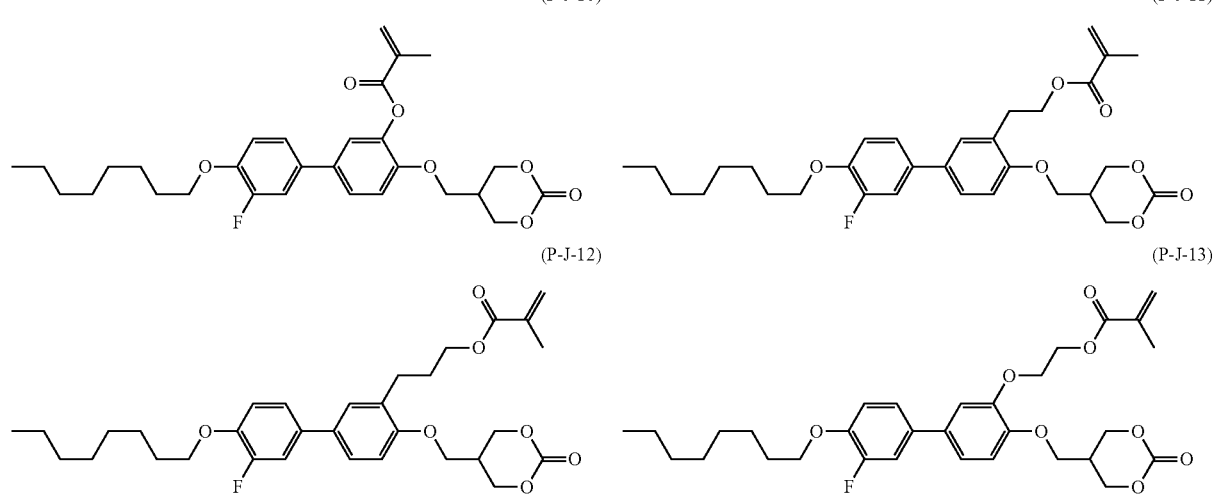
(P-J-10) (P-J-11) (P-J-12) (P-J-13)
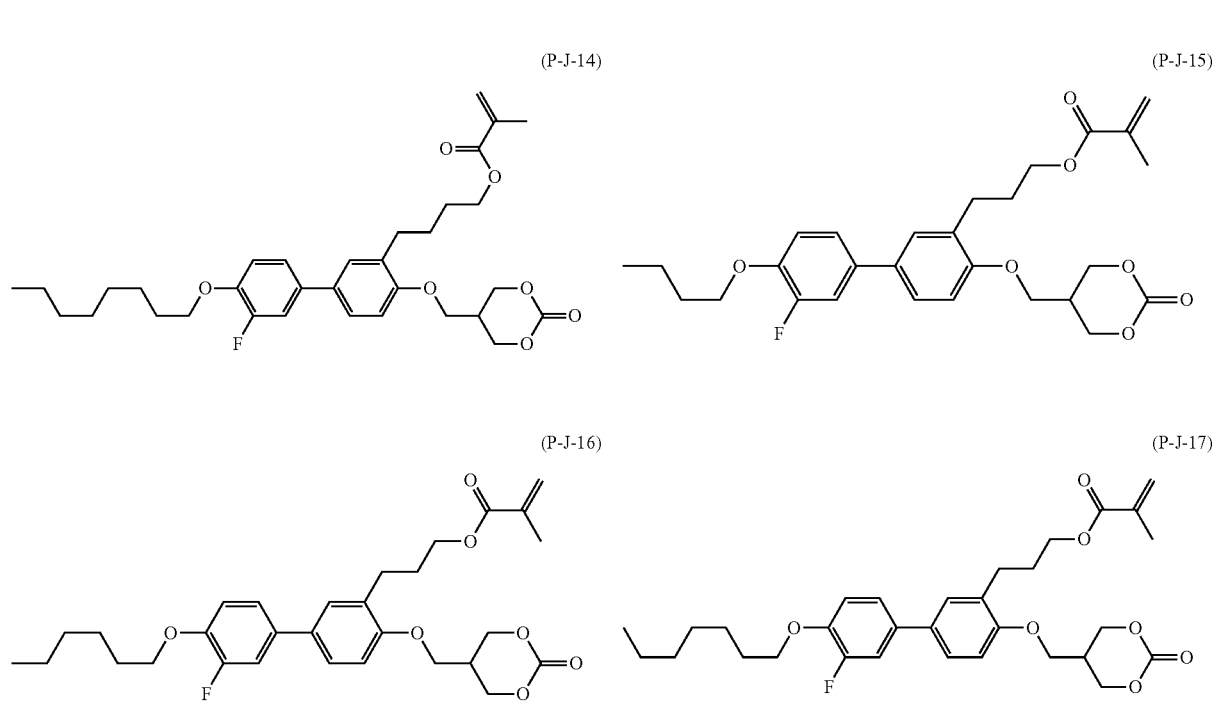
(P-J-14) (P-J-15) (P-J-16) (P-J-17)

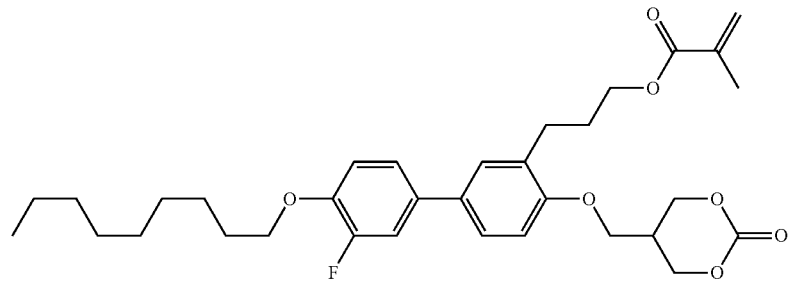
(P-J-18)
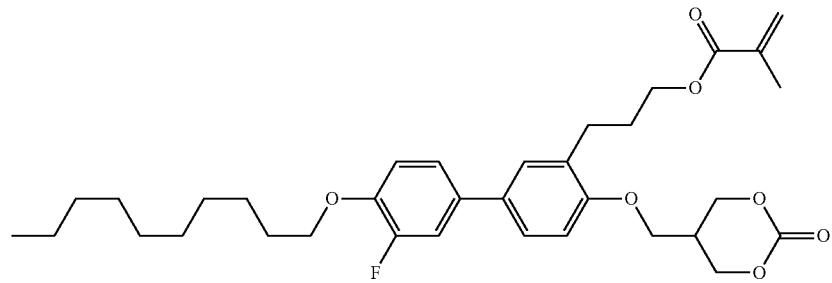
(P-J-19)
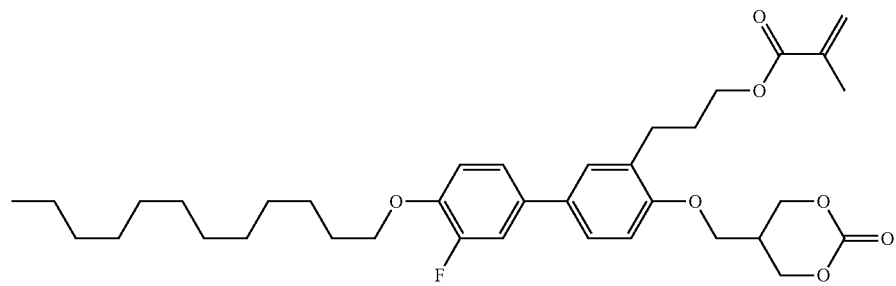
(P-J-20)
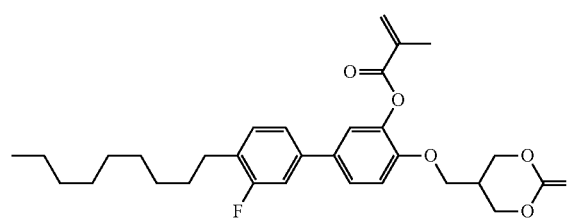
(P-J-21)
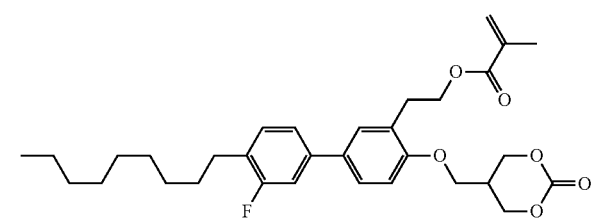
(P-J-22)
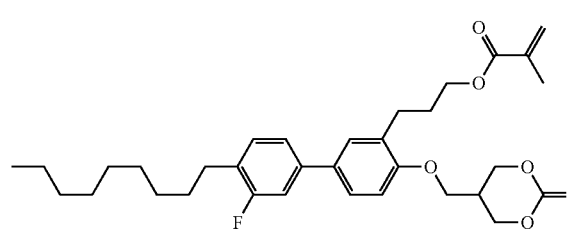
(P-J-23)
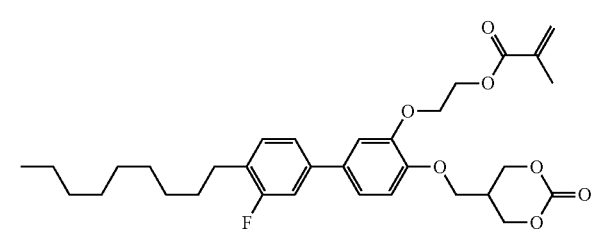
(P-J-24)
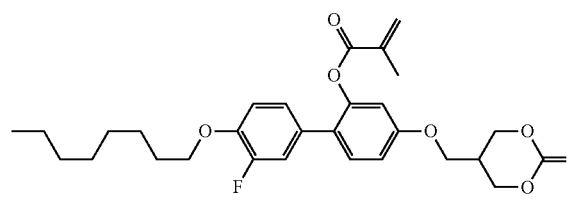
(P-J-25)
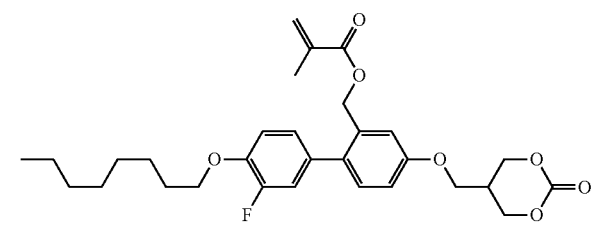
(P-J-26)

-continued
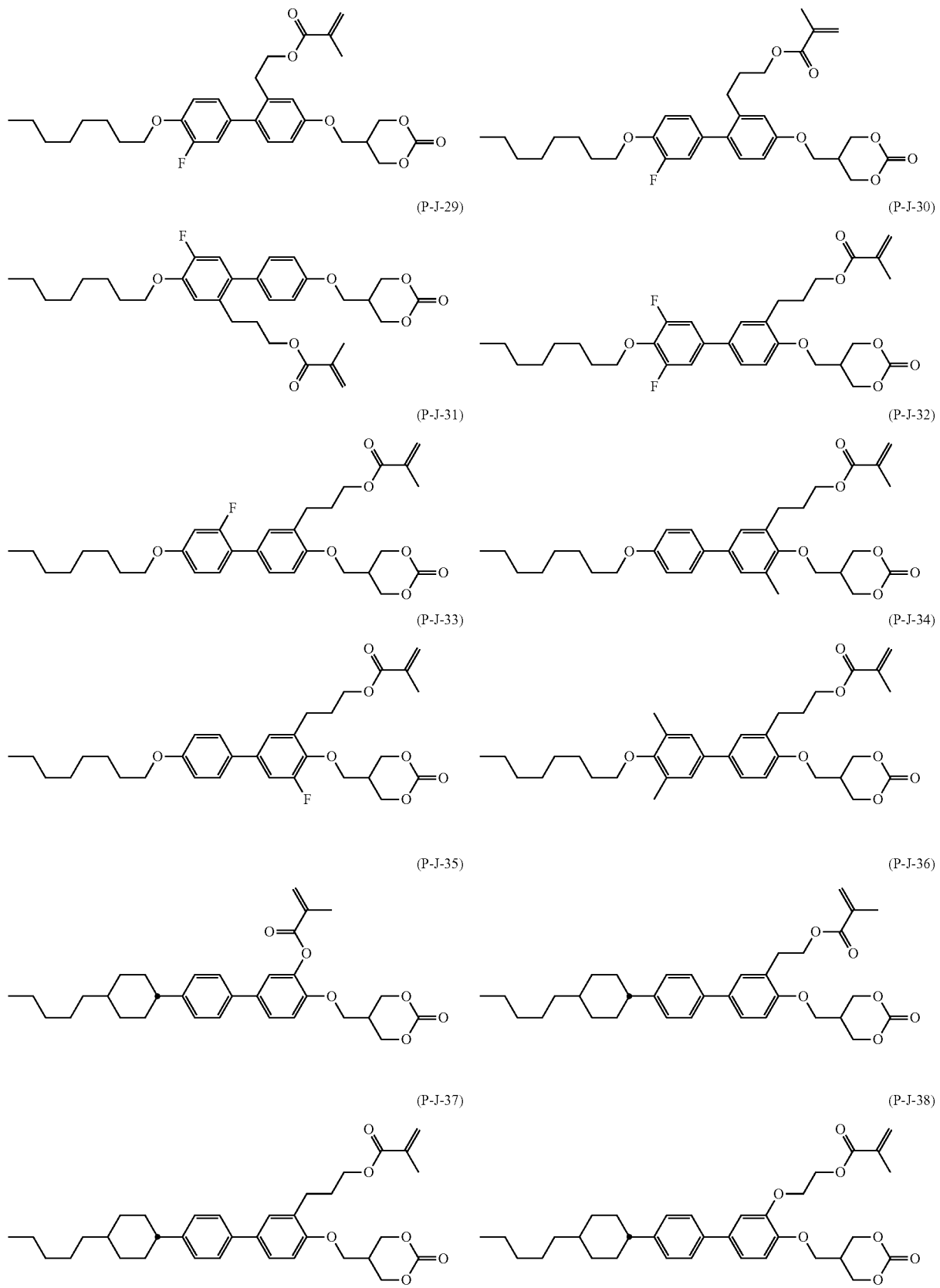

(P-J-39)
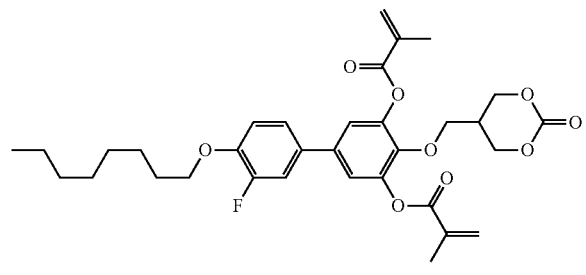
(P-J-40)
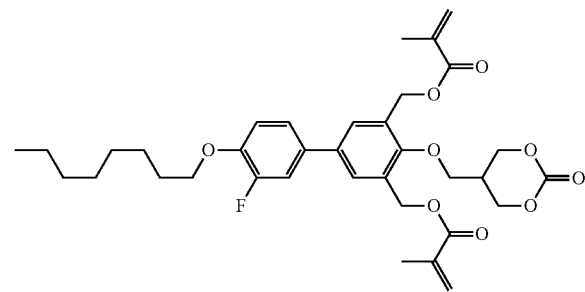
(P-J-41)
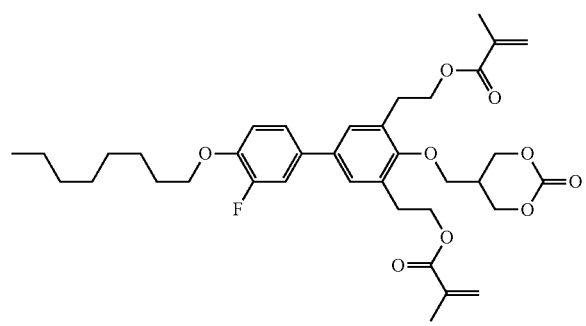
(P-J-42)
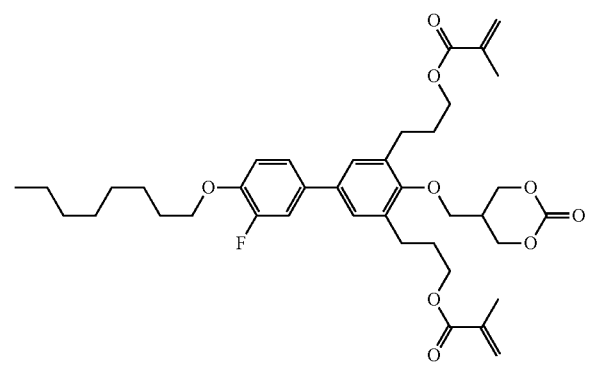
(P-J-43)
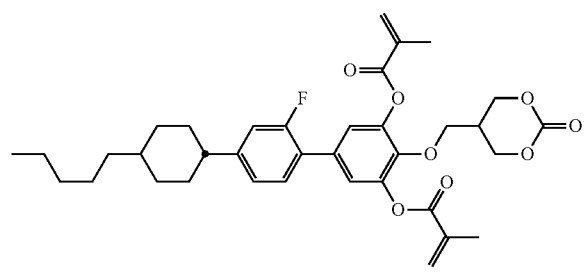
(P-J-44)
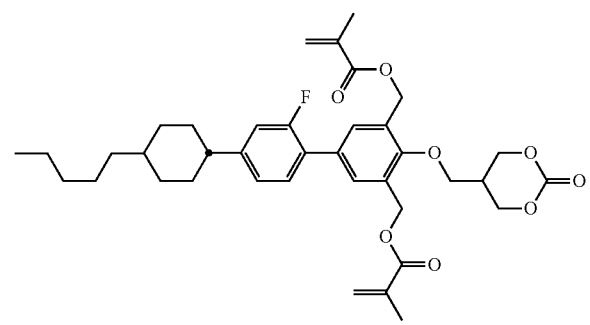
(P-J-45)
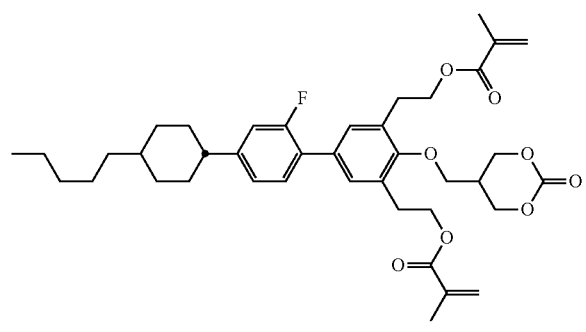
(P-J-46)
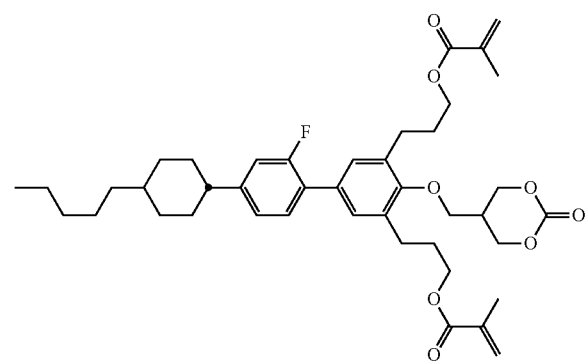

-continued
(P-J-47)
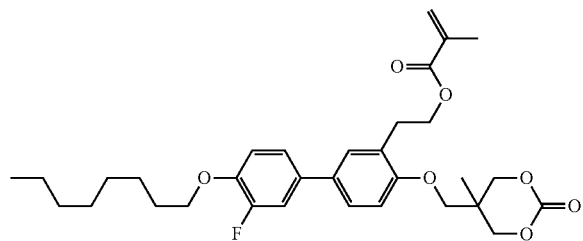
(P-J-48)
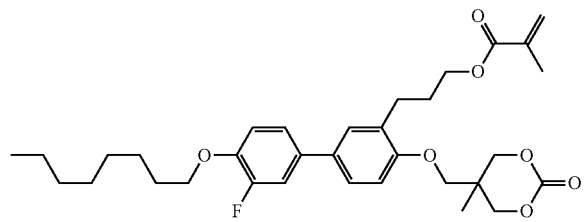
(P-J-49)
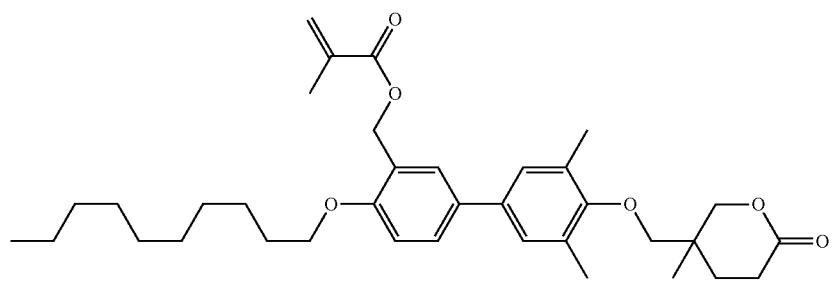
(P-J-50)
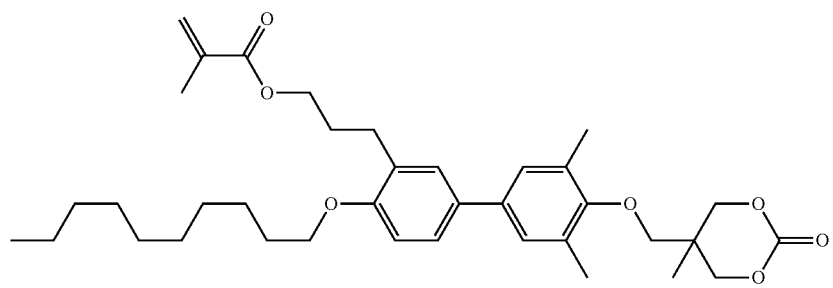
(P-1)
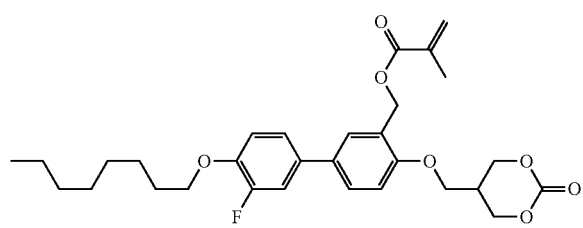
(P-2)
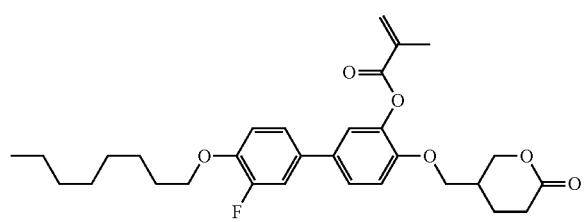
(P-3)
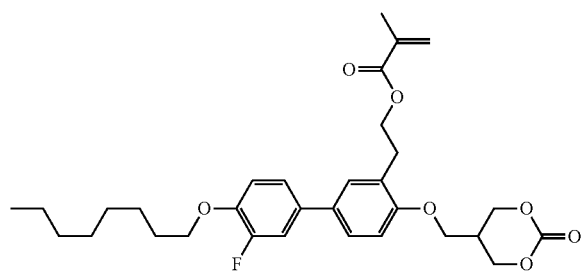
(P-4)
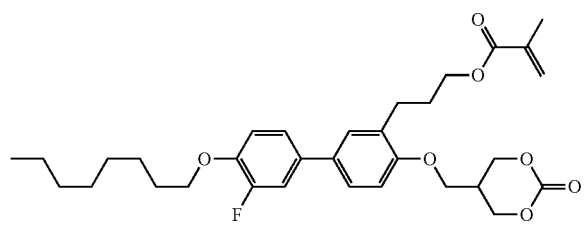

-continued
(P-5)
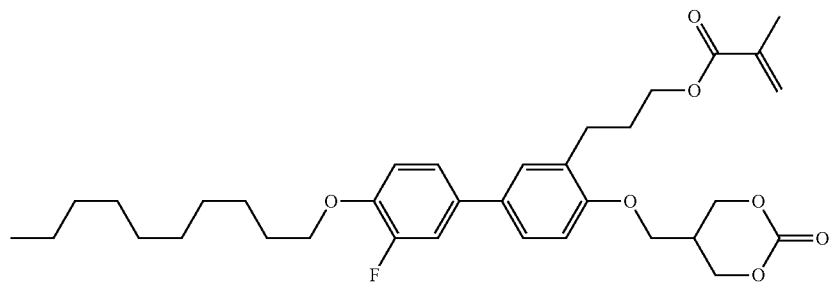
(P-6)
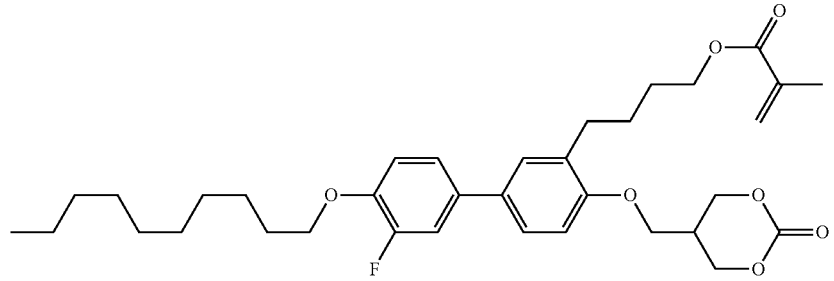
(P-7)
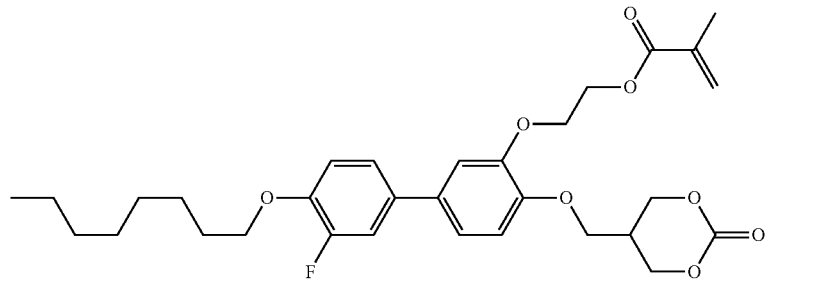
(P-8)
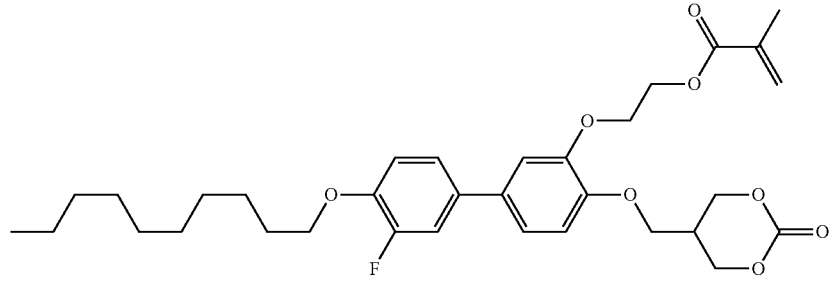
(P-9)
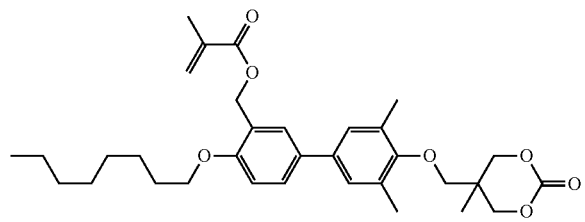
(P-10)
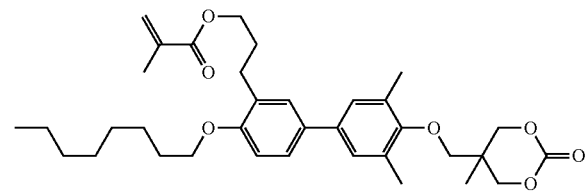
(P-11)
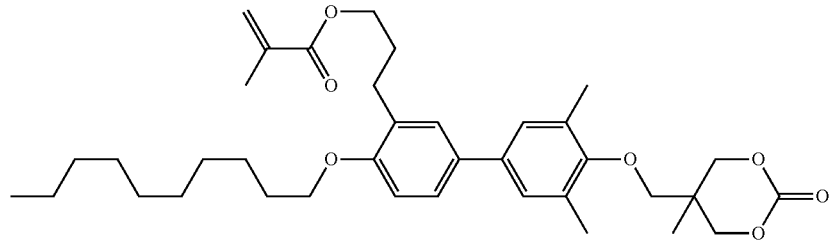

(P-12)
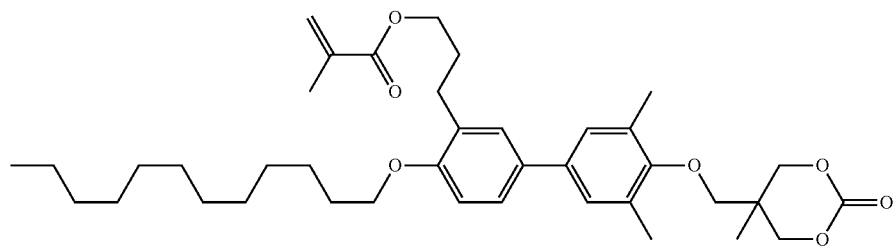
(P-13)          (P-14)
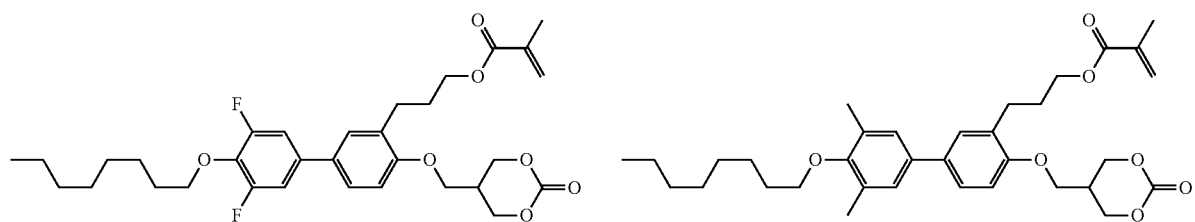
(P-15)          (P-16)
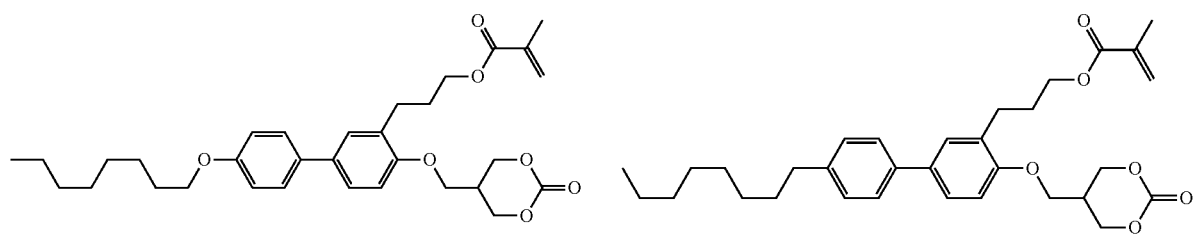
(P-17)
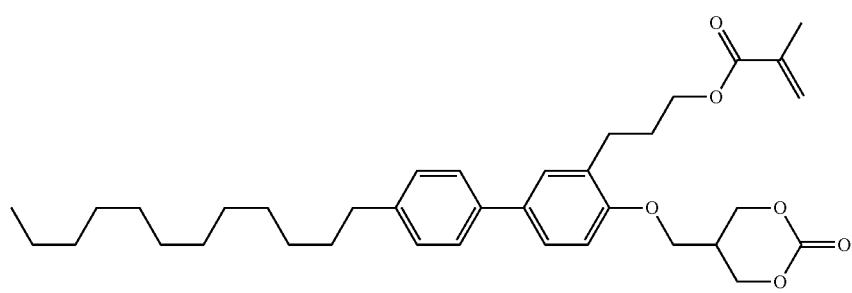
(P-18)
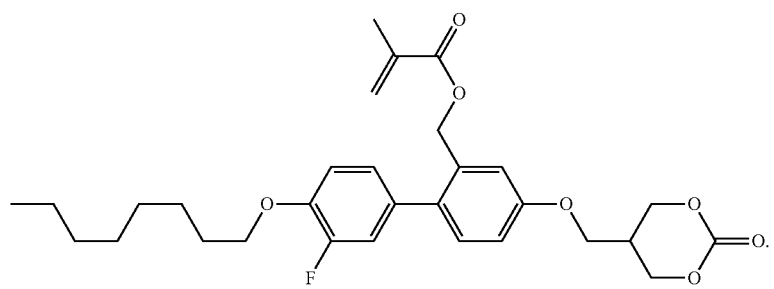

2. The liquid crystal composition according to claim 1, wherein in General Formula (I), $n^{11}$ is 0 or 1.

3. The liquid crystal composition according to claim 1, wherein in General Formula (I), $L^{10}$ and $L^{11}$ are single bonds.

4. The liquid crystal composition according to claim 1, further comprising:

one or two or more kinds of compounds selected from the group consisting of compounds represented by General Formulae (N-1), (N-2), and (N-3):

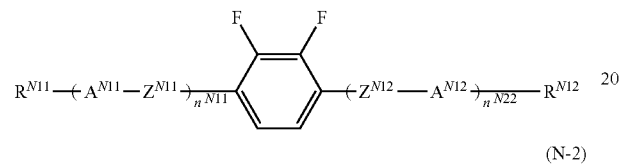
(N-1)

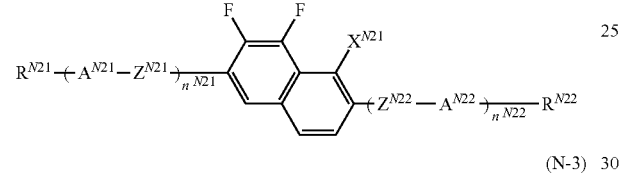
(N-2)

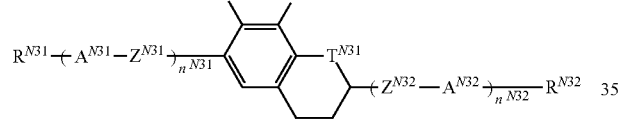
(N-3)

wherein $R^{N11}$, $R^{N12}$, $R^{N21}$, $R^{N22}$, $R^{N31}$, and $R^{N32}$ each independently represent an alkyl group having 1 to 8 carbon atoms, and one —$CH_2$— or two or more non-adjacent —$CH_2$—'s in the alkyl group may be each independently substituted with —CH=CH—, —C≡C—, —O—, —CO—, —COO—, or —OCO—, $A^{N11}$, $A^{N12}$, $A^{N21}$, $A^{N22}$, $A^{N31}$, and $A^{N32}$ each independently represent a group selected from the group consisting of (a) 1,4-cyclohexylene group (one —$CH_2$— or two or more non-adjacent —$CH_2$—'s present in this group may be substituted with —O—), (b) 1,4-phenylene group (one —CH= or two or more non-adjacent —CH='s present in this group may be substituted with —N=), (c) naphthalene-2,6-diyl group, 1,2,3,4-tetrahydronaphthalene-2,6-diyl group, or decahydronaphthalene-2,6-diyl group (one —CH= or two or more non-adjacent —CH='s present in the naphthalene-2,6-diyl group or the 1,2,3,4-tetrahydronaphthalene-2,6-diyl group may be substituted with —N=), and (d) 1,4-cyclohexenylene group, the group (a), the group (b), the group (c), and the group (d) may be each independently substituted with a cyano group, a fluorine atom, or a chlorine atom, $Z^{N11}$, $Z^{N12}$, $Z^{N21}$, $Z^{N22}$, $Z^{N31}$, and $Z^{N32}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, $X^{N21}$ represents a hydrogen atom or a fluorine atom, $T^{N31}$ represents a —$CH_2$— or an oxygen atom, and $n^{N11}$, $n^{N12}$, $n^{N21}$, $n^{N22}$, $n^{N31}$, and $n^{N32}$ each independently represent an integer of 0 to 3, wherein $n^{N11}+n^{N12}$, $n^{N21}+n^{N22}$, and $n^{N31}+n^{N32}$ each independently represent 1, 2, or 3, and in a case where there are a plurality of $A^{N11}$'s to $A^{N32}$'s and $Z^{N11}$'s to $Z^{N32}$'s, those may be the same as or different from each other.

5. The liquid crystal composition according to claim 1, further comprising:

one or two or more kinds of compounds selected from compounds represented by General Formula (L):

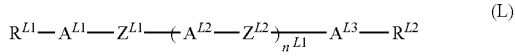
(L)

wherein $R^{L1}$ and $R^{L2}$ each independently represent an alkyl group having 1 to 8 carbon atoms, wherein one —$CH_2$— or two or more non-adjacent —$CH_2$—'s in the alkyl group may be each independently substituted with —CH=CH—, —C≡C—, —O—, —CO—, —COO—, or —OCO—, $n^{L1}$ represents 0, 1, 2, or 3, $A^{L1}$, $A^{L2}$, and $A^{L3}$ each independently represent a group selected from the group consisting of (a) 1,4-cyclohexylene group (one —$CH_2$— or two or more non-adjacent —$CH_2$—'s present in this group may be substituted with —O—), (b) 1,4-phenylene group (one —CH= or two or more non-adjacent —CH='s present in this group may be substituted with —N=), and (c) naphthalene-2,6-diyl group, 1,2,3,4-tetrahydronaphthalene-2,6-diyl group, or decahydronaphthalene-2,6-diyl group (one —CH= or two or more non-adjacent —CH='s present in the naphthalene-2,6-diyl group or the 1,2,3,4-tetrahydronaphthalene-2,6-diyl group may be substituted with —N=), the group (a), the group (b), and the group (c) may be each independently substituted with a cyano group, a fluorine atom, or a chlorine atom, $Z^{L1}$ and $Z^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, in a case where $n^{L1}$ is 2 or 3 and a plurality of $A^{L2}$'s are present, those may be the same as or different from each other, and in a case where $n^{L1}$ is 2 or 3 and a plurality of $Z^{L2}$'s are present, those may be the same as or different from each other.

6. The liquid crystal composition according to claim 1 for use in a liquid crystal display device having a pair of substrates, at least one of which is provided with no alignment film on a surface.

7. A liquid crystal display device comprising the liquid crystal composition according to claim 1.

8. A liquid crystal display device for active matrix drive comprising the liquid crystal composition according to claim 1.

9. A liquid crystal display device for a PSA mode, a PSVA mode, a PS-IPS mode, or a PS-FFS mode comprising the liquid crystal composition according to claim 1.

10. A liquid crystal display device having a pair of substrates, at least one of which is provided with no alignment film on a surface, the device comprising:
- a first substrate and a second substrate which are disposed opposite to each other;
- a liquid crystal layer which is placed between the first substrate and the second substrate;
- an electrode layer which has a plurality of gate bus lines and data bus lines arranged in a matrix, a thin film transistor provided at each intersection of the gate bus lines and the data bus lines, and a pixel electrode driven by the thin film transistor for each pixel, on the first substrate;
- a common electrode which is formed on the first substrate or the second substrate; and
- a resin component formed by curing the polymerizable monomer and the spontaneously aligning monomer of the liquid crystal composition according to claim 1 between the first substrate and the second substrate.

* * * * *